INVENTORS
GEORGE G HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ETAL 3,053,449
ELECTRONIC COMPUTER SYSTEM
Filed March 4, 1955 65 Sheets-Sheet 2

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

ELECTRONIC COMPUTER SYSTEM

Filed March 4, 1955 65 Sheets-Sheet 3

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Lawrence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTOR
GEORGE G. HOBERG
LUCILLE E. MOTT
JOHN R. VAN ANDEL
EDWARD W. VEITCH
RICHARD C. WEISE BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ETAL 3,053,449

ELECTRONIC COMPUTER SYSTEM

Filed March 4, 1955 65 Sheets-Sheet 11

*INVENTORS*
GEORGE G. HOBERG
LUCILLE E. MOTT
JOHN R. VAN ANDEL
EDWARD W. VEITCH
RICHARD C. WEISE
BY Lawrence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY

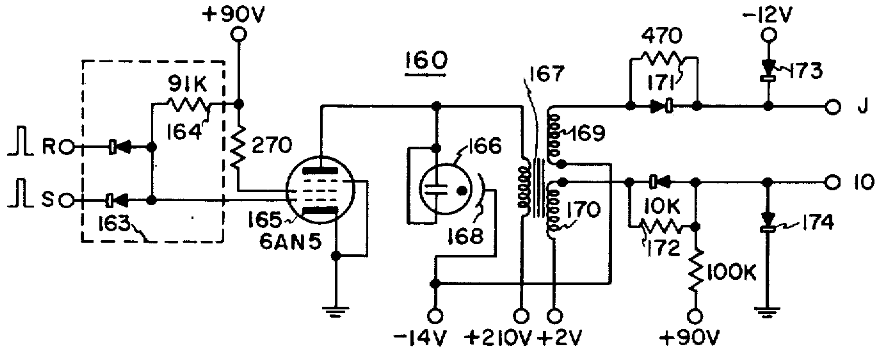
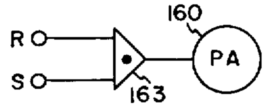
FIG. 16
FIG. 16a
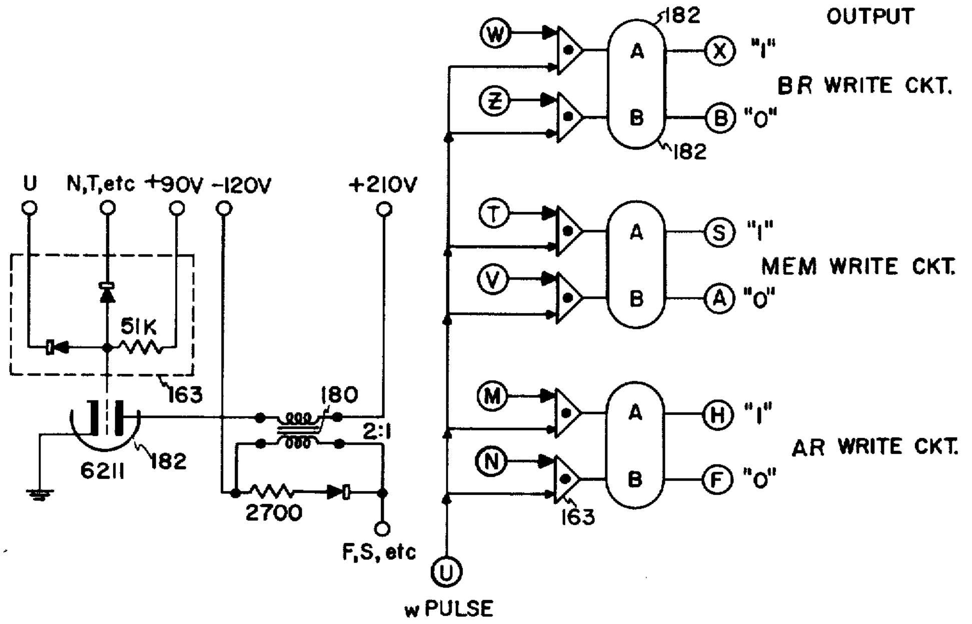
FIG. 17a FIG. 17b
INVENTORS
GEORGE G. HOBERG
LUCILLE E. MOTT
JOHN R. VAN ANDEL
EDWARD W. VEITCH
RICHARD C. WEISE
BY Lawrence R. Brown
ATTORNEY

ELECTRONIC COMPUTER SYSTEM

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

ELECTRONIC COMPUTER SYSTEM

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ETAL 3,053,449

ELECTRONIC COMPUTER SYSTEM

Filed March 4, 1955 65 Sheets-Sheet 18

*INVENTORS*
GEORGE G. HOBERG
LUCILLE E. MOTT
JOHN R. VAN ANDEL
EDWARD W. VEITCH
RICHARD C. WEISE

BY Laurence R. Brown
ATTORNEY

Sept. 11, 1962 G. G. HOBERG ETAL 3,053,449

ELECTRONIC COMPUTER SYSTEM

Filed March 4, 1955 65 Sheets-Sheet 19

INVENTORS
GEORGE G. HOBERG
LUCILLE E. MOTT
JOHN R. VAN ANDEL
EDWARD W. VEITCH
RICHARD C. WEISE

BY Lawrence R. Brown
ATTORNEY

ELECTRONIC COMPUTER SYSTEM

Filed March 4, 1955

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Lawrence R. Brown
ATTORNEY Sept. 11, 1962 G. G. HOBERG ETAL 3,053,449

ELECTRONIC COMPUTER SYSTEM

Filed March 4, 1955 65 Sheets-Sheet 22

INVENTORS
GEORGE G. HOBERG
LUCILLE E. MOTT
JOHN R. VAN ANDEL
EDWARD W. VEITCH
RICHARD C. WEISE

BY Laurence R. Brown
ATTORNEY

INVENTORS
GEORGE HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS.
GEORGE G. HOBERG
LUCILLE E. MOTT
BY JOHN R. VAN ANDEL
EDWARD W. VEITCH
RICHARD C. WEISE
Ralzemond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

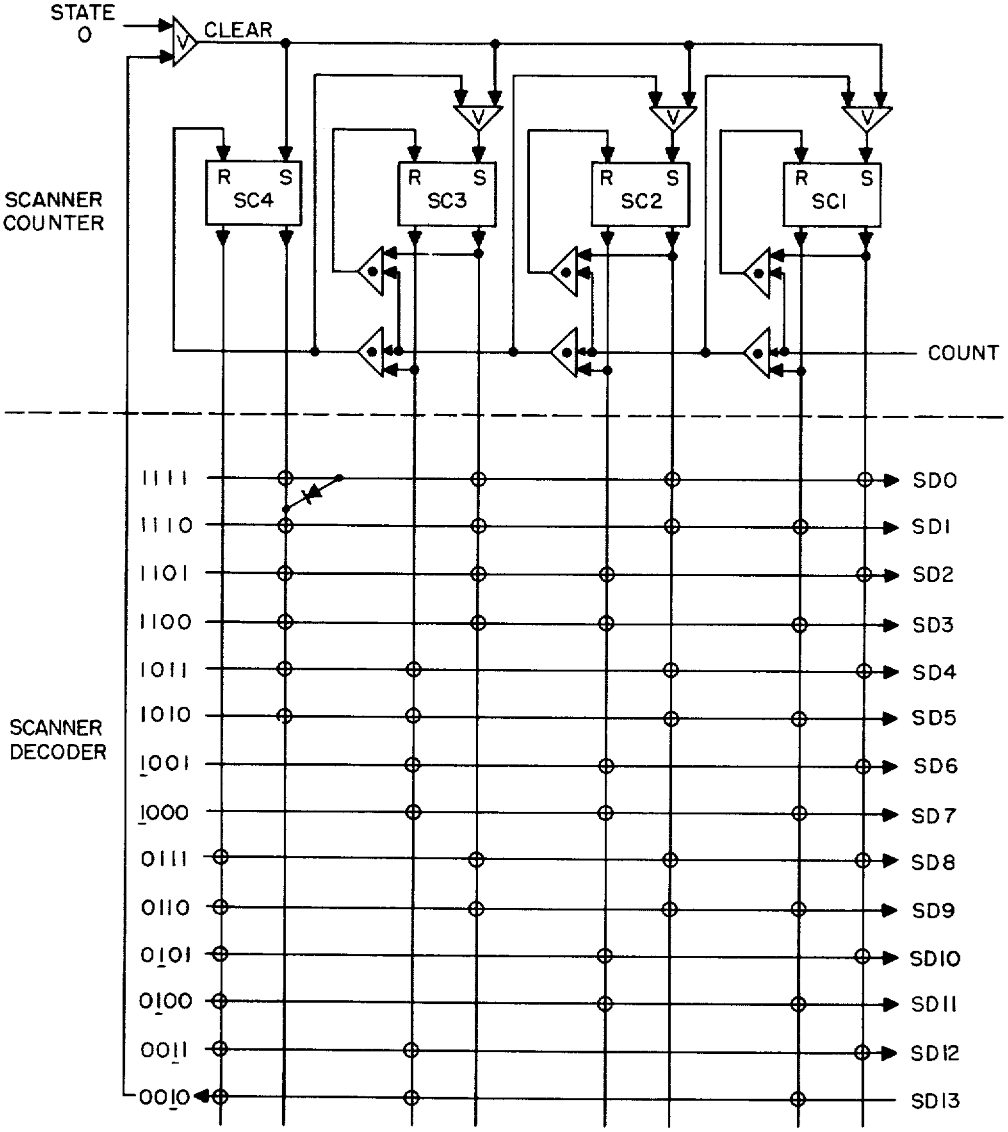
FIG. 34a SCANNER
INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

ELECTRONIC COMPUTER SYSTEM

Filed March 4, 1955 65 Sheets-Sheet 35

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

ELECTRONIC COMPUTER SYSTEM

Filed March 4, 1955 65 Sheets-Sheet 37

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY

ELECTRONIC COMPUTER SYSTEM

Filed March 4, 1955 65 Sheets-Sheet 38

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

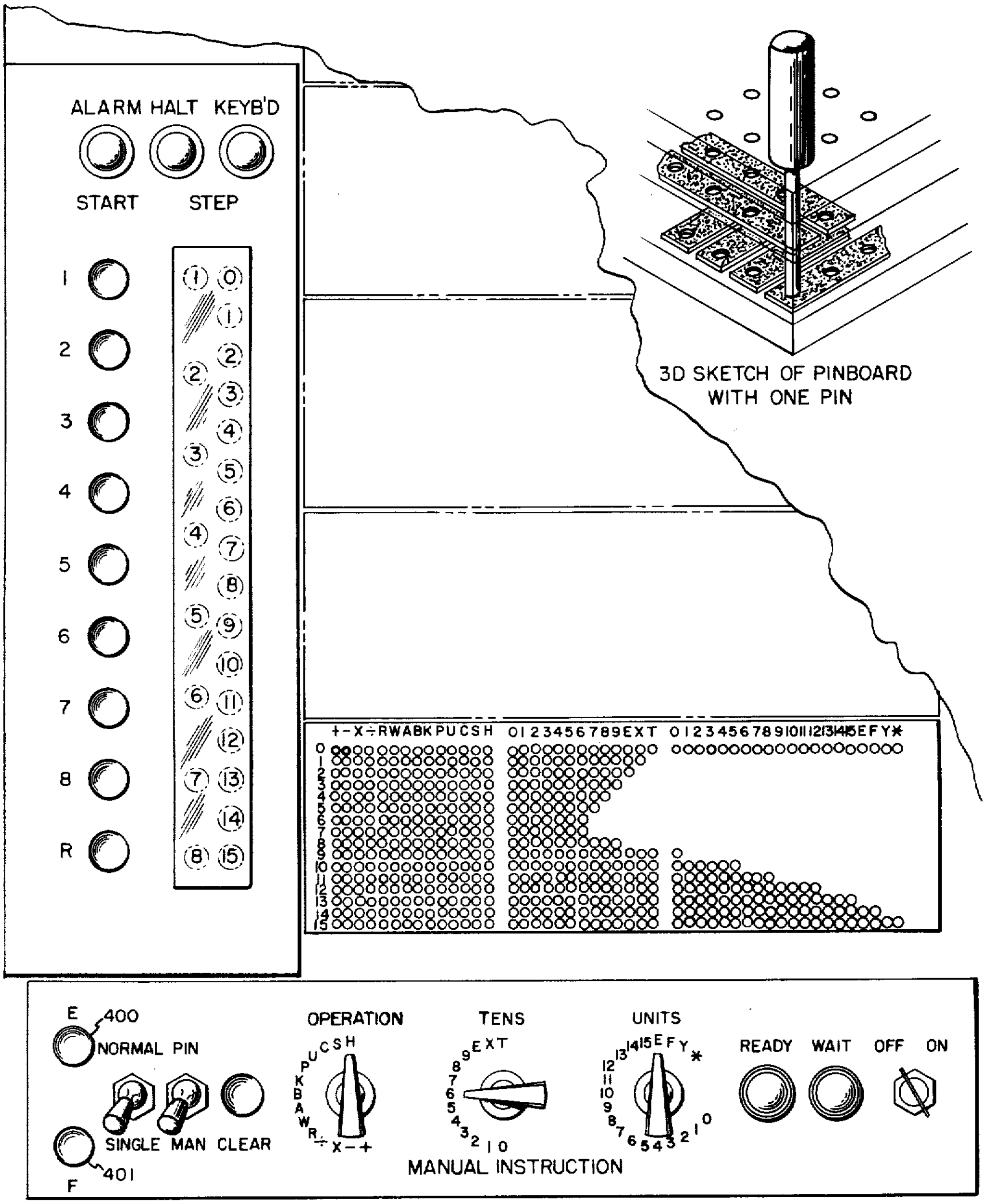
FIG. 36
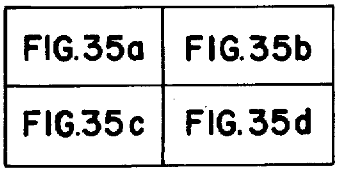
FIG. 35a FIG. 35b
FIG. 35c FIG. 35d
FIG. 35e
INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY
Raymond B. Parker
ATTORNEY

ALARM CIRCUITS

*INVENTORS*
GEORGE G. HOBERG
LUCILLE E. MOTT
JOHN R. VAN ANDEL
EDWARD W. VEITCH
RICHARD C. WEISE
BY [signature]
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ETAL 3,053,449

ELECTRONIC COMPUTER SYSTEM

Filed March 4, 1955 65 Sheets-Sheet 44

INVENTORS
GEORGE G. HOBERG
LUCILLE E. MOTT
JOHN R. VAN ANDEL
EDWARD W. VEITCH
RICHARD C. WEISE

BY Laurence R. Brown
ATTORNEY

SIGN CONTROL

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

SIGN CONTROL AD2

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

COUNTER V & VI INPUTS

INVENTORS
GEORGE G. HOBERG
LUCILLE E. MOTT
JOHN R. VAN ANDEL
EDWARD W. VEITCH
RICHARD C. WEISE
BY Lawrence R. Brown
ATTORNEY Sept. 11, 1962 G. G. HOBERG ETAL 3,053,449

ELECTRONIC COMPUTER SYSTEM

Filed March 4, 1955 65 Sheets-Sheet 48

INVENTORS
GEORGE G. HOBERG
LUCILLE E. MOTT
JOHN R. VAN ANDEL
EDWARD W. VEITCH
RICHARD C. WEISE

BY Laurence R. Brown
ATTORNEY

DIGIT DISTRIBUTOR AND
SCANNER CONDITIONS

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ETAL 3,053,449

ELECTRONIC COMPUTER SYSTEM

Filed March 4, 1955 65 Sheets-Sheet 51

TRANSFER THYRATRONS

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY

ELECTRONIC COMPUTER SYSTEM

Filed March 4, 1955 65 Sheets-Sheet 52

ACCUMULATOR INPUT FIG. 48

INVENTORS
GEORGE G. HOBERG
LUCILLE E. MOTT
JOHN R. VAN ANDEL
EDWARD W. VEITCH
RICHARD C. WEISE
BY Lawrence R. Brown
ATTORNEY

ACCUMULATOR COUNTER

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

STATE COUNTER

INVENTORS
GEORGE G. HOBERG
LUCILLE E. MOTT
JOHN R. VAN ANDEL
EDWARD W VEITCH
RICHARD C. WEISE
BY Laurence R. Brown
ATTORNEY

STATE COUNTER FIG. 51

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

STATE COUNTER

INVENTORS.
GEORGE G. HOBERG
LUCILLE E. MOTT
BY JOHN R. VAN ANDEL
EDWARD W. VEITCH
RICHARD C. WEISE
Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

MISC. CIRCUITS

*INVENTORS*
GEORGE G. HOBERG
LUCILLE E. MOTT
JOHN R. VANANDEL
EDWARD W. VEITCH
RICHARD C. WEISE
BY Laurence R. Brown
ATTORNEY INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ETAL 3,053,449

ELECTRONIC COMPUTER SYSTEM

Filed March 4, 1955 65 Sheets-Sheet 60

INVENTORS
GEORGE G. HOBERG
LUCILLE E. MOTT
JOHN R. VAN ANDEL
EDWARD W. VEITCH
RICHARD C. WEISE

BY Laurence R. Brown
ATTORNEY

Sept. 11, 1962 G. G. HOBERG ETAL 3,053,449

ELECTRONIC COMPUTER SYSTEM

Filed March 4, 1955 65 Sheets-Sheet 61

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY

MULTIPLY

INVENTORS
GEORGE G. HOBERG
LUCILLE E. MOTT
JOHN R. VAN ANDEL
EDWARD W. VEITCH
RICHARD C. WEISE

BY Laurence R. Brown
ATTORNEY

DIVIDE

*INVENTORS*
GEORGE G. HOBERG
LUCILLE E. MOTT
JOHN R. VAN ANDEL
EDWARD W. VEITCH
RICHARD C. WEISE
BY Laurence R. Brown
ATTORNEY Sept. 11, 1962 G. G. HOBERG ET AL 3,053,449

ELECTRONIC COMPUTER SYSTEM

Filed March 4, 1955 65 Sheets-Sheet 65

SHIFT

INVENTORS
GEORGE G. HOBERG
LUCILLE E. MOTT
JOHN R. VAN ANDEL
EDWARD W. VEITCH
RICHARD C. WEISE
BY Laurence R. Brown
ATTORNEY United States Patent Office 3,053,449
Patented Sept. 11, 1962

3,053,449

ELECTRONIC COMPUTER SYSTEM

George G. Hoberg, Berwyn, Lucille E. Mott, Ardmore, John R. Van Andel, Bridgeport, Edward W. Veitch, St. Davids, and Richard C. Weise, Philadelphia, Pa., assignors to Burroughs Corporation, Detroit, Mich., a corporation of Michigan Filed Mar. 4, 1955, Ser. No. 492,062
67 Claims. (Cl. 235—157)

This invention relates to electronic digital computers and more particularly to general-purpose computers having program control devices adapted to perform squencing of program steps representing different programmed operations, under manual or automatic control.

In general, electronic computers have been difficult to operate and highly skilled and specialized operators have been necessary for setting up programs to enable the computer to solve the desired problems. These computers have been highly proficient in solving the problems after being properly programmed. However, the programming technique required in prior art general-purpose computers has necessitated extensive training courses, and has resulted in establishment of a few key personnel upon which the operation of the machine depends. Not only has this caused personnel procurement problems, but it reduces the duties of persons charged with the solution of problems to the mechanical routine of gathering data. This results in losing the feel for the problem and its solution and in the ability to sense whether the solution is proper because all contact is broken by the problem originator with the procedures by which the problem is carried out. Even should these persons do the programming they may not understand the procedures followed in the problem solution because they have to think in terms of coded arithmetic notation rather than in terms of the decimal notation with which they are familiar. In the solution of scientific and business problems, therefore, the scientists and the business men have not favorably reacted toward a loss in feeling for finding solutions when using electronic computers, except in those cases where a time schedule bottleneck overrides the desirability for maintaining contact with the procedures by which the problem is solved.

It is, therefore, an object of this invention to provide an electronic computer which permits an operator to maintain manual control of the program steps executed while solving a problem and yet in which the mere routine of arithmetic or recording is done automatically at high speed by the electronic computer.

Another object of the invention is to provide a simplified externally programmed electronic computer capable of manual or automatic program operation and which operates in association with a cyclically operable business machine.

Accordingly, the electronic computer afforded by the present invention provides simplicity of operation and flexibility of control with provisions for manual operator intervention at any stage of the programmed problem. The operator may view partial results and thereafter cause the computation to proceed in accordance with intelligent judgment which cannot be accomplished readily in the machine itself. The computer operations are designed to aid the operator in understanding the nature and the status of the problem as it progresses through the various automatic or optional manual control steps. Visual aids are afforded showing the condition of the machine during the different operational steps. In addition, the machine is provided with visually pinned program instructions to enable the operator at all times to recognize the program in progress. The removable pinboard also permits flexibility in the choice of programs and rapid changing of the computer from one program to another without danger of improper connections because of wiring complexity.

A further object of the invention is to provide an electronic computer which may be directly operated from a standard keyboard without the necessity of employing specialized input or output equipment, and yet which produces a directly usable printed output of the computed result both of the final solution and of any desired intermediate partial solutions.

A further object of the invention is to provide an electronic computer which operates in association with a cyclically operable business machine producing printed page output with programmed format control, so that printed results are produced in report form without reprocessing the data from the computer.

According to the invention, there is provided: an electronic digital computer system comprising a data input device which includes temporary storage means capable of being conditioned to represent data information including a plurality of digits, an electronic counter coupled to said storage means, a scanning circuit coupled to said storage means for successively presetting the counter in accordance with successive ones of said digits represented by said temporary storage means, arithmetic circuits coupled to said counter and adapted to perform a data processing operation on pulses representative of said successive digits, an external pinboard automatic program control device, an external manual program control device, electronic control circuits selectively responsive to signals from either of said control devices to select the sequence in which said control devices shall control the computer system, and internal timing circuits coupled with said counter and also with said control circuits and said computer arithmetic circuits, said control devices coupled with said timing circuits, said input data device, said scanner, said counter and said arithmetic circuits to perform a data processing operation on said data information.

A more detailed description of the electronic computer, organization and mode of operation together with the accompanying electronic circuits and operational features of advantage are described hereinafter with reference to the accompanying drawings, wherein.

Figure 3A:
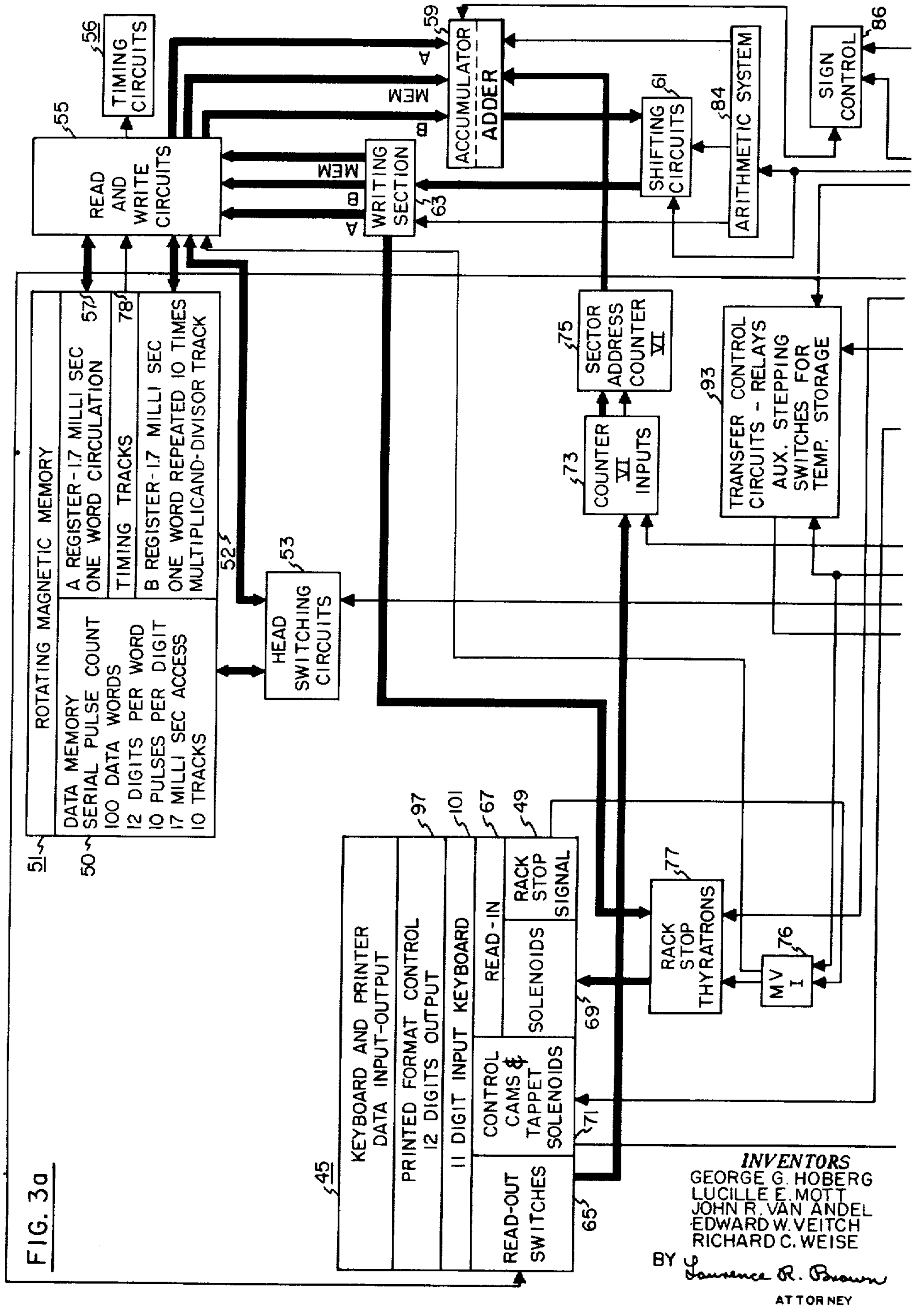
Figure 3B:
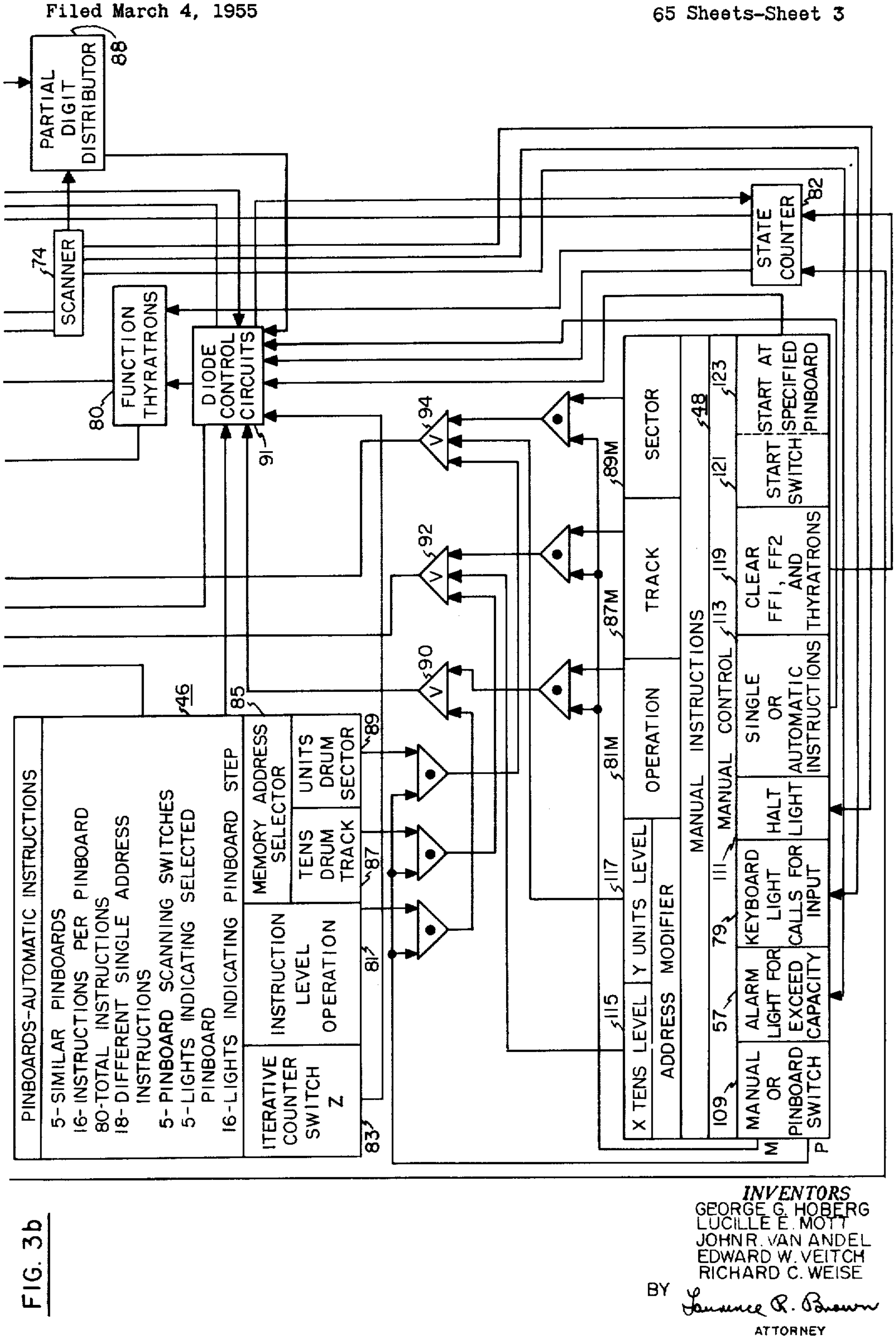
Figure 4:
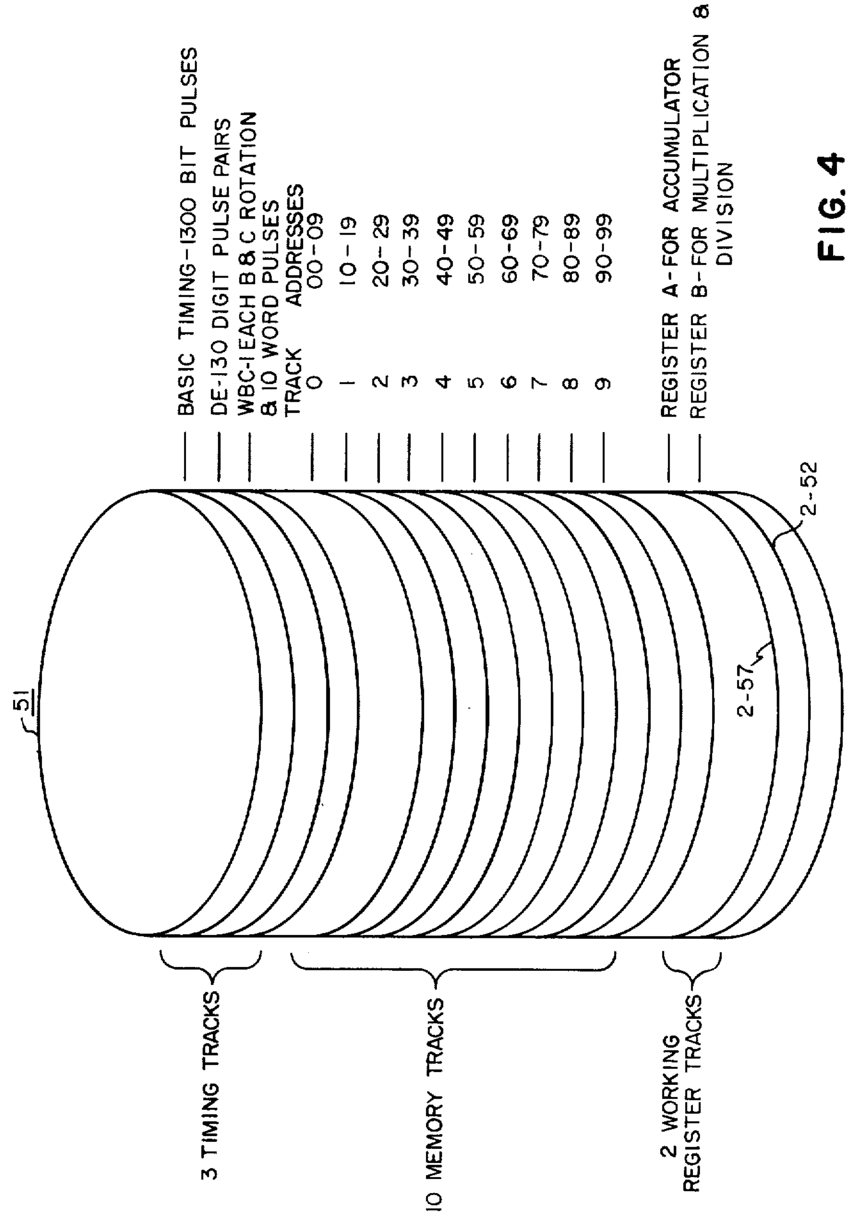
Figure 5:
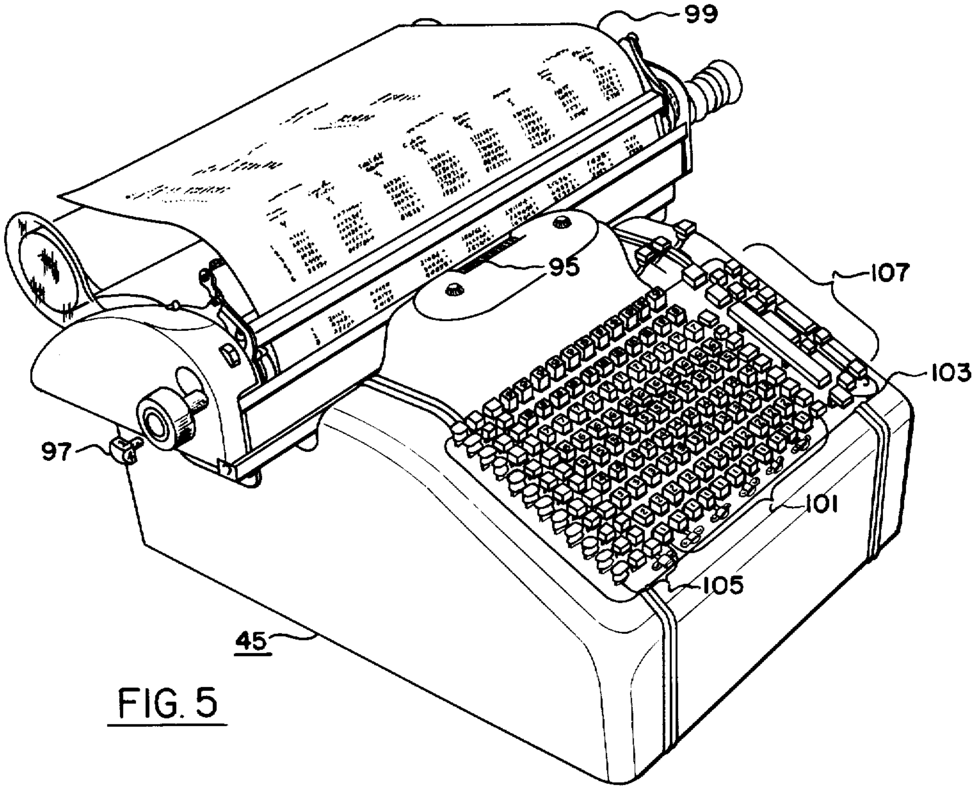
Figure 6:
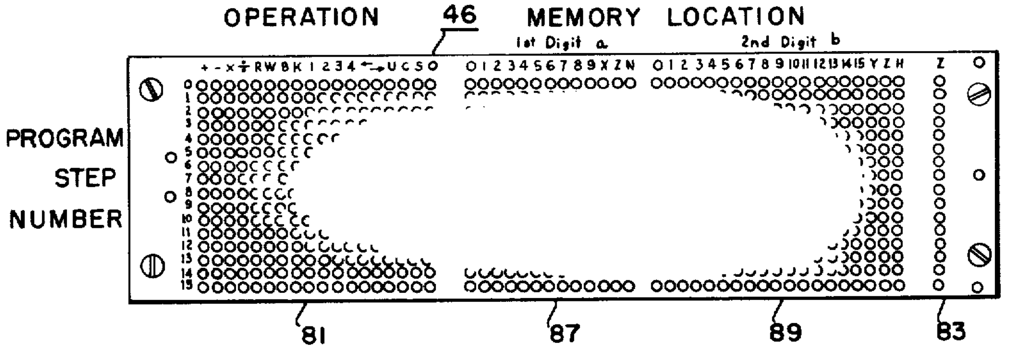
Figure 8:
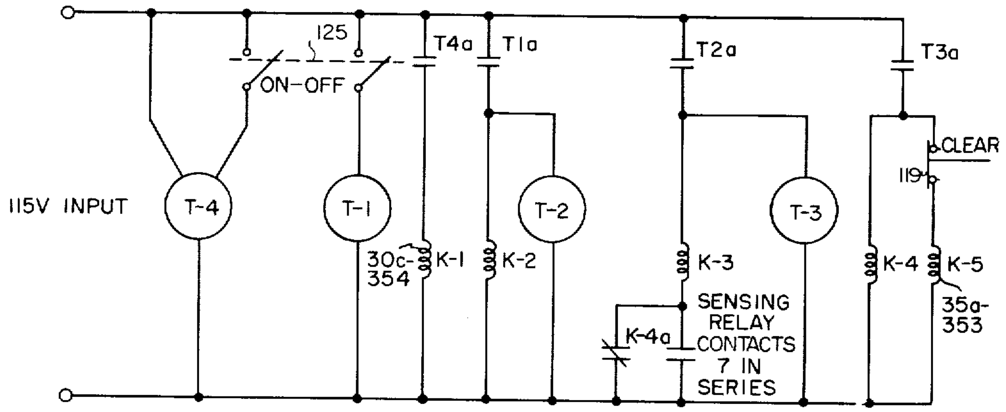
Figure 7:
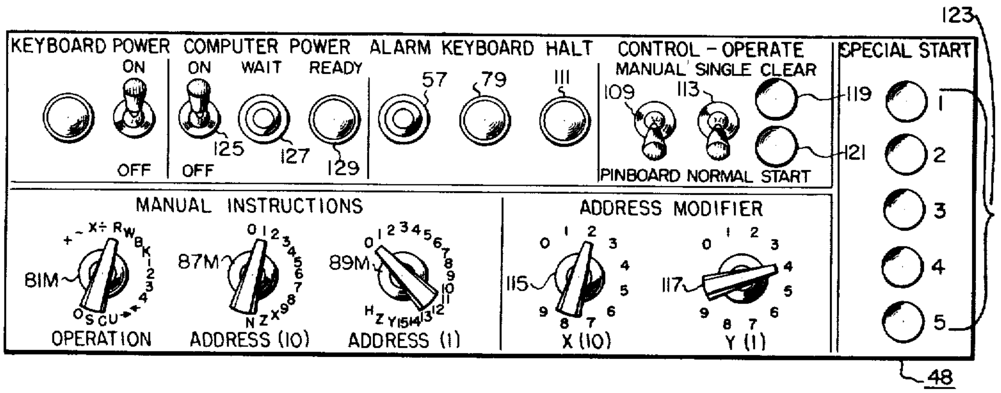
Figure 9:
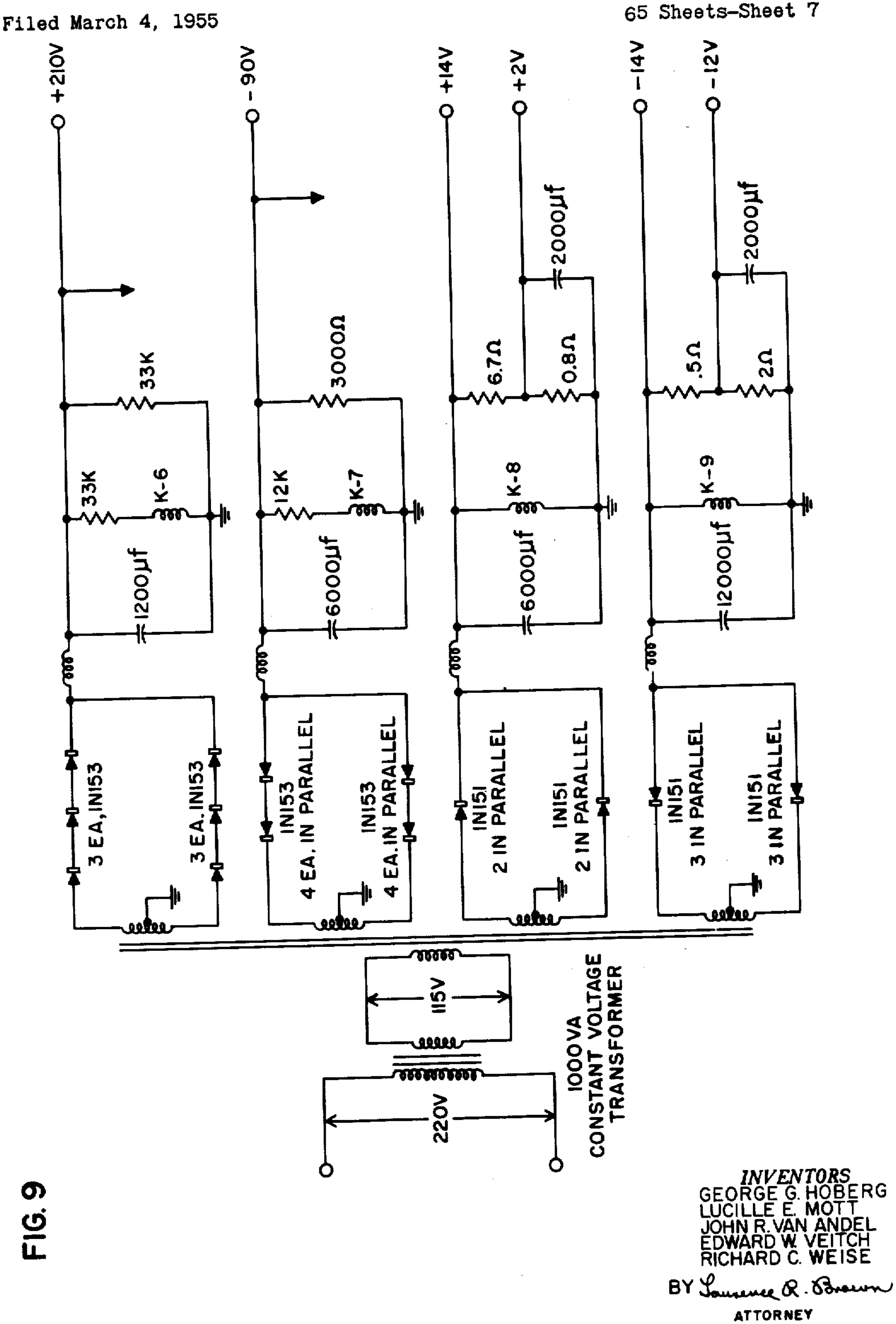
Figure 10:
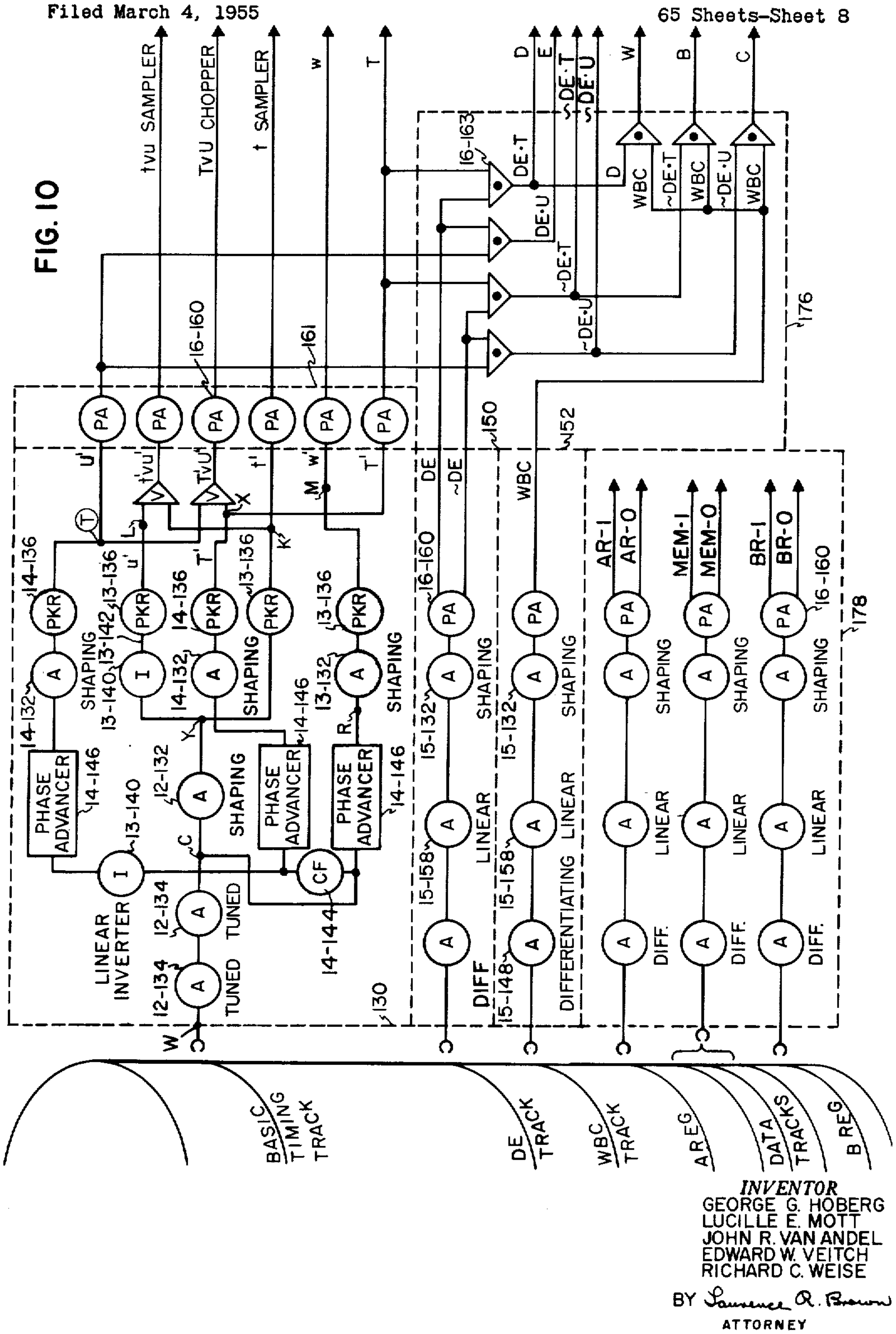
Figure 11:
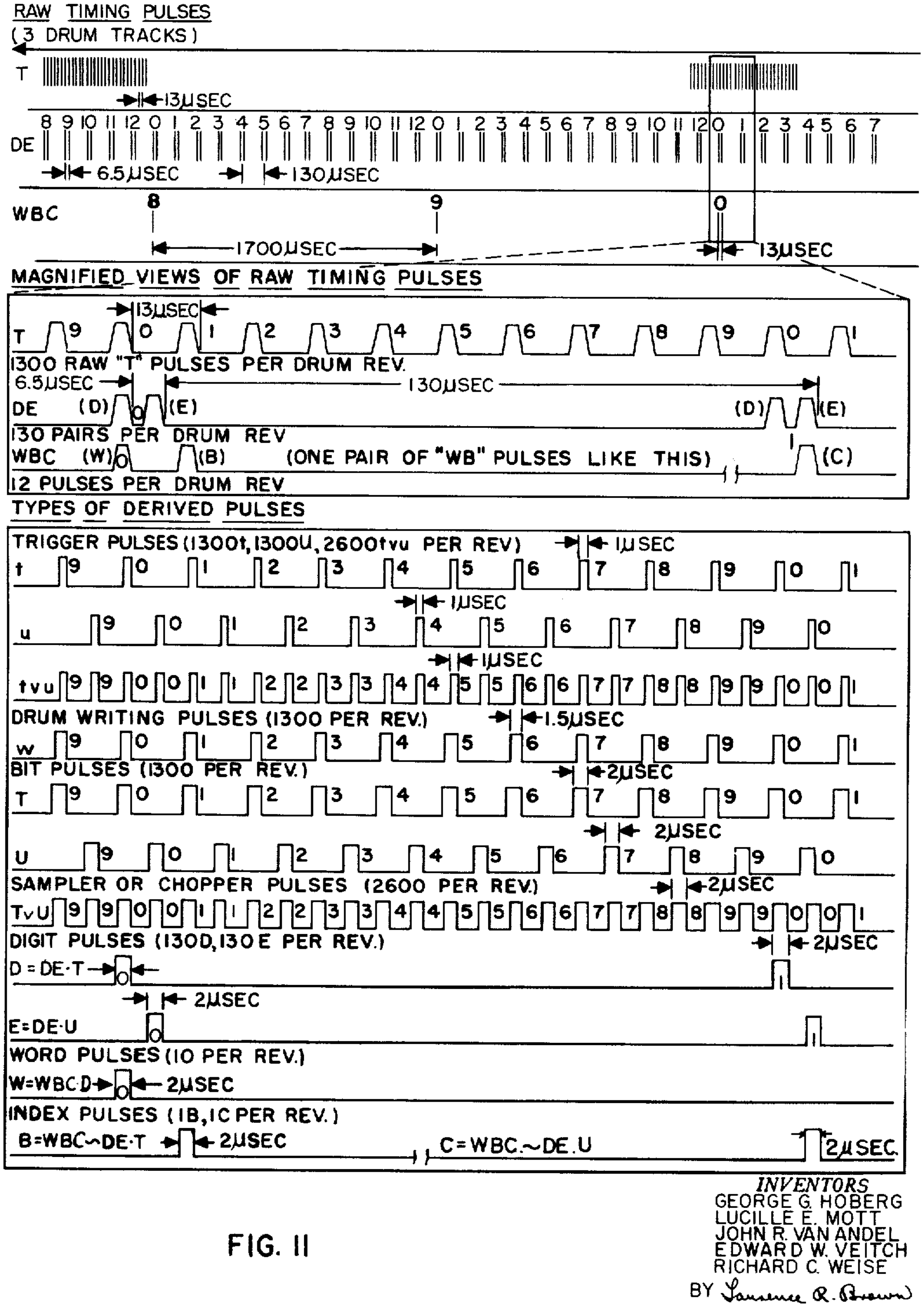
Figure 12A:
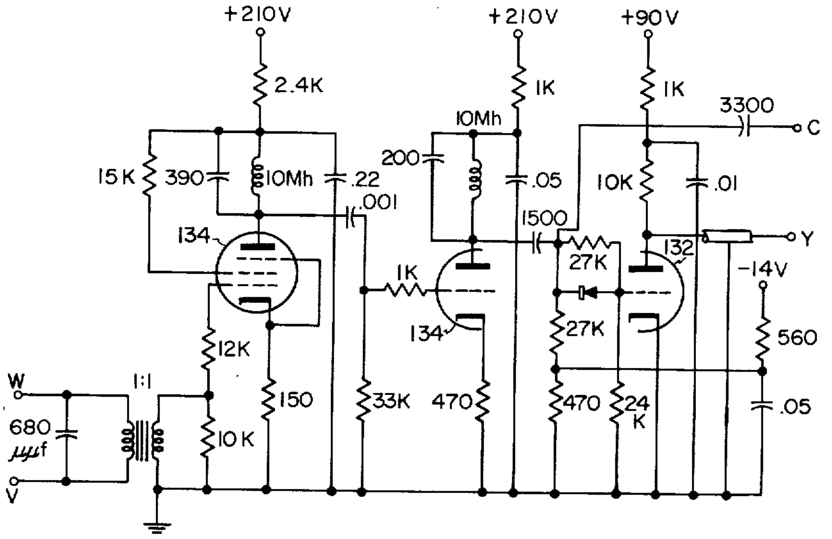
Figure 12B:
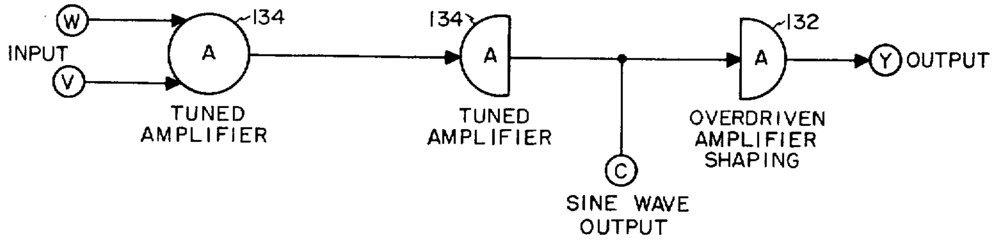
Figure 13A:
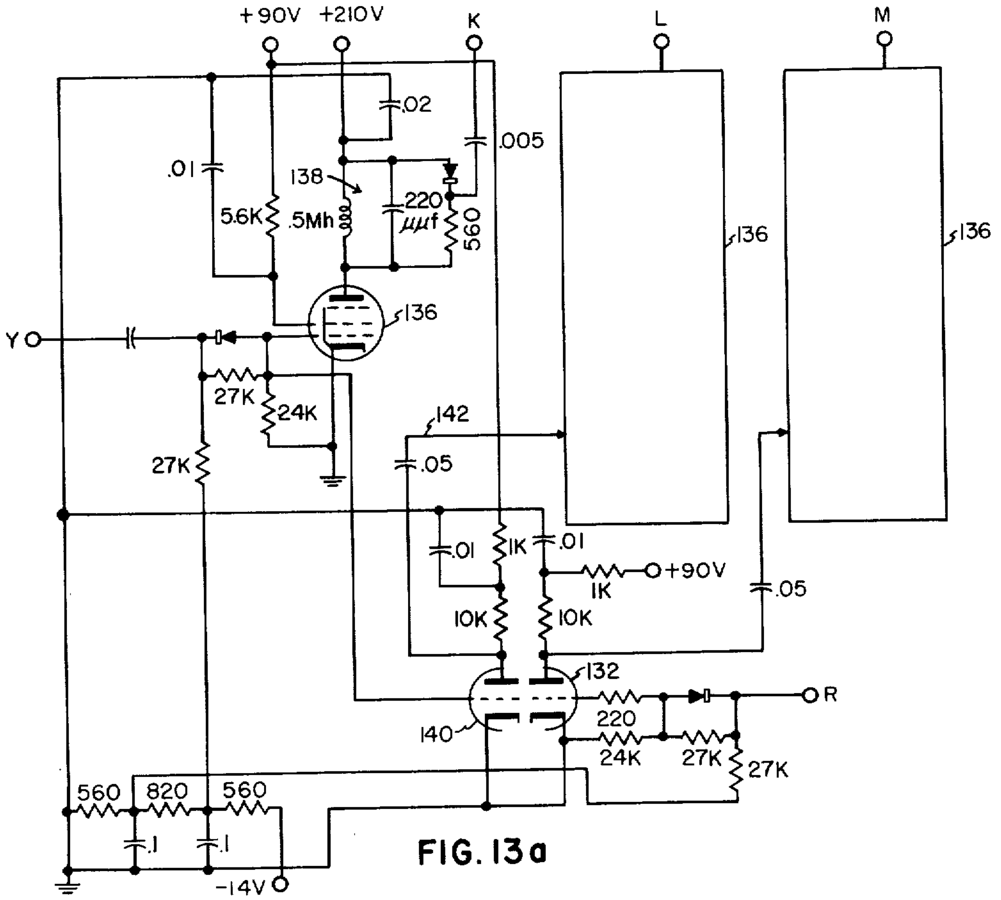
Figure 13B:
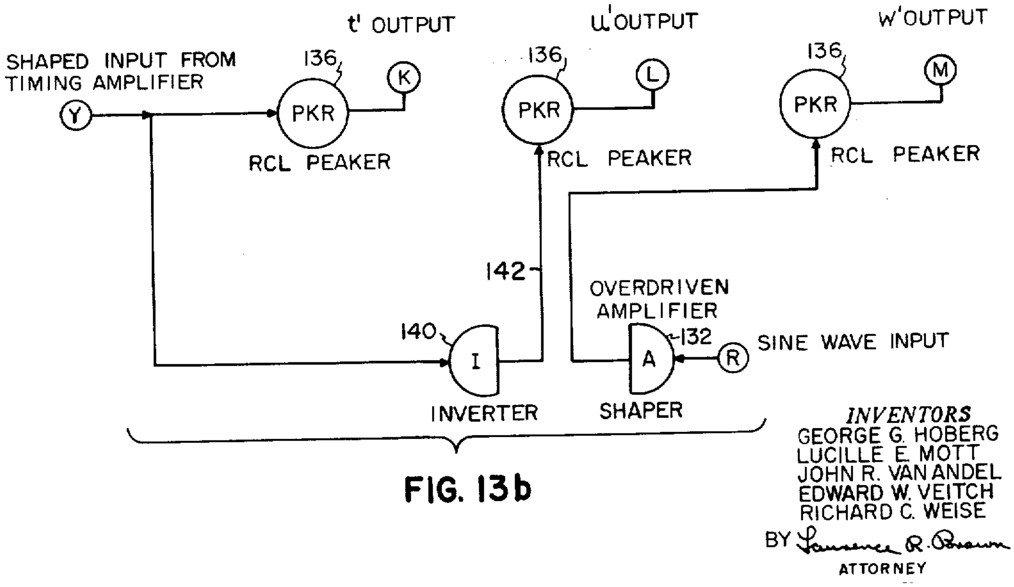
Figure 14A:
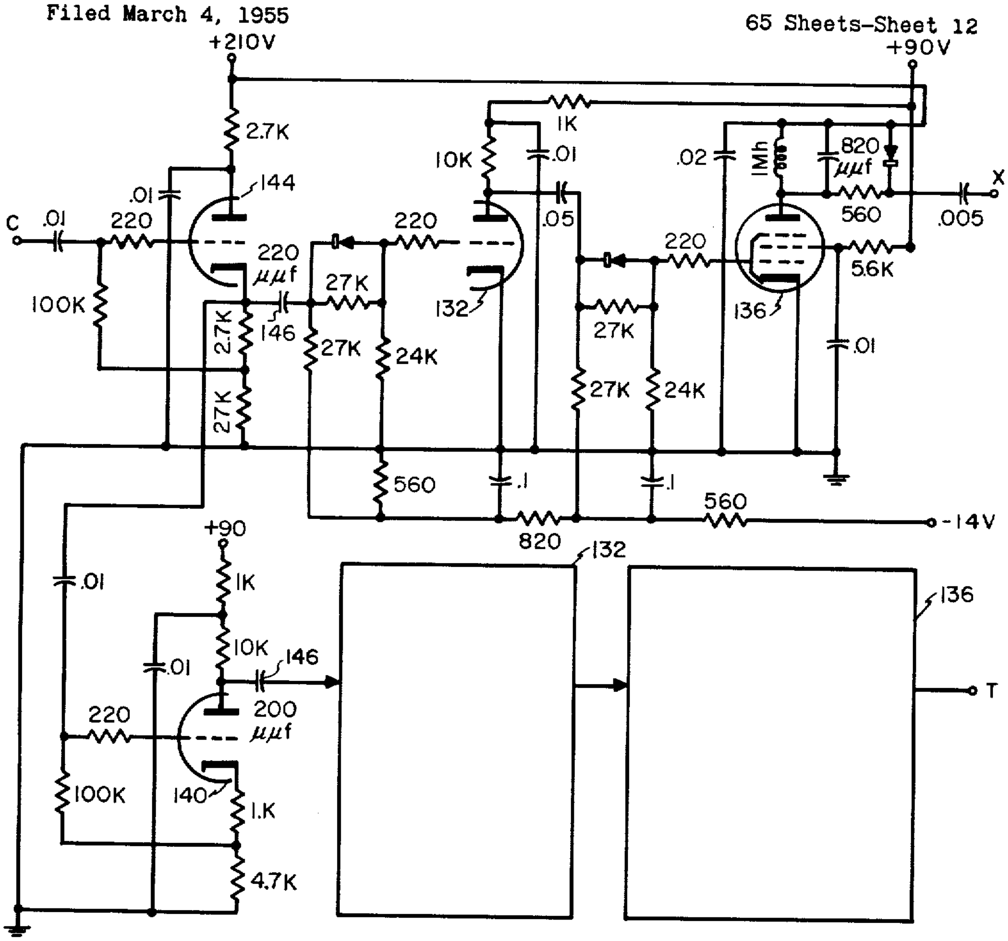
Figure 14B:
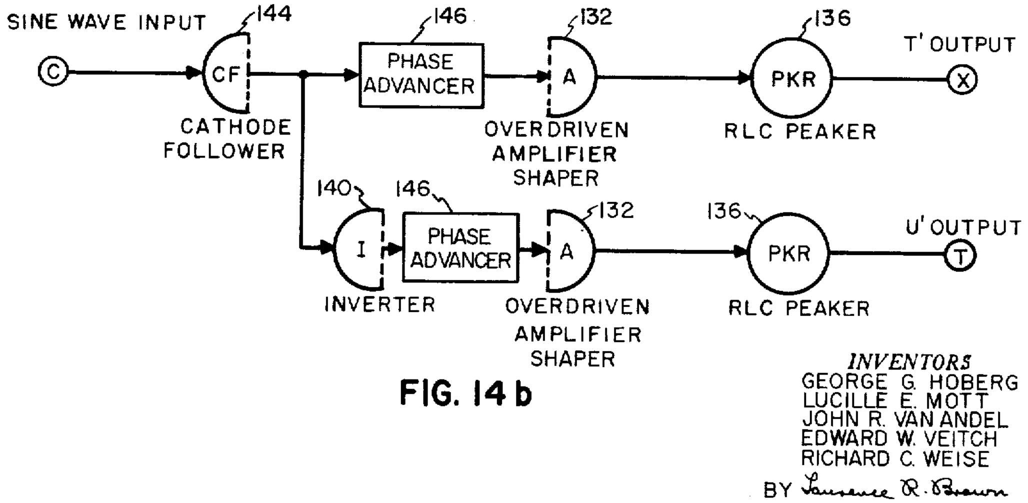
Figure 15A:
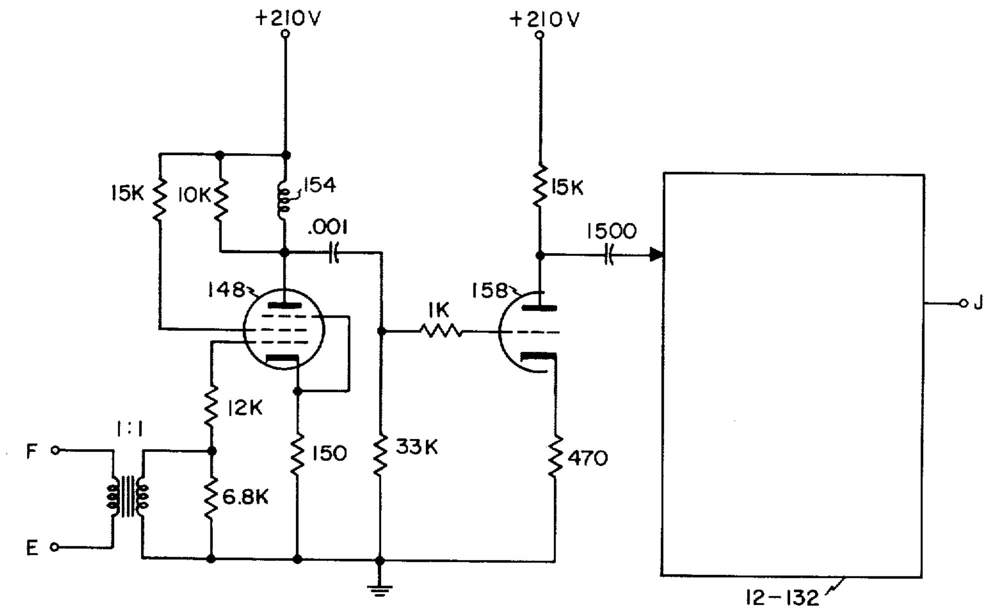
Figure 15B:
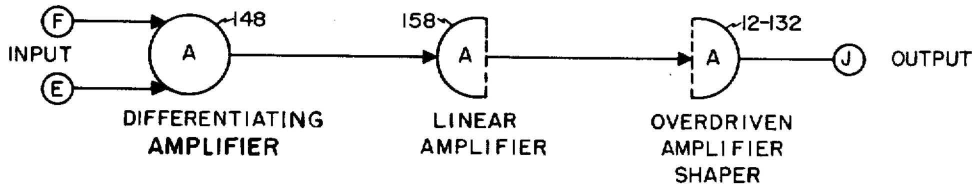
Figure 18:
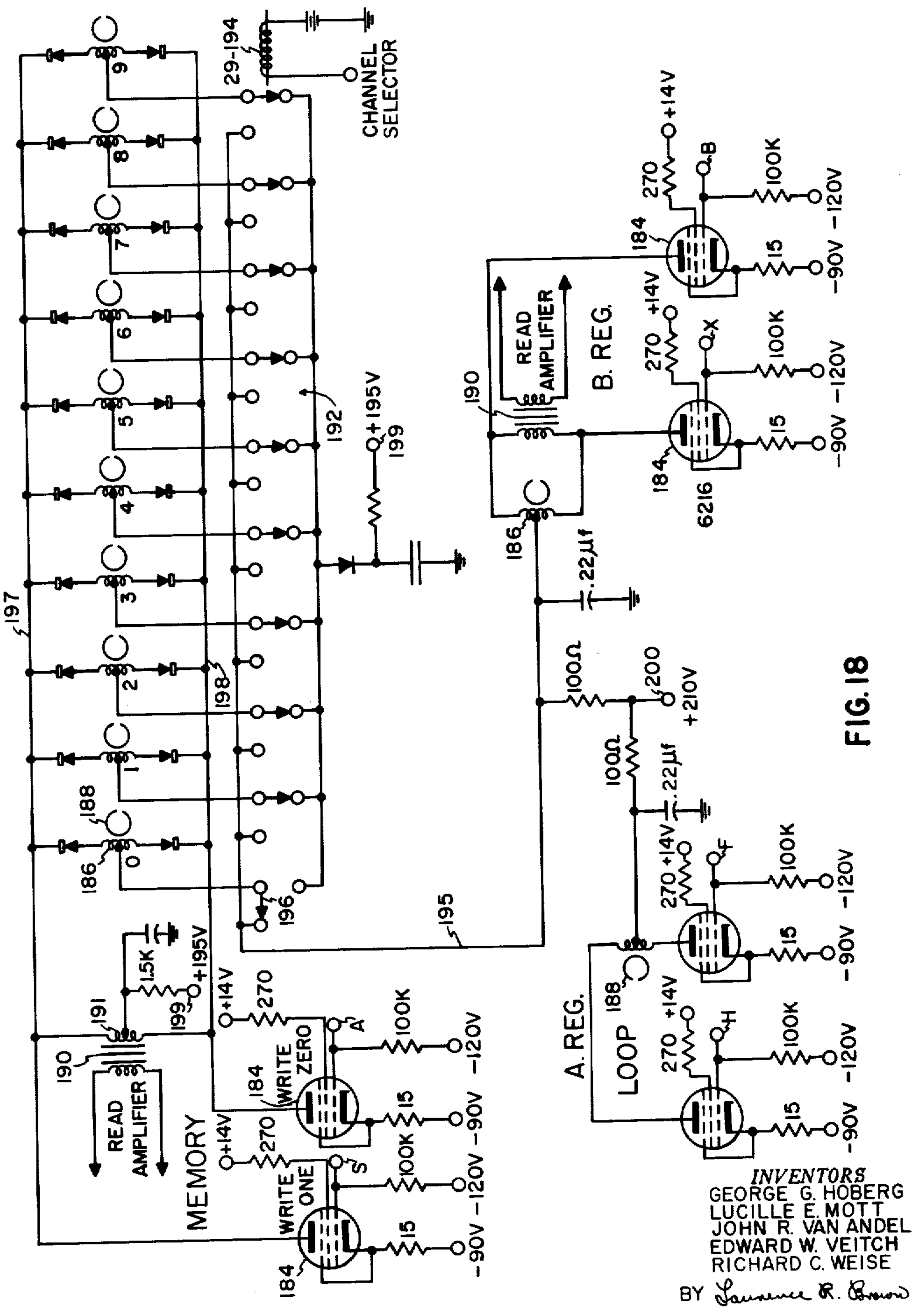
Figures 19, 19A:
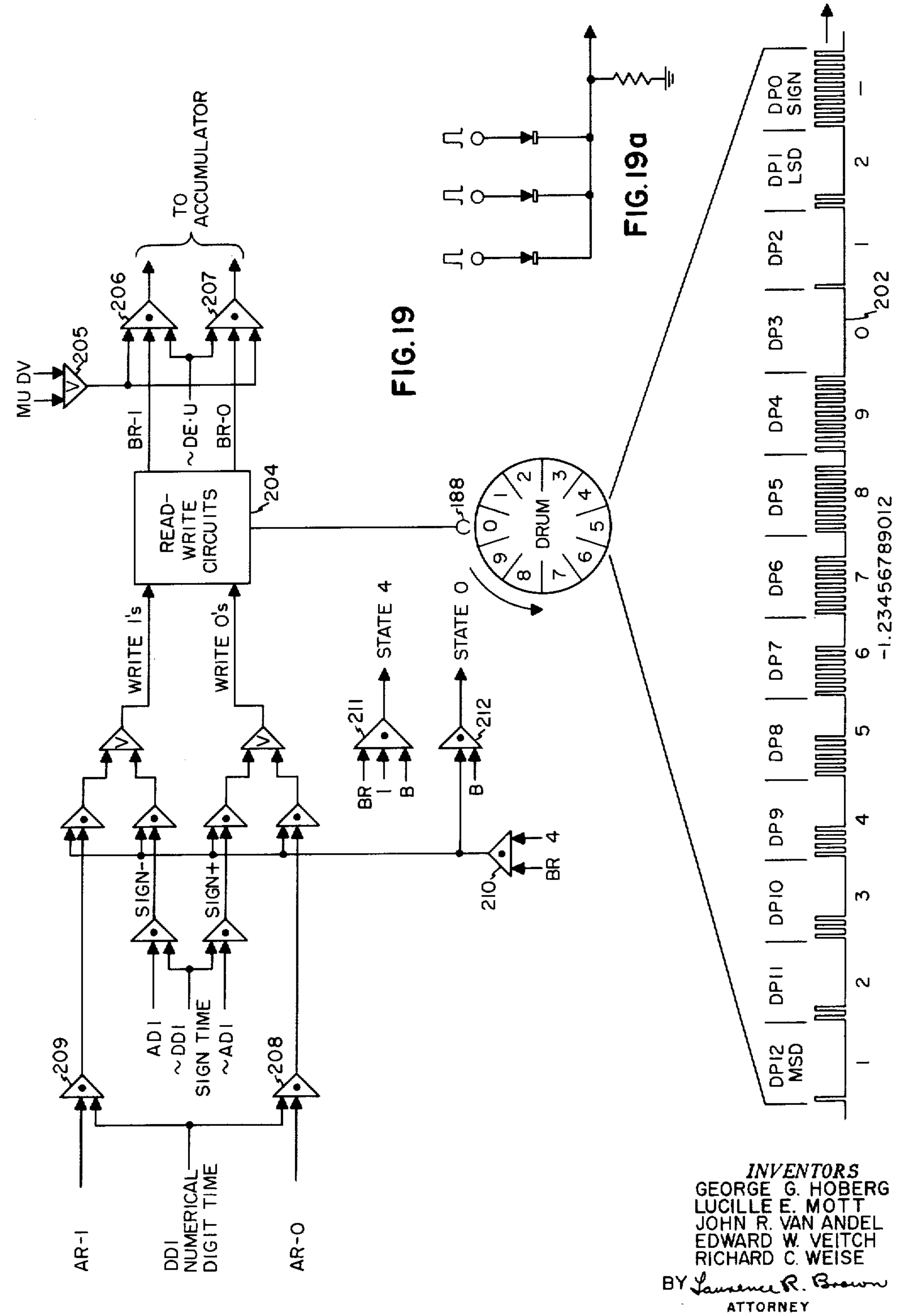
Figure 20:
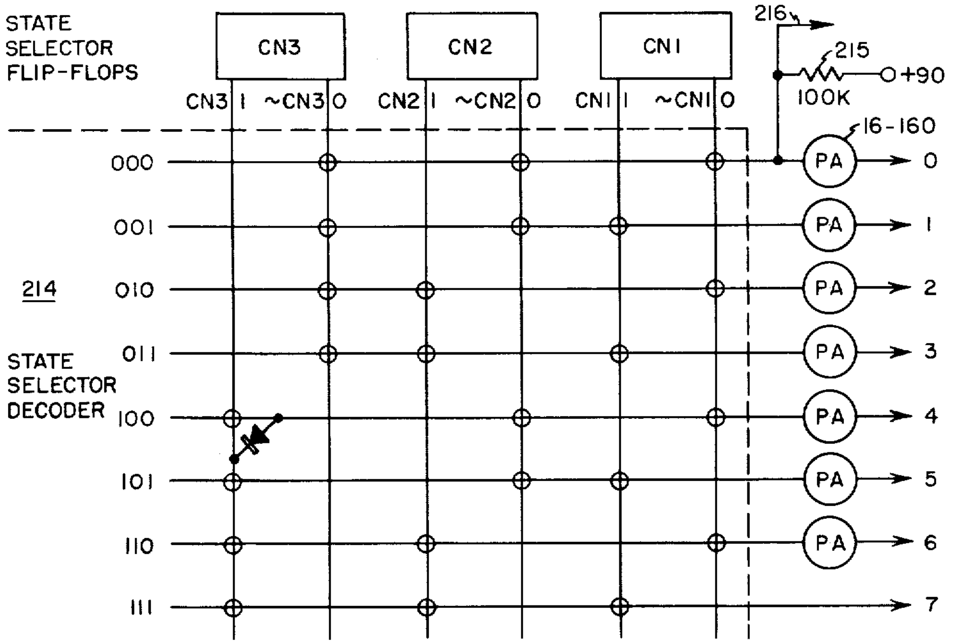
Figure 21:
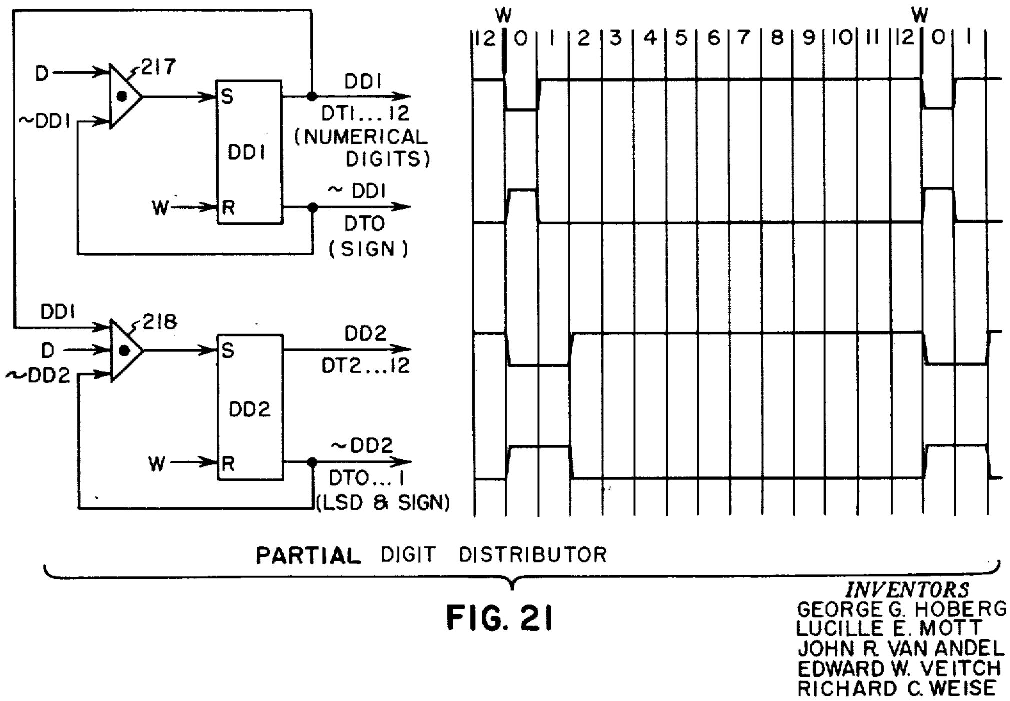
Figure 22:
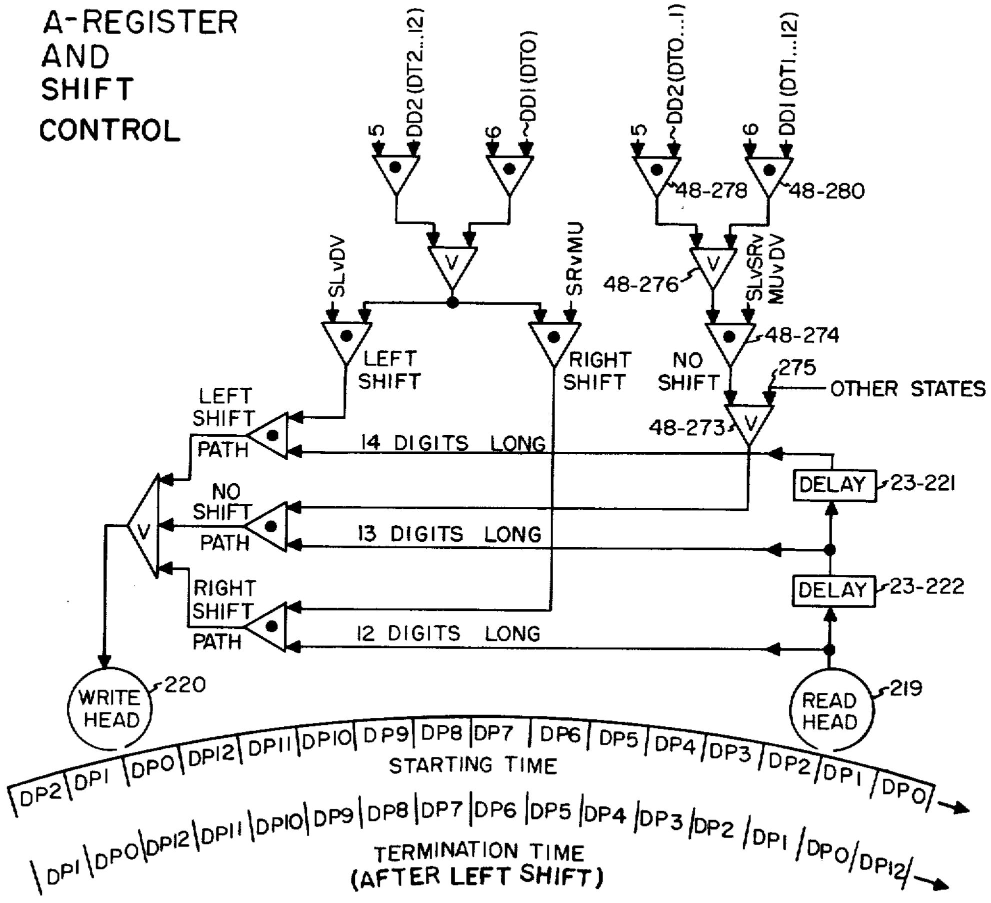
Figure 23:
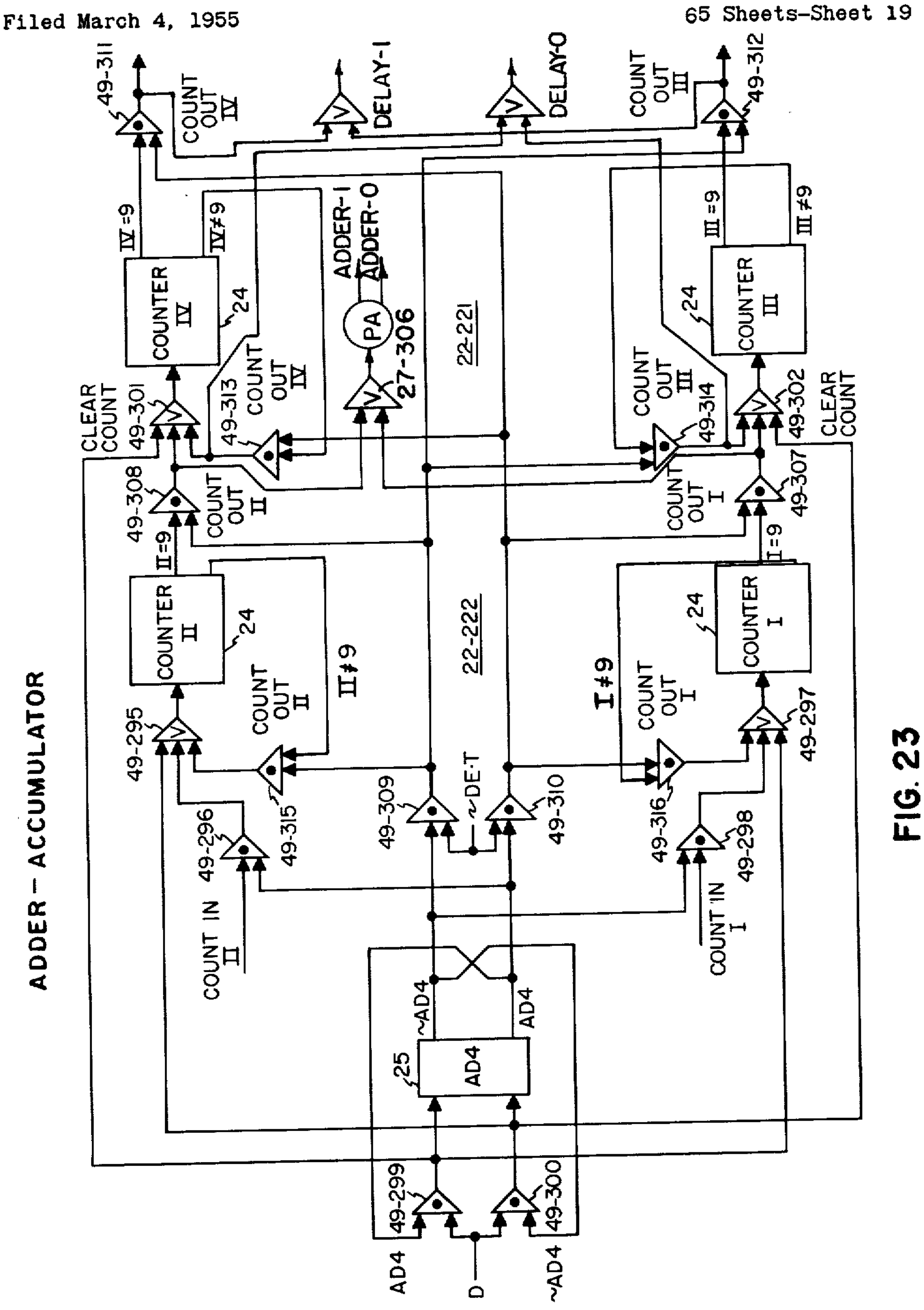
Figure 25:
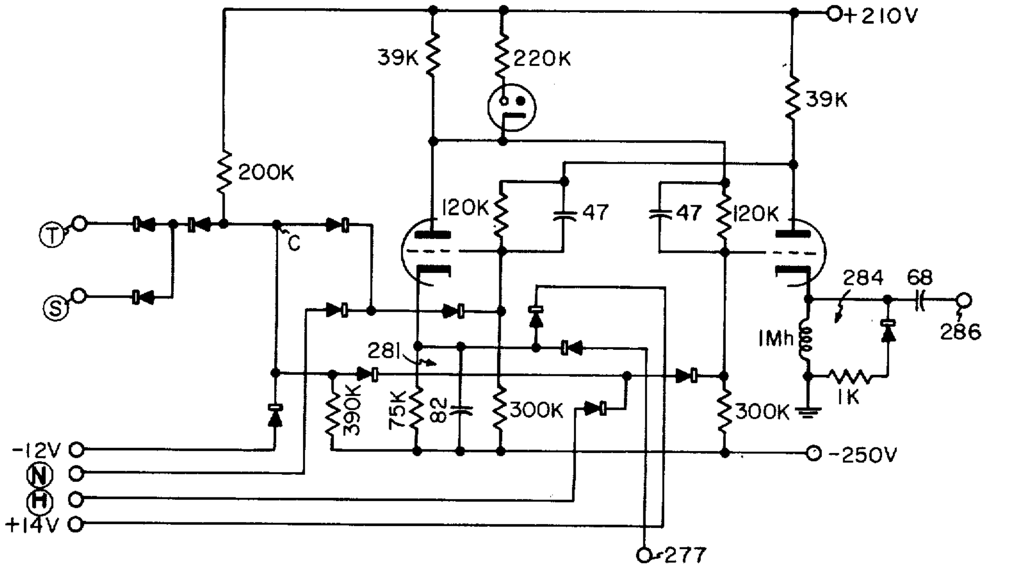
Figure 24:
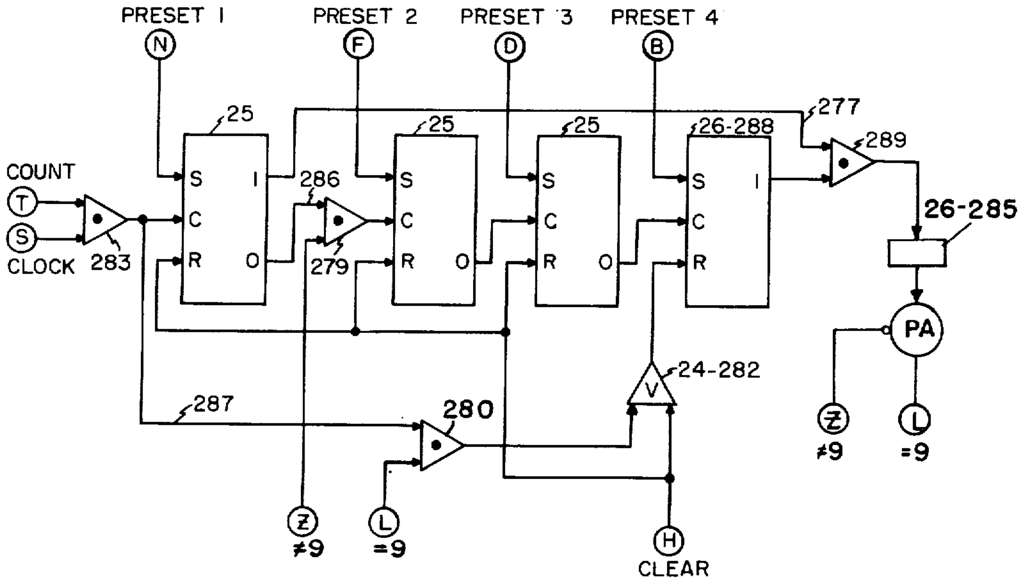
Figure 26A:
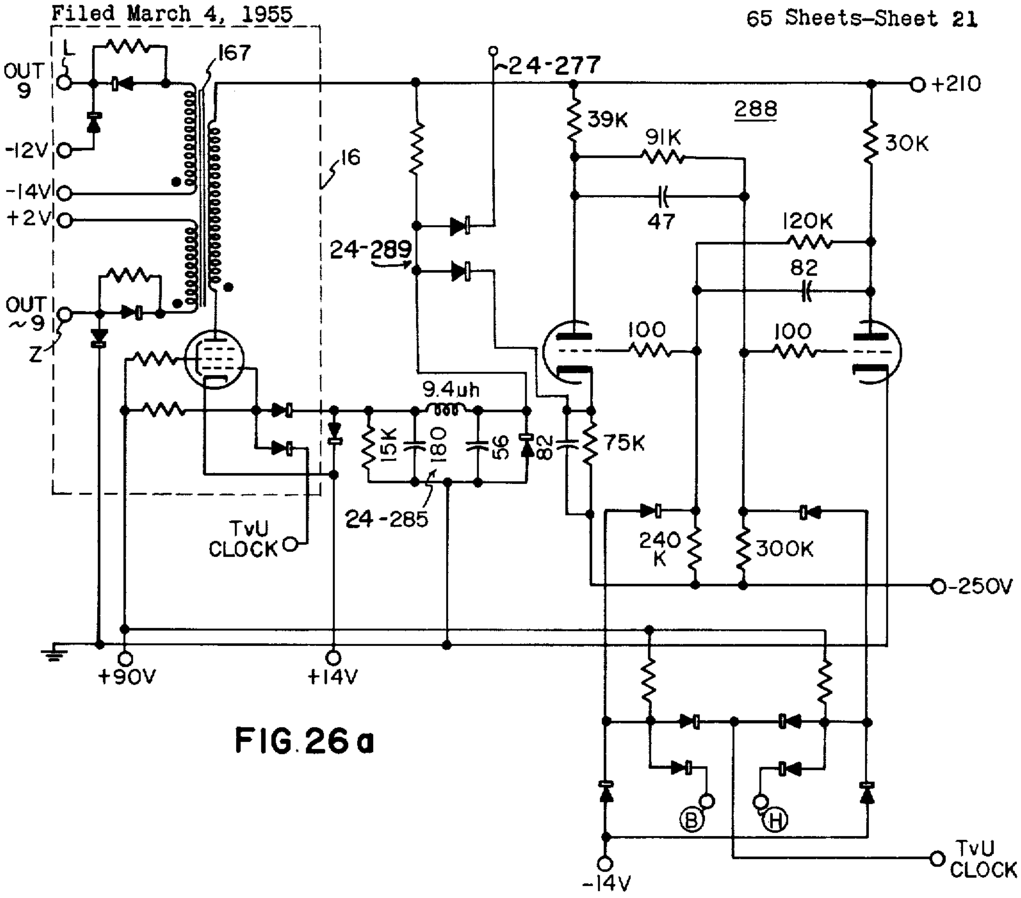
Figure 27:
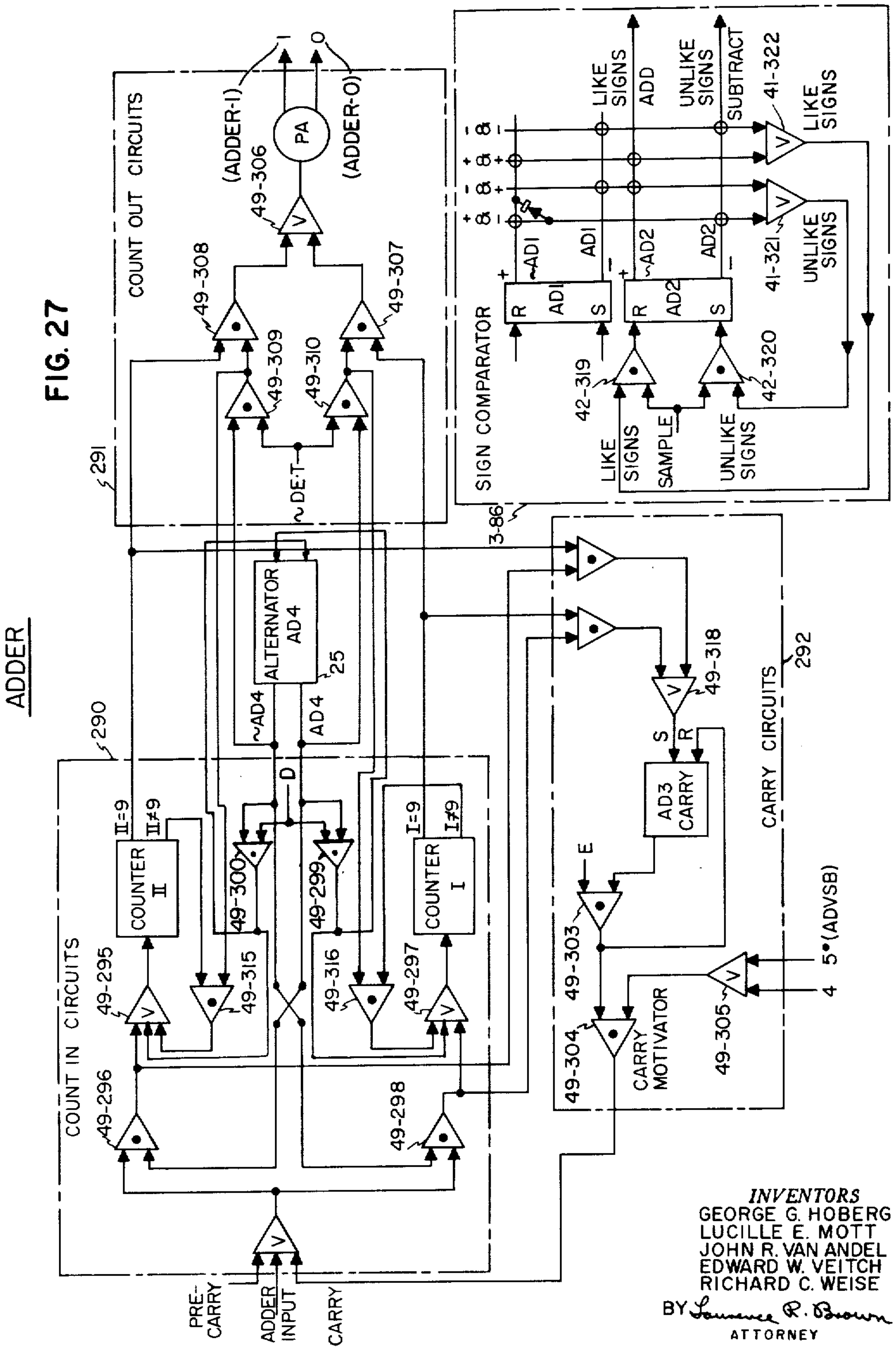
Figure 28:
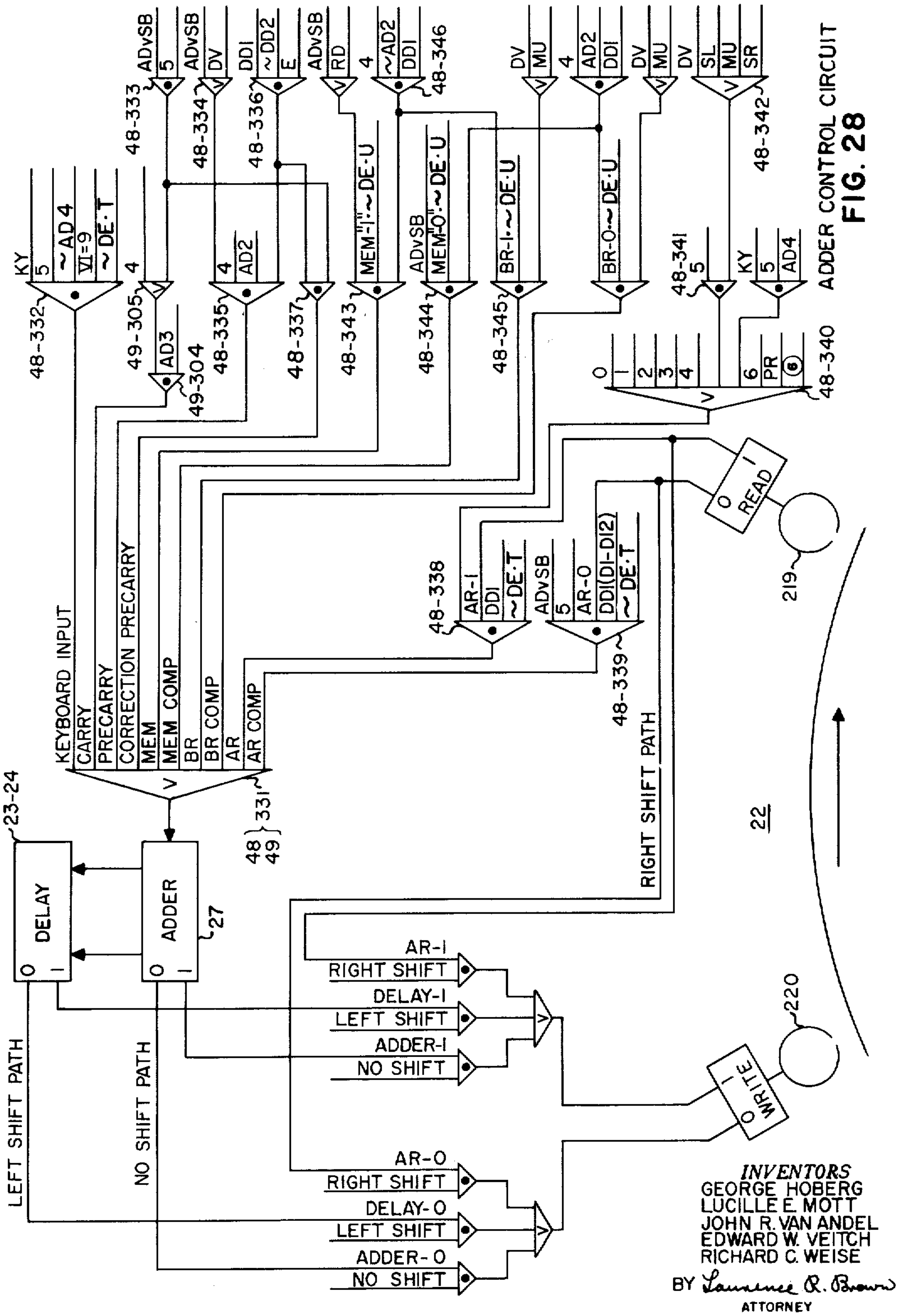
Figure 29:
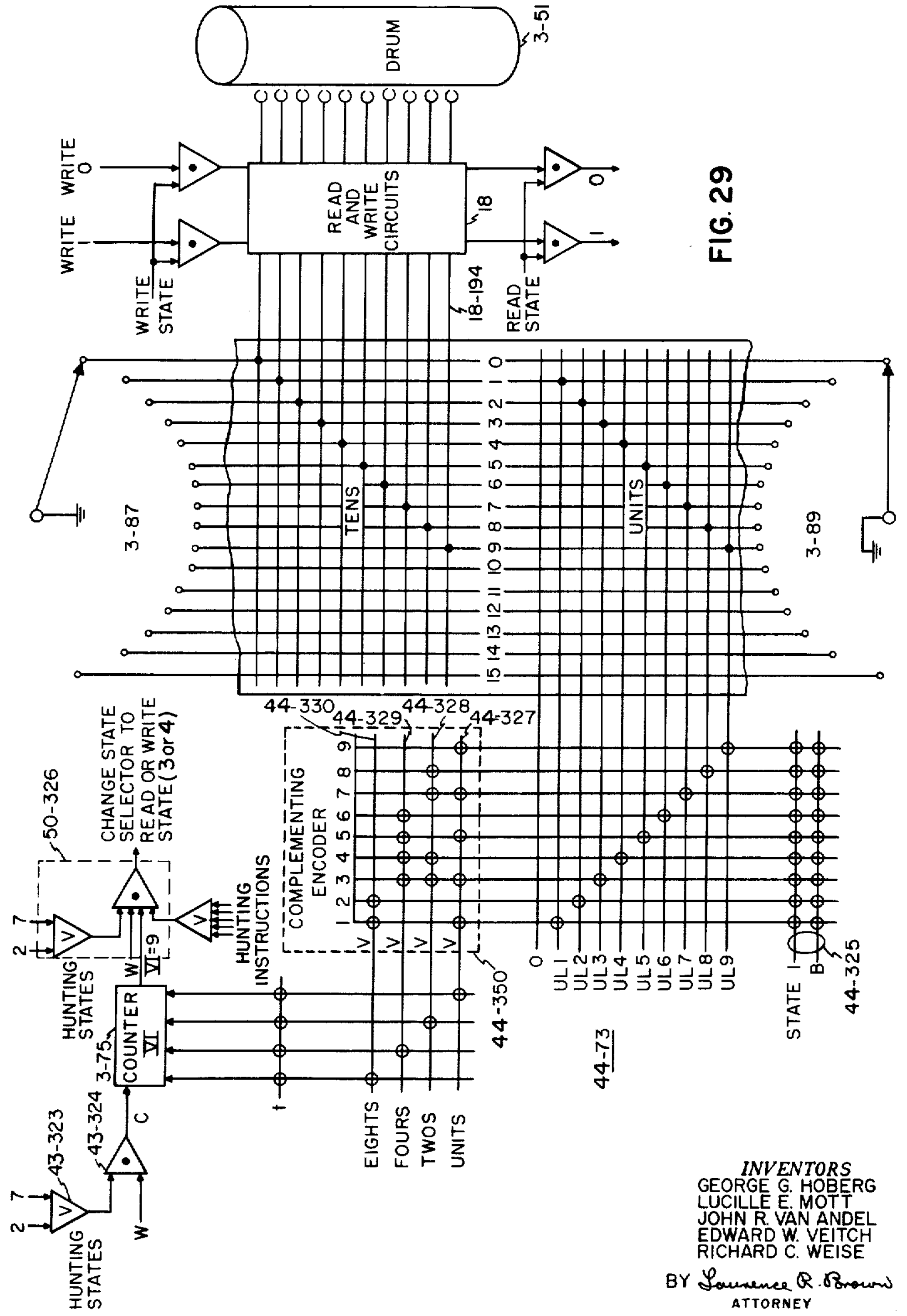
Figure 30A:
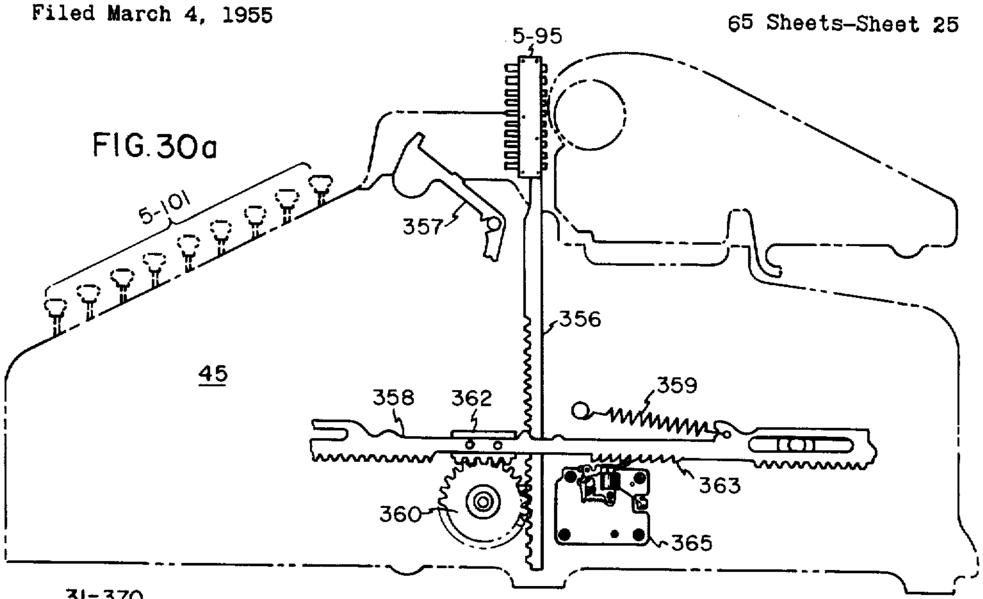
Figure 30B:
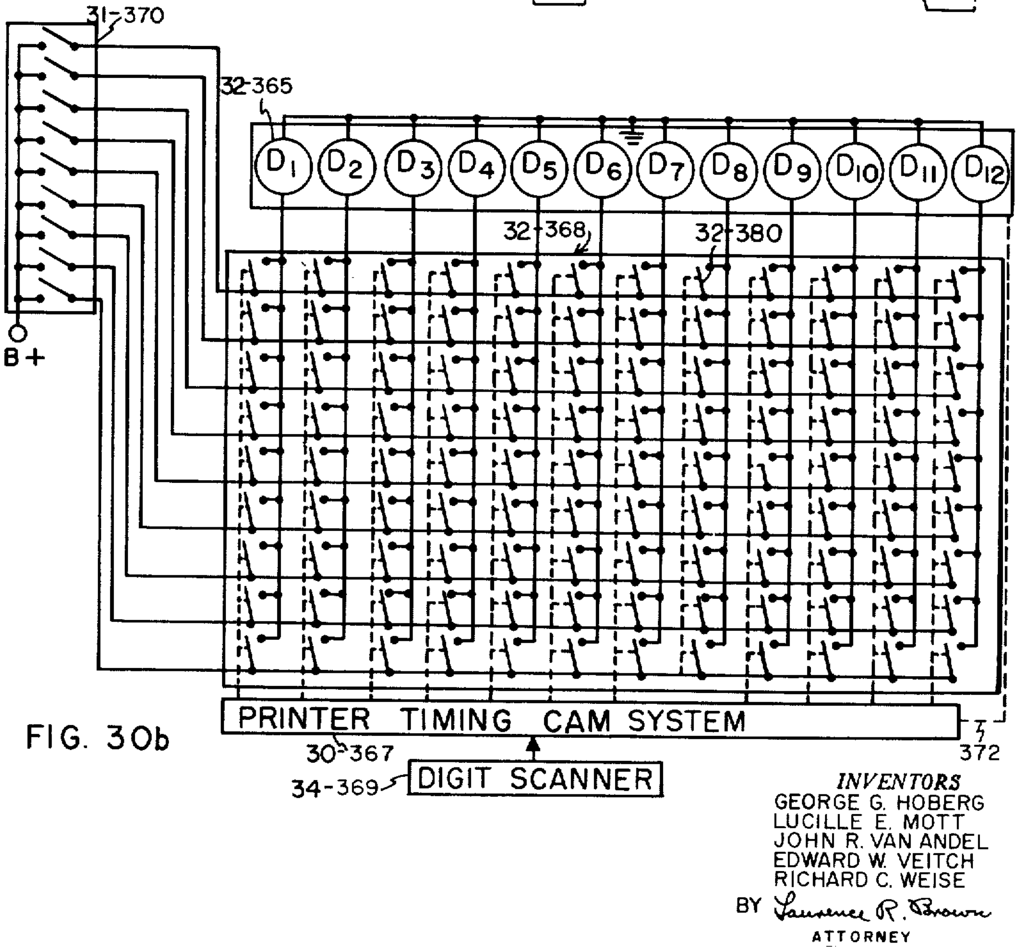
Figure 30C:
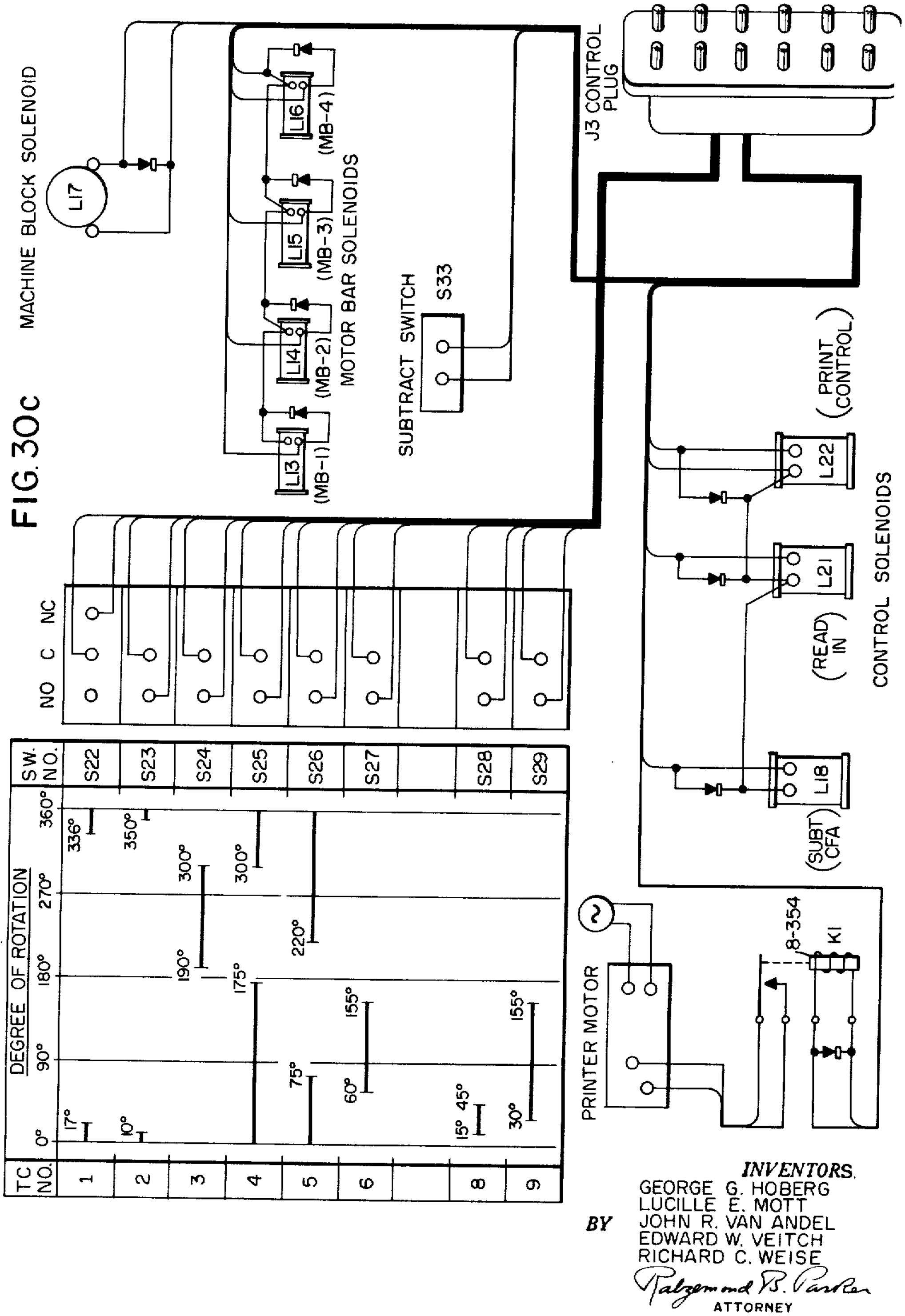
Figure 30D:
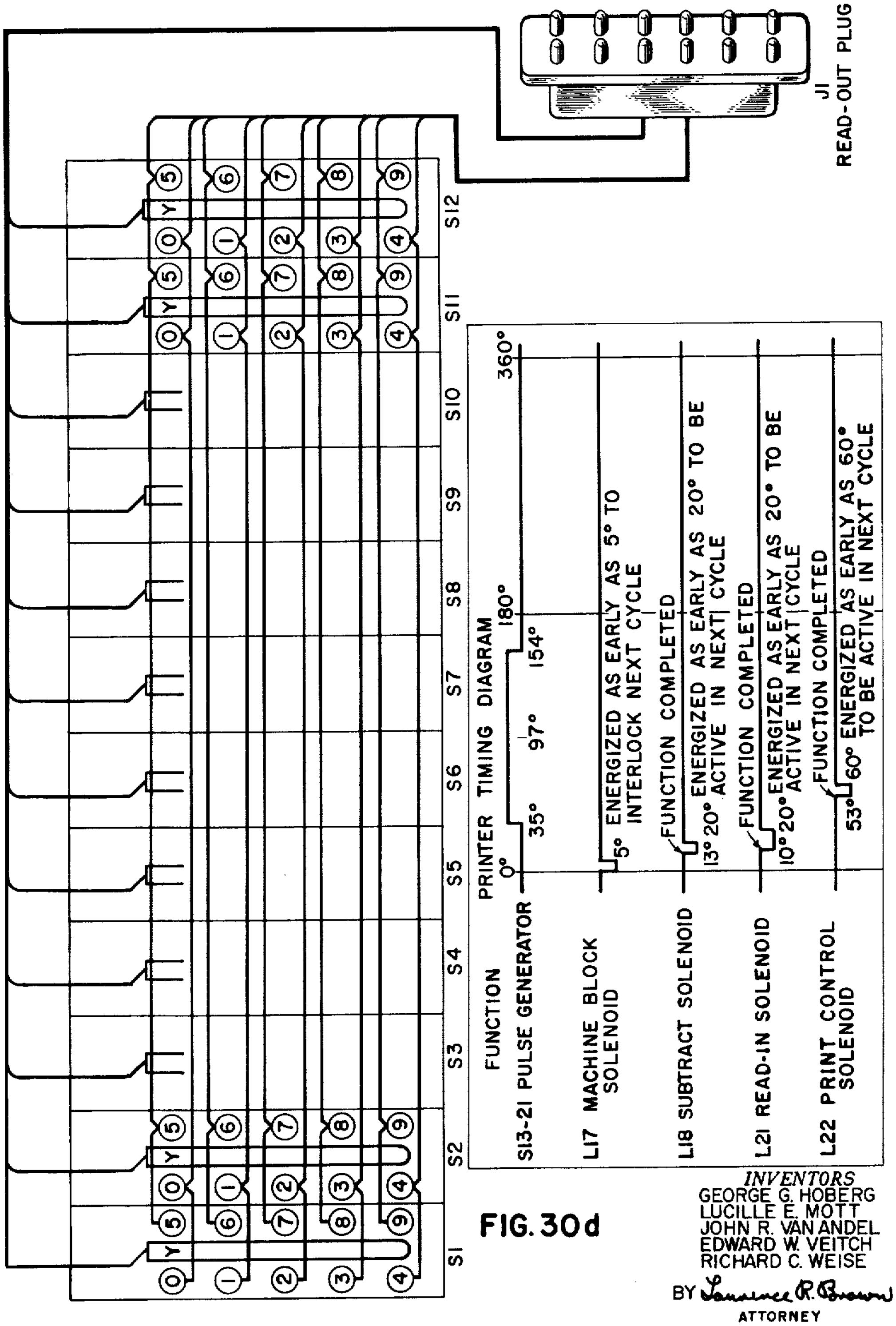
Figure 30G:
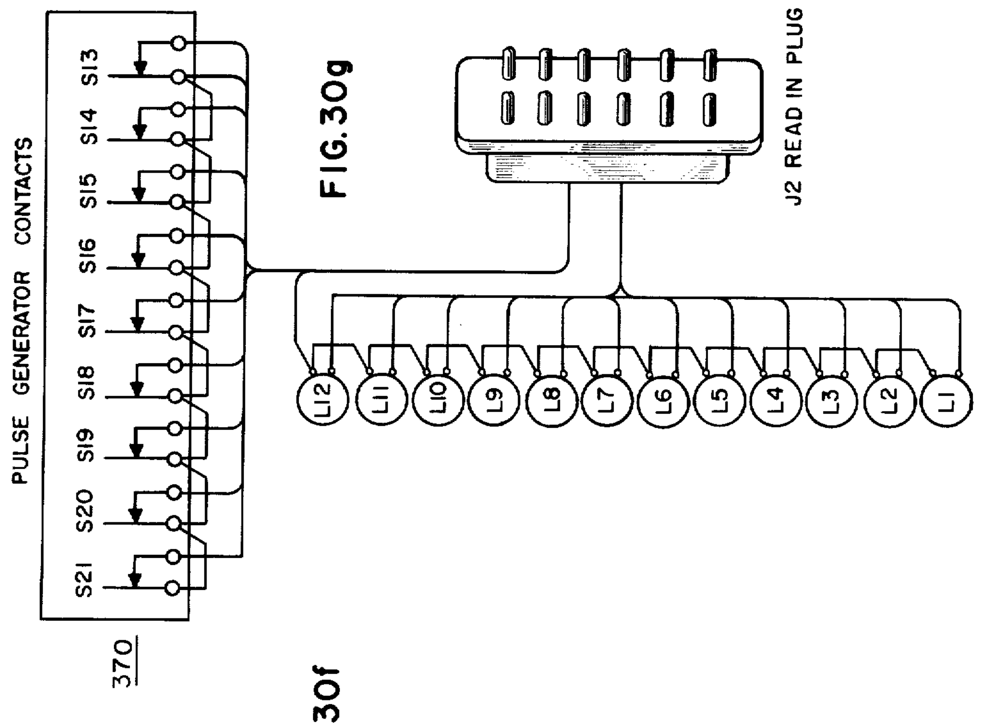
Figure 30F:
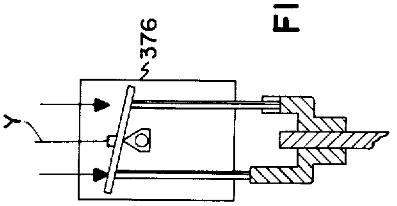
Figure 30E:
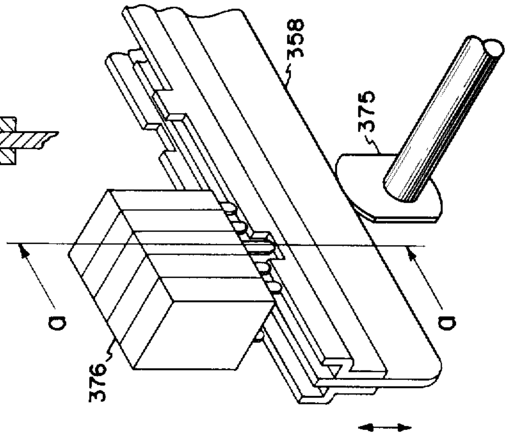
Figure 31A:
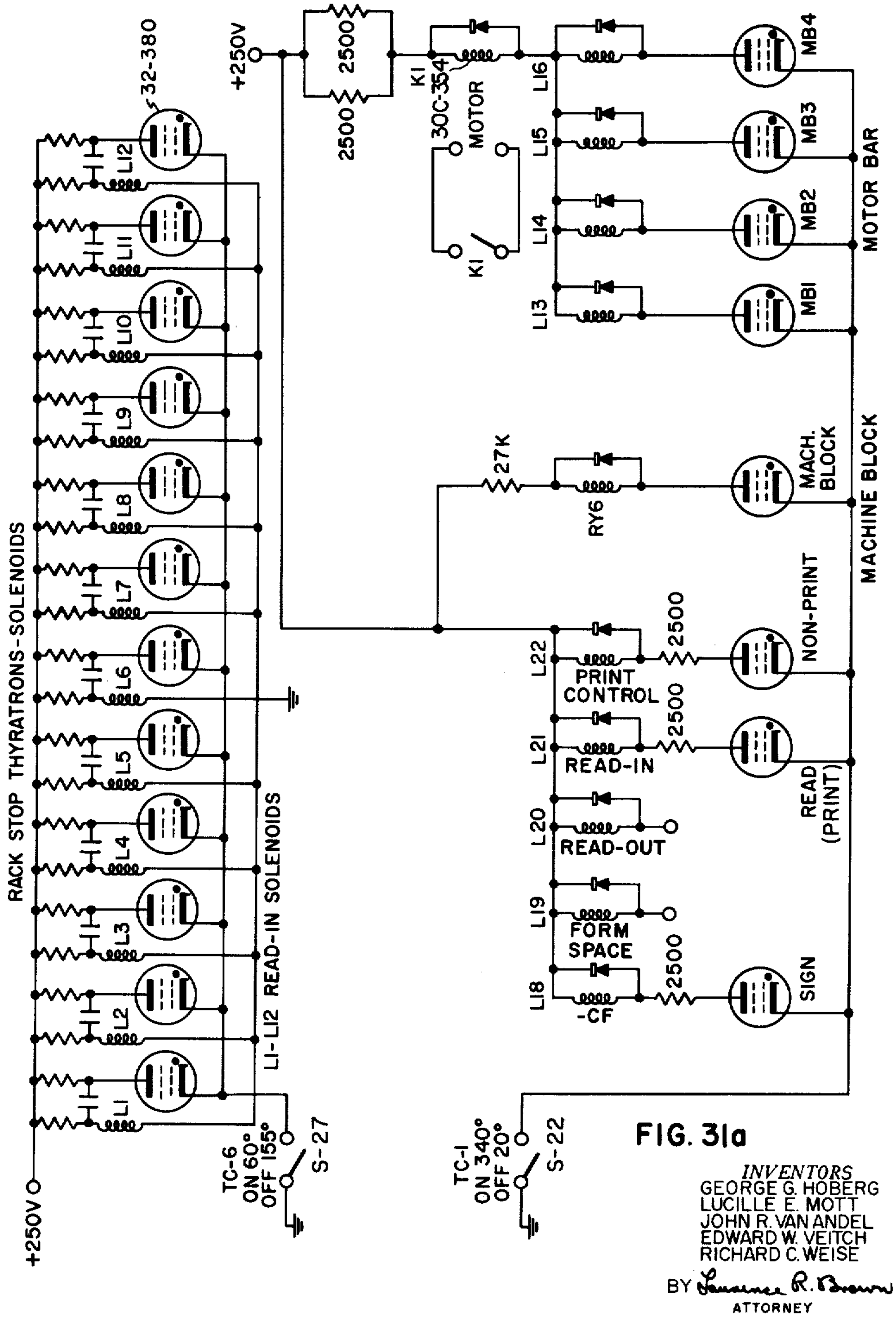
Figure 31B:
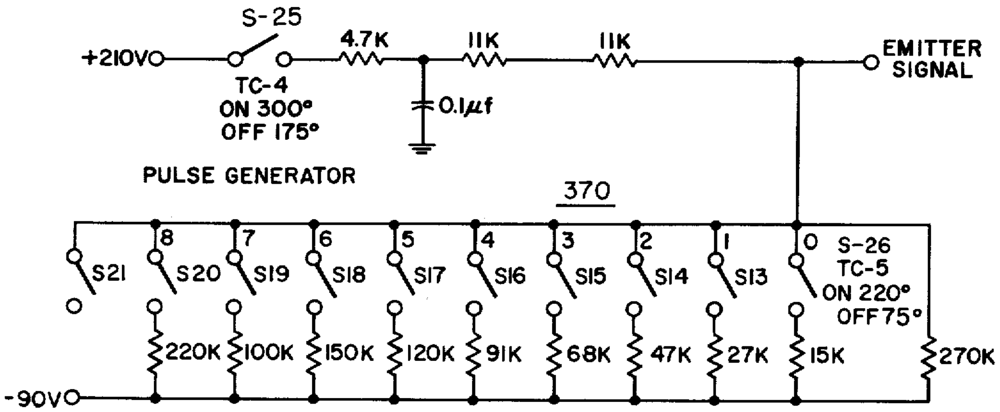
Figure 31C:
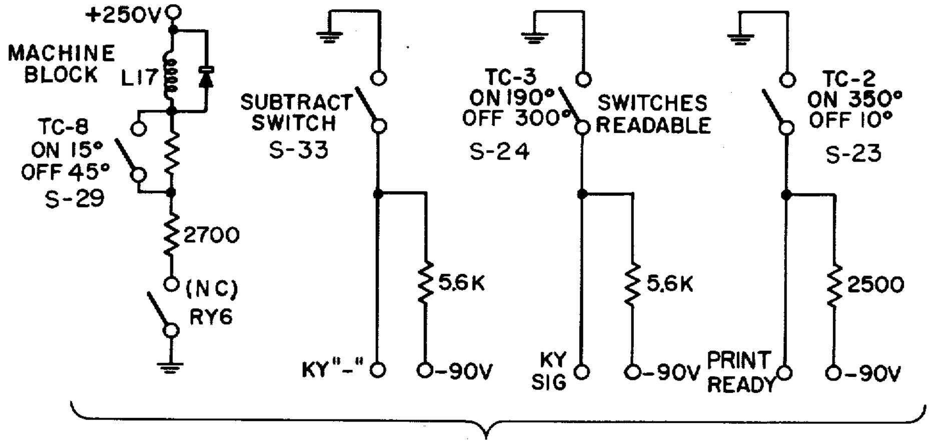
Figure 31D:
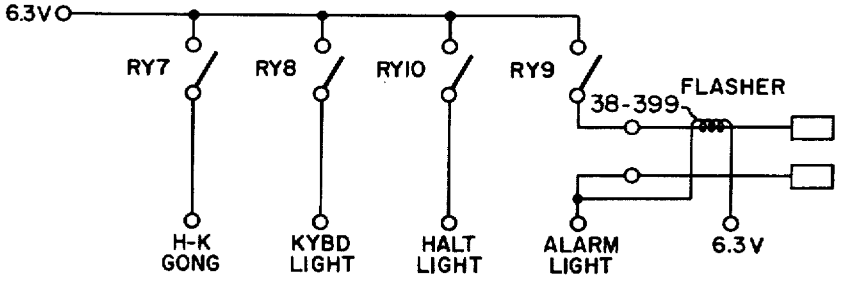
Figures 32A, 32B:
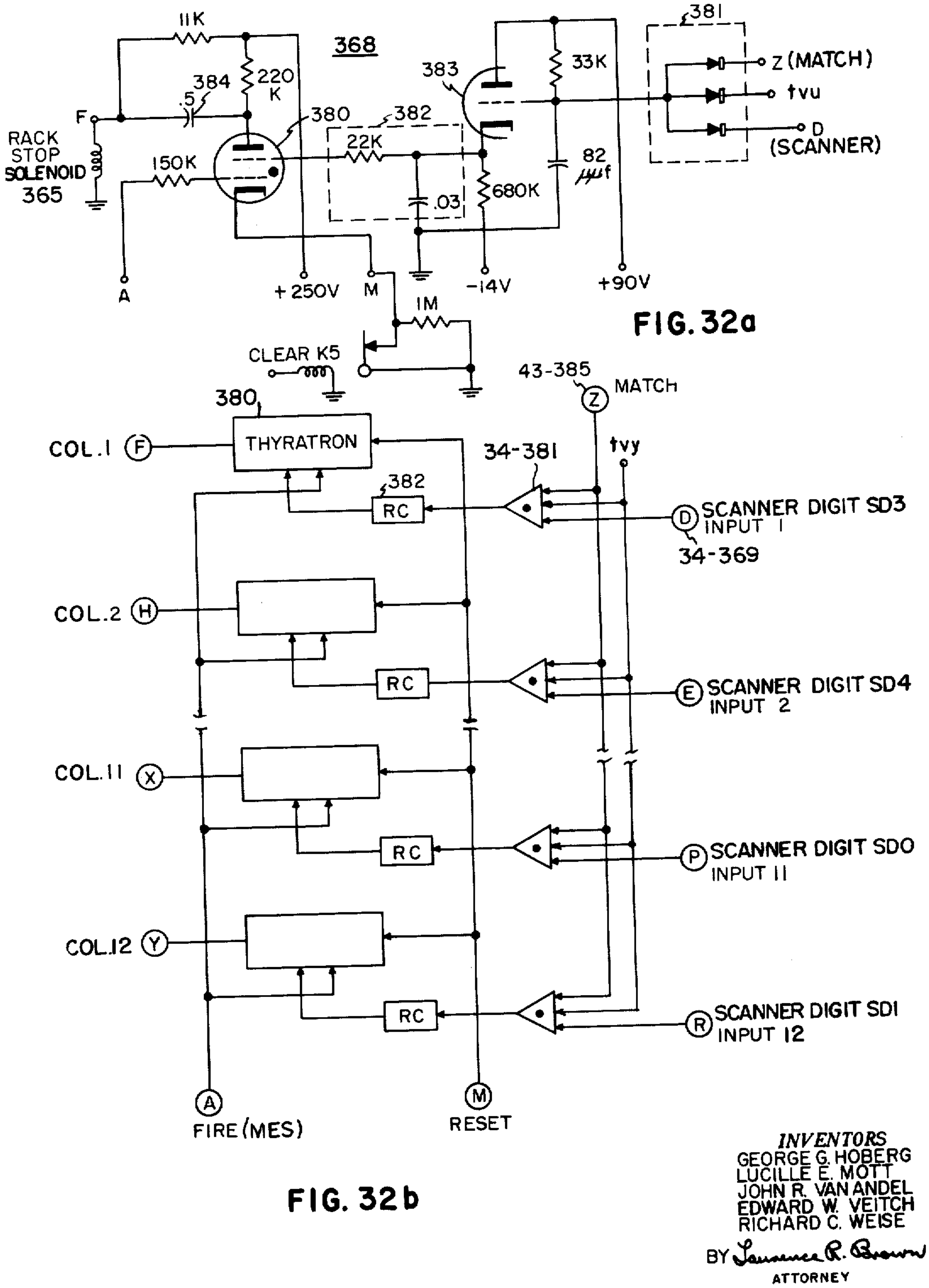
Figure 33:
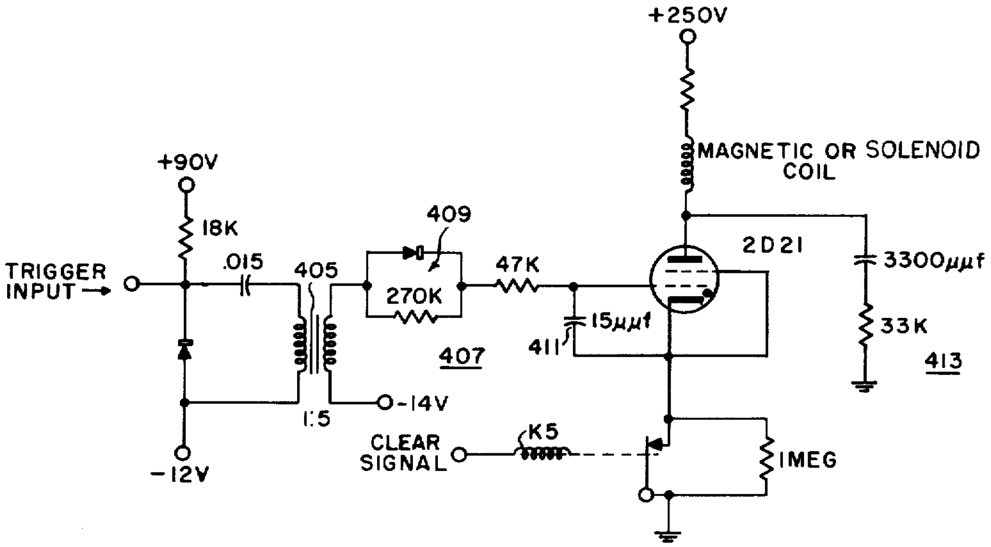
Figure 34B:
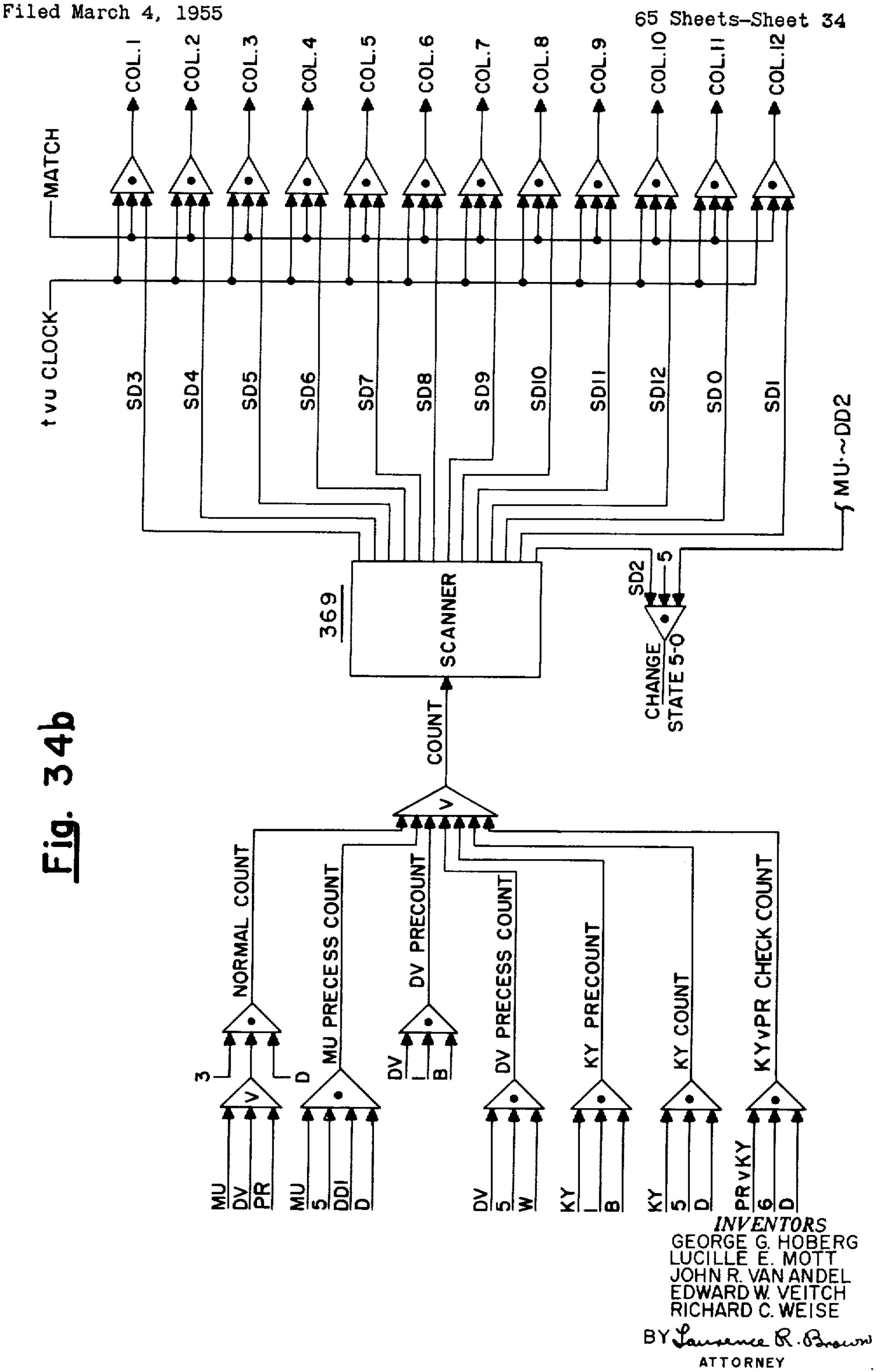
Figure 35A:
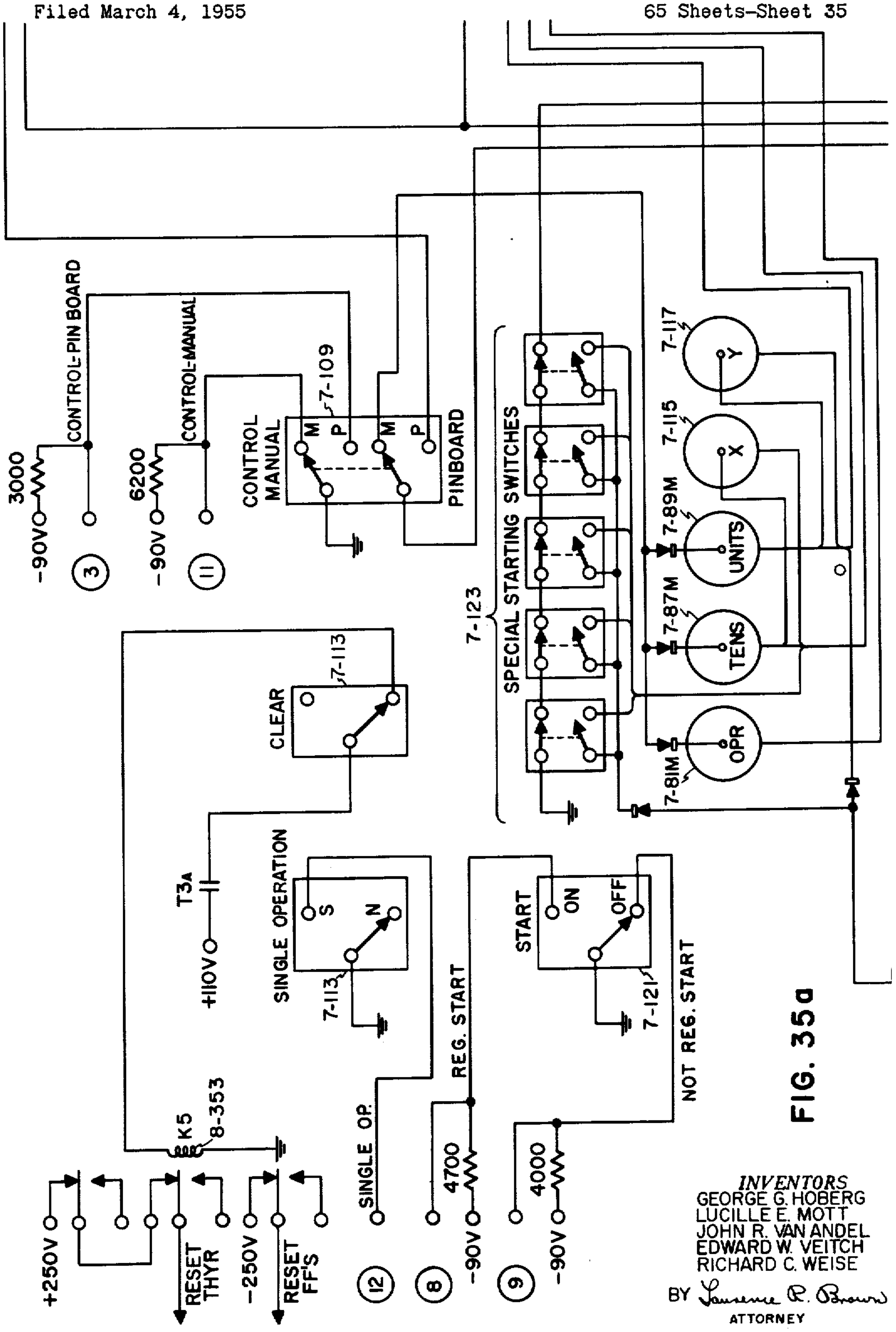
Figure 35B:
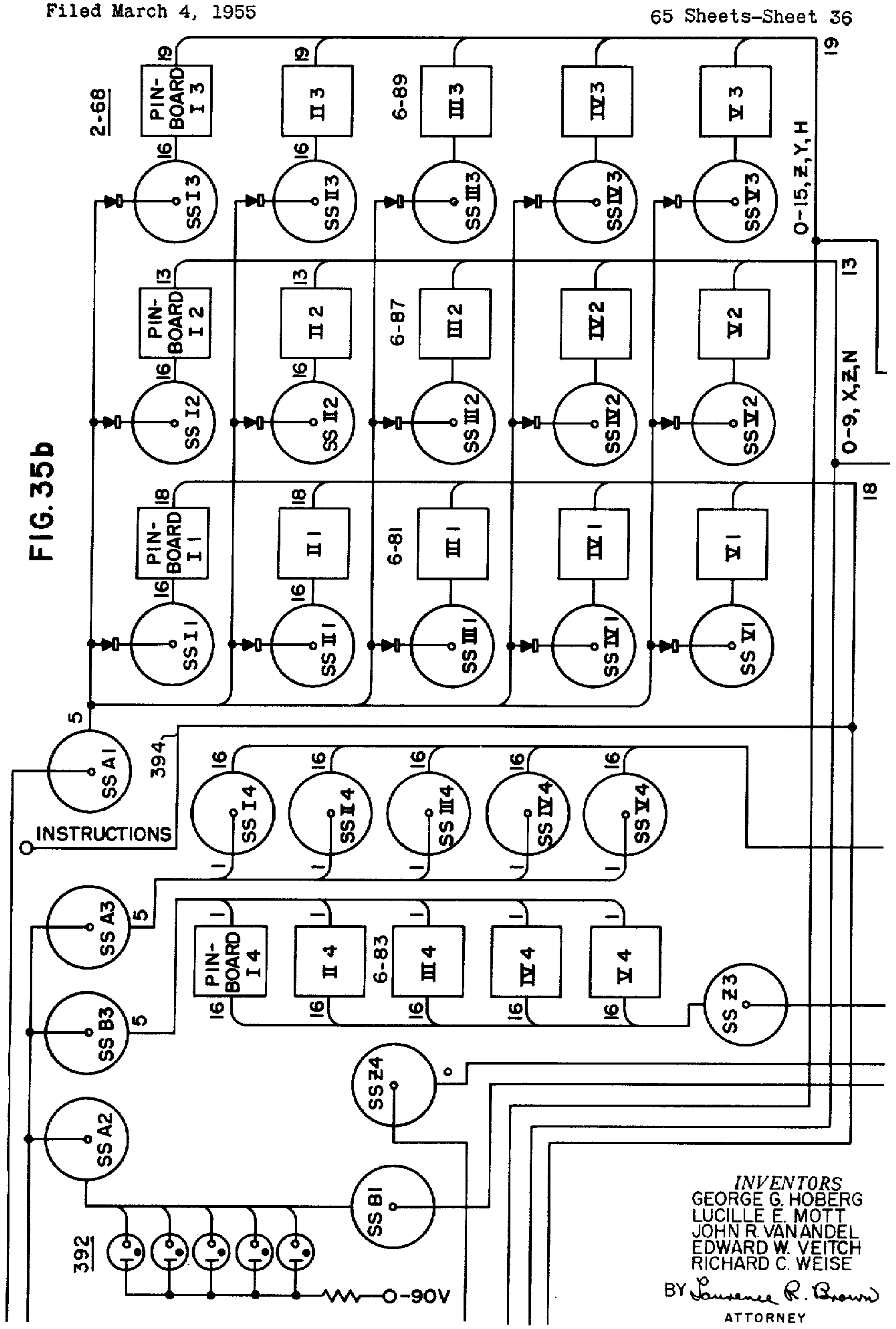
Figure 35C:
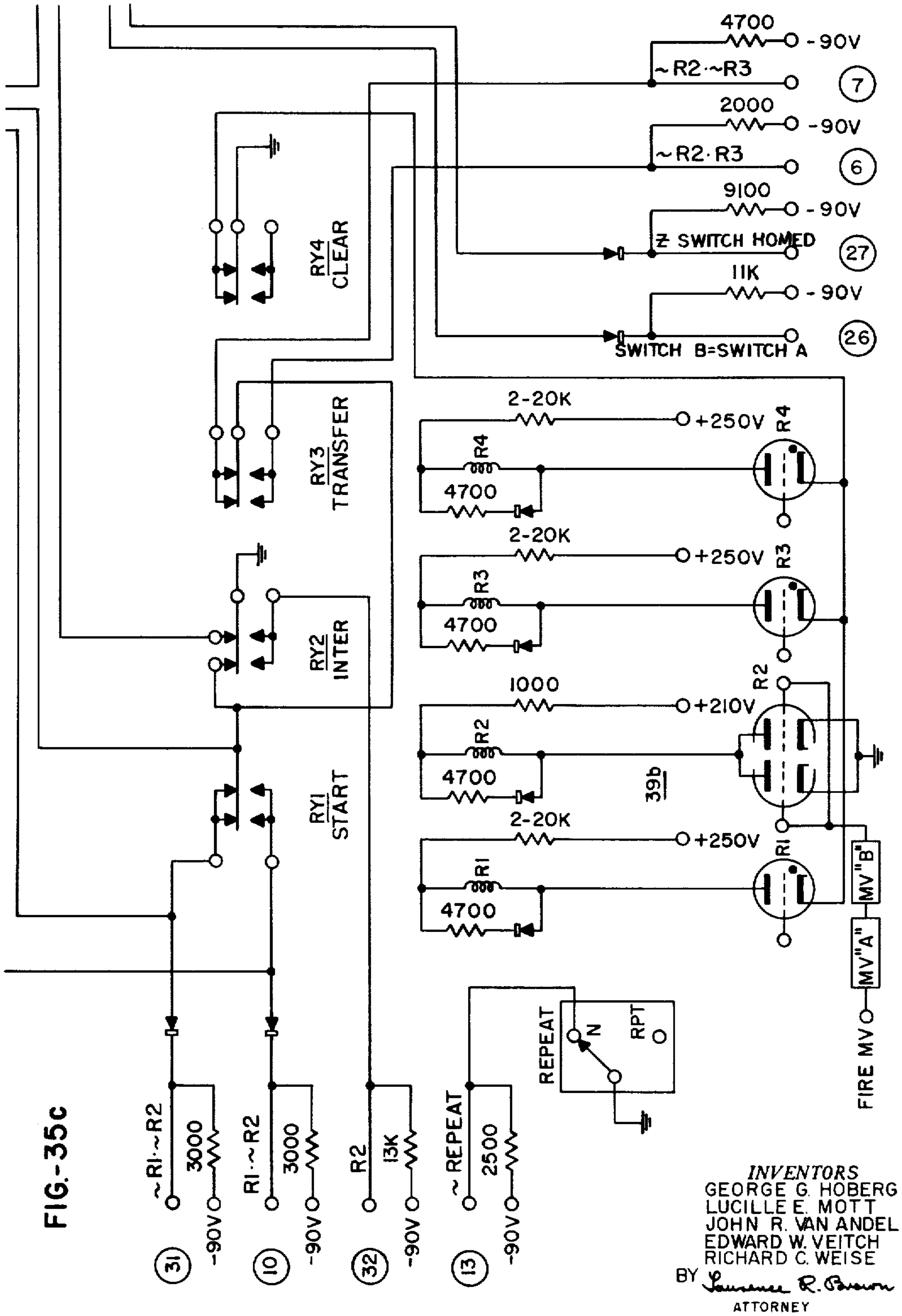
Figure 37:
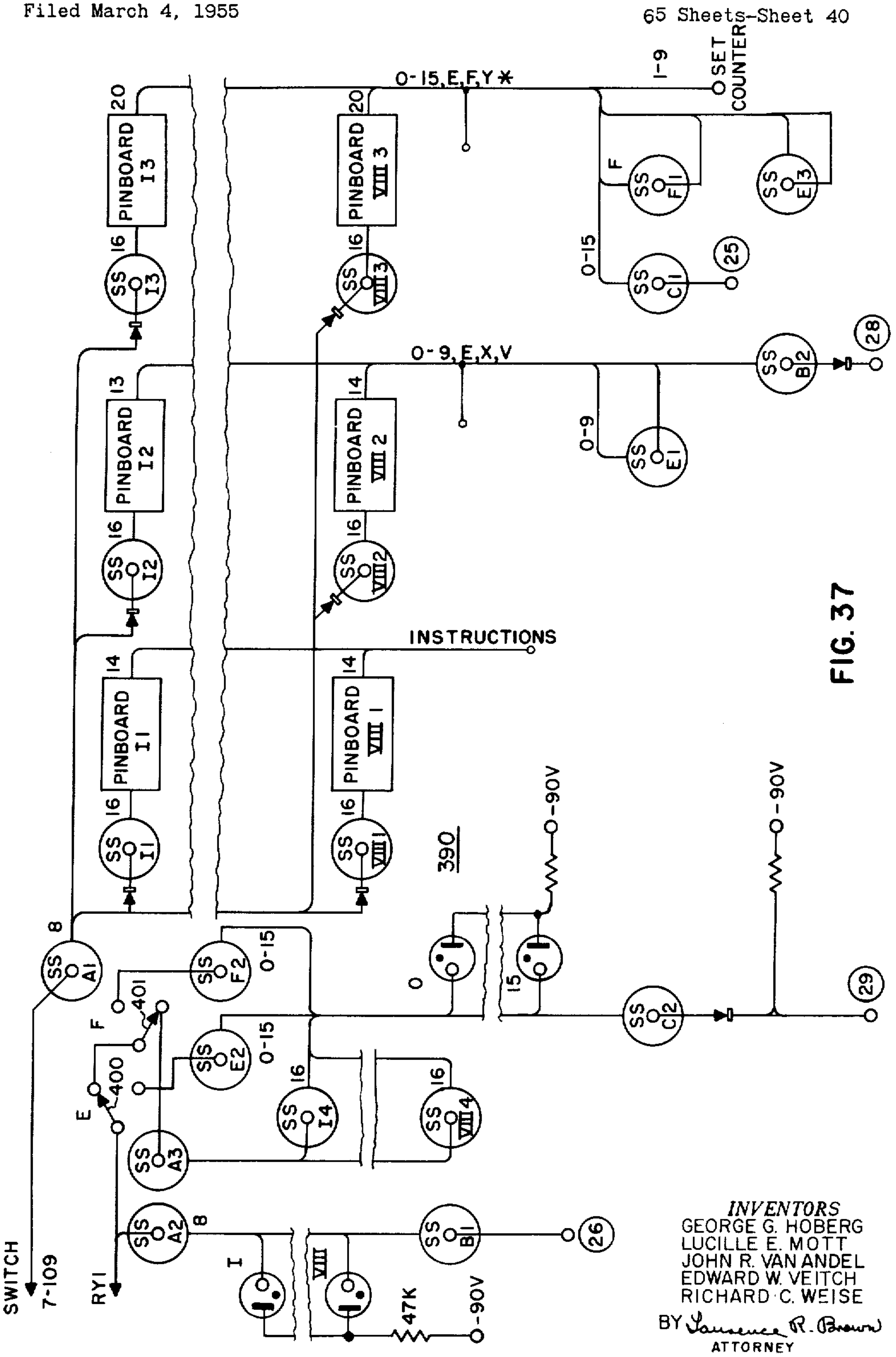
Figure 37A:
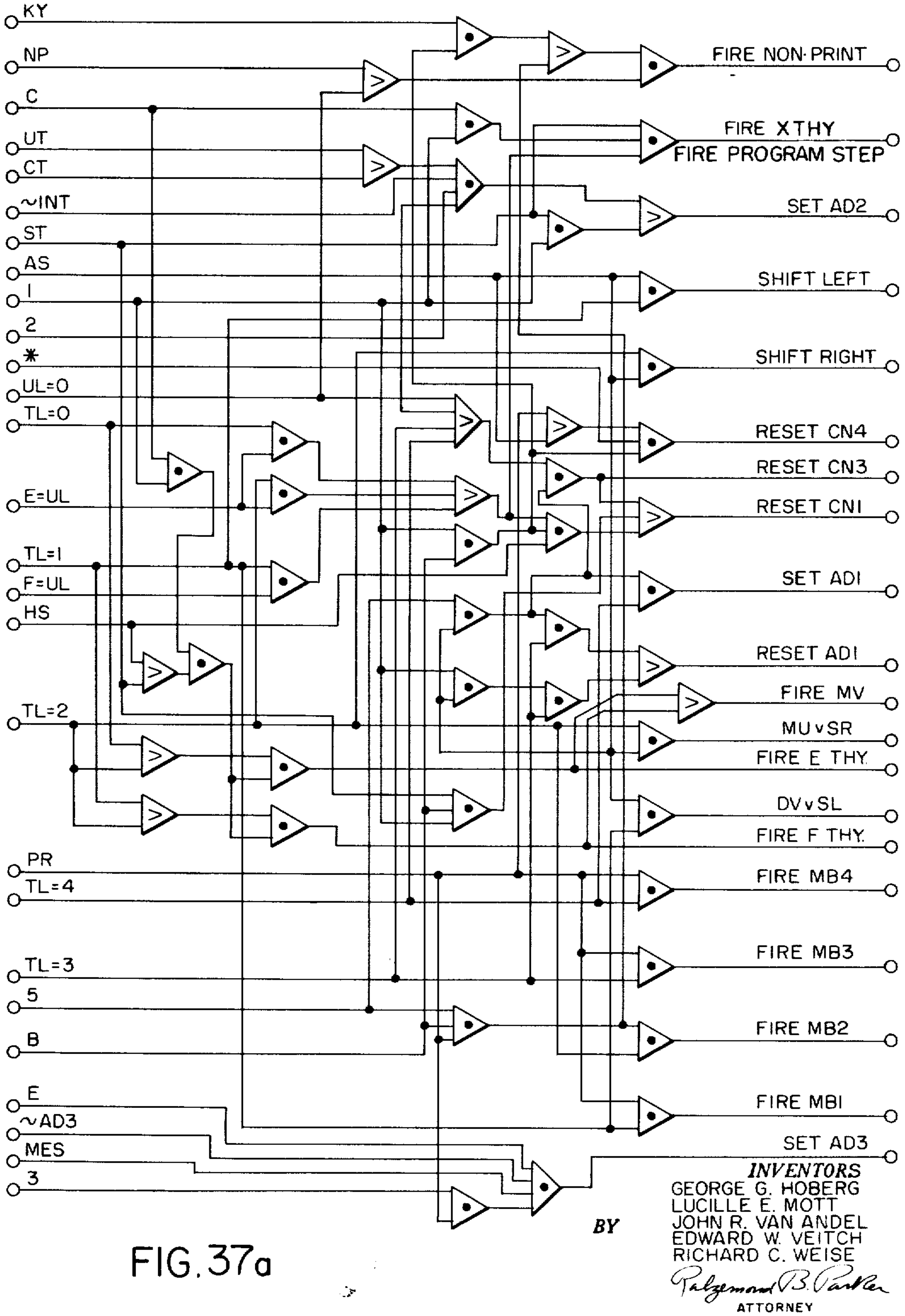
Figure 38:
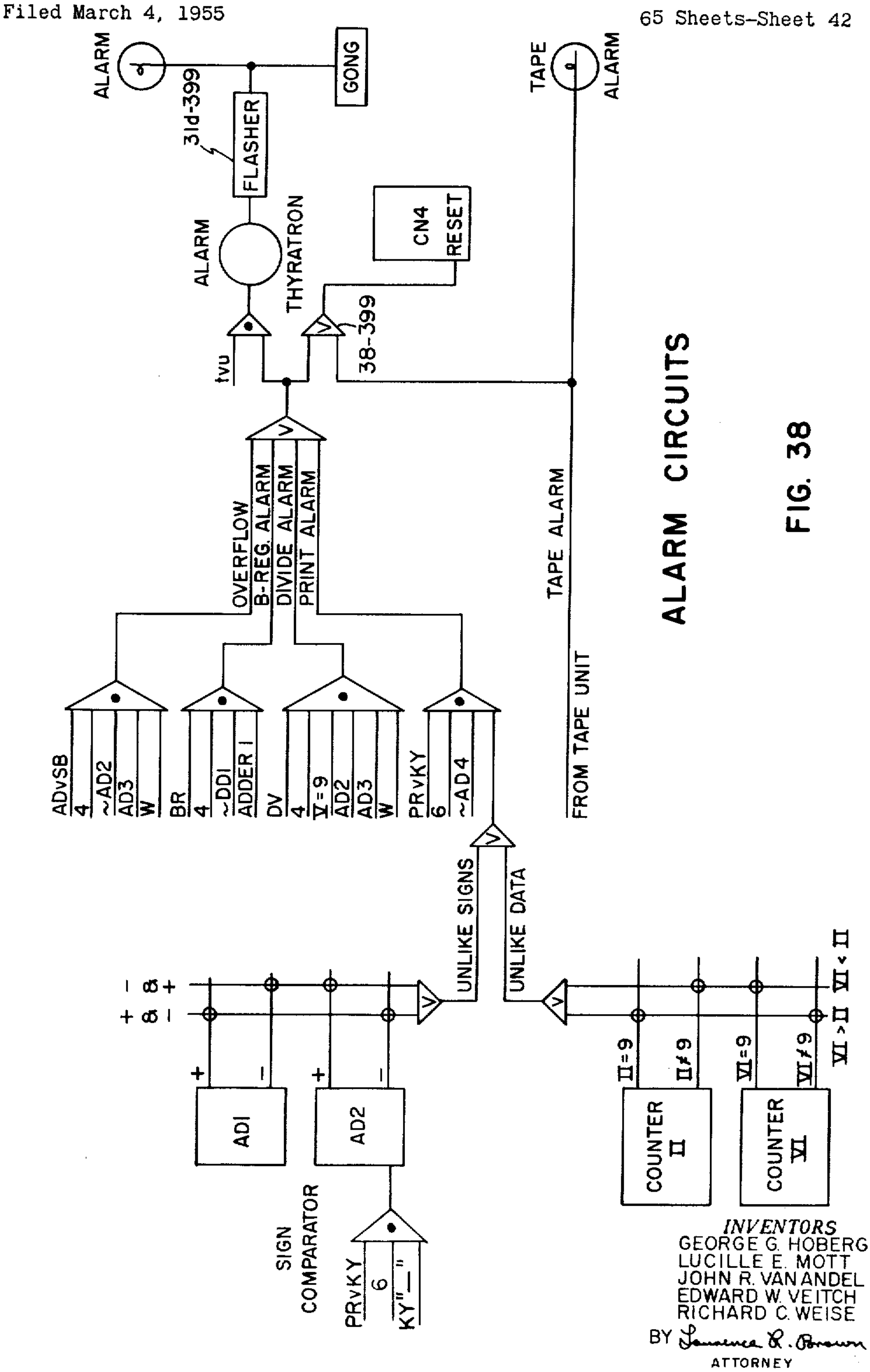
Figure 39A:
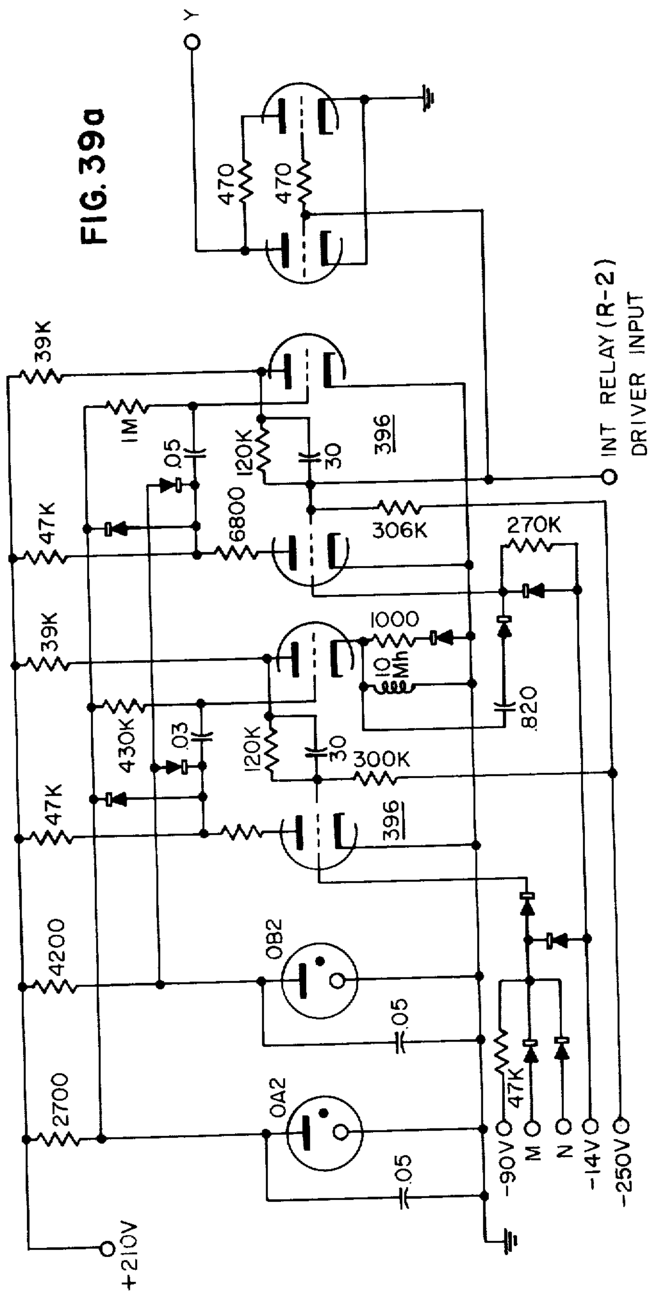
Figure 39B:
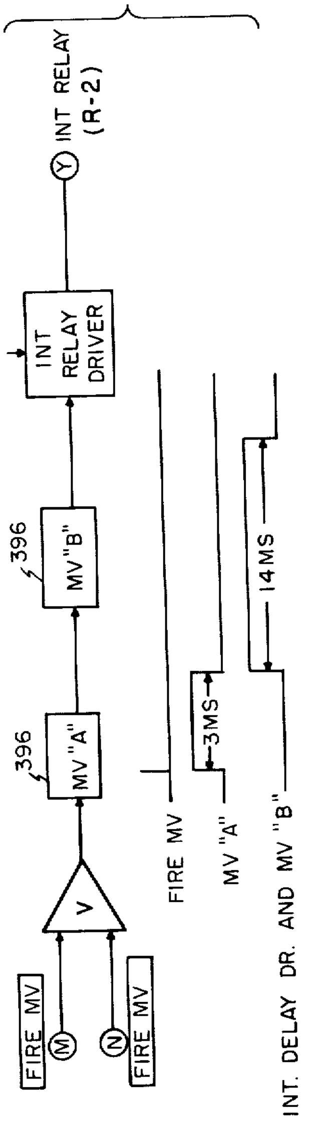
Figure 40:
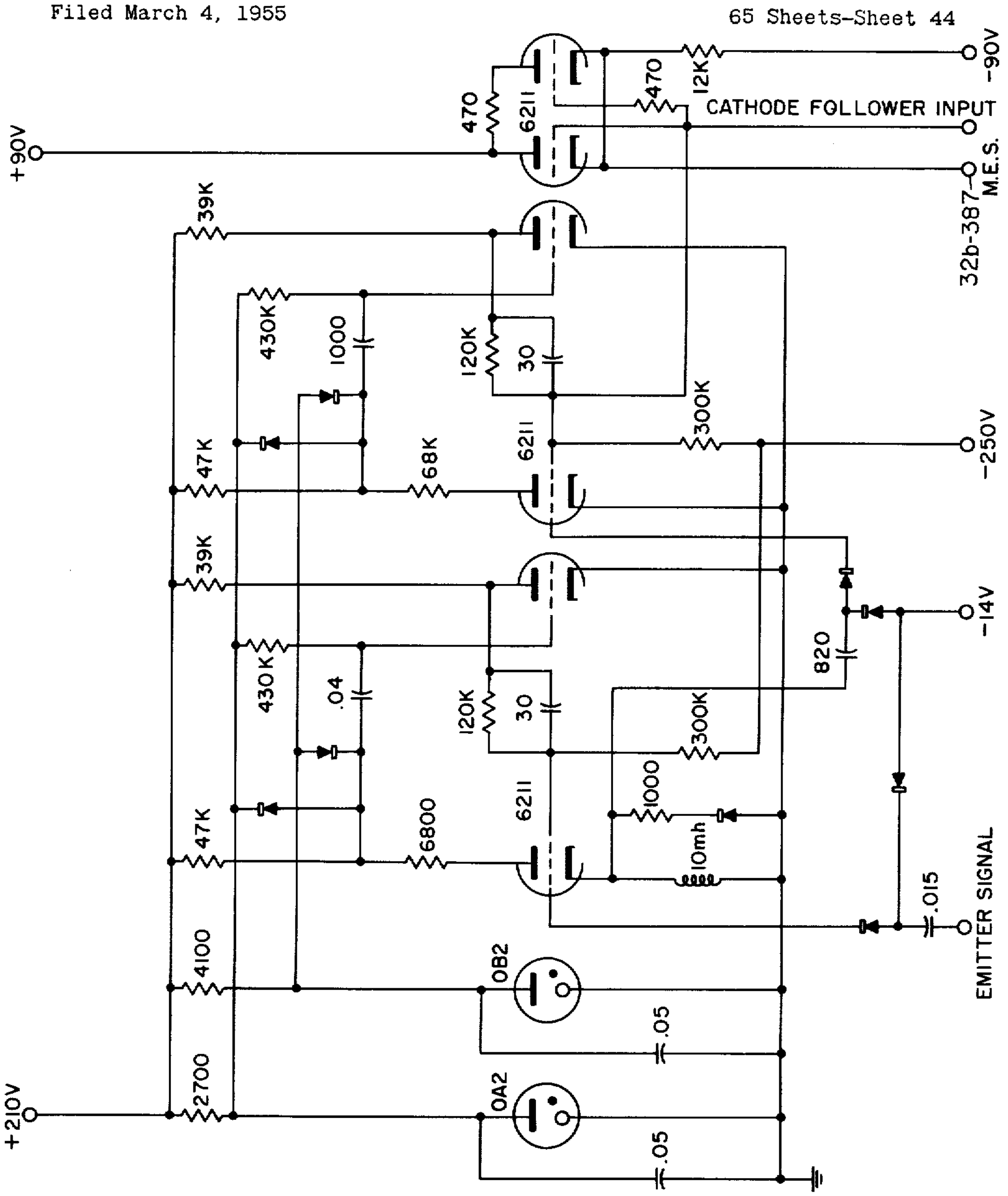
Figure 41:
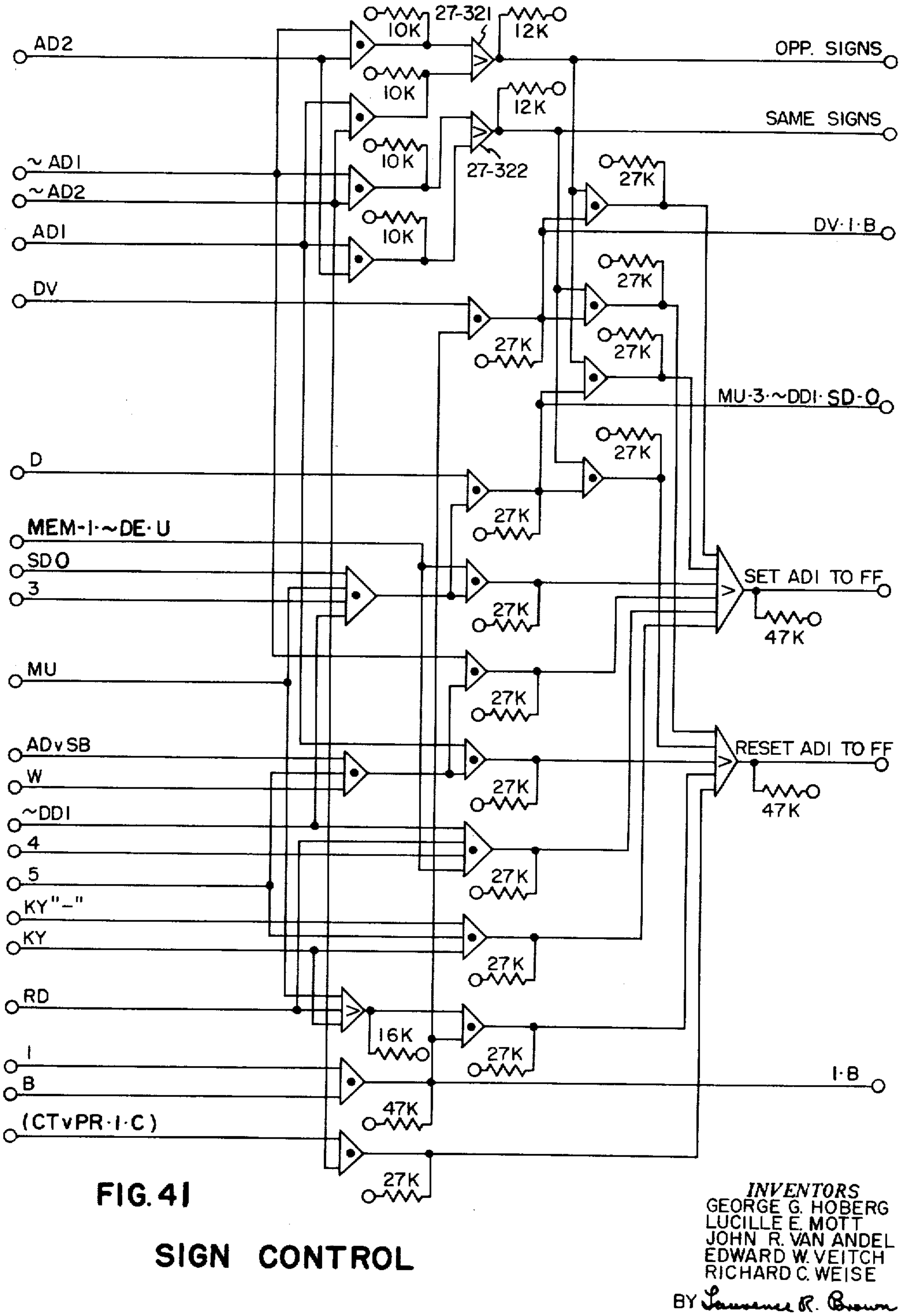
Figure 42:
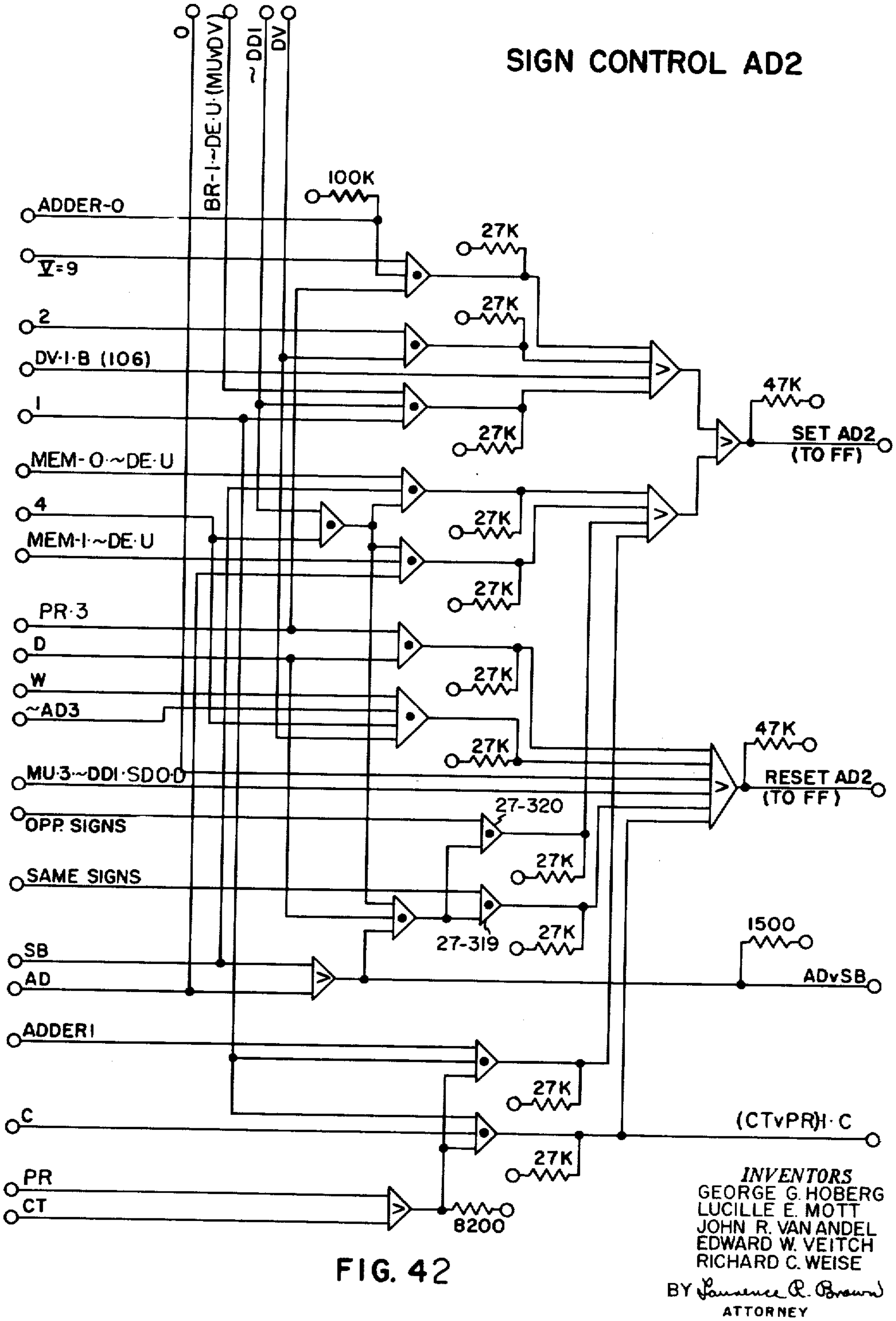
Figure 43:
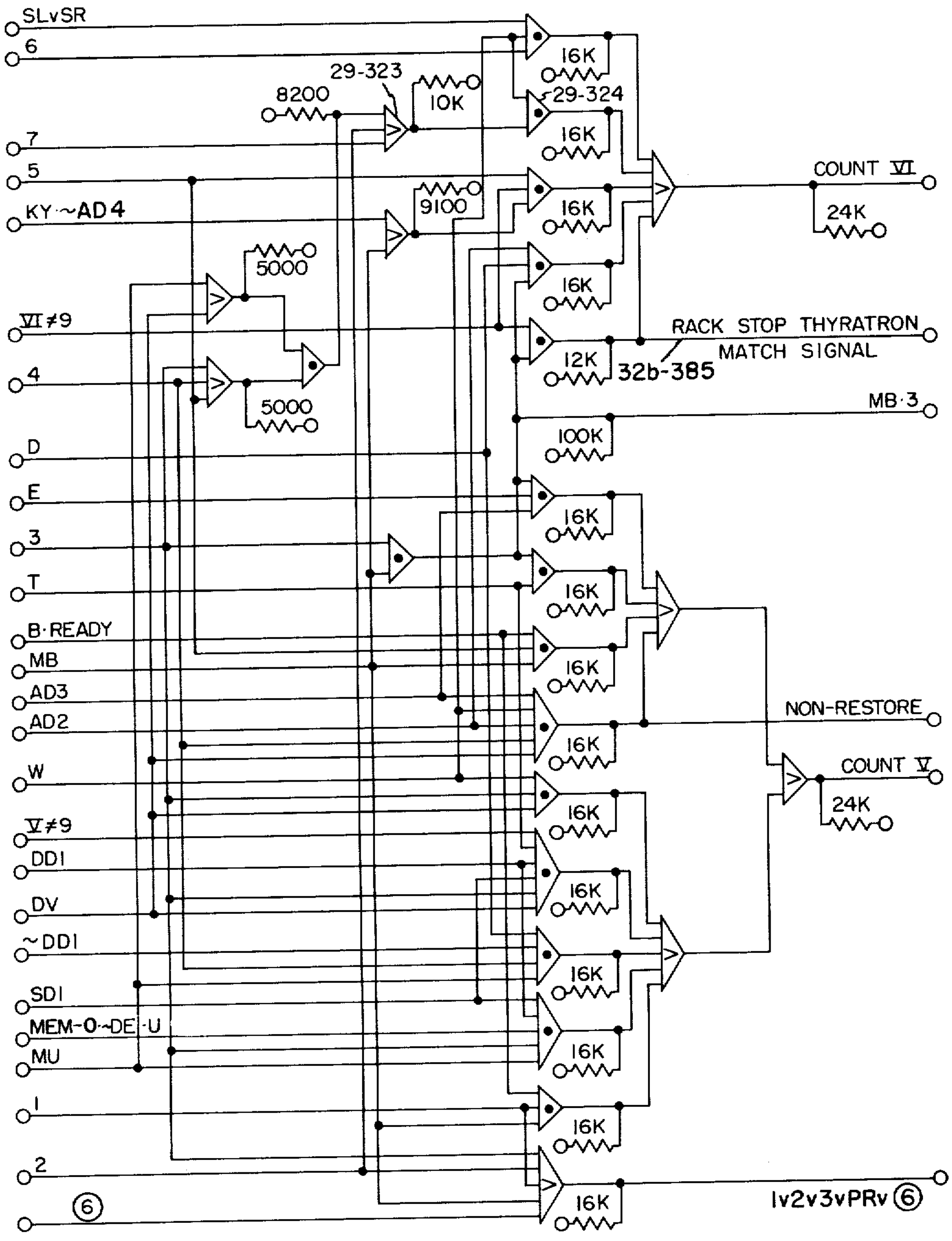
Figure 44:
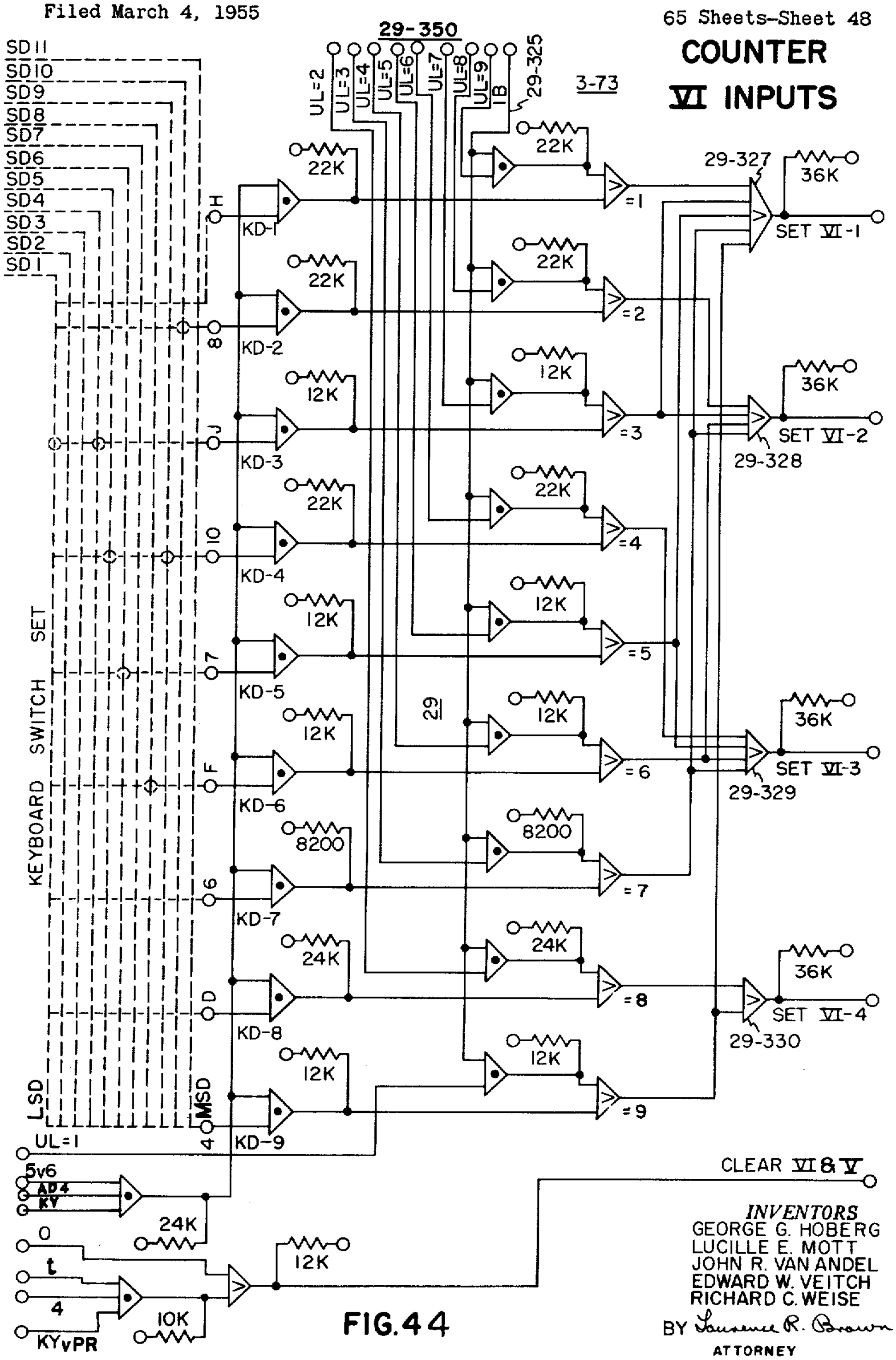
Figure 45:
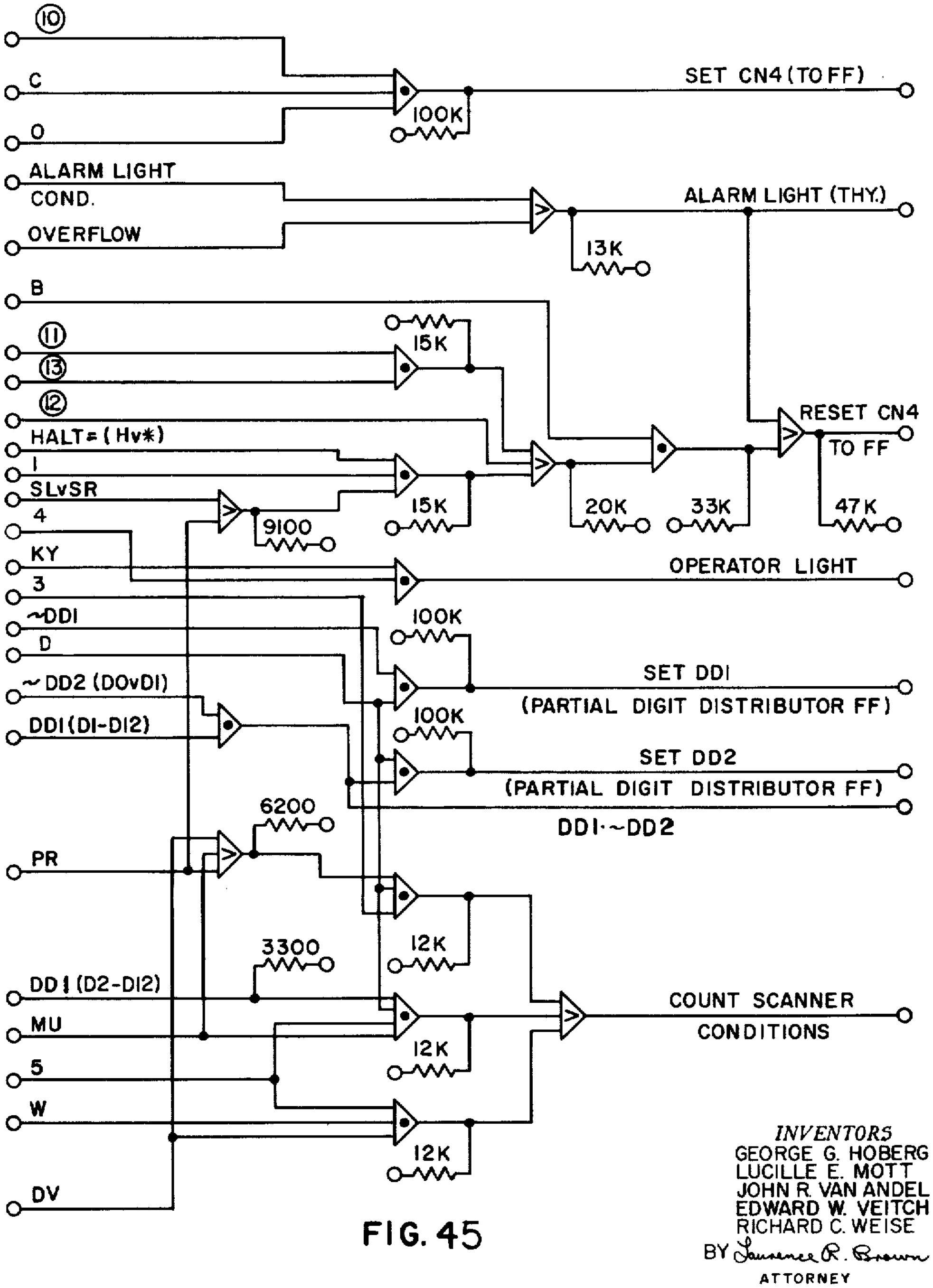
Figure 46:
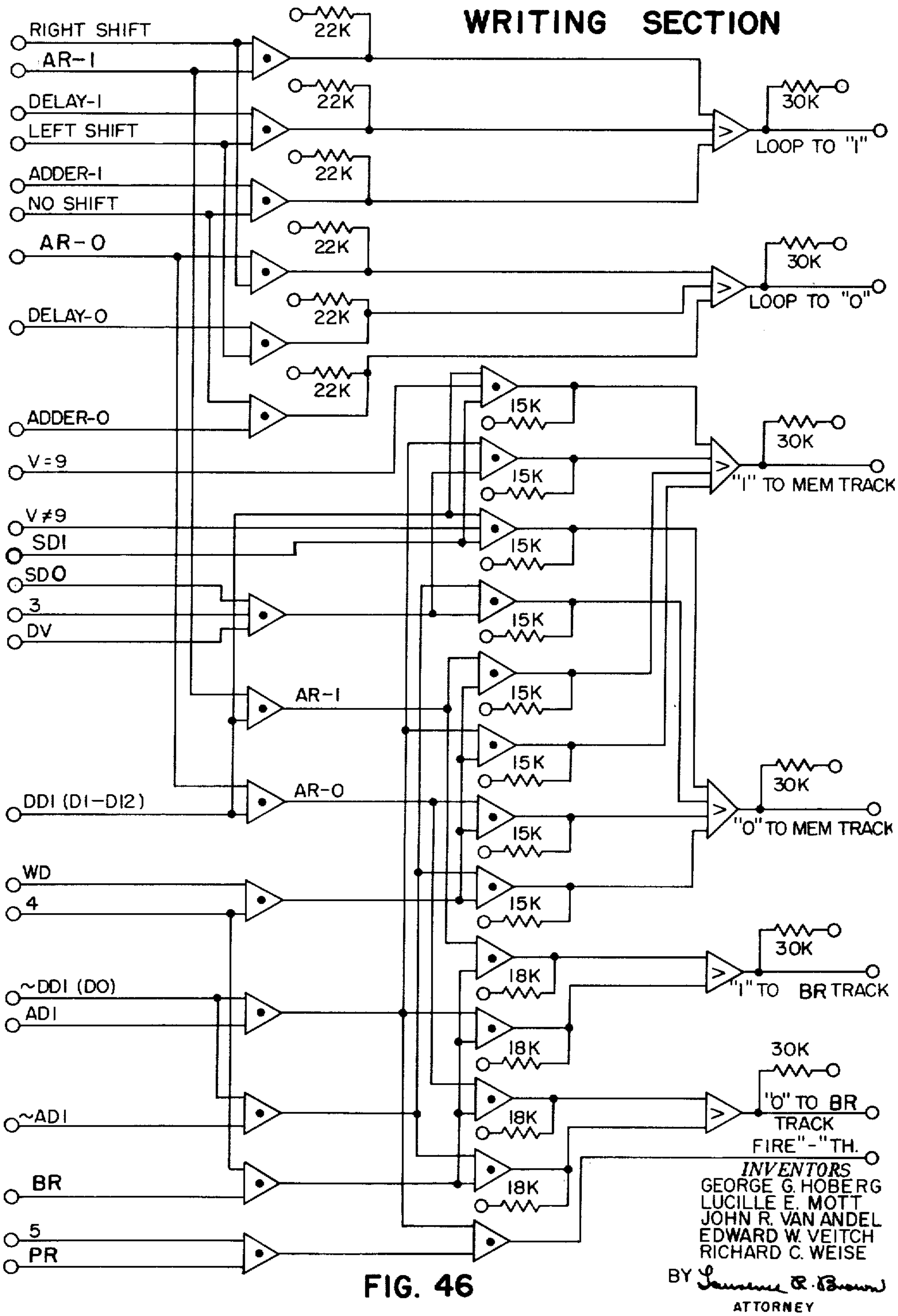
Figure 47:
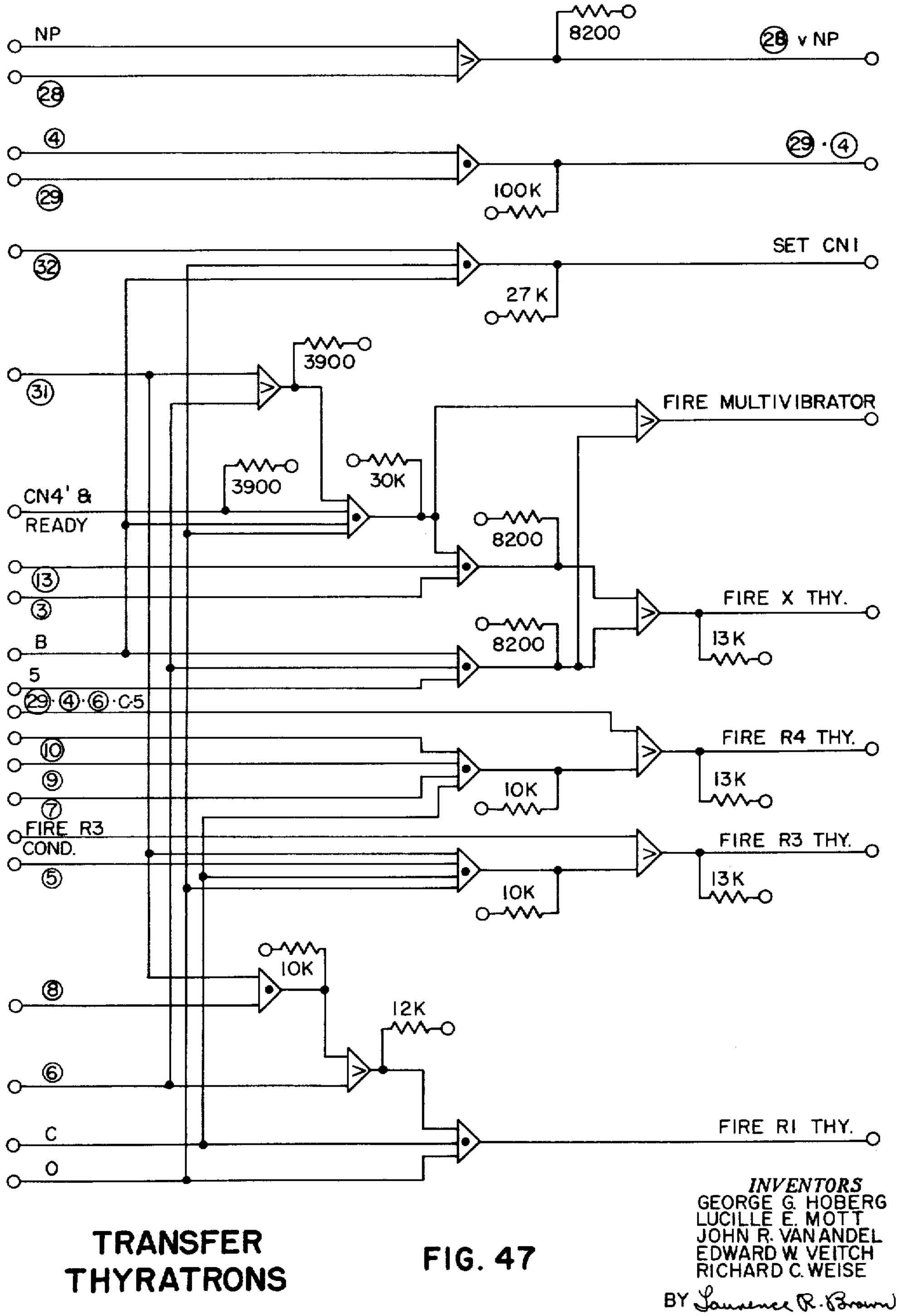
Figure 48:
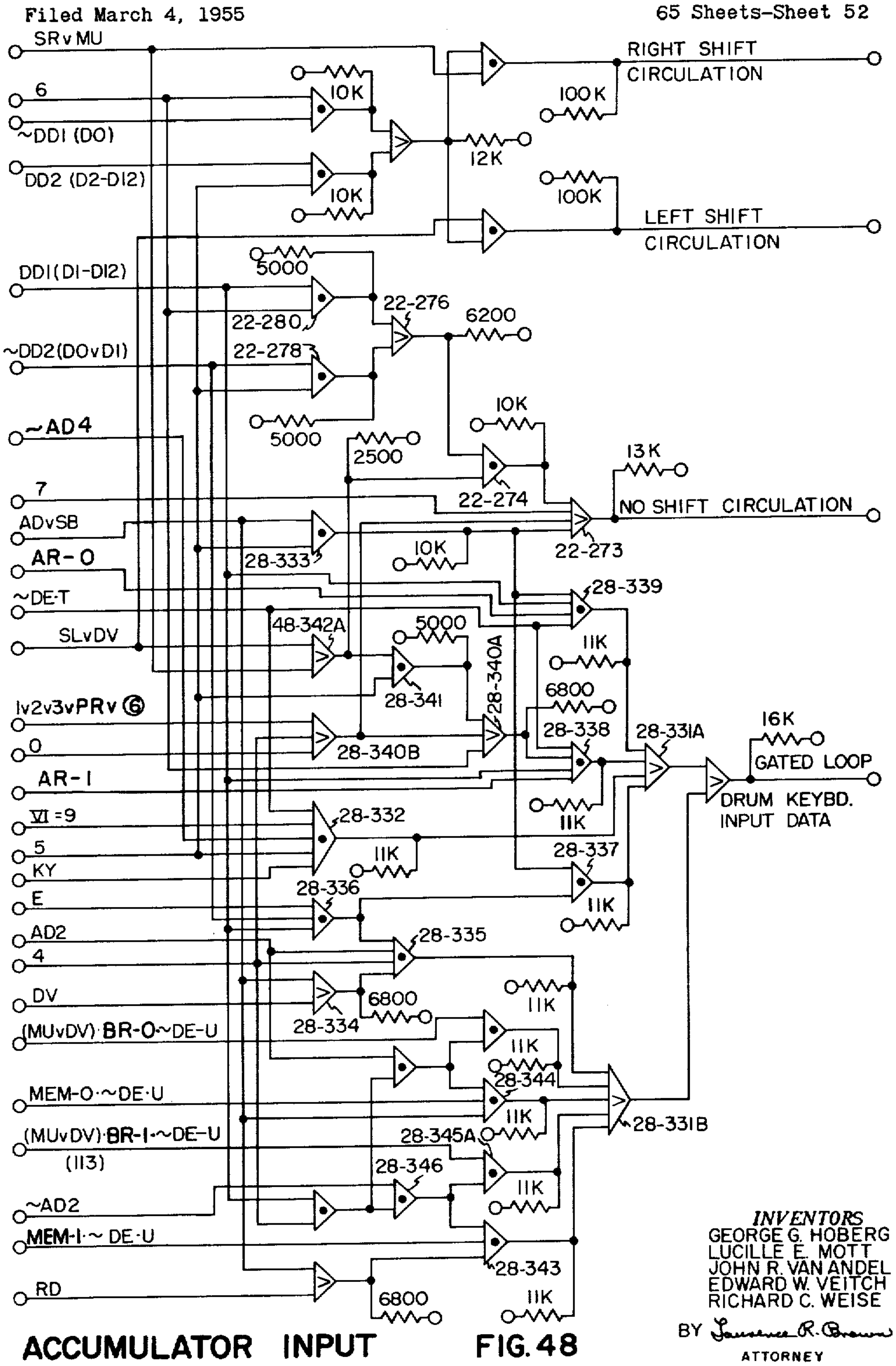
Figure 49:
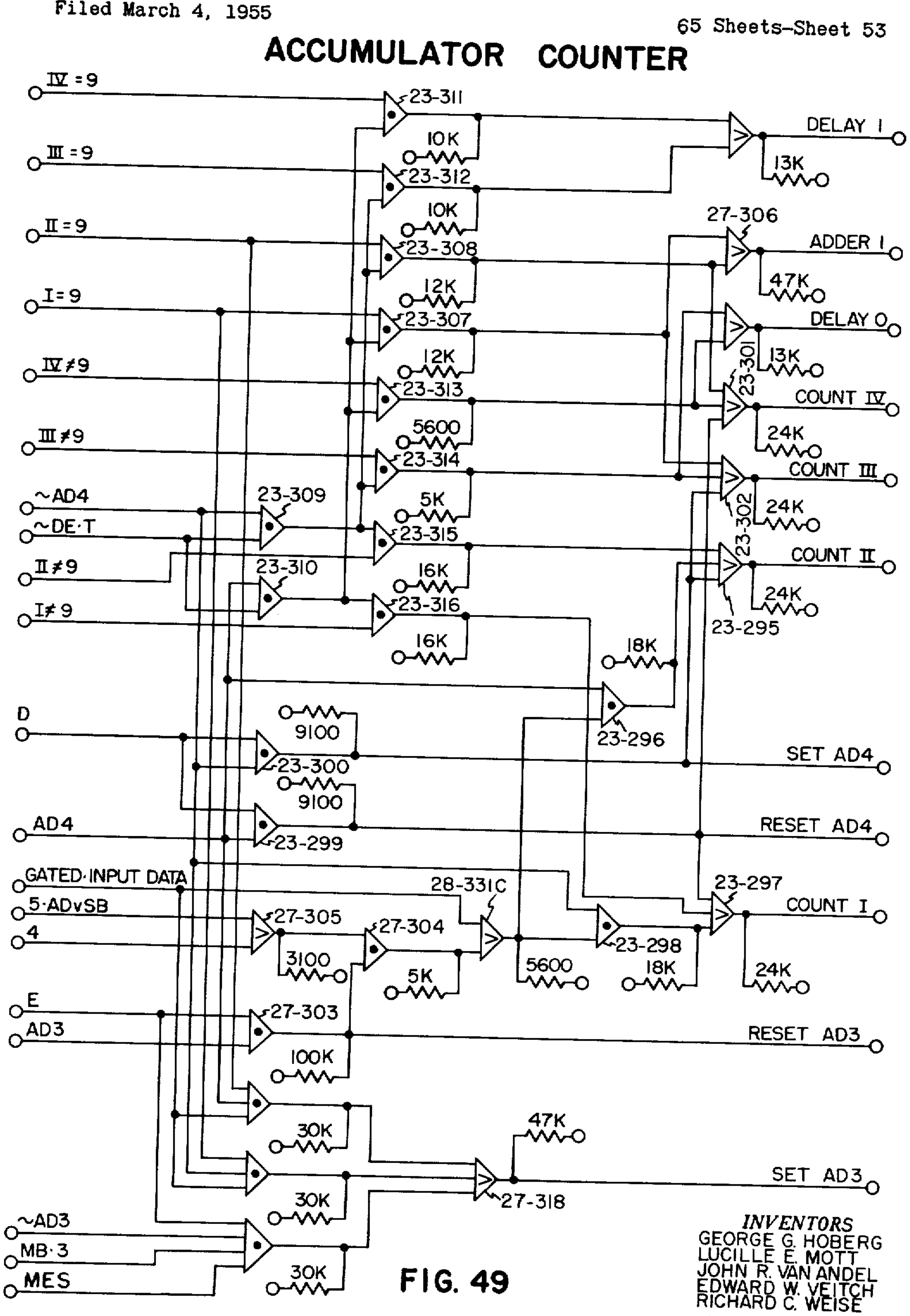
Figure 50:
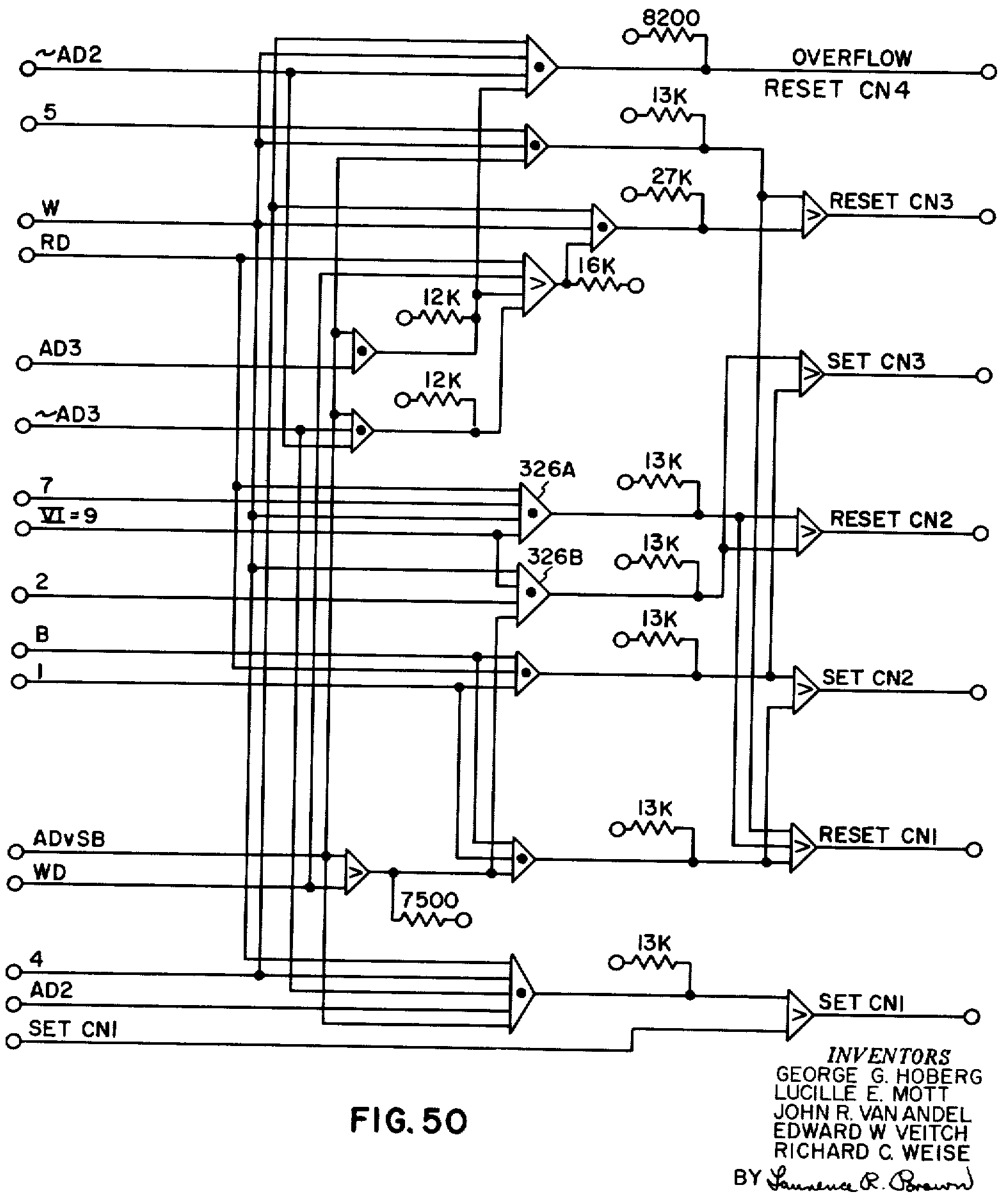

FIGS. 3*a* and 3*b* show in more detailed block diagram form the relationship of different functional units of the computer;

FIG. 4 is a diagrammatic view of a magnetic drum memory device of the computer;

FIG. 5 is a perspective view of the computer data input-output unit;

FIG. 6 is a plan view of a preferred pinboard used for programming the computer;

FIG. 7 is a plan view of the preferred computer manual control panel;

FIG. 8 is a schematic diagram of the computer power control circuit;

FIG. 9 is a schematic diagram of the computer power supply circuit;

FIG. 10 is a logical block diagram of signal processing circuits for stored timing and data information;

FIG. 11 is a waveform diagram of timing pulses used in the computer for scheduling operation;

FIG. 12*a* is a circuit diagram of a two stage tuned amplifier with shaped wave outputs used for data processing and timing;

FIG. 12*b* is a block diagram of the circuit of FIG. 12*a*;

FIG. 13a is a circuit diagram of peaking, amplifying and inverting circuits used for data processing and timing;

FIG. 13b is a block diagram of the circuit of FIG. 13a;

FIG. 14a is a circuit diagram of peaking, amplifying, phase advancing and inverter circuits used for data processing and timing;

FIG. 14b is a block diagram of the circuit of FIG. 14a;

FIG. 15a is a diagram of a differentiating amplifier, linear amplifier and shaped wave output circuit used for data processing and timing;

FIG. 15b is a block diagram of the circuit of FIG. 15a;

FIG. 16 is a circuit diagram of a pulse amplifier of the type used throughout the computer with a gated input;

FIG. 16a is a block diagram of the circuit of FIG. 16;

FIG. 17a is a typical computer writing circuit with a gated timing pulse input circuit, preamplifying circuit and output transformer circuit timed by a clock writing pulse;

FIG. 17b is a block diagram of the B register, A register and memory writing circuits, including, as components, the circuit of FIG. 17a;

FIG. 18 shows the read and write circuits illustrating the write pulse inputs from FIG. 17a and read pulse outputs derived from the magnetic heads;

FIG. 19 is a schematic circuit of the B register showing input and output logical gates;

FIG. 19a is a circuit diagram of a logical diode buffer gate used throughout the computer;

FIG. 20 is a logical block diagram of the computer state selector circuit;

FIG. 21 is a combined block and waveform diagram of a digit distributor circuit used in the computer;

FIG. 22 is a schematic circuit of the A register showing the logical diode shift control gates;

FIG. 23 is a more detailed schematic circuit of the delay elements of FIG. 22 used in conjunction with the accumulator-adder portion of the A register;

FIG. 24 is a more detailed schematic circuit of the counters of FIG. 23 used throughout the computer and showing counter inputs and outputs;

FIG. 25 is a circuit diagram of a flp-flop circuit of the type used throughout the computer and in the first three stages of FIG. 24;

FIG. 26a is a circuit diagram of a flp-flop circuit of the type used in the last stage of FIG. 24 and which has a delay-line coupling and a pulse amplifier output;

FIG. 27 is a schematic diagram of the accumulator-adder and sign comparator;

FIG. 28 is a block diagram of the adder control circuits and the accumulator loop;

FIG. 29 is a diagrammatic representation of address selection circuit;

FIG. 30a is a side view of the keyboard-printer mechanism and rack stop solenoid assembly in the keyboard-printer;

FIG. 30b is a schematic illustration of the mechanical operation of the read-out mechanism in the keyboard-printer;

FIG. 30c is a timing chart of the cam operated switches and a schematic drawing showing electrical control equipment in the keyboard-printer;

FIG. 30d is a schematic diagram of the read-in switches and a timing chart diagram of mechanical functions in the keyboard-printer;

FIG. 30e is a perspective representation of one of the read-in switches of FIG. 30d;

FIG. 30f is a section view of one of the individual switch banks of the switch of FIG. 30e;

FIG. 30g is a schematic representation of the mechanical switches associated with the rack stop solenoids which create actuator rack position signals;

FIG. 31a is a circuit diagram of the rack stop thyratrons and machine function thyratrons showing the associated solenoids;

FIG. 31b is an electrical circuit diagram of the emitter pulse signal generator of FIG. 30g including the timing cam switch;

FIG. 31c is an electrical circuit diagram of control equipment actuated by the timing cams of FIG. 30c and the keyboard subtract switch;

FIG. 31d is an electrical circuit diagram for indicator lights shown in FIGS, 7, 36 and 38;

FIG. 32a is a circuit diagram of a logical diode coincidence gate and a thyratron gate for one of the rack stop solenoids;

FIG. 32b is a logical block diagram of inputs to the rack stop thyratrons of FIG. 32a;

FIG. 33 is a circuit diagram of the thyratron trigger circuits used throughout the computer;

FIG. 34a is a detailed logical schematic of the modulo thirteen scanner counter;

FIG. 34b is a logical circuit diagram of the electronic digit scanner of FIG. 34a showing inputs and outputs;

FIGS. 35a to 35d comprise a logical circuit diagram of the pinboard scanning circuits and stepping switches associated therewith;

FIG. 35e is a block diagram showing the intended arrangement of FIGS. 35a to 35d;

FIG. 36 is a plan view of a modified pinboard control panel showing a modified control panel similar to FIG. 7 and a cut away perspective of a pin contact;

FIG. 37 is a logical block diagram of additional stepping switches used with the modified control panel of FIG. 36 illustrating eight pinboards and their associated stepping switches, and indicating how the additional stepping switches are connected into the circuitry shown in FIGS. 35a to 35d;

FIG. 37a is a logical circuit diagram of function controls initiated by pinboard instructions;

FIG. 38 is a logical block diagram of the alarm circuits and includes the print check and the sign check circuits;

FIG. 39a is a circuit diagram of the interrupter multivibrator circuit input to the interrupter circuit of FIG. 35c;

FIG. 39b is a schematic block diagram of the circuit of FIG. 39a, also showing the delay timing chart;

FIG. 40 is the pulse stretcher and amplifier for the emitter signal of FIG. 31b producing the modified emitter signal used in FIGS. 32a and 32b;

FIG. 41 is a logical circuit diagram of a portion of the sign control circuits;

FIG. 42 is a logical circuit diagram of the remainder of the sign control circuits;

FIG. 43 is a logical circuit diagram of inputs to counters V and VI;

FIG. 44 is a logical circuit diagram of keyboard inputs and address selection inputs to counter VI;

FIG. 45 is a logical circuit diagram of part of the alarm circuitry, inputs to the digit distributor and inputs to the scanner;

FIG. 46 is a logical circuit diagram of the inputs to the different computer writing sections shown in FIGS. 19, 28 and 29;

FIG. 47 is a logical circuit diagram of inputs to the thyratrons of FIG. 35c and state control counter of FIG. 20;

FIG. 48 is a logical circuit diagram of control inputs to the accumulator loop circuits of FIG. 28;

FIG. 49 is a logical circuit diagram of inputs to the accumulator counters, alternator flip flop and carry flip flop;

FIG. 50 is a logical circuit diagram of inputs to the state control counter of FIG. 20.

Figure 35D:
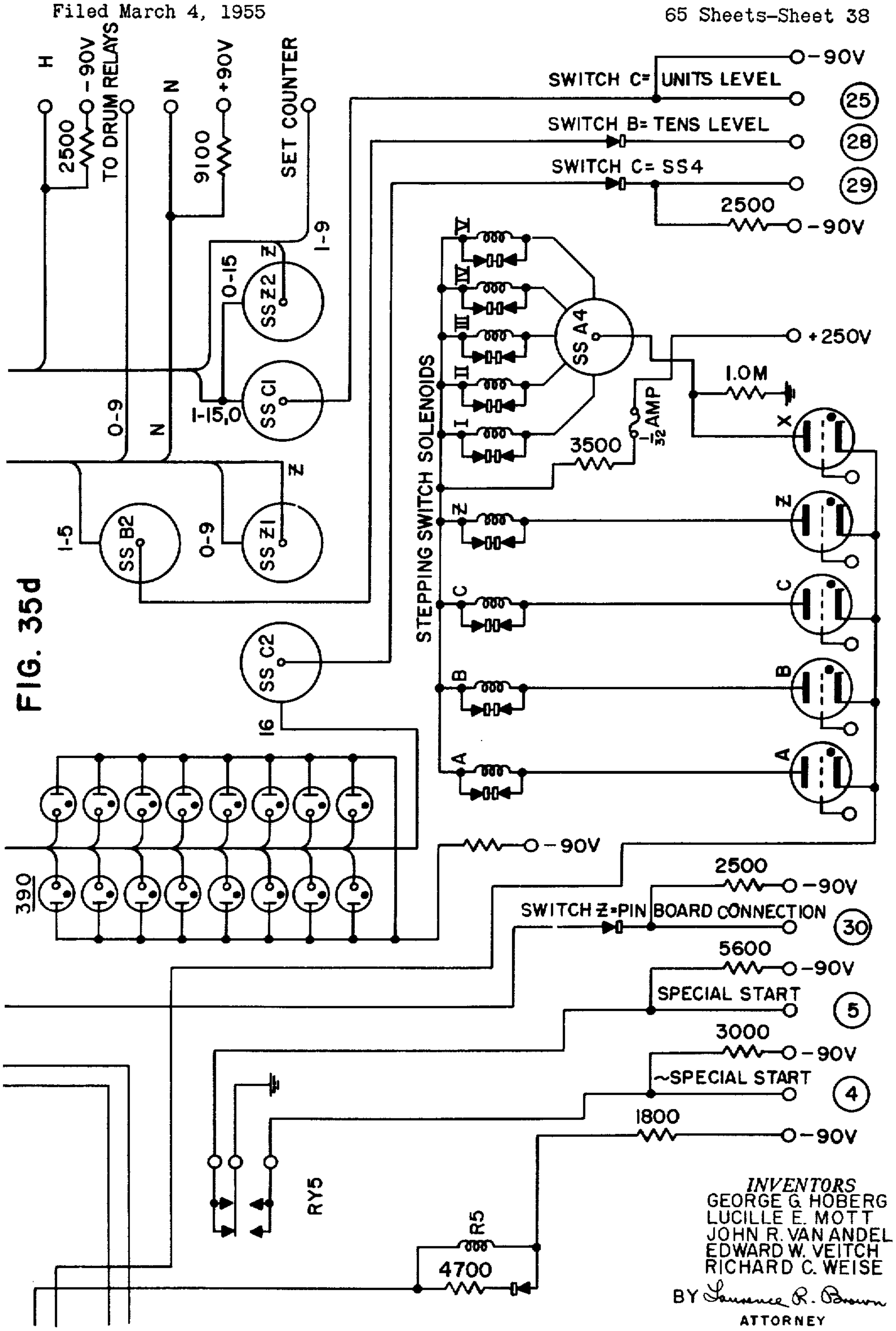
Figure 51:
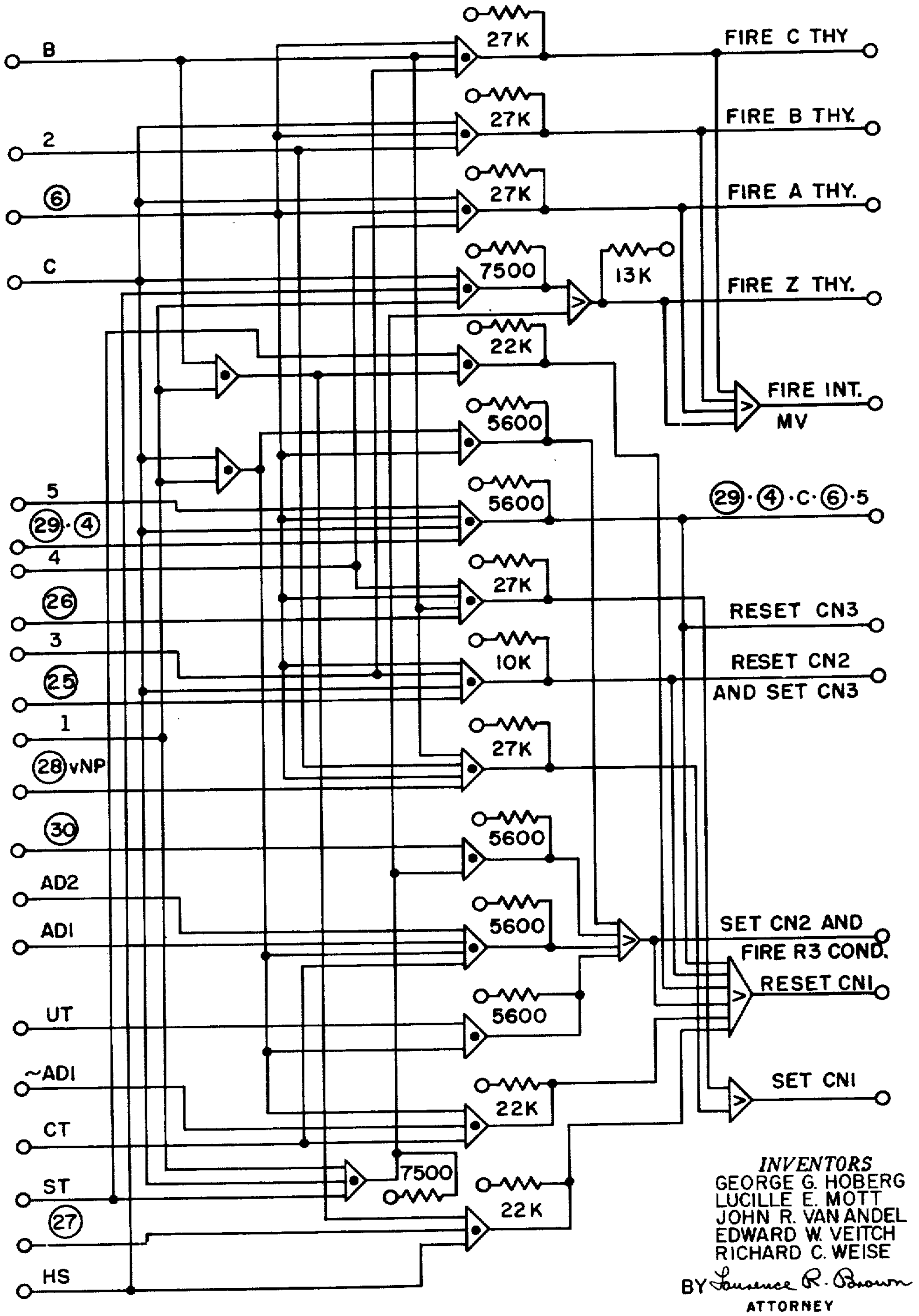
Figure 52:
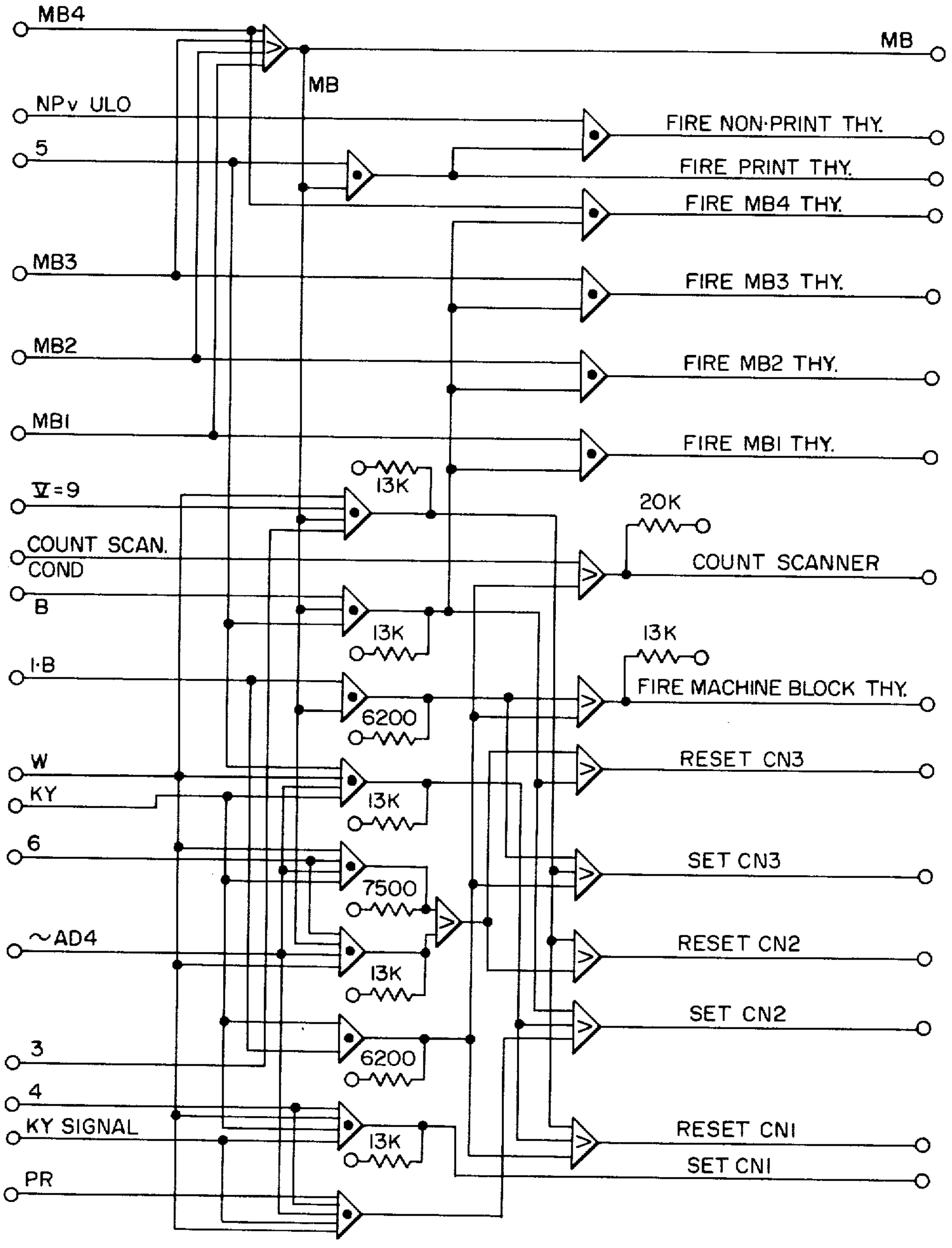
Figure 53:
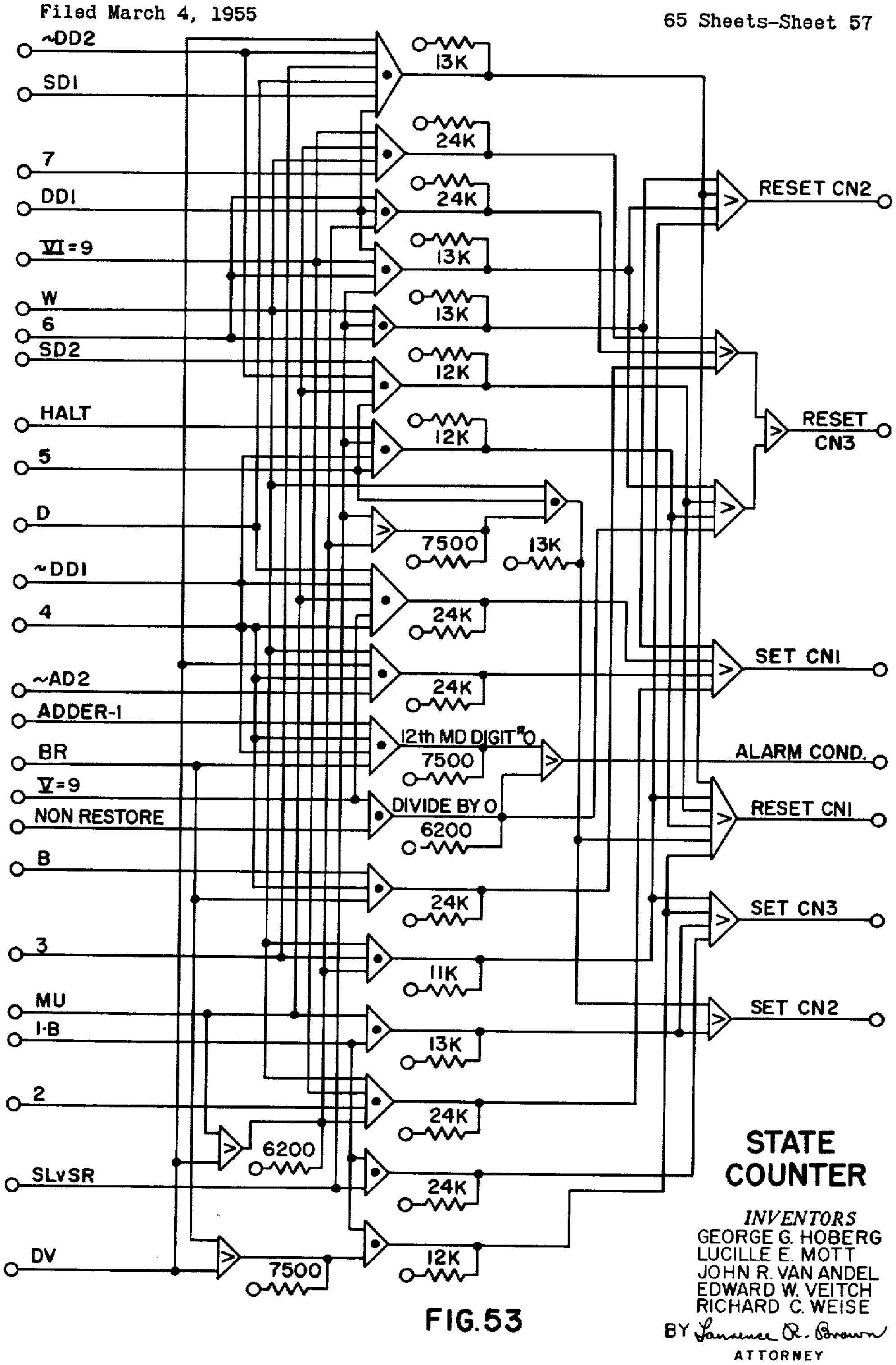
Figure 54:
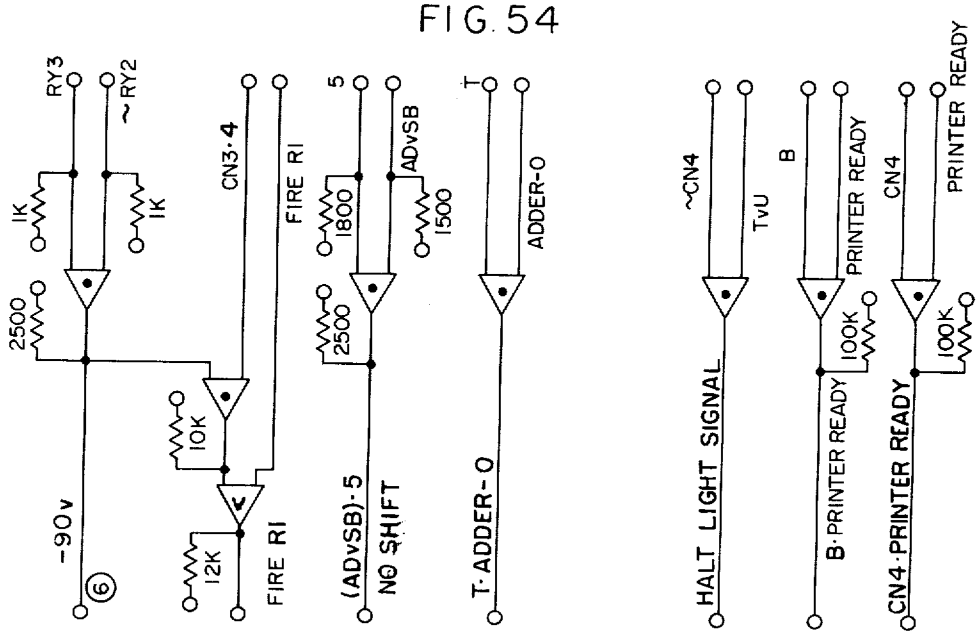
Figure 55:
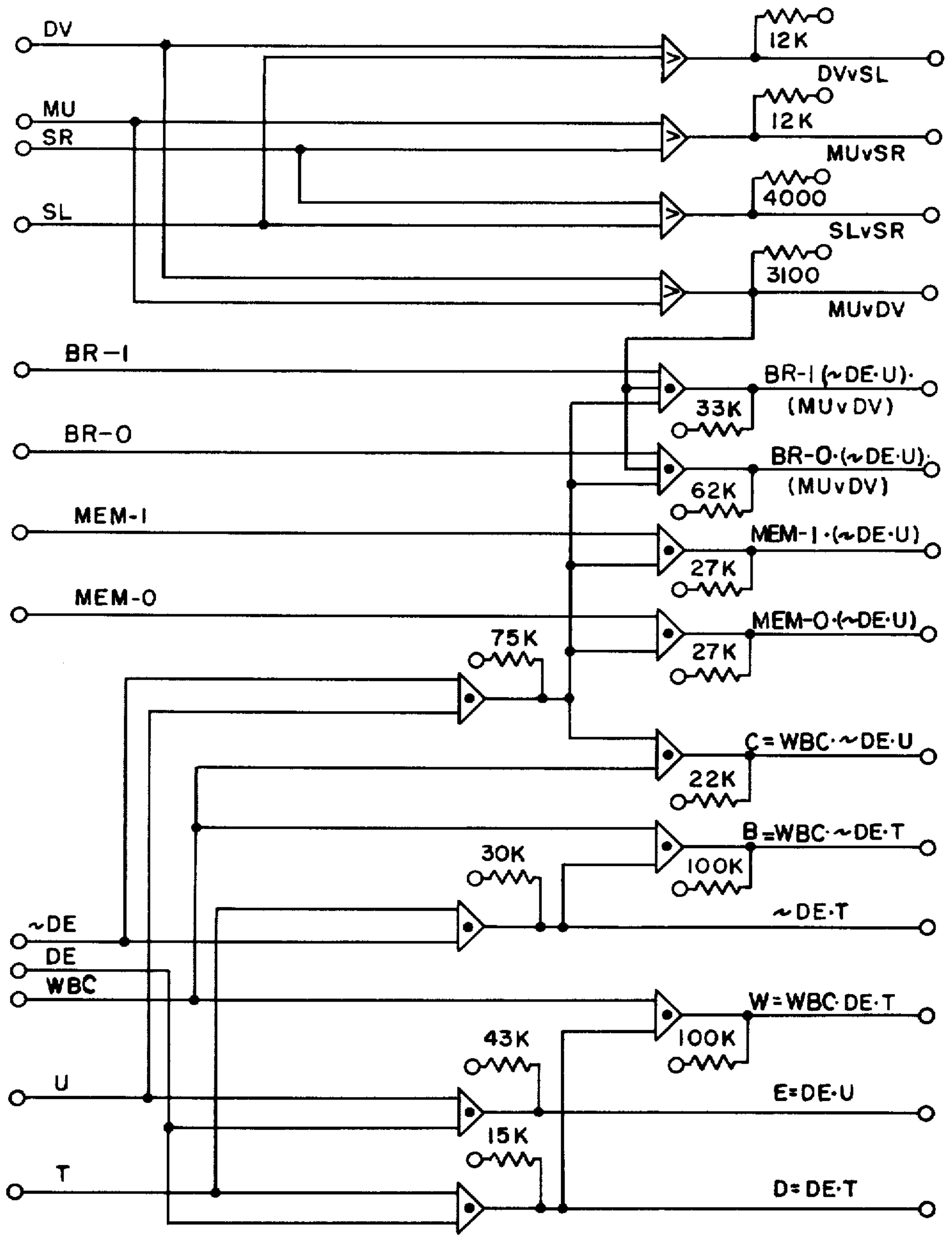
Figure 56:
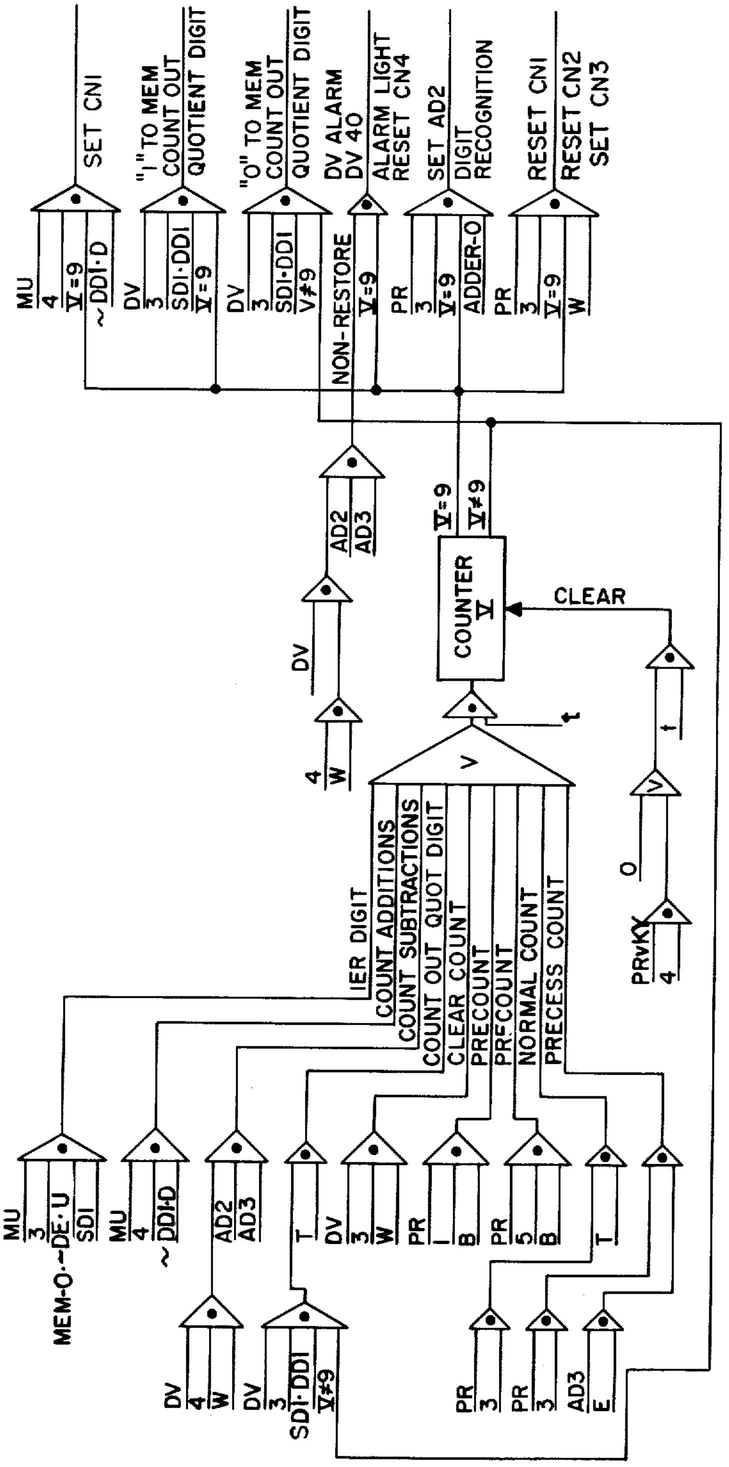
Figure 57:
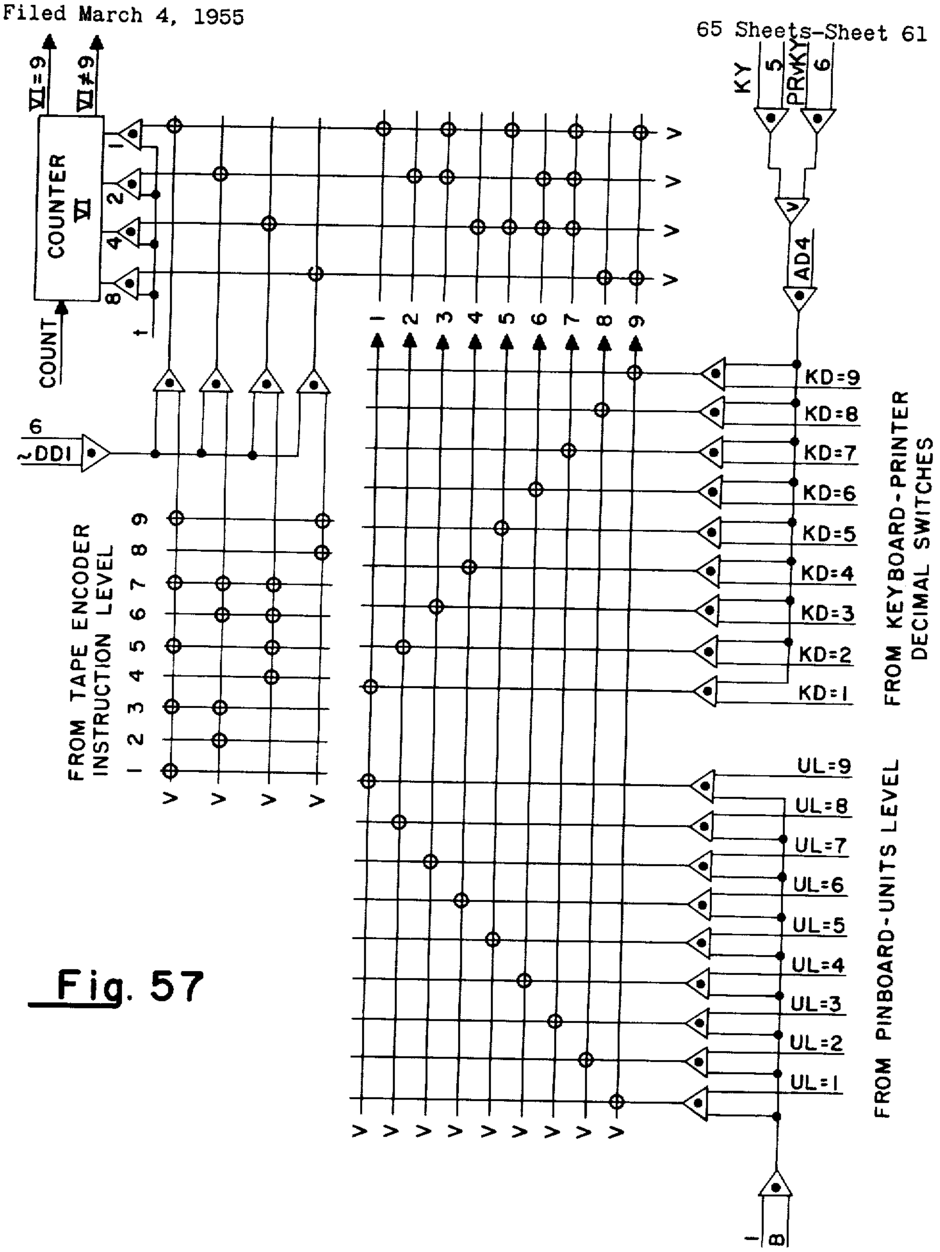
Figure 58:
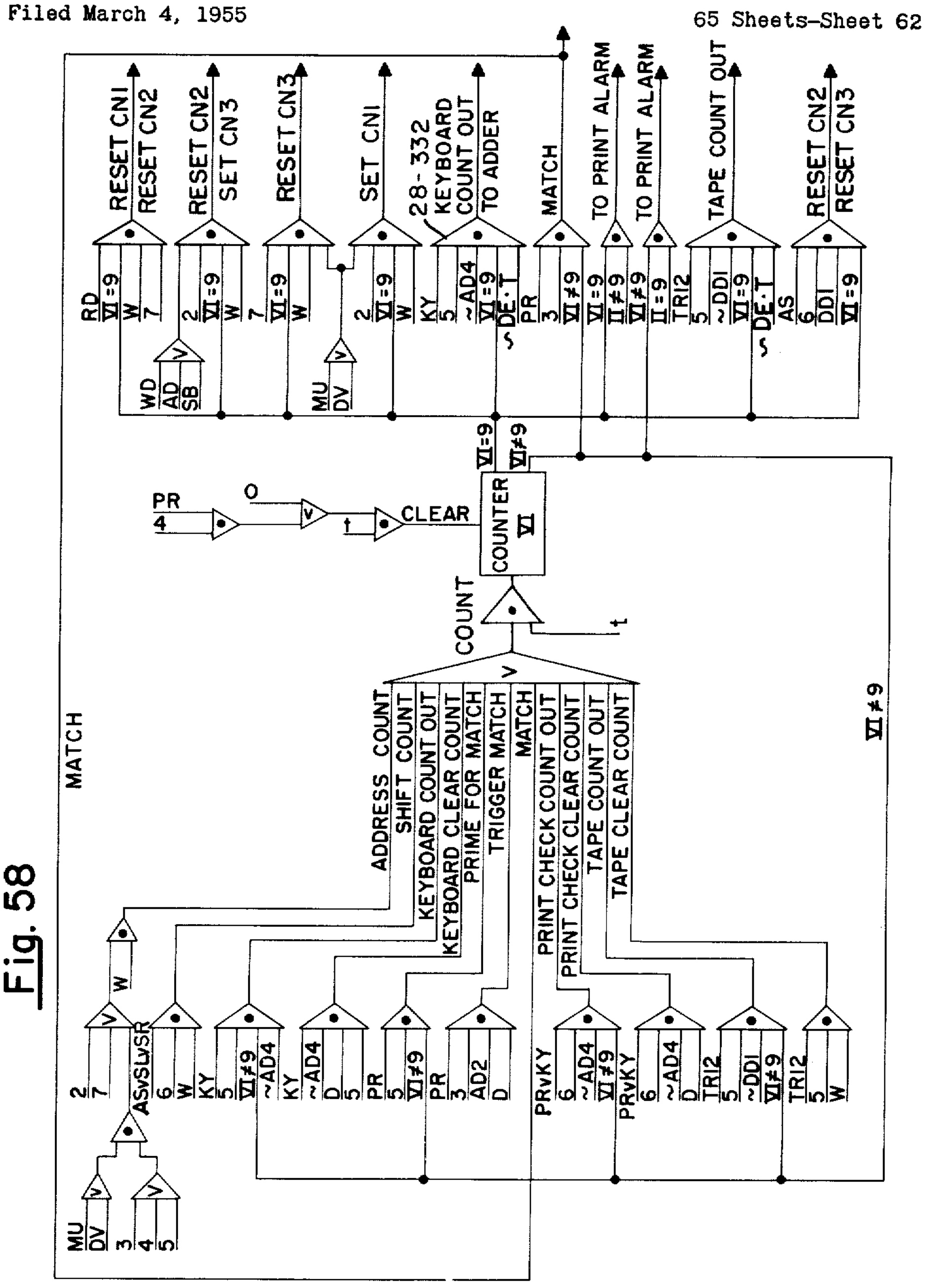
Figure 59:
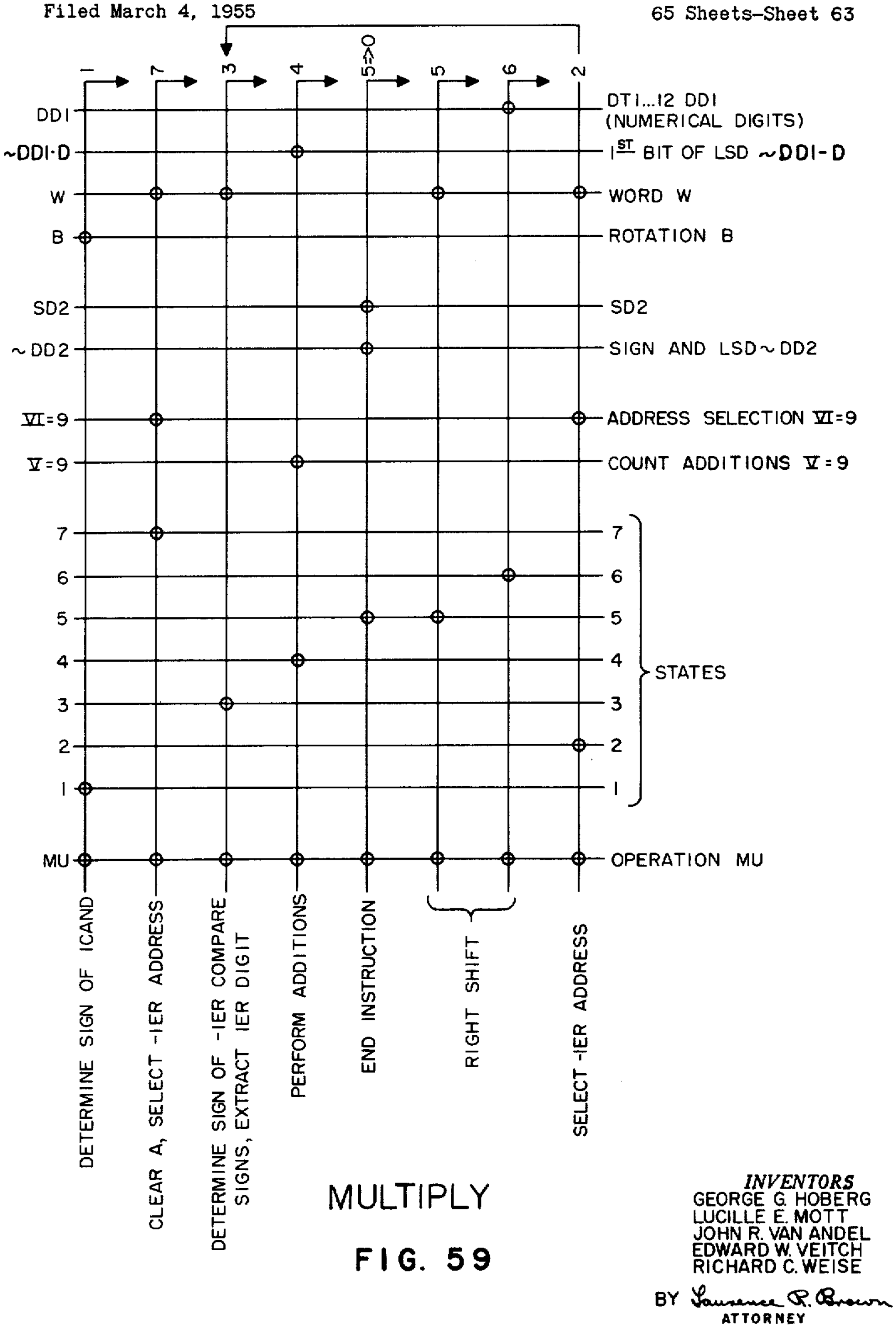
Figure 60:
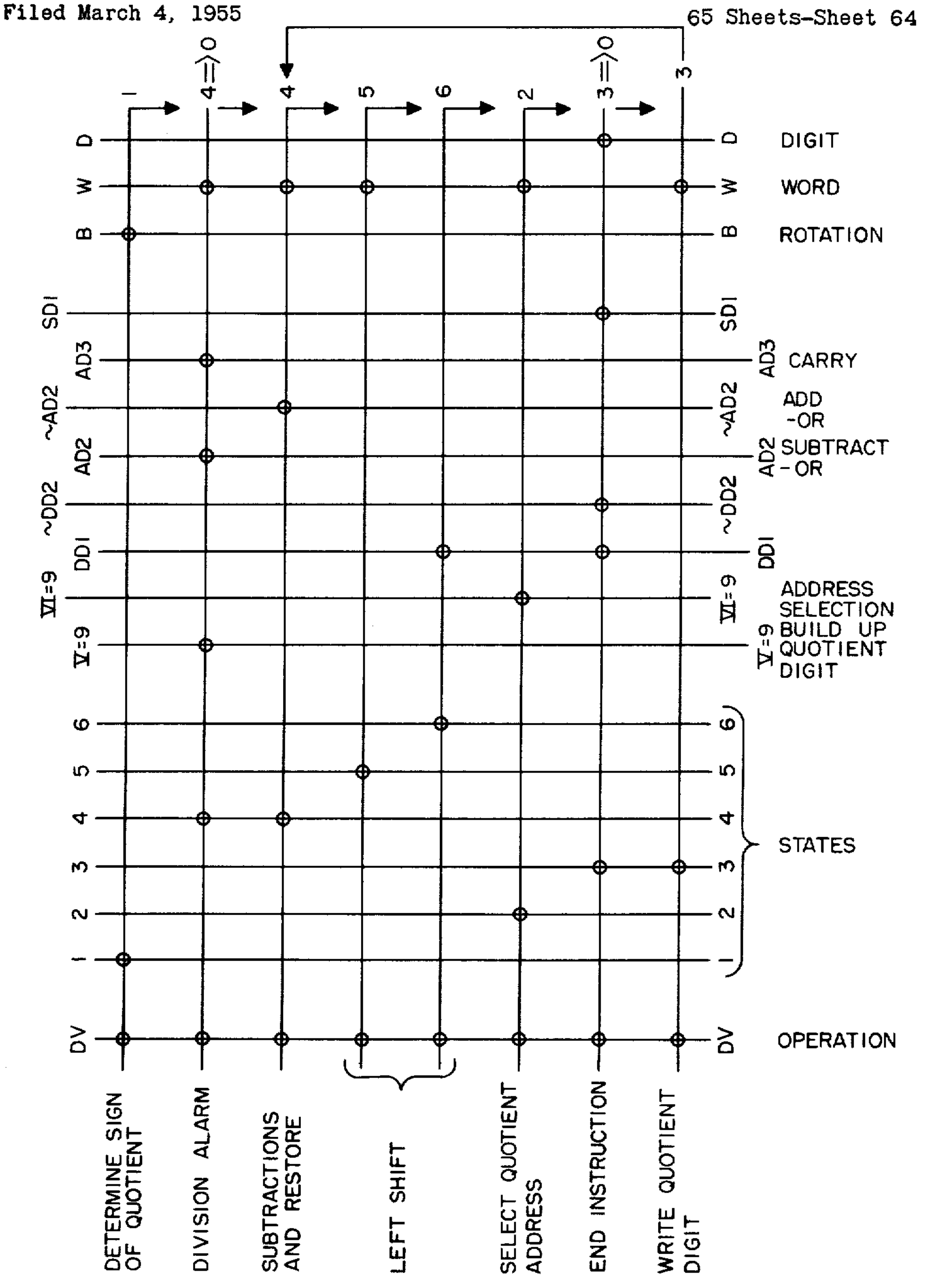
Figure 61:
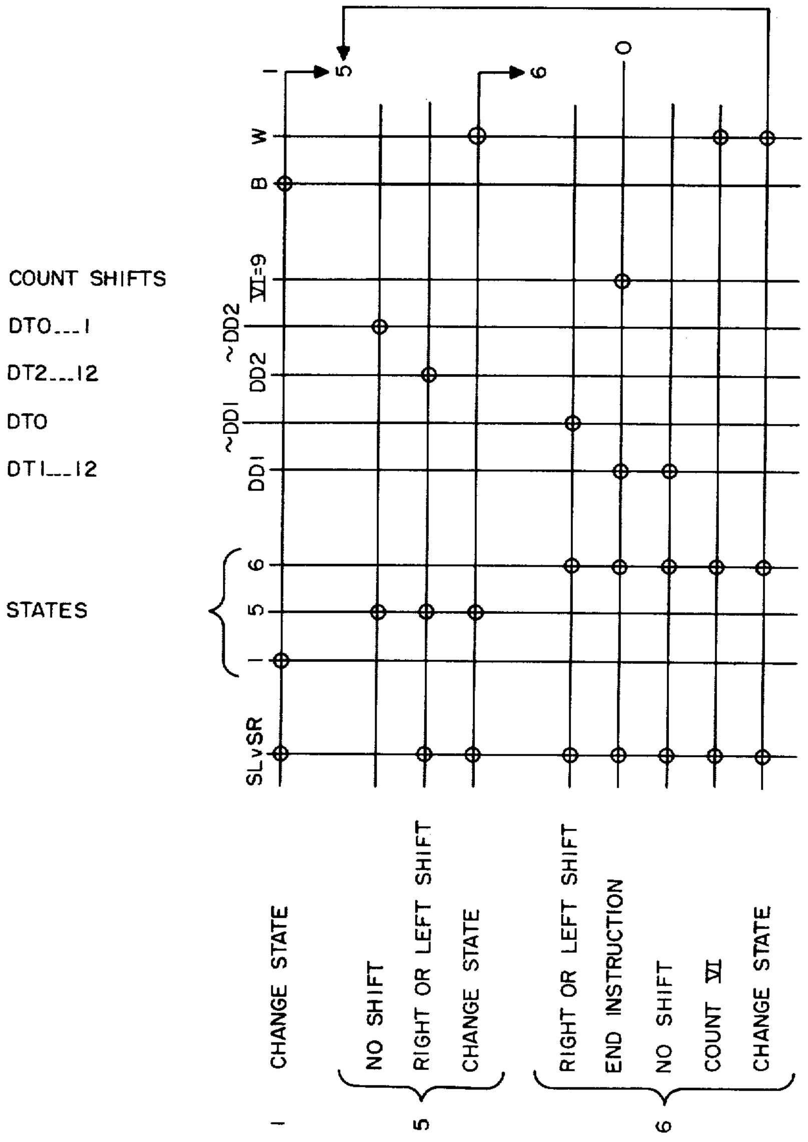

FIG. 51 is a logical circuit diagram of inputs to the state control counter of FIG. 20, inputs to the interrupter multivibrator of FIG. 35c, and inputs to the thyratrons of FIG. 35d;

FIG. 52 is a logical circuit diagram of inputs to the state control counter of FIG. 20, inputs to the function and motor bar thyratrons of FIG. 31*a*, and inputs to the scanner;

FIG. 53 is a logical circuit diagram of inputs to the state counter of FIG. 20, and inputs to the alarm circuitry;

FIG. 54 is a logical circuit diagram of miscellaneous diode gates;

FIG. 55 is a logical circuit diagram of operation conditions for the signal gating and diode timing pulse circuits of FIG. 10;

FIG. 56 is a logical circuit diagram of counter V input and output conditions;

FIG. 57 is a logical circuit diagram of counter VI showing the encoded inputs for the data input and address location functions;

FIG. 58 is a logical circuit diagram of counter VI input and output conditions;

FIG. 59 is a logical diagram of state and function conditions for the multiply operation;

FIG. 60 is a logical diagram of state and function conditions for the divide operation;

FIG. 61 is a logical diagram of state and function conditions for the shift left and shift right operations.

In order to facilitate comparison of circuits throughout the computer, like elements are given similar suffix reference characters. In the detailed description of the computer system the reference characters are referred to the figures in which they are also shown by a prefix numeral, and likewise cross reference is made from reference characters of one figure to another, wherever convenient. Wherever possible, to simplify notation, alphabetical reference characters are used on terminals and localized elements. In view of the complexity of the system, descriptive legends are used in connection with some of the figures to enable corresponding circuitry to be compared without detailed reference to the specification. Also subheadings are used in the specification to more readily direct attention to different sections of the computer system.

Figure 1:
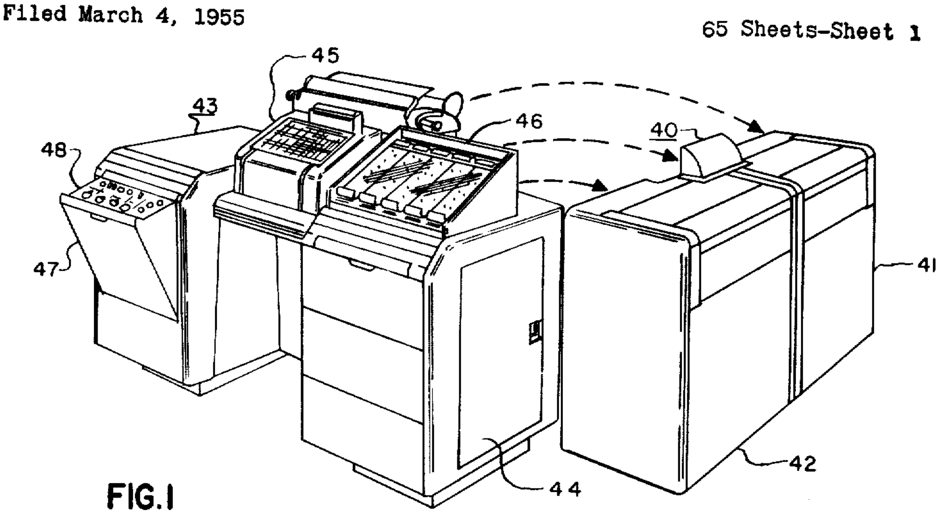
FIG. 1 is a perspective view of the electronic computer console.

In FIG. 1 is shown a perspective view of the desk-size computer console. A ventilated rear cabinet housing section 1—40 contains the electronic computer circuits which are generally mounted on standardized plug-in circuit units. The circuit housing section 1—40 pivots open for ready access in servicing to the interior elements, and is further provided with removable cover sections 1—41 and 1—42 for access to circuits exposed at the rear of the cabinet.

The desk section 1—43, in general, houses the power supply and memory units, which are accessible through opposite end panels 1—44. On the desk top is affixed an input-output unit 1—45 herein identified as a keyboard-printer and a visible control panel 1—46 employing removable pins into which is programmed the automatic instruction sequence to be performed by the computer. A pivoted compartment drawer 1—47 houses a manual control panel 1—48, which may be used for setting up operation conditions in the computer and for modifying the automatic instruction sequence.

Figure 2:
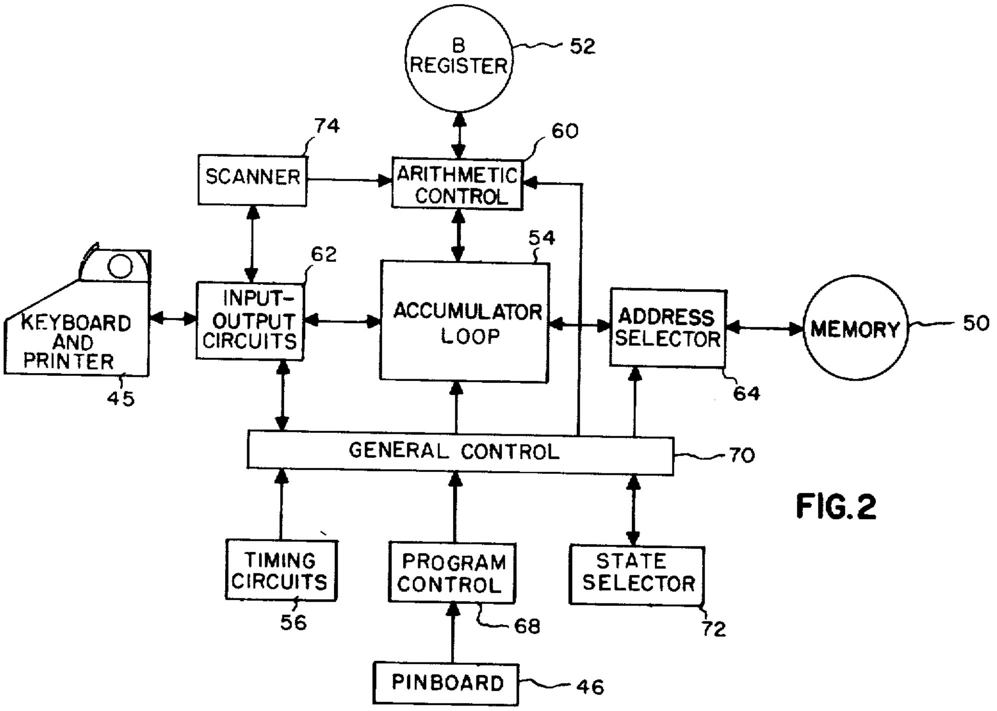
FIG. 2 is a generalized block diagram of the several functional computer sections.

The block diagram circuit of FIG. 2 illustrates the overall operational relationship of different computer units. The computer units are shown in functional rather than physical relationship. For example, the memory unit 2—50 comprises several tracks of a rotating magnetic disc or drum, while the B register 2—52, and accumulator loop 2—54 each comprise further single tracks on the same rotating storage device. The timing circuits 2—56 may be also actuated from timing signals synchronized with further tracks upon the rotating storage device. Input-output circuits 2—62 are provided to assure that the electronic computer timing circuits 2—56 and the keyboard and printer 45, which has an independent operating cycle, are synchronously sensed. The novel input-output circuits are arranged so that separate buffer memory devices are eliminated as will be explained. The keyboard and printer 45 with its internal operation cycle includes further timing cam means not associated with the block 2—56 for enabling the transfer of information between the keyboard and printer unit 45 and the synchronously operated computer circuits. In this respect the more detailed block diagram presentation of FIG. 3 shows that during a printing operation the pulse generator switches produce rack stop signals at section 3—49 which under control of the multivibrator 3—76 serves to time the firing of the rack stop thyratrons 3—77 in response to signals originating at the accumulator-adder 3—59 when accompanied by the read-out (PR) instruction.

All arithmetic operations are under control of circuits within the arithmetic control unit 2—60 or the general control unit 2—70, and all data transfers through the input-output circuits 2—62 and address selector unit 2—64 make use of the accumulator loop 2—54, which comprises a regeneratively controlled data track upon the rotating storage device. The arithmetic operations are scheduled by a program set up on the pinboard 46. Each program sequence may be automatically scanned step by step with the program control circuits 2—68. The arithmetic control unit 2—60 and B register 2—52 are used primarily for multiplication and division operations, and the general control circuits 2—70 are used to schedule each of the several operations for which the computer is designed. The general control circuits operate from a scheduled selection of eight different computer states set up by the state selector unit 2—72.

The scanner unit 2—74 counts the decimal digits of a numerical word. It is used to enable the keyboard-set digit to be read into the accumulator synchronously, and also is used in multiplication and division to choose the proper multiplier and quotient digits respectvely. Thus, the input keyboard-set signal may be statically held until used and, therefore, internal storage registers are unnecessary for the input word.

A more detailed block diagram organization of the computer is shown in FIGS. 3*a* and 3*b*. The heavy lines of FIG. 3*a* indicate information processing paths, whereas the lighter lines indicate control signal paths. As with FIG. 2, each of the block units of FIG. 3 will hereinafter be described in detail and will be identified in different figures where feasible with similar reference characters. The computer described in FIG. 3 has functional block units assembled in a computer circuit typifying the details of a typical model of a computer constructed in accordance with the invention. Thus, it is readily seen that the typical details described in connection with some of the block units may readily be modified by those skilled in the art without departing from the invention disclosed and claimed herein. Certain such specific departures such as the amount of storage and number of instructions available in different computer models will be later described. The block diagram is discussed hereinafter in two separate phases, e.g., *Data Processing* and *Control Circuits* to simplify the presentation.

*Data Processing*

In the rotating magnetic memory unit 3—51, each data word has twelve decimal digits plus sign and is stored in serial form so that the sign is read first and then the least significant digit, etc., as shown in FIG. 19 which illustrates the B register. Each digit is stored in pulse-count form with 10 memory bit cells allocated for each digit. The tenth spacer cell located between two successive digits is not used for bit storage since the digits from zero through nine need only nine of the ten available bits.

A typical rotating memory device is the magnetic drum 51, which is diagrammatically shown with associated memory tracks in FIG. 4. This magnetic drum, when rotated at about 3600 r.p.m. requires only about seventeen milliseconds for each revolution. Thus, the reading time for one of the ten words stored in equidistant peripheral arcs or sectors around each track is about one and seven tenths millisecond.

The data memory comprises ten drum memory tracks each storing ten words for a total of one hundred word memory. Each track is given an address comprising a tens decimal digit ($10^1$) and each word sector is given an address comprising a units decimal digit ($10^0$) so that the entire one hundred word memory address may be signified by a decimal number from zero to ninety-nine. Each data track has a separate magnetic read-write head which is selected by the head switching circuits 3—53 under control of a programmed address track selector digit. The recorded drum information, which is read, is then passed on to the read and write circuits 3—55 for amplification and processing. Likewise, computer information to be written on the memory tracks is passed through the read and write circuits 3—55.

The drum, in addition to the memory tracks, is provided with two working register tracks. The B register track 2—52 has one word repeated ten times for use as the multiplicand or divisor in the multiplication and divisional operations. Thus, each multiplicand or divisor word has a maximum access time of about one and seven tenths milliseconds, and reading from the drum may start at the closest word position. The A register track 3—57 is a circulating one word track, which also provides a maximum access time of about one and seven tenths milliseconds from the start of the word. That is, that any desired digit in the A register track will be available to be read out within one and seven tenths milliseconds after any instant in time. This track 3—57 is connected in the accumulator loop 2—54 to serve as an accumulator register.

Three separate timing tracks are provided in the timing track sections 3—78, for the bit, digit, word and rotation timing pulses. There are 1300 bit timing pulses on the basic track thus serving to produce approximately a 78 kilocycle basic computer operating frequency. The 1300 pulses on this basic track provide for ten words of twelve decimal digits plus sign in the pulse-count notation. The WBC track produces ten word pulses and one each B and C rotation pulses, which are distinguished in the manner shown in the timing chart explained hereinafter in connection with FIGS. 10 and 11. The DE timing track provides 130 digit pulse pairs for each drum rotation. The timing signals are passed from the timing track section 3—78 through the read and write circuits 3—55 to the timing circuits 3—56 which are used to synchronize operations by gating signals at local circuit positions throughout the computer.

For transfer of data between the rotating memory 3—51 and other computer units all data is processed through the read and write circuits 3—55 and the accumulator-adder 3—59. The accumulator-adder loop principally comprises a serial pulse-counter adder circuit, which is coupled in a loop circuit with the A register memory track 3—57 through the shifting circuits 3—61 and writing section 3—63. Data may also be transferred between the memory unit 3—51 and the keyboard and printer 3—45 by way of the accumulator-adder 3—59 and writing section 3—63.

The keyboard and printer 45, as shown in perspective in FIG. 5, may be formed from a standard business machine of the type described in the U.S. Patent No. 2,629,549, issued February 24, 1953, to T. M. Butler for "Automatic Function Control Mechanism for Accounting Machines." This machine provides a selectable printing format control from a semi-ganged high speed printer by means of a mechanically programmed control tray in the machine. This feature is described in the U.S. Patent No. 2,635,732, issued April 21, 1953, to T. M. Butler for "Carriage Moving and Positioning Means for Accounting Machines." Thus, a printed page may be produced directly from the electronic computer circuits in any desired type of format. Each printed output word may have twelve decimal digits plus sign and the keyboard 5—101 may have eleven input digits. The read-out conversion from the business machine keyboard to an electronic circuit is accomplished by read-out switches 3—65. The read-in section 3—67 transfers data from electronic computer circuits to the printer by means of solenoids 3—69 which serve to stop the business machine printing racks in a desired position in the manner described in the U.S. Patent No. 2,822,752, issued February 11, 1958, to R. S. Bradshaw et al. for "Differential Type Setting and Resetting Means." Since the business machine operates on its own internal read-out and print cycle which is asynchronous with the operation of the rotating magnetic memory in the computer, the control cam and tappet solenoid section 3—71 is provided for remote control of the keyboard and printer operations with the function thyratron circuits 3—80 and the state counter 3—82 shown in FIG. 3*b*. This control section 3—71 is described in the U.S. Patent No. 2,836,355, issued May 27, 1958, to O. W. Banik et al. for "Remote Function Control System."

Data is transferred from the keyboard through readout switches 3—65 and by way of the counter VI input circuits 3—73 and counter VI 3—75 to the accumulator-adder 3—59 and on to the A register 3—57. Conversely, data is transferred from the computer to the printer by reading from the memory into the A register 3—57 and then by way of the writing section 3—63 to the accumulator-adder 3—59 where it sets up control circuits to actuate the rack stop thyratron circuits 3—77 and the rack stop solenoids 3—69.

The business machine keyboard and printer 3—45 is shown in perspective in FIG. 5. The machine has a fast operating semi-ganged printer 5—95 which is set up for actuation from electronic computer signals by rack stop solenoids 3—69 in the manner hereinafter described in connection with FIGS. 30*a* and 30*b*. By means of a carriage control unit 5—97 a choice of mechanically programmed formats may be selected as described in the above-mentioned U.S. Patents No. 2,629,549 and No. 2,635,732. The carriage control unit 5—97 forms no part of the present invention.

The eleven column full-keyboard 5—101 serves to directly index decimal input data for the computer without special intermediate coded documents or buffer memory devices. This input data is converted to electrical signals for the computer by means of read-out switches 3—65 described hereinafter in detail in connection with FIGS. 30*d*–30*f* and 44. With the series of four separate motor bars in the keyboard column 5—103, the carriage tabulation, spacing and printing may be made to follow a programmed pattern and permit printing of specified results in a predetermined columnar position of the record page 5—99. These motor bar initiated functions may be accomplished automatically from the computer by means of function control thyratrons shown in FIG. 31*a* as will be explained hereinafter. Further sets of control keys in keyboard sections 5—105 and 5—107, provided in the standard keyboard printer 45 may be used, if desired, for other input data to the computer such as a negative sign for data inputs.

All of the data processing units and paths hereinbefore described may be placed under control of the automatic pinboard, FIG. 6, or manual control panel, FIG. 7, to initiate computer data processing instructions comprising "operation level," "*a*"-level and "*b*"-level for the respective pinboard sections 81, 87 and 89 of FIG. 6 as follows:

| | | | |
|---|---|---|---|
| + | *a* | *b* | Add the contents of the memory location *a b* to the contents of the accumulltor. |
| − | *a* | *b* | Subtract the contents of the memory location *a b* from the contents of the accumulator. |
| × | *a* | *b* | Multiply the contents of the B register by the contents of the memory location *a b* and place the answer in the accumulator. |
| ÷ | *a* | *b* | Divide the contents of the accumulator by the contents of the B register, store the answer in the memory location *a b* and leave the remainder in the accumulator. |
| R | *a* | *b* | Read the contents of the memory location *a b* into the accumulator. |
| W | *a* | *b* | Write the contents of the accumulator into the memory location *a b*. |
| ← | | *b* | Shift the contents of the accumulator left *b* places ($0 \leq b \leq 9$), with a shift of ten places if *b* is zero. |
| → | | *b* | Shift the contents of the accumulator right *b* places ($0 \leq b \leq 9$), with a shift of ten places if *b* is zero. |

| | | | |
|---|---|---|---|
| B | | | Transfer the contents of the accumulator into the B register. |
| K | | | Transfer the contents of the keyboard into the accumulator when a motor bar is depressed. |
| 1<br>2<br>3<br>4 | | | Print the contents of the accumulator, using the designated motor bar. |
| 1<br>2<br>3<br>4 | N<br>N<br>N<br>N | | Position the carriage of the keyboard-printer (as in a print operation) as directed by the designated motor bar, but suppress the printing hammers. |
| 1<br>2<br>3<br>4 | | H<br>H<br>H<br>H | Position the carriage of the keyboard-printer, as directed by the designated motor bar, print the contents of the accumulator, and halt the automatic computer operation. |

Other instructions exist which will be described hereinafter but all the above instructions involve processing data through the accumulator loop in the manner described by the block diagram of FIG. 3*a*. A detailed operation schedule of the computer in performing these instructions will be discussed hereinafter.

Each pinboard is constructed to receive an individual pin in any one of 16 rows to indicate the program step. The pinboard details are described and claimed in the U.S. Patent No. 2,922,135, issued January 19, 1960, to George G. Hoberg et al. for "Electrical Pin Board Cross Connection Device." The pinboard layout is shown in the plan view of FIG. 6. Three main groups or sections of columns 81, 87 and 89 are provided respectively for receiving in each of 16 rows a separate pin for designating respectively the computer instruction and the first and second memory address digits *a* and *b*. The latter two sections 87 and 89 are sometimes used for further sub-instructions and for designating pinboard numbers and rows with some instructions. A fourth section of one column 83 is used in connection with the Z columns of sections 87 and 89 for a special Z switch instruction, which is hereinafter described. A pin in this column will establish a "*c*"-level.

*Control Circuits*

The timing circuits 3—56 of FIG. 3*a* are used to reform and gate signals throughout the computer to ensure operation upon the proper data and to maintain synchronism in the computer. The instructions for directing control functions are alternatively selected by the pinboard sections 3—46 or the manual program control section 3—48 as shown in FIGS. 6 and 7, respectively. The pinboard sections 3—46 of different computer models may be constructed with different numbers of automaticaly scanned instructions. The typical pinboard section described in the preferred embodiment of the invention has five similar removable pinboards each having sixteen possible instruction steps thereby providing a total of of eighty automatically scanned instructions.

The number of different instructions provided in the computer may also vary, but the eighteen different single-address data processing instructions of this embodiment shown in section 6—81 of FIG. 6 are typical in a general-purpose computer of this type. Thus, in addition to the fourteen data processing instructions hereinbefore described, the following four control instructions and one halt sub-instruction are provided by the pinboard instruction level operation designated 81 in FIGS. 3*b* and 6. The halt sub-instruction is shown in section 6—89. It will be noted that the "*c*"-level, section 83, of the instruction is only used in conjunction with the Z switch and may be pinned at any one of the columnar positions 0 to 15 to be effective with any instruction that calls for a Z switch operation.

| | | | |
|---|---|---|---|
| U | *a* | *b* | Transfer control unconditionally to pinboard *a* step *b*. |
| C | *a* | *b* | If accumulator contents are negative transfer control to pinboard *a* step *b*; if not, go to next program step. |
| S | *a b* | *c* | Step the Z switch once; if Z steps past *c* ($0 \leqq c \leqq 15$), transfer control to pinboard *a* step *b*. |
| O | | | Home Z switch to zero. |
| → | H | | |
| ← | H | | Halt the computer. |

Additional sub-instructions X and Y are provided in the pinboard sections 6—87 and 6—89 which transfer control to the manual switches 3—115 and 3—117 and permit manual choice of the designated memory location. This transfer to manual control is accomplished simply by plugging the X and Y pinboard columns in sections 87 and 89 of FIG. 6, and setting the desired address memory location in manual switches 115 and 117 of FIG. 7. Thus, when X is pinned in section 87 of FIG. 6 rather than a decimal number for the "*a*"-level, the computer selects the memory location manually set by the operator in the X switch 7—115. This affords a great increase in programming flexibility.

To enable the operator to follow the computer operation, a series of indicators is provided. Each pinboard and each pinboard step has a designated indicator light. The pinboards and lights are commonly scanned by means of stepping switches, and thus the instruction step in progress is shown on the indicator lamps at all times. A typical display of such lights for one computer model is shown in FIG. 36.

The Z switch operates as an iterative routine counter and comprises four banks of a sixteen position stepping switch, as will be explained in conjunction with FIGS. 35*a*–35*d*. By means of the Z switch pinboard section 3–83, also shown in FIG. 6, the number of desired iterations may be selected. This switch operates as described and claimed in U.S. Patent 2,906,838, issued September 25, 1959 to W. W. Deighton for "Program Scanning Apparatus." The O instruction, section 81 of FIG. 6, homes the Z switch after use so that further iterative counts may be pinned. Since this computer does not permit the passing of instructions through the arithmetic unit for modification and processing, the Z switch is also set up for modifying the address portion of instructions so that the same pinboard step may be used on successive instructions to identify different memory locations. In this manner the automatic program storage capacity is effectively increased beyond the normal pinboard capacity. The Z column in both the second and third pinboard sections 3—87 and 3—89, also shown in FIG. 6, is provided for this operation. If the Z switch is at 3, for example, the operation $+Zb$ will be treated as $+3b$, and the operation $+ZZ$ will be treated as $+33$. Thus, on successive passes through an iteration, the instruction $+aZ$ will add the contents of memory location $aZ$ to the contents of the accumulator, and, on the next following iteration after stepping the Z switch once, the instruction $+aZ$ will add the contents of memory location $a(Z+1)$ to the contents of the accumulator. The Z switch may be used in programming to count the number of iterations and simultaneously modify the address, if desired.

In performing its routines, the Z switch is coupled through the diode control circuit section 3—91 and thence to the transfer control circuit section 3—93 of FIG. 3*a*. In general, the control is performed in logical diode circuits with which flip flop circuits and decade counters are associated. The instructions going into the diode system comprise, in general, ground connections made through the stepping switches of section 3—93 and the pinboards 3—46. The decade counter circuits similar to 3—75 are used to hold data being processed. In the diode circuit section 3—91, the control pulses are gated against timing pulses to thereby produce sampled output signals of exact timing.

In order to maintain complete operator control over the computations, every pinboard instruction (except the section 83 which is necessarily automatic) is duplicated in the manual control panel 3—48. A plan view of a control panel with a display of manual instructions corresponding to those of the manual control panel 48 of FIG. 3*b* is shown in FIG. 7.

With the manual override switch 7—109, control may be transferred from automatic pinboard operation to manual control as desired. The manual control panel 7—48 therefore has alternative manual switches 7—81M, 7—87M, and 7—89M for replacing corresponding pinboard sections to permit a manual choice of instructions and addresses. The mixer circuits 3—90, 3—92 and 3—94 are provided to enable either manual or automatic operation control. At this point of the system other alternative input means such as tape input might be used for directing the machine operation, without departing from the invention disclosed and claimed.

The automatic instructions may be interrupted by programming a halt instruction resulting in an indication at the halt light 7—111 at any operation step wherein operator judgment may then be used to choose the next address or instruction. The instruction procedure at any time may be accomplished on either a single step-by-step basis, or fully automatic sequenced control, by means of the instruction control switch 7—113 which operates through diode control circuits 3—91 to actuate the transfer control circuits 3—93. This feature is desirable for servicing the computer or for computations where operator judgment is required for several successive instructions.

Further manual control over selection of the address is possible with the address modifier X switch 7—115 and Y switch 7—117. When switch 7—109 is set to its manual position, and switch 7—87M is set to X, the "*a*"-level address location associated with the operating instruction is read from the address modifier switch 7—115. Similarly, when switch 7—89M is set to Y, the "*b*"-level address location associated with the operating instruction is read from the address modifier switch 7—117.

The clear push button 7—119 is used to convert the computer operation to its 0 state in which the machine normally idles to await the next instruction. The computations may be initiated by a start switch 7—121 at the beginning of the computer instruction sequence or alternatively at the beginning of any specified pinboard by means of one of the special start switches 7—123, one switch being provided for each pinboard.

When the keyboard instruction K is to be used, the computer halts and lights in addition to the halt light 7—111, the keyboard light 7—79 indicating the computer is ready for a keyboard entry. In addition to excitation of the keyboard light 7—79 a chime may be sounded for aural indication. The operator then may enter a number in the keyboard 5—101 after which the computer is started by actuation of a motor bar 5—103 by the operator. Whenever the capacity of the computer is exceeded, or an error has been made in transferring data between the computer and the keyboard-printer, the alarm light 7—57 is excited.

The computer power switch 7—125 shown on the panel of FIG. 7 starts a power control operating cycle. Before the computer power is applied by the control circuit the wait indicator 7—127 is energized, and conversely the ready light 7—129 shows completion of the power control cycle. The power control system, schematically shown in FIG. 8, starts its operation cycle upon closing of the power switch 8—125. This instantaneously energizes the time delay relay T4. This relay provides its delay of thirty seconds before de-energization, after the power switch 8—125 is opened. Thus, relay K1 is energized immediately by contacts T4*a* to provide power to the magnetic memory motor, ventilating fans in the console, and a low potential tube heater circuit.

Thirty seconds after switch 8—125 is closed the time delay relay T1 is operated, this applying power by way of contacts T1*a* to relay K2 and time delay relay T2. Relay K2 increases the tube heater potential to normal by coupling heater power circuits in parallel, rather than in series as first connected with relay K1. After the thirty second delay produced by relay T2 occurs and contacts T2*a* close, relay K3 applies power to the direct current computer power supplies by way of the closed contact K4*a*. Each of the seven series sensing relay contacts will be closed when corresponding voltages at different critical computer circuits are available. Failure of any of the voltages will cause the relay K3 to drop out and remove the entire direct current supply excitation any time after relay contact K4*a* is opened.

The direct current power supply circuits energized by relay K3 are shown schematically in FIG. 9. These circuits supply all the direct current potentials necessary for operation of the computer tube and diode circuits. The required regulation of the D.C. output voltages is accomplished without power control servo systems. A constant voltage transformer serves to regulate the input to the supply. Regulation of the D.C. output voltages under static conditions is achieved by the use of germanium function diodes which have a low impedance, and the use of low D.C. resistance windings in the transformer and filter inductances. Heavy capacitance filtering provides the required regulation for transient changes in the input voltage and changes in the load currents. The required current carrying capacity is provided by coupling 1N153 germanium junction power diodes in parallel in the high voltage sections and 1N151 diodes in the low voltage sections. Series rectifier diode connections are made in the high voltage sections for reducing the reverse voltage applied to the diodes. In the manner shown in FIG. 9, other additional power supply voltages such as +90 volt and −210 volt power supply sections may be included. Relays similar to K6 to K9 of FIG. 9 are sensitive relays for sensing failures in supply potentials, and have contacts in series with the direct current power supply energizing relay K3 of FIG. 8.

In FIG. 8, after a five second delay produced by relay T3, contacts T3*a* energize the relays K4 and K5. Relay K4 operates to transfer energization from the indicator panel wait light 7—127 to the ready light 7—129. Relay K5 serves to reset the state counter 3—82 to the zero idling state initially by holding off bias on one side of the respective state counter flip flop circuits. Also to eliminate the possibility of thyratrons from firing with immediate application of power, the relay K5 applies plate voltage to the thyratrons. The clear switch 8—119 therefore is coupled in series with the relay K5 to assure that the computer may be sent to the idling state whenever manual control is effected.

In performing arithmetic operations the state counter 3—82, as shown in FIG. 3, is caused to attain different counts to place the computer into special operating states which are described in detail hereinafter. The instructions dictate a controlled sequence of the operating states by medium of the diode control circuits 3—91. When the keyboard-printer unit 3—45 is in use, the control cams section 3—71 is also used to gate presetting of the state counter 3—82 to the desired operating state.

During the printing operation the state control counter 3—82 cooperates with the control cams section 3—71 to set up the rack stop solenoids in section 3—69 preparatory to printing; also the state control counter 3—82 cooperates with the control cams and diode control circuits 3—91 to energize the function control thyratrons 3—80 which in turn set up the function tappet solenoids 3—71 which control the printing of data and sign, and also controls the carriage position. The state counter 3—82 also cooperates with transfer control circuits 3—93 to shift the state counter to its next state. In performing addition with the computer, general control is effected through diode control circuits in unit 3—91 to operate the arithmetic system 3—84, shifting circuits 3—61 and sign control circuit 3—86.

During certain of the arithmetic operations, the scanner 3—74 and partial digit distributor 3—88 are utilized respectively to count the digits of a word and to distinguish the sign digit from the rest of the word, respectively. During keyboard data entry operations the scanner 3—74 may be preset to the starting position, and used to scan the decimal read-out switches 3—65 in the keyboard-printer unit 3—45 to read the keyboard set digits, least significant first, into the accumulator-adder 3—59 as will be explained in conjunction with FIG. 44. During the print-out operation the scanner 3—74 serves to scan the word set up in accumulator-adder 3—59 and serves to operate the rack stop thyratron circuit 3—77 which actuates the rack stop solenoids 3—69 and effectively transfer the word in the accumulator to the mechanical actuators in the keyboard-printer preparatory to printing. The method in which the scanner 3—74 operates during the print operation will be explained in conjunction with FIGS. 34*a*, 34*b* and 44.

*Timing Circuits*

All of the arithmetic operations are timed by means of signals derived from permanently stored timing signals in the memory section 3—78 with circuits located in the read section 3—55 and processed in the timing circuit section 3—56 of FIG. 3*a*. These timing circuits 3—56 are shown in more detail in FIG. 55 and in block diagram form in FIG. 10. The waveforms corresponding to the stored timing signals and the outputs created by the timing circuits 3—56 in FIG. 10 are illustrated in FIG. 11, and detailed schematic circuits are found in FIGS. 12 through 16. The block diagram circuits of FIG. 10 are discussed together with timing pulse characteristics of both the raw recorded pulses and those timing pulses derived therefrom as indicated by the waveforms of FIG. 11.

The basic timing track shown diagrammatically in FIG. 11, has 1300 raw timing pulses T spaced at thirteen microsecond intervals which are used to derive pulses for synchronous operation of the computer at approximate bit frequencies of either 78,000 or 156,000 cycles per second. The raw timing pulses T are used in the basic timing section 10—130 for deriving a series of shaped pulses *t*, *u*, *tvu*, T, U, TvU, and W. The timing and widths of these pulses, together with an indication of the timing of the decimal pulse count notation in the computer system are seen in the waveforms of FIG. 11. From the corresponding letter notation at the output leads of the basic timing section 10—130 each timing signal may be traced back to the basic timing track through the processing circuits, which may be constructed as shown schematically in detail in FIGS. 12 through 16. Thus, as an illustration, the raw basic timing pulses T are fed to input W through the two stage tuned amplifier circuit 12—134 of FIGS. 12*a* and 12*b* to produce a sine wave output signal at terminal C. This terminal C is indicated in FIG. 10 at the output of tuned amplifier 12—134. The block notation of FIG. 12*b* may be compared with that of the basic timing processing circuits 10—130 of FIG. 10 to indicate the manner in which the schematic circuits of FIG. 12*a* are employed. Shaping of the sine wave signal at terminal C of FIG. 10 is performed by overdriving a biased triode amplifier 12—132 in a circuit providing lowered plate potential from the +90 volt supply as shown in FIG. 12*a*. This effectively converts the sine wave output signal of the intermediate tuned amplifier 12—134 of FIG. 10 to a shaped wave at the output terminal Y of FIG. 10 of the overdriven shaping amplifier 12—132, from which is derived in further circuits the one microsecond wide *t* and *u* pulses shown diagrammatically in FIG. 11.

The shaped wave at terminal Y, FIGS. 10, 12*a* and 12*b*, is further processed in the circuits of FIGS. 13*a* and 13*b*. Thus, the pentode amplifier tube 13—136 of FIG. 13*a* serves as a further peaking circuit to produce at the output terminal K the *t'* timing pulse also shown in FIG. 10. The peaking is done in a damped resonant pulse forming circuit 13—138 (FIG. 13*a*).

To form the *u'* timing pulse, an inverter circuit comprising the triode amplifier 13—140 (FIG. 13*a*) is used to produce an input signal at lead 13—142 to a similar peaking circuit 13—136 to produce at the output terminal L, FIGS. 10, 13*a* and 13*b*, the shaped *u'* timing waveform. Thus, by utilizing the reverse half cycle of the available shaped sine wave, the *t* and *u* clock pulses are caused to be interspersed with each other, as shown in FIG. 11.

The *w'* drum writing signal, FIGS. 10, 13*a* and 13*b*, is derived also from the sine wave signal at terminal C. The input, terminal C of FIG. 10, of the overdriven amplifier 12—132 is delayed by means of a suitable phase advancing circuit similar to 14—146 which produces at terminal R a timing pulse which has a leading edge starting one-half of a microsecond before the corresponding *t'* pulses. The damped resonant pulse forming circuit 13—132, FIG. 13*b*, is tuned to produce a one and a half microsecond pulse. The *w'* pulses last for a duration of one and a half microseconds, and are therefore suitable for actuating circuits for writing upon the magnetic drum. In the computer system these wider pulses permit the storage of more energy. The peaker stage 13—136 of FIG. 13*b* further shapes the *w'* waveform to produce output pulses at terminal M.

The further two microsecond wide clock pulses T' and U', FIGS. 10 and 14*b*, are derived in circuits of the type shown in FIGS. 14*a* and 14*b* from the sine wave produced at the input terminal C. A cathode follower circuit 14—144 couples the sine wave signal to two separate processing channels for the respective clock pulses T' and U'. An inverter circuit 14—140 serves to intersperse the U' pulses with the T' pulses by utilizing a different half cycle of the sine wave input signal. By means of the interposed phase advancing circuits 14—146 shown in FIG. 14*b*, the sine wave signal is caused to trigger off the overdriven amplifiers 14—132 of FIG. 14*b* soon enough to cause the T' and U' pulses to be derived one microsecond before the beginning of the *t'* and *u'* pulses, respectively, and the damped resonant pulse forming circuits 14—132, FIG. 14*b*, are tuned to produce pulses of two microseconds duration. The phase advancing circuits 14—146 comprise simply the input R-C coupling circuit to the overdriven amplifiers 14—132 comprising the 220 micro-microfarad capacitor 14—146. The pulses are finally shaped in the peaker circuits 14—136 to produce at the respective output terminals the shaped T' and U' pulses.

*Signal Processing Circuits*

Some of those circuits described in connection with the basic timing processing circuits 10—130 are likewise used for processing the other timing track and data track signals in Sections 10—150, 10—152 and 10—178 of FIG. 10. A differentiating amplifier 15—148 is used in the memory reading stage of the amplifier circuits in reading sections 10—150, 10—152, and 10—178, of the type shown in detail in FIG. 15. Thus, the pentode tube presents a high resistance and the choke 154 has a low inductance so that the output pulses are differentiated as applied to the cascade coupled linear amplifier circuit 15—158. The pulses are then shaped in the overdriven amplifier 12—132 to produce output signals at the terminal J.

These shaped signals are further processed through the pulse amplifier circuit 16—160 as are the signals derived from the basic timing track as indicated in the pulse amplifier circuit portion 10—161. The amplifier circuit of FIG. 16 is shown in universal form so that it may be utilized throughout the computer wherever pulse amplification is necessary. This is particularly true in some of the diode logic circuits. As is well known, after a pulse has passed through several diode logic stages, inherent circuit delays cause the pulse to be spread out and misshaped. Thus, fresh timing of the input signals with an appropriate clock pulse is accomplished by means of the diode "and" circuit 16—163. This "and" circuit is a conventional circuit comprising two diodes which serves as the input circuit for the 6AN5 pulse amplifier tube 16—165 coupled to a source of positive potential and may be supplied with a source of positive input pulses at either one of the two diode cathode input terminals R and S. Thus, both diodes have to be cut off in order to produce a positive output pulse at the control grid of the pulse amplifier tube 16—165. Throughout the following specification and circuit embodiments, gates constructed schematically as those gates 16—163 are shown in the logical form of FIG. 16*a*. Thus, the "and" circuits 163 of FIG.

10 may be of this type. It is to be recognized, of course, that more than two input signals can be afforded by likewise connecting more diodes and input terminals to the resistor 16—164 in the same sense. Thus, the coincidence of all input signal pulses will produce a single output signal pulse.

The coincident pulses are amplified by the tube 16—165 and are coupled to the pulse transformer 16—167. In order to provide standard pulses for use in inhibiting as well as other logic functions throughout the computer, two secondary windings 16—169 and 16—170 are used respectively for producing positive and negative output pulses. All the pulses produced are of an amplitude of about twelve to fourteen volts, since this potential produces the highest back resistance in the crystal diodes used for logic and clamping purposes.

In each of the secondary windings 16—169 and 16—170, a 2 volt differential is provided across the diode circuits in order to produce a threshold for eliminating small transient noise signals. The output signals are respectively clamped at —12 volts and ground potential. Also in order to produce high quality pulses without transient ringing, the resistors 16—171 and 16—172 serve together with the clamping diodes 16—173 and 16—174 connected in series therewith to critically damp the secondary windings for a single half cycle of oscillation. Thus, with the described circuit the input waveforms are accurately re-timed by the input "and" circuit 16—163 and are produced in amplified form by the pulse amplifier circuit 16—160 to produce shaped output pulses at the pulse transformer 16—167.

The various combinations of timing pulses which are necessary at different stages of the computer for proper operation are derived in the "and" circuits of the processing section 10—176 of FIG. 10. Since digital information is handled throughout the computer system, the data tracks derive similar shaped pulses in the "and" circuits 16—163 of the data section 10—178.

Neon tube indicator devices 16—166 of FIG. 16 are used to indicate the presence of pulses at transformer 16—167. A capacitive coupling member 16—168 outside the tube envelope permits pulsating energy to discharge the tube and provide a visual indication useful in servicing throughout the computer system. This device is described and claimed in the copending U.S. application, Serial No. 492,248 for "Neon Lamp Indicator Device" by Robert J. Williams, filed the same date as this application.

The recording of information upon the magnetic drum is in general accomplished with the same magnetic transducer heads as used for writing by means of circuits described in FIGS. 17 through 19. The basic information to be written upon the drum is derived at input logical "and" circuits 17—163 at terminals M, N, T, etc., of FIG. 17*b*, and are timed by means of the *w* drum writing pulses at the input terminal U of the diode "and" circuits 17—163. Thus, a pulse is derived at the output transformer 17—180 of FIG. 17*a* of the preamplifier tube 17—182 which has a duration of one and a half microseconds. This one and a half microsecond pulse from amplifiers 182, in FIG. 17*b*, is applied to the output data writing circuits at terminals F, H, S, etc., for the respective three drum channel groups of FIG. 18 which comprise the B register write circuit, the data multiple channel memory write circuit, and the A register write circuit. Throughout the writing channels, return-to-negative magnetic recording techniques are utilized. Thus, the circuits are designed to separately write digital information in the form of both 1 and 0 digits. Each writing preamplifier 17—182 comprises a half of a 6211 type duo-triode. By means of selected input signals, each half of the duo-triode tube is designated to write only one of the signals 0 or 1 necessary for writing a bit of information on the drum. In this manner, when writing, one half of the triode is conducting each time one of the drum writing pulses *w* occurs. The circuits are designed to operate at a continuous drum writing frequency of 1300 pulses per drum revolution so that a series of either 0 or 1 data signals may be recorded.

The actual drum writing circuits by which the output signals of preamplifiers 17—182 are coupled to the magnetic writing heads are shown in FIG. 18. The drum read-write circuits are shown for the three separate data sections of the magnetic drum. These groups, namely, the multiple channel data memory group, the A register channel and the B register channel each have provisions for reading and writing magnetic information upon the drum. In each of the three data sections similar read and write amplifiers are utilized for writing alternatively 1's and 0's as specified by output signals from the circuits shown in FIG. 17*b*. Each of the writing amplifiers 18—184 comprises a 6216 type pentode tube, which is coupled to one half of a magnetic transducer head winding 18—186. By center tapping the winding 186 of the magnetic head and driving it at opposite ends with separate amplifier tubes, 1 and 0 signals may be written upon the drum alternatively.

The A register circuit comprises a circulating loop for re-entry of information upon the same memory channel or track after suitable modification in the adder and delay circuits. As shown in FIGS. 22 and 28 a separate reading head is spaced a fixed distance of about one computer word from the loop writing head 188 to provide a circulating register or loop. However, in the B register and data memory sections as shown in FIG. 19 for the B register the same magnetic head winding is used both as a reading and writing head. In order to couple the signal to succeeding amplifier circuits from the single magnetic head, a read amplifier transformer 18—190 is coupled with its primary winding in shunt with the magnetic head windings 18—186.

A single head is coupled with each magnetic drum track, with the exception of the A register track which has two heads and is coupled for re-entry of information. Thus, the separated reading and writing heads are provided for the A register loop. In the data memory section there are ten data tracks 0 through 9, each of which may be individually selected so that reading and writing may be accomplished upon only one track at a time. Thus, a single read and write circuit is provided for the entire data memory section. The particular memory track is therefore selected by setting up the switch section 18—192 by means of address selection instructions from either the hereinbefore described pinboard 3—46 or the manual control panel 3—48. The selected instructions, for example, may operate a channel selector relay 18—194 individual to the magnetic head of each track in order to operate the associated single pole-double throw switch contact. Only one switch contact, such as 18—196, is connected at a time, therefore permitting the selection of only one track such as the 0 track shown in the drawing.

In this selection scheme, each memory section reading head 18—188 has its associated winding 18—186 coupled to two opposite buses 18—197 and 18—198 by means of poled unidirectional devices such as the illustrated diodes. A cut-off bias is supplied to these diodes by way of the unselected windings of tracks 1 through 9 which apply to the respective head winding center tap terminals the +195 volts available at the power supply terminal 18—199. This supplies to the unselected diode anodes a potential of about 15 volts negative with respect to the +210 volts available at power supply terminal 18—200 which is coupled to buses 197 and 198 through the winding of the 0 track head selected by switch contact 196. Thus, each of the diodes of the non-selected heads presents maximum reverse impedance so that little current flows therethrough. Accordingly, potentials which are generated in the non-selected windings with signals presented by rotation of the drum are not transferred to buses 197 and 198 where they may be read by the reading amplifier transformer winding 191, nor will conduction of one of the memory write amplifiers 184 cause current to flow in any unselected winding to produce undesired writing upon the drum. However, when the input signals are applied to one of the write amplifiers 184, current is caused to flow from the −90 volt amplifier cathode potential through the respective amplifier tube 184 and the corresponding section of the selected reading winding 186 to the switch contact 196 and back through the 210 volt power supply terminal 200. No current flows through the non-selected windings to +195 volts because of the 15 volt bias, due to the 210 volts on buses 197 and 198, as described above. In this manner, a single read-write amplifier circuit may serve for a plurality of memory data channels in the computer system. This circuit is described and claimed in U.S. Patent 2,932,008 issued April 5, 1960 to George G. Hoberg, for "Matrix System."

In order to read from the plurality of memory channels, the read amplifier primary winding 191 is coupled to a +195 volt power supply terminal 199. This assures a current flow from the +210 volts at the center tap of the selected 0 track head winding 186 through the respective diode circuits and back to the +195 volts at the center tap of the read amplifier transformer primary winding 191. Because of the continuous current flow through this circuit, relatively small signals of several millivolts caused by the motion of the recorded magnetic drum signals with respect to the magnetic heads 188, will produce in read transformer 190 signals capable of operating the read amplifier circuits of FIG. 15, which are shown also in the logical reading circuits 178 of FIG. 10.

The organization of the B register circuits is shown in the logical diagram of FIG. 19. In general, the B register is used during multiplication and division for storing either the multiplicand or divisor word. The word enters the B register from the accumulator and is recorded 10 times around the B register track so that access may be accomplished within one-tenth of the drum rotation. A typical word, as stored upon each drum sector, is indicated by the waveform 19—202. This waveform typifies the words stored and used throughout the computer. As the drum rotates, the first decimal digit DP0, which represents the sign, is presented in each sector. The sign is represented by nine "1" pulses for negative sign and nine "0" pulses for a positive sign.

Between each digit space, which contains zero to nine recorded bits, is a guard cell so that ten complete recording bit spaces are used for each decimal number. Next in succession after the sign digit DP0 is the least significant digit DP1 of the recorded word, which in this illustrative case is a two and is represented therefore by two "1" pulses in the pulse count notation used throughout the system. Each decimal digit is then read in succession until the most significant digit DP12 is reached. For all computations the decimal point is fixed between the most significant digit DP12 and the next most significant digit DP11. Thus, in the B register track of the drum, the same word would be written in all ten sectors and therefore would be available at the reading head 19—188 with a maximum access time of approximately 1.7 milliseconds for a drum revolution of 3600 r.p.m.

Signals to and from the transducing head 19—188 are processed in the read-write circuit section 19—204 in the manner hereinbefore described. Since the information is read out of the B register at T time, a suitable delay means (not shown) is interposed to delay the information 6.5 microseconds to make it available at U time. Separate output signals go to the accumulator register from the B register for both "0" and "1" recorded information, as indicated by the notation BR–0 and BR–1. Since the B register is read only during multiplication or division, the "or" circuit 19—205 produces signals derived from the computer instructions for actuating the output gating circuits 19—206 and 19—207 as will be explained in conjunction with FIG. 28. This "or" circuit is constructed similar to that shown in FIG. 19*a*, as are similar "or" circuits throughout the computer. Thus, by means of a positive pulse at any one or more of the diode anodes of FIG. 19*a*, the potential at the output terminal is raised due to conduction through the load resistor to the ground terminal. As shown in FIG. 19, the coincidence of either the multiply or the divide instructions with information BR–1 or BR–0 from the B register and clock pulses ~DE.U which occur at each U time except the sign time U0, produces corresponding output signals which are sent to the accumulator as will be explained in conjunction with FIG. 28. Therefore, during the receipt of clock pulses ~DE.U, shown in FIGS. 10 and 11, any recorded B register information, excepting signs, is read out through gates 19—206 and 19—207 into the accumulator in response to a multiply or divide signal received at the input "or" circuit 19—205.

In order to write upon the B register, FIG. 19, separate circuits of the type hereinbefore described are supplied for writing both the "1" and "0" bits. The input information which appears at 19—204 is taken from the accumulator loop or A register, FIG. 28, as designated by the input notation AR–1 and AR–0. In the partial digit distributor 3—88, FIG. 3*b*, is a flip flop circuit DD1 shown in FIG. 21, which is used for distinguishing between the time of occurrence of the sign digit DT0 and numerical digits DT1 through DT12. Thus, the DD1 input signal is used to gate input digits from the A register at the input write gating circuits 19—208 and 19—209. The sign is separately processed and stored in a sign control flip flop 3—86, FIG. 3*a*, which is designated AD1 as shown in FIG. 27. Therefore, the ~DD1 signal is used to gate the DT0 digit containing the respective minus or plus signs of the words to be written at the proper digit time DT0 at the respective write "1" and write "0" input leads to the read-write circuits 19—204.

Information to be written into the B register is always transferred from the A register, the transfer taking place during state 4, as will be more fully explained hereinafter. When the B register instruction is set up in the pinboard by plugging the B column in section 81 of FIG. 6, an instruction signal BR conditions the write circuits 19—204. An instruction signal BR designating the B register write operation is necessary at the control gate 19—210 in order to permit writing upon the B register drum track. The computer automatically steps from state 0 to state 1, and reads the B register instruction, as shown in FIG. 47. In coincidence with the B register control instruction BR, the computer must be in state 4 in order to permit writing upon the drum, as seen in FIG. 19. State 4 starts with the B timing pulse, shown in FIGS. 10 and 11. In order to arrive at state 4 from state 1 the coincidence of a B timing pulse with a state 1 condition and a B register instruction BR at the state control gate 19—211 is used to change the control to state 4. The next B pulse after the end of the full revolution which permits the entire word in the accumulator to be written upon the B drum, utilizes a further state control gate 212 to change the computer state to the 0 idling state. Accordingly, state 4 both starts and ends with successive B pulses. The word is written entirely around the B register, and is retained in the accumulator for further use. In this manner information processed in the accumulator loop may be entered upon the B register for use in connection with the multiplication and division computations.

In general, the control of the different computer states is selected by means of three flip flop circuits shown by the block diagram of FIG. 20. The flip flop circuits are designated respectively CN1, CN2 and CN3 and may be constructed in the general manner shown schematically in the hereinafter described circuits of FIG. 25. By presetting the three flip flops, hereinafter called the "state counter," any one of eight computer operating states may be selected. The conventional diode matrix decorder circuit 20—214 is used to separate the eight output signals which are coupled to the respective pulse amplifiers 160.

The matrix circuit 20—214 has a plurality of output rows, each coupled to a suitable power terminal by a resistor 20—215 as shown typically for the row 000 for state 0. Thus, output signals are produced at each row only upon the coincidence of signals at all of the diode connections to the columns as schematically shown in the matrix by means of circles. Output signals from each output lead may be taken directly for use without pulse amplification by means of a lead 20—216 where desired. Thus, the hereinbefore described state control gate 19—211 in FIG. 19 will serve to establish state 4, during state 1 of the B register operation, by resetting the flip flop CN1 and setting flip flop CN3 to establish an 001 condition. In operation of the state counter, as will be shown later in more detailed diode control circuits in FIGS. 50–53, only the necessary changes in the flip flop conditions will be made to change from one state to another. Thus, if the computer was changed from state 1 to state 4 the only changes in the state selector flip flops would be the setting of flip flop CN3 to its "1" condition, and resetting the flip flop CN1 to its "0" condition. Likewise, the state control gate 19—212 in FIG. 19, in returning the computer from state 4 to state 0, would serve only to reset flip flop CN3 to its 0 state.

Construction of the partial digital distributor 3—88, which generates pulses DD1 and ~DD1, as described in connection with FIG. 19, is indicated in FIG. 21. The first of the two flip flop circuits DD1 and DD2 is utilized in order to distinguish between the sign digit time DT0 of each decimal word and the remaining numerical digit times DT1 through DT12. The output signal of flip flop DD1 is used to provide this information both in the positive sense DD1 and negative sense ~DD1. This flip flop circuit DD1 is reset by each word pulse W and is set by the first digit pulse D after the W pulse in combination with a ~DD1 signal showing that the flip flop circuit is in its reset condition, as controlled by gate 21—217.

For further machine processing which will be described hereinafter, the partial digit distributor also produces an output signal which occurs during the least significant digit time DT1 and the sign time DT0 as accomplished by the flip flop circuit DD2 of FIG. 21. Similarly, this flip flop circuit is reset with the word clock pulse W. A control gate 21—218 is used for setting the flip flop when it is in its reset condition ~DD2. Thus, in response to a digit timing pulse D arriving when both the DD1 and ~DD2 signals are available, the flip flop circuit DD2 is set so as to be in the reset condition only for the periods DT0 and DT1 of two digit pulses D arriving immediately after the word pulse W.

The accumulator-adder 3—59 together with the shifting circuit 3—61 are shown in logical form in FIG. 22 to indicate the manner of circulation and modification of information picked up at the reading head 22—219 and rewritten by the writing head 22—220. Each word, as stored in the entire accumulator loop, has 12 decimal digits plus an unused sign digit space, one of which is stored in delay 23—222 for normal no-shift operation, and twelve of which are found recorded on the drum surface located between the read and write heads 219 and 220. The storage of one digit in delay 23—222 permits precession of information about the accumulator loop by direct coupling, in order to provide the shift right operation, bypassing the one digit delay. An additional delay of one digit is incorporated in an alternate circuit path for obtaining shift left sequencing. The result of this latter operation is indicated by the comparison of the two words located between the read heads at the starting and termination of one period of left shift. Thus, the normal accumulator circulation path is from the read head 22—219 through the normal one digit delay circuit 23—222 through the no-shift path and back to the write head 22—220 as controlled by a no-shift input instruction through the "or" circuit 22—273.

The no-shift signal is derived from computer circuit logic in response to various input conditions at the "or" circuit 48—273, shown in FIG. 48. For example, in FIG. 22, shifting during multiplication is partially done in state 5 with the ~DD2 signal identifying digit times DT0 and DT1 causing the no-shift signal to be excited at the gate 48—274 by way of the mixer circuit 48—276. Thus, coincidence with the further control signal SL*v*SR*v*MU*v*DV at gate 274 is required. Likewise, in multiplication, state 6 causes similar action to take place at gate 48—280 in combination with the DD1 signal, which identifies digit times DT1 through DT12. The control signal at gate 48—274 is derived from multiply (MU), divide (DV), shift left (SL) or shift right (SR) instructions. More detailed disclosure of this circuitry together with the other states which will cause no-shift operation as designated by lead 22—275 is found hereinafter in the detailed logic circuits in FIG. 48 of the diode control circuit section 3—91.

Similar operation in response to the shift left and shift right instructions are derived as shown in FIGS. 22, 28 and 48. The mode of circuit operation may be readily deduced from the signal notation and diode switching circuits shown in FIG. 22 and FIG. 48. In general, throughout the specification in order to simplify the presentation, where the notation and diode logic circuits are clearly disclosed in the drawing, a detailed description of every electrical circuit element is not presented. Logical circuits are described wherever necessary to explain the circuit operation or to enable a similar analysis of other related logical circuits. It is clear, however, that in the present state of the art, logical circuit diagrams presented herewith are sufficient to explain the operation of the invention described and claimed herein.

As hereinbefore explained and shown in the waveforms of FIG. 11, the drum writing pulses *w* are formed with a leading edge occurring before that of the corresponding clock pulses *t*. This serves the purpose in the shift control circuits of FIG. 22 of making the regenerative drum loop head spacing and circuit delay configuration less critical. Because the data recirculates, even a very small change in delay between the three optional circuit loops will cause enough precession to be built up to cause erroneous circuit operation unless the signals are accurately retimed. Thus, the longer drum writing pulses cause the reading head 219 to produce a wide enough signal to be gated precisely at the desired time so that if the heads are accurately spaced, small variations of delay in the three circuits in either direction will be corrected by the retiming action By causing the leading edge of the *w* pulses to occur prior to the timing pulses *t*, the delay variation tolerance in the shift paths may occur in either direction so that the operation of the regenerative shift control circuits is made reliable without the necessity for strict custom adjustments of delay lines in the respective circuit paths.

The delay circuits of FIG. 22 are shown in more detailed block diagram form in the embodiment of FIG. 23 which will be explained hereinafter. The delay is obtained in binary counters of the type illustrated in block diagram form in FIG. 24 and which are used throughout the computer. This counter provides a decimal count, with output signals available at terminal L indicated for each count of nine input pulses at terminal T. The input counts at terminal T are always clocked by clock trigger pulses at terminal S. The count is made by means of interconnecting the four flip flop circuits as shown diagrammatically in FIG. 24. The last stage of the counter shown in FIG. 24 is constructed similar to the stage shown in FIG. 26*a*. This circuit is generally described in the U.S. Patent No. 2,824,961 issued February 25, 1958, to J. O. Paivinen for "Decade Counter for Producing an Output at the Count of Nine." In this circuit a complete decimal digit of any magnitude may be stored by presetting the counter to the complement of the digit to be stored so that an output signal at the terminal L will be produced at the proper digit count to identify the stored digit. Since this same basic counter is used in the several different counting circuits of the computer, it is shown in its most general form in FIG. 24 and therefore is provided with four preset terminals N, F, D and B, as well as with a clear terminal H. In the normal cleared or "0" state caused either by a clear signal at terminal H or by the counter reaching a count of 10, each of the four flip flops is put in the reset condition. In order to preset the cleared counter at any desired count, the respective flip flop circuits may be set by signals at the appropriate preset terminals N, F, D and B in any one of its possible counts.

In performing the counting operation, input signals are available at the complement terminals C (FIGS. 24 and 25) of the respective flip flop circuits. Thus, the state of the flip-flop is changed by a signal at the complement terminal C regardless of the previous condition. Input count signals at terminal T are gated by means of the clock pulses at terminal S in the gate circuit 24—283. Thus, the first count signal arriving after the counter is cleared produces at the first counter stage a signal which will transfer that stage from reset to set condition. Since the other three stages are in the reset condition at the arrival of the first count pulse, the signal at the output gate 24—289 as seen at the lead 24—277 is not passed to the nines count output terminal L. The nines count output is generated at terminal L by a pulse amplifier circuit of the type shown in FIG. 16 in the manner shown in FIG. 26*a*, so that negated output signals are produced at the terminal Z, FIG. 26*a*, as well as the normal nines count signals at terminal L. The input to the pulse amplifier is derived from the output of gate 24—289. As shown in FIG. 26*a*, the inputs to gate 24—289 are from the fourth stage and from the first stage of the counter. The B and H input of FIG. 26*a* are the set and reset terminals of the last stage flip-flop of the FIG. 24 counter. The negated output signals are used to inhibit the gate 24—279 which allows the counter to be cleared at the count of ten.

The output flip flop is designed basically as shown in FIG. 26*a* and is described and claimed in the U.S. Patent No. 2,842,662 issued July 8, 1958 to R. J. Williams for "Flip Flop Circuit." At the pulse transformer 26—167 both the nines count output signal, terminal L, and the output signal ~9, terminal Z, are obtained.

In general, the delay circuit 24—285 of FIG. 26*a* prevents the transmission of the output signal from the gate 24—289 until after the expiration of the input pulse which causes the switching of the first flip flop to the set condition. Accordingly, the nines output of gate 24—289 does not coincide with the ninth input pulse and therefore does not permit the premature operation of gates 24—279 and 24—282. The pulse amplifier output signal may be connected back into the counter circuit at terminals L and Z. The L and Z terminals of FIG. 26*a* are the same as L and Z of FIG. 24.

In FIG. 24 the flip flop output signal at the output lead 24—286 of the first stage will cause switching of the second flip flop stage unless the ~9 inhibit signal at terminal Z changes from positive to negative (as occurs at the count of nine). Thus, the transfer path of a switching signal to the second flip flop circuit includes the inhibit gate 279. The second flip flop circuit will cause a binary count with its reset output signal complementing the third flip flop circuit which is likewise connected in cascade circuit with the fourth flip flop circuit. Thus, a normal binary count is effected in the four stages in the presence of pulse ~9 so that the fourth flip flop circuit is set with the receipt of the eight input pulse, but an output signal will not be provided at the count of eight at terminal L because of gate 24—289 where the lead 277 from the first flip flop circuit will not be permissive. When the ninth input counting pulse is received, however, the first flip flop circuit will be switched to its set condition to produce the required signal at lead 277 without upsetting the fourth flip flop state and provides the 9 output signal at terminal L. Because of the absence of ~9 for a count of nine at inhibit gate circuit 279, the binary count of the second state is interrupted for the next (or tenth) input count, when the first stage is reset. Since the second and third flip flop circuits are in the reset state at this time, the tenth pulse arriving at the input terminal of the fourth stage by way of reset lead 24—287 will serve to reset stage four as well as stage one thus returning the entire counter to its cleared condition, and enabling it to perform a further decimal count. Thus, the counting action progresses as shown in the following chart:

| | | | |
|---|---|---|---|
| Reset | 0 0 0 0 | 6 | 0 1 1 0 |
| 1 | 1 0 0 0 | 7 | 1 1 1 0 |
| 2 | 0 1 0 0 | 8 | 0 0 0 1 |
| 3 | 1 1 0 0 | 9 | 1 0 0 1 |
| 4 | 0 0 1 0 | 10 | 0 0 0 0 |
| 5 | 1 0 1 0 | | |

In general, each of the first three stages of the binary counter is a circuit such as that shown in FIG. 25 and the fourth stage is a circuit such as that shown in FIG. 26*a*. Note that the output circuit of the flip flop at terminal 286 is coupled to a pulse forming damped inductive circuit 25—284. Thus, no output signal is obtained in either the static set or reset condition of the first three flip flop stages, but is obtained only when the initial transition current occurs as the flip flop is reset. This permits the direct triggering of the counter circuits with pulse waveforms, and produces output pulses which may be used directly in other system circuits.

Thus, the counter circuits of FIG. 23 are caused to provide a one digit delay by storing ten bit pulses or one decimal digit. Count-in requires one digit time and count-out can only occur during the following digit time. Counters similar to those shown in FIG. 24 may be preset and counted out without the one digit delay as will be explained in conjunction with counter V of FIG. 56 and counter VI of FIGS. 29 and 58. Circuit construction is simplified by performing addition in the accumulator loop with the same basic counters in which the delay is provided for the shifting operation. The alternator flip flop circuit AD4 is provided to cause one counter to be readout as the alternate counter is read-in. In general, all of the flip flop circuits may be constructed as shown in the embodiment of FIG. 25 where direct current output signals may be taken from cathode circuits of both tubes at respective terminals such as 25—277. The resistive cathode circuit 25—281 produces a static indication of the tube condition rather than the pulsed output signal produced at terminal 25—286 by the inductive cathode circuit 25—284.

The output terminals of the alternator AD4 in FIG. 23 are fed back by cross connections to input gating circuits 49—299 and 49—300 which are actuated by coincident digit clock pulses D to thus provide alternate output signals remaining for the duration between consecutive D pulses, as designated at the two output leads AD4 and ~AD4. These signals are used to turn to count in alternate decimal digits at the respective counters I and II, and conversely to enable the counting out of one counter while counting in is taking place at the other counter. More detailed circuit conditions are shown in the diode control circuit section, FIG. 49, where similar reference characters 295—302 are shown to facilitate comparison. In like manner, other logic circuits may be traced through the diode control circuit sections.

The counter circuits of FIG. 23, in order to afford the digit delay interval used in the accumulator loop, are constructed for a count-in of the decimal digit during one digit time and a count-out at the succeeding digit time.

Therefore, separate input gates 49—296 and 49—315 or 49—298 and 49—316 are respectively provided for count-in and count-out operation for the corresponding counters II or I. The input gates 49—296 and 49—298 of counters II and I are connected to the alternator terminals AD4 and ~AD4 respectively. Every other digit of each input word which enters the accumulator must be processed through either the upper or lower counting chain, and the digits are thereafter recombined at the output circuits. The same alternation program is effected at the respective counters III and IV. As before shown in connection with FIG. 22, the cascade connection through two delay circuits 23—222 and 23—221 is utilized only in order to produce left shift operation, whereas the presentation of output signals after a single decimal digit delay permits no-shift operation. It may be seen with the circuit of FIG. 23 that the shift delay is available in such form that it simplifies the addition process. In performing addition, provision is made for counting alternate digits into the separate counter circuits I and II in the manner hereinafter described in connection with FIG. 27. Digit position DP0 in memory contains the sign digit, but in the accumulator loop of FIG. 22 DP0 is left blank and the sign is stored in a flip flop circuit AD1, and is handled separately in the sign comparator circuit 86, FIG. 27, during addition.

The adder circuit of FIG. 27 is broken up in four sections; 290, 291, 292 and 86 respectively denoting the count-in circuits, count-out circuits, carry and sign comparison circuits. The add instruction AD serves to algebraically add the contents of a specified memory location to the contents of the accumulator, by means of the adder input lead, FIG. 27, and thereafter leaves the sum in the accumulator. Addition is performed serially by counting bits from two digit sources into a single adder counter (counter I or II) one bit at a time, and holding any carry signal for addition with the succeeding digit. Digits from the accumulator track are counted in at T time and those coming from the memory or B register are counted in at U time, via a 6.5 microsecond delay, so that the digit bits may be interspersed or staggered in time relationship. Thus, the counting rate is 156,000 cycles per second or twice the normal bit presentation rate throughout other computer circuits. Digits which are counted into counter I and II are counted out during the following digit time. To count out of the counter, nine T pulses (~DE.T) are applied to the count input terminal at gates 49—316 and 49—315 of counters I and II. These pulses continue to advance the counter until it reads 9. The rest of the nine T pulses are then gated through gates 49—308 and 49—307 to form the output digit. Counters I and II are always advanced to the count of 9 by 9 T pulses (~DE.T) and, when the alternator AD4 is shifted by the next following D pulse, one more pulse will enter one of the counters from gate 299 or 300, which will count it to the count of 10, leaving it in the clear condition. When counter I reaches the count of 9, it conditions one of the gate inputs to gate 49—318 and upon the arrival of the 10th adder input pulse from 49—298, carry flip flop AD3 is set. The carry signal is held in flip flop AD3 for presentation with the next succeeding decimal digit at E time through gate 49—303. As an example of the operation of the adder counters, consider first that the alternator AD4 is set to AD4 for digit time DT1. The two digits to be added are a 4 and a 7. If the 7 is from the accumulator track, it is counted into the adder input, FIG. 27, by seven pulses during seven successive T times, and the 4 is counted into the adder input from the memory during four successive U times interspersed with the T times. Since alternator AD4 is set at AD4, counter II will receive the eleven input pulses through gate 49—296, leaving counter II containing a count of "1." As counter II passes through 9, it conditions one of the input gates to the buffer 49—318 so that the 10th count reaching counter II will also set the carry flip flop AD3. During the next following digit time starting with a D pulse at alternator AD4, ~AD4 activates gate 49—309 and the nine T pulses (~DE.T) are applied to gate 49—315 and count through the buffer 49—295 to count counter II up to the 9 condition. When counter II reaches 9, the input II≠9 inhibits gate 49—315, leaving counter II at the count of 9, and counter II=9 activates gate 49—308, allowing the remaining T pulses, which, in this case would be the last T pulse of the nine count, to arrive at gate 49—306 and appear as an output adder–1. The first D pulse arriving after the ~AD4 sets the alternator AD4 and simultaneously clears counter II by applying the 10th count to counter II at the end of the ~AD4 condition, as shown at gate 49—300 During the AD4 condition, the 10th count to counter II had previously set the AD3 carry flip flop and the D pulse which caused the ~AD4 condition which is followed by an E pulse As seen at gate 49—303 of FIG. 27, this E pulse during state 4 causes a single carry pulse to arrive as an input to both gates 49—296 and 49—298. Since the alternator is now in the ~AD4 condition the carry arrives at gates 49—298, 49—297 and is transmitted into counter I as a carry. Since the E pulse that triggered the carry occurred before the first possible T pulse or U pulse at the adder input, a count of one in the next higher order digit is preset prior to the count-in operation for that digit.

The add instruction AD or subtract instruction SB is necessary to cause the contents of a specified memory location to be added to the accumulator loop as shown in FIG. 28. Various conditions for providing an adder input signal from the drum or keyboard are shown in the accumulator input circuits of FIGS. 28, 48 and 49. During the addition cycle, the track selection is made during state 1, and the sector address is found during state 2. The actual addition takes place during state 4. By means of the hereinbefore described partial digit distributor circuit 3—88 of FIG. 21, the sign of the memory word is read into the flip flop circuit AD2 during digit time DT0 by gating ~DD1 with state 4 and MEM—1, the sign of memory as shown in FIG. 42. The flip flop circuit AD1 already has been conditioned with the sign of the accumulator contents. After the complete sign digit from memory is read-in, and at the tenth bit time of DT0, complement control flip flop circuit AD2 is set by a D pulse if the signs are opposite and reset if the signs are the same as shown in FIGS. 27 and 42. Whenever the signs are opposite, the numerical portion of the word from memory is complemented by sending memory "0's" to the adder instead of memory "1's," as shown in FIG. 28. This produces a 9's complement which is changed to a 10's complement by sending a pre-carry bit E pulse into the adder during the tenth bit time of DT0, as schematically indicated at the input circuit of the adder 27—290, FIGS. 27 and 28.

During digit times DT1 to DT12 the bits from the accumulator tracks enter the adder input circuit at T time and the bits from the memory enter at U time as indicated respectively by the gates 48—338 and 48—343, FIGS. 28 and 48. A carry is stored in the flip flop circuit AD3 and is sent to the adder between digits at E time so that it will be added to the next digit. At W time, after addition, flip flop circuits AD2 and AD3 are inspected by signals as shown in the circuits of FIGS. 38 and 50. AD3 indicates an overflow of the MSD, and ~AD2 indicates unlike signs. If the signs are the same and there is no carry for a normal operation, which is the case with AD2 and AD3 reset, the sum is in absolute value form and the sign of the sum is correct in AD1. In this case the state selector goes to state 0 to wait for the next instruction indicating that the normal addition is completed. If the signs are opposite and there is a carry, as occurs when AD2 is set and AD3 is set, there has been a proper addition of the complement, and the same situation holds. The state counter goes to 0 as shown in FIG. 50 where CN3 is reset. However, if the signs are opposite and there is no carry, AD2 and AD3 being in the set and reset condition, the sum is in complement form. In this case control changes to state 5, as seen in FIG. 50 where CN1 is set, in which the accumulator is complemented as seen in FIGS. 28 and 48, and provided with a correction precarry signal, as seen in FIGS. 27 and 28. Also the storage state of AD1 is changed in state 5 by a W pulse to give the correct sign as well as the absolute value of the sum, as seen in FIG. 41, after which control goes back to state 0. When the signs are the same and there is a carry, with AD2 reset and AD3 set, the number in the accumulator exceeds the capacity of the register. In this case the alarm thyratron circuit is fired as shown in FIGS. 38 and 50. Also the flip flop circuit CN4 which is hereinafter discussed, is reset to prevent the stepping switch from proceeding to the succeeding instruction and sends the control state to 0. The state 5 complementing operation gates AR–0 through the adder with a precarry which gives the proper 10's complement.

In order to perform the subtract instruction, the operation is entirely identical to the adding operation except that the sign of the word in the memory is complemented as it is sent to the flip flop circuit AD2 during digit time DT0 by gating ~DD1 with state 4 and MEM–0, as shown in FIG. 42.

In FIG. 28 the entire accumulator loop is denoted together with the adder of FIG. 27 and its plurality of input conditions. These input conditions may be traced through the diode logic control circuits, for example, in FIGS. 48 and 49, where cross referenced identification characters are supplied to facilitate tracing of the circuits. Different aspects of this system are illustrated in the hereinbefore described FIGS. 22 through 27.

The manner in which the counter VI is operated in conjunction with either the pinboard or manual control to achieve address selection is shown diagrammatically in FIG. 29. The manner in which the counter VI is operated in conjunction with the keyboard switches to achieve data input from the keyboard is shown diagrammaticaly in FIG. 44. FIG 44 also shows the complementing encoder 29—350 of FIG. 29 as an input to counter VI.

It will be noted that the complementing encoder 29—350 of FIG. 44 presets counter VI to 10's complement of the input, whereas the keyboard switch inputs set counter VI to the desired decimal digit in the 1, 2, 4, 8 binary code.

In order to locate the sector address, counter VI is utilized as an address counter during state 2 or state 7, as shown in FIG. 29. Access to the address sector of the channel or track is accomplished by measuring time from a reference point on the drum. The location of the word is defined as being so many W pulses after the reference point, the reference point being the B pulse recorded on the drum. Counter VI is preset to the 10's complement of the desired sector and counted with W pulses so that the W pulse which arrives after counter VI reaches the count VI=9 will mark in time the desired sector of the channel. This operation is shown diagrammatically in FIG. 29.

The manner in which the encoder 29—350 operates is shown in FIG. 44. The computer, after locating the proper address, must shift to a data transfer state. This can be accomplished by gating the W pulse marking the address with the address state 2 or state 7, and with counter VI=9, and with the instruction which is being performed to shift the state counter, as shown in FIGS. 50 through 53.

Counter VI is used to accomplish three operations, two of which will now be explained. If the word to be operated upon is in the computer and is being transferred to another location in the computer, counter VI operates as an address locating counter. Should data be entering the computer as in a keyboard instruction (KY) or leaving the computer, as in a print-accumulator contents (PR) instruction, counter VI will be utilized as a digit encoder. For example, during keyboard entry instruction (KY) counter VI is cleared during the "0" state, as shown in FIGS. 44 and 58. The state counter goes to state 1 as the first instruction state (as it does for all instructions) where the keyboard printer is unblocked. The state counter then shifts to state 4 where counter VI is again cleared, as shown in FIG. 44, and awaits the KY signal which indicates that data has been entered into the keyboard by the operator. The state counter then goes to state 5. State 5 is the data transfer state in which the data set in the decimal switches is transferred into counter VI, as will be explained later. The scanner of FIG. 34*b* scans the keyboard digits one at a time, setting the binary coded decimal representation of the keyboard decimal entry into counter VI.

As will be explained in conjunction with FIG. 58, the digit set in the counter VI is counted out into the accumulator-adder, as shown in FIGS. 28, 48 and 58. Information counted out of counter VI is counted directly into the accumulator loop and the computer shifts to state 6, shown in FIG. 52. During state 6 the information transferred to the accumulator loop is compared with the information set in the keyboard decimal switches as shown in FIG. 38. Should the information in the accumulator loop differ from that set in the decimal switches the alarm circuits of FIG. 38 will be energized, stopping the computer.

Once keyboard information is set into the accumulator loop, it may be transferred to the magnetic memory by using counter VI as an address counter. Information being transferred from the magnetic memory to the accumulator loop is located in a distinct memory address which is selected by means of the pinboard or manual control. FIG. 29 shows diagrammatically how counter VI is utilized for memory access or address selection. The tens level switch 3—87 of the address selects the channel as explained in conjunction with FIG. 18. The units level of the address sets counter VI to the tens complement of the address as shown at encoder 350 and selector switch 3—89 of FIG. 29. More detailed logical circuits of FIG. 29 are shown in FIG. 44 and will be explained hereinafter.

Address counter VI is provided with four preset input connections to the different counter stages in order to allow for storing the selected memory sector condition as shown in FIG. 29. Counter VI is cleared during state 0 for all instructions. During state 1, the B timing pulse operates "and" circuits 325, FIG. 29, and the unit selector 3—89 serves to set up the 10's complement of the units position into counter VI. Thus, each word pulse W at the input gate circuit 324 counts the counter VI, so that at the count of nine counter VI produces an output to the output gating circuits 326. The next W pulse causes the state selector circuits to go into the read or write states.

As shown in FIG. 44, the keyboard digit may be also set into counter VI during state 5. For this reason counter VI is cleared at the end of state 4, as shown in FIGS. 44 and 58. After the keyboard signal digit is set into counter VI, the digit is then counted out into the accumulator loop. The third function of the address counter VI is to produce "match" signals for actuation of the printer, during the print operation, and will be explained hereinafter.

In FIG. 44, the detailed logic of the counter VI input circuits 3—73 is shown as cross-referenced in the diagrammatic representation of FIG. 29. Thus, for each of the unit levels UL1 through UL9, the complementing encoder matrix 29—350 converts the units level to the 10's complement for input at the respective counter stages. In the "or" circuits 44—327 through 44—330, the corresponding units level indication is converted to the binary preset signal for counter VI. Thus, the state counter will be controlled by address counter VI to perform reading or writing operations with the magnetic drum 3—51 only during the presence of the selected units sector as it occurs during the rotation cycle.

Simplified diagrams of one embodiment of the counter VI input and output circuits and operating conditions are shown in FIGS. 57 and 58. The circuits of FIG. 57 indicate the manner of presetting information into counter VI from either the pinboard, keyboard or an external tape unit. Thus, the address may be set up optionally from the different units in response to control signals in the computer either automatically derived during scanning of the pinboard or other input unit or manually selected by the manual control panel.

In FIG. 58, the connections of counter VI as used for other purposes than address selection are shown with provisions made for addition of information from a tape input unit, and for producing an alarm for the print check operation shown in FIG. 38.

*Keyboard-Printer Input and Output Circuits*

This computer receives data as signals set up by the keyboard-printer mechanism 3—45 without intermediate buffer register storage devices for synchronously converting the keyboard information into computer signals. Synchronizing is accomplished by serially reading out information one digit at a time under control of synchronizing and timing circuits which cause the printer and computer operating cycles to coincide for the different operational steps which must take place at the direction of either the computer or the keyboard printer.

The keyboard-printer shown in FIG. 30*a* serves as the data input and output means. There are two types of instructions in which the keyboard-printer is utilized, the first of these being the keyboard instruction KY in which a data word from the keyboard is transferred from the keyboard into the A register, and the second being the print instruction PR (induced by a motor bar operation 1, 2, 3 or 4) in which a data word from the computer is transferred from the A register into the printer.

During the keyboard instruction, the operator causes the mechanical decimal switches shown in FIG. 30*d*, and more specifically in FIGS. 30*e* and 30*f*, to be set. The computer, under control of the electronic scanner of FIG. 34*a*, then reads the decimal switches, and passes the data through the matrix encoder of FIG. 44 into the counter VI of FIG. 58. The information set into counter VI of FIG. 58 is counted out directly into the accumulator loop as shown in FIG. 28 at gate 48—332. This keyboard input to the adder is so synchronized that each of the digits set into the accumulator loop from the decimal switches is first read into counter I of FIG. 23. Since the digits being read into counter I from the decimal switches can only be counted in during even digit time ~AD4, only the first, third, fifth, etc. digits of the word indicated by the decimal switches are read into the accumulator during one word time. A second word time is required in which the even digits not previously read into the accumulator loop are again scanned by the scanner of FIG. 34*a* and are set into counter I, while the odd digits previously scanned are recirculated through the A register loop and into counter II. The digits counted out of counters I and II then form one complete word, and are recirculated in the A register.

The keyboard instruction KY is performed in three states, 1, 4 and 5. In state 1, the blocked keyboard-printer is unblocked to enable the operator to initiate a keyboard-printer cycle and a precount is sent to the scanner as shown in FIG. 34*b*, which will be explained later. State 4 is a waiting and synchronizing state in which the operator indexes positive or negative data into the keyboard and depresses an appropriate motor bar to initiate a keyboard-printer cycle, causing the information set into the keyboard to be indexed into the mechanical decimal switches shown in FIG. 30*d*. During state 5 the information set into the decimal switches during the keyboard-printer cycle is transferred into the accumulator.

The computer was set into state 5 at the time of a W pulse and ~AD4 which occurs at the beginning of digit time DT0. A digit pulse D occurs simultaneously with the W pulse and sets AD4, as shown in FIG. 23, to produce an AD4 signal during digit time DT0.

While the alternator AD4 of FIG. 23 is set, counter II can accept input pulses, and at digit time DT1, ~AD4 enables counter I to accept input pulses.

The digit scanner of FIG. 34*a* was cleared in state "0" and precounted one count in state 1, FIG. 34*b*, leaving the line scanner digit SD1 high, awaiting the next count to the scanner, which will be the next D pulse marking the end of digit time DT0 and the beginning of DT1.

The decimal switches of FIG. 30*d* through 30*f* are shown diagrammatically in FIG. 44, and during DT0, SD1 is connected to column 1 (the least significant digit), as shown diagrammatically in FIG. 44. For purposes of illustration, the numeral set in column 1 is the keyboard digit 3, indicated by the circle in column 1. The switch setting and the scanner digit SD1 occur as an input to an "and" gate with state 5, the keyboard instruction and AD4 to set a "3" into counter VI in binary code. At the end of digit time DT0, alternator AD4 is reset, FIG. 23, and the scanner is counted to SD2, FIG. 34*b*.

When the scanner digit SD2 is permissive during digit time DT1 the counter VI will not be set because the AD4 gate input is not permissive during even digit times of the first word time. The digit in the third column of the keyboard is entered into counter VI during the next digit time DT2, and so on up to the digit in the eleventh column at digit time DT10.

The scanner of FIG. 34*a* is a modulo 13 counter counted by D pulses as shown in FIG. 34*b*. There are 13 D pulses per word occurring at DT0 to DT12. During even digit time DT0, SD1 was permissive and at even digit time DT12, SD0 will be permissive, which is triggered by an SD13 condition, as seen in FIG. 34*a*. The next following D pulse will occur at the beginning of digit time DT0 of the second word, and will again set the scanner to SD1, but now AD4 will be in its set condition for even digit times, as an even count DT0 follows the preceding even count DT12. Thus during the second word time, the digits in the even columns of the keyboard are entered into the A register.

With reference to FIG. 28, gate 48—332 provides the keyboard input for the odd numbered digits during the first word time and the even numbered digits during the second word time. The gate 48—340 showing the state 5 and keyboard input to gate 48—338 provides the recirculation gated path for the odd numbered digits as they are recirculated during the second word time. It will be understood that this basic operation is gated through a no-shift path. Thereafter, the state counter goes into state 6, at which time the complete word in the A register is recirculated and continuously written around the magnetic drum.

With reference to FIG. 23, the adder inputs from FIG. 28 are counted into the terminals count-in I and count-in II. Information set into the counter VI during AD4 time is counted into counter I during ~AD4 time. The information is then counted out of counter I during AD4 time and is recirculated in the accumulator loop and read into counter II during AD4 time during the next word time.

During the second word time when the recirculating information is being read into counter II the even number digits from the keyboard switches of FIG. 44 are being read into counter I of FIG. 23. It can be seen with reference to FIG. 28 that these two sources of information will completely write into the accumulator loop the word that has been set into the decimal switches.

Also during state 5 the sign of the data word is read into the computer. Had the keyboard minus switch S33 of FIG. 31*c* been depressed, coincidence of the minus sign (—), the keyboard operation signal KY, and the state 5 signal will set flip flop AD1 as shown in FIG. 41. When AD1 is set the sign of the accumulator word is negative as shown in FIG. 27.

After the word from the decimal switches is set into the accumulator, means are provided to shift the computer into state 6 where a comparison operation is performed in which the data in the decimal switches is compared with the data read into the accumulator during the previous state 5. This gives a positive check of the information transferred between the accumulator loop and the decimal switches. This operation will be explained later in conjunction with the print instruction PR.

The keyboard-printer unit, FIG. 30*a*, is provided with an internal operating cycle which causes revolution of a set of timing cams, the operations of which are shown diagrammatically in FIG. 30*c*. By means of these cams, specific positions of the keyboard-printer operating cycle may be designated. The keyboard-printer is controlled by signals received directly from the computer to set up the keyboard-printer for printing data from the computer, as will be described hereinafter. The vertical motion of the printer type assembly 95 of the semi-ganged printer is timed so that the computer can make the proper selection of a type character in the assembly 95. The selected type character is mechanically held in storage during a portion of the cycle for later printing by motion of the type hammers 357.

At the first part of the printer operating cycle, the actuator rack 358 is caused to move longitudinally to the extreme left hand position by means of camming release action. The camming action releases the accumulator bar 358 so that it may move to the left by force of the spring 359 to the forwardmost position. The type assembly 95 in its uppermost position presents a decimal 9 type character for printing. In the accumulator rack position shown in FIG. 30*a*, the type rack is in an intermediate position. The type rack is driven through a pinion gear 360 which is rotated by the mating rack gear 362 which is affixed to the accumulator rack 358. Accordingly, during the forward motion of the actuator rack 358, as provided by the spring 359, the selector teeth 363 are made to scan across the position of the rack stop solenoid or latching relay assembly 365. As will be explained hereinafter electrical signals representative of information in the accumulator loop may release the latching relay at the time when a particular type character is in front of a hammer 357. The accumulator bar 358 will be made to stop its forward motion and be held until the latching relay is thereafter released during the latter portion of the operation cycle. A similar actuator rack 358 and solenoid assembly 365 is provided for each of the twelve type assemblies 5—95, from which decimal digits may be printed out.

As shown schematically in FIG. 30*b*, a latching relay assembly 365 is provided for each type assembly, representing digit positions D1 through D12. The entire output word may be set up in semi-ganged relationship during the printer operation cycle so that the hammers 357 are caused to strike the selected type characters. By this means, therefore, the printer unit itself is caused to provide the necessary storage for the output signals without the use of intermediate buffer storage.

As indicated diagrammatically in FIG. 30*b*, pulse generator switches 31—370 as provided in the printer unit, may be caused to energize successive rows of matrix 368 at the proper time for the latching relays 365 of digits D1 through D12 of a word to set up the type character indicating the selected digit designated 1 through 9 at the respective matrix rows. Before each successive row is energized by inputs at 31—370, the switches of switching matrix 368 are set up by memory gating circuits 32—380 within the computer in each digit position for which a rack solenoid 365 is to be energized at that time.

After the printing has occurred by action of the hammers 357, the latching relays may be reset by mechanical means from the timing cams 367 as illustrated by lead 372. Further timing means such as the digit scanner circuit 369 is utilized in the computer to permit the switching circuits to be set up for only one digit position at a time, during the digit timing periods. The actuator racks 358 move forward together, producing signals from switches 31—370 indicative of the time when the rack stop relay 365 must be energized to set up each given digit. Each of the digits of the word stored in the accumulator is serially examined for a given digit, and the switches in matrix 368 are closed for digit positions in which the given digit has been found. The rack stop relays of all these digit positions are then actuated simultaneously before examination for the next digit begins. This operation will be more fully explained hereinafter. In this manner each of the twelve digit positions is sequentially set up in the electronic computer circuitry and then simultaneously set in the printer. Faster action to set-up the electronic computer circuits is unnecessary as the computer is able to scan each digit position several times between each signal from 31—370. Accordingly, serial operation is provided since the mechanical motion of the printer is slow compared to the electronic circuit action within the computer.

Other machine operations are performed by energizing solenoids under control of electronic computer circuits by means such as shown in FIG. 30*c*. Thus, a machine block solenoid L17, FIG. 30*c* which is tripped by the computer control is used as an interlock to prevent the keyboard-printer from cycling until called for by the computer. It controls a mechanical interposing action. This prevents accidental operation of the keyboard which might enter data into the machine when not called for by the computer, and prevents cycling of the keyboard printer during PR instructions until called for by the computer which would cause printing of a partial result before the scanning and type setting action is complete, which might otherwise occur if some of the manual controls on the keyboard are manipulated during the print operation, etc. The machine block conditions are shown in FIG. 52.

All the devices of FIG. 30*c* are located in the keyboard-printer and are electrically coupled to the computer circuits by means of the diagrammatically shown control plug J3. The actual physical operation of the solenoids may vary from one printer to another, but in general they comprise interposer inserts or mechanical linkages for preventing motion of or applying motion to already existing printer mechanism, as described in the before mentioned U.S. Patent No. 2,836,355.

In operation of the hereinbefore described keyboard-printer, any one of four motor bars may be actuated to control the printer format. Therefore, provision is made by means of solenoids L13 to L16 for actuating automatically each of the motor bars from separate computer signals. Corresponding machine instructions may be programmed in the pinboard for printing by means of any of these motor bars to provide the desired format control. In setting up the format, each of the motor bars will cause the keyboard-printer to complete a cycle of operation, and the separate motor bars may be caused to perform the following specific functions:

(1) The carriage is returned regardless of position.
(2) The carriage is tabulated and returned if in the final tabulator position.
(3) The vertical spacing is caused while the tabulation position remains unchanged.
(4) Operation is dependent upon internal programming and the existing carriage position to cause tabulation to any tabulator position.

Tappet solenoids L18 to L22, FIG. 31*a*, are provided in the keyboard-printer to enable control function operations of the keyboard-printer by electrical computer signals. Solenoid L22 is the non-print (print control) solenoid which is energized to block the print hammers. As every machine cycle initiates a printing cycle, this suppresses printing during the keyboard-printer machine cycle for certain operation when no printed output is desired. For example, as shown in FIGS. 37*a* and 52, the non-print function may be energized when entering data from the keyboard into the computer. Solenoid L21 like solenoids L1 to L12 is labelled "read-in," indicating flow of information from the computer to the keyboard-printer. Solenoid L21 serves the function of releasing the bail holding the clappers of the rack-stop solenoids which allows the clappers to be free to cooperate with signals received from the computer at the rack stop solenoids L1 to L12. L21 is always energized for printing operations. Solenoids L19 and L20 are provided in the keyboard-printer for special control functions and are not shown under the direct control of the presently illustrated computer, but may be connected for computer control, or, as illustrated, may be tripped by electromechanical keyboard-printer controls once the keyboard-printer is cycled by the computer or by manual operation. For example the space form solenoid L19 may be used following a print instruction to perform a space operation of the keyboard-printer which would render a double space on the printed format. Solenoid L20 may be energized to cause the printer to cycle under the control of any of the available manual function control keys 107 shown in FIG. 5 which would render a printed format in several desirable forms. Solenoid L18 is energized by the computer sign control circuits during printing operations to index a minus sign in the symbol print bar.

Sets of control keys 107 also are provided on the keyboard of the keyboard-printer 45 as shown in FIG. 5 which control the function of the keyboard-printer. These control keys and functions are fully disclosed and described in our aforementioned U.S. Patent No. 2,629,549.

The control keys 107 are designed for the basic functions of Total, Sub-total, Non-Add, Subtract, Repeat and Error when used with the mechanical calculator separate and apart from the computer. A key similar to the 107 keys is provided as a computer disconnect key which enables the keyboard-printer to be used as a mechanical calculator having its own internal mechanical registers. The Subtract switch S33 in FIGS. 30*c* and 31*c* operates during the KY (keyboard data entry) instruction for setting the negative sign of an accumulator as hereinbefore described. All data words entered into the computer whether positive or negative are initiated by motor bar operations.

The timing cams 1 to 6, 8 and 9, illustrated diagrammatically in chart FIG. 30*c*, indicate the timing operation during the keyboard-printer cycle. The switches S22 through S27, S29 and S30, associated with the aforementioned timing cams are indicated on the chart as connected for either normally closed (NC) or normally open (NO) operation. These cams operate during the keyboard-printer cycle and are attached to an existing shaft which continuously rotates during the entire cycle. The motor which operates the printer through its functional cycle is controlled by means of the K–1 relay 30*c*—354 which was heretofore discussed in connection with the control circuits of FIG. 8. Timing cam TC–1 is shown to be a normally closed switch. In this normally closed type switch, the contacts are closed up to 17° when the switch cam follower rides on the high portion of the cam, then the switch contacts open and remain electrically open until 336° when the switch cam follower rides off the high portion of the cam. In like manner, timing cam TC–4 is a normally open switch. In this normally open type switch the high portion of the cam extends from 300° to 175° so that the contacts of the normally open switch are closed from 300° to 175° and are open from 175° to 300°. The operation of the other cams are similarly depicted in the chart of FIG. 30*c*.

During the keyboard-print instruction, the keyboard printer machine cycle is initiated and the solenoids L17, L18, L21 and L22 in FIGS. 30*c* and 31*a* may be initiated. The timing diagram in FIG. 30*d* illustrates diagrammatically the portions of the keyboard-printer cycle in which the electrical signals from the computer may effectively initiate these solenoids. For example, the switches S13 to S21 are only active between the limits of 35° and 154° of the keyboard-printer cycle. Also, the normally energized machine block solenoid, if left energized up to the first five degrees of the keyboard-printer cycle would prevent the keyboard-printer from completing a motor bar initiated cycle.

In order to index the subtract sign, the solenoid L18 must complete its function before the keyboard-printer has passed through 20° of a keyboard-printer cycle. The solenoid L21, which releases the rack stop solenoid clappers must be energized before 20° of the keyboard-printer cycle. The solenoid L22, which blocks the printer hammers must be energized by 60° of a keyboard-printer cycle. It will be understood that this timing chart is approximate and represents a typical keyboard-printer cycle.

During a computer keyboard-printer cycle, initiated either by the KY instruction or the PR instruction, the decimal switches S1 through S12 of FIG. 30*d* are set according to the information being read into the computer from the keyboard-printer or being read out of the computer into the keyboard-printer. These switches S1 through S12 are constructed as shown in FIGS. 30*e* and 30*f*. This device is disclosed and described in U.S. Patent 2,914,759 issued November 24, 1959 to W. W. Deighton et al. for "Data Storage, Read Out and Transfer Device." The keyboard information is electrically connected from the keyboard-printer unit to the computer by means of the read-out plug J1 of FIG. 30*d* so that each switch bank S1 through S12 will store and release a keyboard-set signal to the computer when needed, without the necessity of intermediate cyclically operated buffer storage. The switches of FIG. 30*d* are constructed so that a Y terminal is a common lead to each of the digit positions of each bank of decimal switches. As hereinbefore described the S1 position is representative of the least significant digit or the column 1 position in the keyboard-printer. The signals supplied to the common terminal Y of switch S1 are supplied by the scanner of FIG. 34*a* and more specifically by the SD1 terminal of the scanner decoder as illustrated in FIG. 44. When switch bank S1 is being scanned, a signal arrives at common terminal Y of switch bank S1 and is conducted through the contact representative of the digit position indicative of the key set number. It will be seen that since only one switch bank S1 to S12 is energized at any one time by the scanner of FIG. 34*a* only one digit will appear as an input to counter VI for any single scanner position.

During a print instruction, the rack stop solenoids of FIG. 30*a* stop the actuator racks 358 at positions indicative of the decimal numbers being read-out of the computer. The switches S1 to S12 are set by cam operated means shown in FIG. 30*e* during the KY instruction, and are indexed with decimal data the same way during a print check operation for the PR instruction.

As shown in FIG. 30*e*, an extension to the keyboard actuator bar 358 is positioned longitudinally by depressing a key designating a particular digit. Then by means of the cam 375, the rack is made to engage with the switch 376 for that keyboard column, which is set in a storage condition indicative of the keyboard accumulator bar position, which thus stores the key-set information until the computer is ready to synchronously sample it to derive input information. This keyboard read-out technique is described in the copending U.S. application Serial No. 497,901, filed the same date as this application by William W. Deighton et al. for "Data Transmission System," and by the aforementioned William W. Deighton et al. "Data Storage, Readout and Transfer Apparatus." The manner of connection of the switch unit of FIG. 30*d* to the computer diode logic circuits is indicated in FIG. 44.

Rack stop solenoid assemblies 365 shown in FIG. 30*a* are provided in the keyboard-printer. During the print instruction (PR), data in the A Register (accumulator loop) is set into the keyboard printer by releasing the clappers or pawls of the latch stop solenoids at the appropriate position of the actuator racks. The actuator rack indicator switches S13 to S21 of FIG. 30*g* produce electrical signals indicative of the physical position of the actuator racks. Switches S13 through S21 are shown as electrically connected in FIG. 31*b*. When the switches of FIG. 31*b* are operable their normally open contacts are closed and the camming action of an actuator type rack moving leftward in FIG. 30*a* exposes the switches S13 to S21 in sequence causing them to open and the series resistors associated with switches S13 to S20 to be switched out of the circuit. The current flow from +210 volts to −90 volts decreases as the resistance of the bridge increases, and the voltage change is sensed at the emitter signal terminal. The emitter signal pulse is fed to the multi-vibrator circuit of FIG. 40 which produces a positive output on the cathode follower modified emitter signal terminal MES. This MES output lasts for at least 130 microseconds which enables it to bracket at least one E pulse which is used to synchronize the operations of the computer and the keyboard-printer, as will be explained later.

The MES signal is produced at a leftward position of the actuator rack in FIG. 30*a* that enables the latching clapper to engage teeth 363 by the rack stop solenoid. The MES signal is supplied to the control grid (terminal A) of a tetrode thyratron gating tube 380, FIGS. 32*a* and 32*b*, and the shield grid is fed by signals representative of digits being read by the computer. There is a thyratron gate 380 associated with each of the rack stop solenoids and actuator racks.

Synchronization between the computer digits being read and the individual actuator racks is accomplished by the digit scanner of FIGS. 34*a* and 34*b*. When a thyratron gate 380 is fired, it forms a shunt path around the normally energized rack stop solenoid causing the spring loaded clapper to move free of the solenoid engaging the teeth 363 of the actuator rack.

During the print operation, the signal on the SD3 terminal of the scanner of FIG. 34*b* occurs at digit time DT3 and is connected directly to the rack stop solenoid circuit 381 shown in both FIGS. 32*a* and 32*b*. As will be explained, the digit being read from the accumulator is delayed one digit time by the adder and one digit time by counter V, so the scanner is synchronized by wiring terminal SD3 directly to column one in FIG. 32*b* for the first digit read from the accumulator, which manifests itself as a Match signal in FIGS. 32*a* and 32*b* at digit time DT3.

The computer data to be read out to the printer originates in the accumulator where a data word is being circulated. The data word is read from the Adder–0 side of the accumulator loop. As explained in conjunction wth FIGS. 27 and 28, the absence of data causes Adder–0 to be high and the presence of data causes Adder–0 to be low or inhibitive at the time of T pulses. Thus, a zero being read out of the adder will make Adder–0 high from T0 to T9, and a one from T0 to T8, etc.

With reference to FIG. 56 the digits being read from the accumulator loop are applied to the gated input of a digit recognition flip flop AD2, along with state 3 of the print instruction and the signal $V=9$. The Adder–0 input will be pulsed during time T9 only if a zero is being read from the accumulator loop. When the computer is searching for zeros, i.e., the actuator rack has not as yet moved leftward in FIG. 30*a* to index any type bar, counter V is being counted in such a manner that a $V=9$ will be high at T9 bit time for each digit emerging from the adder. If $V=9$ is high when Adder–0 is high, AD2 is set indicative of a zero digit which is the only possible Adder–0 digit having a bit pulse in the T9 position. After all the digits of the word emerging from the adder have been scanned, the successive digit positions of the word having been gated by SD3, SD4, etc., and by matching each successive digit position with $V=9$ at T9 time, the twelve RC circuits 382 in FIG. 32*b* store the fact of the match for each digit position in which the match occurred. The thyratrons 380 of FIG. 32*b* then receive the MES signal firing those thyratrons which had Adder–0 pulses at T9 time.

By precounting counter V one count, $V=9$ will occur at T8 bit time which is the condition desired in the scan for the "one" digit of the accumulator word. Not only does the MES signal fire the thryratron but it is gated with an E pulse, ~AD3, PR and state 3 to set AD3 as shown in FIG. 49 which in turn precesses counter V with an E pulse, as shown in FIG. 56, causing the computer to scan for the next higher digit. Since counter V is a modulo 10 counter it can scan for digits 0 to 8. A digit of 9 is selected if no other digit is matched in a given digit position and is indexed by mechanical stops for the actuator racks within the keyboard-printer.

It has been explained that counter V and Adder–0 pulses are gated to set the digit recognition flip flop AD2 as shown in FIGS. 42 and 56. During the PR instruction and state 3, AD2 and a D pulse will trigger counter VI as shown in FIG. 58. Counter VI is at $VI=9$ when this pulse arrives setting it to $VI\neq9$ which is gated with PR and state 3 to form the match signal. The match signal is fed back to the counter VI input and clocked by *t* pulses which causes the counter to count itself back up to $VI=9$ before it stops producing the match signal.

The match signal from FIG. 58 is gated with *tvu* pulses and the scanner digit signal at gate 381 of FIG. 32*a*. This signal is fed through an amplifier and RC circuit 332 which holds the output high on the shield grid of tube 382 long enough for all digits of an accumulator word to be scanned several times and set before the MES signal fires the thyratron 382.

It can be seen that each word in the accumulator is scanned at least nine times, i.e., at least once for each of the possible digits zero through eight, and once a match occurs causing the thyratron to be fired, the same thyratron will be fired when the next higher digit is scanned. This does not produce an error, however, for the thyratrons are fired by the first pulse they receive, and remain fired for all subsequent pulses received, and the first pulse received is indicative of the correct digit.

The computer match signal as seen from FIGS. 43 and 58 is regenerated in the computer counter VI so that each input gate 381 in FIG. 32*a*, which also has a signal from the scanner indicating a match for the digit being inspected, serves to fire the corresponding thyratron. The signal through each input gate 32—381 of FIG. 32*b* is a burst of eighteen one microsecond *tvu* pulses spaced approximately six microseconds apart and having a duration of 130 microseconds. These bursts of pulses are applied to cathode follower circuits 32—383 shown in FIG. 32*a* which drive R-C time delay circuits 382. Each of these circuits maintain a voltage well above ground for as long as the burst of pulses occur. Gating for synchronism takes place in the thyratron gate 380. Thus, the matched signal at the R-C circuit 382 is applied to the shield grid of the thyratron 380. When the MES fire signal is received at a control grid, and a thyratron 380 has an input signal at the shield grid, the tube conducts. The MES fire signal comes originally from the aforementioned series of pulse generator switches 31—370 in the printer, which indicates the printer rack position. Thus, normally current flows through the rack stop solenoid from the 250 volt supply source until it is interrupted by firing of the thyratron 380. This de-energizes the solenoid by providing a low impedance shunt path bypassing the solenoid and permits rapid operation of the rack stop latching pawl. The capacitor 384 causes the solenoid current to drop rapidly through zero so that a small reverse current flows. This reverse current eliminates the residual magnetism and permits the pawl to pull away much faster than it would if current merely dropped to zero. In order to reset the thyratron 380 after it is fired, a clear relay K–5 has a contact connected in series with the discharge path so that current is interrupted upon operation of the relay as afforded at the thyratron reset terminal M. This circuit is described in the U.S. Patent 2,904,726, issued September 15, 1959, to James B. Ricketts, Jr. for "Thyratron Actuated Pawl Circuit."

A further general purpose thyratron circuit shown in FIG. 33 provides means for operating the other relays and stepping switches from logical pulses derived from the diode control circuits of the computer. Since a typical positive trigger pulse of 10 volts amplitude and one and a half microseconds duration is not sufficient to reliably fire the thyratron, both a step up transformer 33—405 and a pulse stretching circuit 33—407 is provided in the thyratron input network. By means of the diode and a resistor combination 33—409, the capacitor 33—411 is allowed to charge rapidly through the diode from a positive trigger pulse, and discharge slowly through the resistor. This effectively lengthens the trigger pulse so that reliable triggering is effected with an incoming signal as short as one microsecond.

With high inductance solenoids, it is difficult to build up sufficient current in the thyratron anode circuit to sustain ionization after the input pulse terminates. Thus, the R-C circuit 33—413 from the anode to ground provides a path for sufficient initial current to sustain ionization after the input signal terminates and until the current in the solenoid builds up. Accordingly, operation of the relays or stepping switches with low amplitude and short duration pulses is possible. This circuit is described and claimed in Patent 2,942,160 issued June 21, 1960 to James B. Ricketts, Jr., and Robert H. Schafer for "Triggered Thyratron Circuit."

As seen from FIG. 31*a*, the rack stop thyratron cathode circuits must be closed by timing cam TC–6 to complete the read-in conditions while the actuator rack is moving during 60° to 155° of the printer cycle. This cam switch is set to overlap the operation of switches S13 to S21 in FIG. 31*b* which operate these solenoids. Similar cathode circuit completion of the function thyratrons occurs with timing cam TC–1. The function thyratrons of FIG. 31*a* are triggered by circuits similar to that of FIG. 33 and the operating conditions may be traced by means of the corresponding reference notations in the diode logic circuits such as FIG. 52. For example, all the motor bar solenoids are energized, when selected, by state 5 and a B pulse as shown in FIG. 52. The manner in which the individual motor bars are selected by plugging the appropriate operation level of the pinboard has been described in connection with FIG. 6. The flip flop AD1 of FIG. 38 holds the sign of the accumulator and is sensed in state 5 of the print instruction to set the sign solenoid L18 which also causes switch S33 to be set if the sign is negative, as shown in FIG. 46. The read (print) thyratron of FIG. 31*a* is always fired in state 5 with a print instruction as shown in FIG. 52, but when the non-print (print control) instruction is also used the print hammers are blocked during the keyboard-printer cycle. The machine block solenoid must be released by the computer for either the print (PR) or keyboard (KY) instruction and is fired in state 1 by a B pulse for the KY instruction and will be described hereinafter in conjunction with FIG. 52 for the PR instruction.

In FIG. 31*b*, computer circuit connections are shown for deriving the emitter signal from the pulse generator. The pulse generator 3—49 is coupled in series with a printer timing cam TC–4 to sequentially generate signals for firing rack stop thyratrons of FIGS. 31*a* and 32*b*. Each MES signal in sequence at the emitter signal terminal FIG. 40 indicates that it is time to fire the thyratrons for a corresponding digit. The emitter signals are reshaped by the computer multivibrator 3—76 shown in FIG. 40. The reshaped MES pulses also are used to set AD3 which will step counter V, which keeps track of digits represented by the rack position. This input to AD3 is shown in schematic form in FIG. 49. By means of flip flop AD3, the modified emitter signals from the keyboard-printer unit are synchronized with the computer during the print instruction as described, and this circuitry is shown in FIGS. 49 and 56. The counter V, FIG. 56, is used in the print instruction to remember whether the computer is matching for 0's, 1's, etc., by precess counting counter V from AD3 and the modified emitter pulses, counter V serves as a tally count to remember the rack position.

In FIG. 52, state 3 of the PR instruction begins with a B pulse at bit time T1 and this B pulse is the second count to counter V, as shown in FIGS. 43 and 56. The next T pulse to count counter V will occur at T2; thus T8 leaves $V=9$ high for gating purposes at T9. The signal $V=9$ may be made to occur one bit time earlier by precessing with AD3 and the E pulse which will occur at bit time T0 after the first MES. Until precessed, counter V receives ten T pulses per digit and will give $V=9$ outputs at the same bit time for every digit.

The match signal, 32*b* is generated for the print instruction by the general-purpose flip flop AD2 and counter VI as shown in FIG. 58. AD2 also serves in the sign comparison circuits as seen from FIGS. 38 and 42. The logical inputs for counter VI are shown in FIGS. 43, 44 and 58; and the logical inputs for counter V are shown in FIGS. 43 and 56. Input conditions for flip flops AD2 and AD3 are shown in FIS. 42 and 49, respectively.

FIG. 56 also shows the various other operations through which the counter V is associated with the arithmetic control circuits 2—60. Basically, this counter counts the number of repeat addition steps made during multiplication, and builds up the quotients by counting the number of subtractions during division. Thus, in multiplication the counter V is counted by Adder–0 and stores the complement of the multiplier digit, then is counted for each addition of the multiplier until the counter $V=9$, as shown in FIGS. 43 and 56. In division, the counter is advanced after each subtraction and in this way builds up the quotient digit which is subsequently read-out as will be explained hereinafter. This is shown in FIGS. 43, 46 and 56. In FIG. 31*c* miscellaneous timing cam relay operated circuits are shown with identification symbols denoting their system connections and functional relationship. The machine block solenoid L17 cannot be energized until the machine block thyratron in FIG. 31*a* is fired and the circuit completed through the contacts of RY6. Subtract switch S33 is manually operated on the keyboard-printer to enter negative data into the computer, and S33 does not depend on a cam timed switch but automatically resets AD1 to set up the sign during state 5 as shown in FIG. 41, which will be explained later. The switch S24 creates the keyboard signal indicating that the decimal switches of FIG. 44 are set and ready to be read into counter VI. The KY signal (or switches readable) also affects the state counter as seen in FIG. 52. The print make-ready switch S23 is used to indicate the start and finish of a keyboard-printer cycle, and is referred to as print make-ready in FIG. 30*c*. In FIG. 31*d* the alarm light circuit flasher and other indicator connections are shown.

The scanner circuit (3—74) is shown in FIG. 34*a*, and is made up of four flip flops SC1 through SC4, which by means of the input gating circuit produces separate output signals signifying the thirteen digit times. The output signals SD0 to SD12 represent the digits of a word, which are presented by connecting the flip flops of FIG. 34*a* to circuits as shown in FIGS. 34*b* and 44 to count through the digit sequence SD0 to SD12. The scanner is cleared in state "0" for all instructions.

Thus, it may be seen in FIGS. 34*b* and 44 that the scanner circuit is used during the keyboard instruction KY to scan the decimal switches in the keyboard-printer unit to read the keyboard set digits into the accumulator, one at a time. This scanning operation may be seen by reference to the diode logic circuit embodiments of FIGS. 34*b* and 44.

During the print instruction (PR), the accumulator is scanned continuously while matching for "0" 's, "1" 's, etc., for setting up the accumulator word digits into corresponding printer racks as seen in FIGS. 34*b* and 32*b*.

In response to the multiplication instruction MU, the scanner is used to choose the least significant digit of the multiplier and thereafter precesses through the more significant digits. Conversely, in division the scanner is used to choose the digit position of the word in the memory into which the quotient is to be written by signifying the most significant digit first and then by precessing to the least significant digit. Accordingly, it is seen that by means of the present computer circuits, transition is made between the keyboard-printer input-output unit and the computer circuits without providing synchronously actuated buffer memory register devices.

*Instruction Scanning Circuits*

The computer instructions may be derived from the automatically scanned pinboards as seen in the various views of FIGS. 35*a* through 35*d*, which are assembled in the manner shown in FIG. 35*e* into an overall circuit diagram. Each of the five pinboards (3—46) is designated in FIG. 35*b* by the Roman numeral notation I–V. The pinboard sections 6—81, 6—87, 6—89 and 6—83 of FIG. 6 are noted by the respective Arabic numbers 1 through 4 in FIG. 35*b*. Associated stepping switches SS are similarly identified. The wiring diagram is simplified in that a single control path is used to indicate the several input and output leads of the pinboard and their stepping switches SS. Thus, the designation 5, 16, etc., indicates the number of leads of a particular cable. The control circuitry for stepping switches A, B, C and Z is shown in FIG. 51. Thyratron X control circuitry is shown in FIG. 47.

It is seen that each of the stepping switches I through V have three banks of contacts for respectively scanning the pinboard sections 1, 2 and 3. Each bank has sixteen contacts which serve to selectively connect in sequence to ground the leads represented by one of the sixteen rows of the pinboard 6—46. A fourth section of the stepping switches I through V is used to actuate the neon lamps 35*d*—390 for indicating the particular step of the program being connected in the computer circuit at any time. The stepping switches I to V each have four banks of contacts and when the thyratron X, FIGS. 35*d* and 47, is fired, one or the stepping relays I to V is energized to step all four banks of one of the switches. Selection of the stepping switch energized depends upon which pinboard is designated by the A switch contact SSA4 as seen in FIG. 35*d*. The first bank of the stepping switch A (SSA1) is selectively coupled in series with the three switch banks, 1, 2 and 3 of stepping switches I–V. The further section 2 (SSA2) of stepping switch A functions to match stepping switch A to the position of the memory switch SSB1, to indicate proper pinboard selection, and also serves to light one of the lamps 35*b*—392 designating the selected pinboard. Bank 3 of stepping switch A (SSA3) serves to select the fourth bank of one of the stepping switches I–V which in turn light the pinboard step light and match the selected switch to the position of the memory switch SSC2 to indicate proper row selection. Bank 4 of stepping switch A (SSA4), as shown in FIG. 35*d*, connects in only one stepping solenoid for the selected pinboard I to V, so that only one pinboard switch is stepped at a time and return may be made to the portion of the sequence which was last used by any pinboard.

The rows of the fourth section 6—83 of the pinboard are scanned by the third bank of a special Z stepping switch (SSZ3), which, as hereinbefore noted, is used for counting purposes during the instruction scanning procedure. The first two banks of this switch SSZ1 and SSZ2 are used respectively for scanning the pinboard sections 6—87 and 6—89 to permit use of only the program tens and units digit specified by the Z switch. The fourth bank SSZ4 is used for permitting reset of the scanning switch to zero position in response to the instruction "O" when set up in pinboard section 6—81.

Further stepping switches B and C are provided for respectively remembering tens and units digits to designate pinboard number and step during the transfer instructions, since ordinarily the data set up in the stepping switches is switched after use and is therefore destructively read-out. Only in the transfer operations is memory of the preceding instruction step required, and this operation alone uses the B and C switches. Each of the stepping switches has an actuating solenoid, FIG. 35*d*, which is fired by means of a thyratron circuit of the type hereinbefore described in connection with FIG. 33. Back to back coupled diode dampers employing the overload breakdown principal are used across the solenoid coils to damp unwanted inductive ringing and to assure a single operation step in response to an input pulse. The thyratron input circuits are operated by diode control circuitry shown in FIGS. 47 and 51 of the diode logic section. The stepping switches I to V each have four banks of contacts and when the thyratron X, FIGS. 35*d* and 47, is fired, one of the stepping relays I to V is energized to step all four banks of one of the switches. Selection of the stepping switch energized depends upon which pinboard is designated by the A switch contact SSA4 as seen in FIG. 35*d*. The pinboard selector stepping switch A has four banks of contacts which are all stepped together when the A thyraton of FIGS. 35*d* and 51 is fired. The tens level transfer memory stepping switch B has three banks of contacts which are all stepped together when the B thyratron of FIGS. 35*d* and 51 is fired. The B switch is a pinboard memory switch and will remain set to the pinboard which is currently active.

The units level transfer memory stepping switch C has two banks of contacts which are all stepped together when the C thyratron of FIGS. 35*d* and 51 is fired.

The special stepping switch Z has four banks of contacts which are all stepped together when the Z thyratron of FIGS. 35*d* and 51 is fired. The manner in which these stepping switches are used will be explained in conjunction with the instruction operations employing their use.

Each of the instructions set up on the pinboard section 6—81 is brought out at an instruction cable 35*b*—394, which represents a plurality of leads designated throughout the diode control circuits by such notation as KY for keyboard, MU for multiplication, etc. As seen in FIG. 35*a*, the manual control section 7—81M of the computer is coupled in the same manner to provide the alternative instructions at the instruction cable 394 when the manual control switch 7—109 so directs. The various other manual control instructions are coupled to terminals appropriately numbered within circles, which may be traced through the diode logic for appropriate circuit connections to determine the manner of operation. For example the terminal ⑫ of FIG. 35*a* is grounded when the manual control switch section 7—113 is set for a single instruction step at a time and causes the reset of the flip flop CN4, FIG. 44, which prevents operation of the stepping relay.

The terminals of FIGS. 35 to 35*d* have been given descriptive names to denote their functions which may be traced on FIGS. 43, 45, 47 and 51. Terminal ③ denotes "control-pinboard"; terminal ⑪ denotes "control-manual"; terminal ⑫ denotes "single operation"; terminal ⑧ denotes "regular start," terminal ⑨ denotes "not regular start"; terminal ㉛ denotes "~R2.~R1"; terminal ⑩ denotes "~R2.R1"; terminal ㉜ denotes "R2"; terminal ⑬ denotes "~repeat"; terminal ㉖ denotes "switch B=Switch A"; terminal ㉗ denotes "switch Z homed"; terminal ⑥ denotes "~R2.R3"; terminal ⑦ denotes "~R2.~R3"; terminal ④ denotes "~special start"; terminal ⑤ denotes "special start"; terminal ㉚ denotes "switch Z=pinboard connection"; terminal ㉙ denotes "switch C=switch SS4"; terminal ㉘ denotes "switch B=tens level"; and terminal ㉕ denotes "switch C=units level."

In connection with the computer operation, several relays R1 through R5 are employed. In FIG. 35*c* the operational circuits for the relays R1 through R4 together with their corresponding contact connections are designated. Relay R1 is used to permit the starting cycle to begin in all starting operations including the special starts at separate pinboards by medium of the special starting switches 7—123. The start relay, R1, circuitry is shown in FIGS. 47 and 54.

Relay R2 is designated an interrupted relay and is used to protect the stepping switch contacts. Thus, this relay is used upon firing of a pair of single shot multivibrator circuits 396 as shown in FIGS. 39*a* and 39*b* to drive the interrupter relay R2 at such time that the thyratrons do not step the switch contacts while current is flowing through the stepping switch contacts. This increases the life and reliability of the stepping switches and therefore permits reliable computer operation with mechanically scanned switch assemblies. The similar schematic multivibrator circuit of FIG. 40 is used as the hereinbefore mentioned multivibrator (3—76) in driving the rack stop thyratron section 3—77 in response to emitter signals. The interrupter relay R2 circuitry is shown in FIG. 51.

Transfer relay R3 is energized during transfer operations to effect memory control in the transfer instruction as will be described in conjunction with the diode logic circuits of FIGS. 43, 47 and 51. When terminal ⑥ of FIG. 35*c* is permissive it indicates the condition ~R2.R3, and terminal ⑦ indicates ~R2.~R3. These two terminal indications are used in the R3 logical circuitry of FIG. 47. The relays R1, R3 and R4 of FIG. 35*c* are actuated from thyratron circuits such as shown in FIG. 33. The relay R4 is coupled to clear the relays 1, 3 and 4 in the manner shown, by opening the cathode circuit connections of the actuating thyratrons. Typical operational circuits for relays R3 and R4 may be traced in the diode logic of FIG. 47. The relay R5 is used in the special starting operation to produce both a make and break contact at switch RY5 of FIG. 35*d* and is initiated by one of the switches 7—123 of FIG. 35*a*, and actuated from the −90 volt power supply potential as shown in FIG. 35*d*.

Circuits in the computer for providing alarm signals are constructed for operating further relays R7 to R10 coupled with contacts in the alarm light circuits. The connections of different relay contacts are shown in FIG. 31*d*. The alarm indications performed by relay R9 may be connected as shown in the typical simplified logic diagram of FIG. 38.

The alarm 7—57 is actuated when overflow (exceed capacity) of the accumulator occurs as indicated in FIG. 38 during the addition or subtraction instructions, or alternatively by overflow during the B register instruction. Separate circuits provide for alarm during the divide instruction and for an optional print check alarm. The conditions under which these circuits operate are clear from the notation in FIG. 38, and some of the circuits may be traced in the more detailed diode logic circuits of FIGS. 45, 53, 56 and 58. Optional alarm conditions as may be derived from an external tape unit may be coupled in at the mixer circuit 38—398 also to reset the flip flop CN4 and halt the computer.

The present computer may be adapted readily in different models for larger memory, larger instruction storage capacity or modified instruction pinboard catalogue. As seen from FIG. 36, a modified pinboard assembly and manual control panel may be altered to take into account such modifications. Thus, provision is made for eight rather than five pinboards to permit scanning of one hundred and twenty-eight sequential instruction steps. The manner of coupling the modified pinboard scanning circuits is indicated in FIG. 37 along with a more versatile connection of two iterative or counting switches E and F which replace the single Z switch. FIG. 37 shows how the structure shown in FIGS. 35*a* to 35*d* may be modified to accommodate eight pinboards and the E and F switches. In all other respects, this modification is identical to the computer hereinbefore described.

The manual control panel thus simply indicates E and F pushbutton switches 36—400 and 36—401, which are seen in functional position in FIG. 37, and when depressed serve to cause an indicator lamp to designate the switch position. Two columns of the keyboard section 5—105 may be used rather than separate X and Y switches to set up the required numerical choices for address selection. The E and F modification switches are incorporated into the circuitry of FIG. 37 in a manner similar to that in which the Z switch is incorporated into FIGS. 35*a* to 35*d*. The E and F switches operate separately or collectively to modify the tens and units level of the pinboard instruction as will be explained hereinafter. It will be noted that the address modification switches X and Y of FIG. 7 have no equivalent in the modified keyboard FIG. 36. These X and Y switches have been more conveniently located on the keyboard-printer at column 105, FIG. 7, and additional columns 105 may be provided should an enlarged address, for memory or data print characters, be desired.

Certain variations in FIG. 36 are indicated from the hereinbefore described pinboard of FIG. 6. For example, the shift instruction for FIG. 36 operations may be included with the instruction for an absolute value instruction, which provides for making the accumulator sign either positive or negative as desired, and shifting in either direction. This instruction may be termed AS to designate the combined absolute value and shift operations and may be pinned at "A" as shown in the pinboard of FIG. 36 with the following results:

| | | | |
|---|---|---|---|
| A | *1* | *b* | Shift accumulator contents *b* places to the left. |
| A | *2* | *b* | Shift accumulator contents *b* places to the right. |
| A | *3* | | Make accumulator contents positive. |
| A | *4* | | Make accumulator contents negative. |
| A | | * | Halt. |

In the modification of FIG. 36 also it may be seen that the print or former motor bar instruction may now be carried out by pinning P in the first section and 1, 2, 3, or 4 in the second section or tens level of the FIG. 36 type pinboard to designate the respective motor bar. Also by pinning a 0 in the third section, the keyboard printer cycle may be carried through without a printing operation. By pinning the * in the third section, the computer will halt after printing. The H instruction performs a homing operation on the special E and F switches.

To execute control of the E and F modification counting switches of FIG. 37, which have replaced the preferred embodiment Z switch hereinbefore described in connection with FIGS. 35*b* and 35*d*, the stepping instructions may be pinned in FIG. 36 as follows:

| | | | |
|---|---|---|---|
| S | *0* | *b* | Step the E switch once; then if E≠*b*, execute the next instruction; if E=*b*, execute the instruction after the next instruction. |
| S | *1* | *b* | Same as above, but using the F switch. |
| S | 2 | *b* | Step E and F switches once; if E≠*b*, execute the next instruction; if E=*b*, execute the instruction after the next instruction. |
| H | 0 | *b* | Advance the E switch, stopping at position *b*. |
| H | 1 | *b* | Advance the F switch, stopping at position *b*. |
| H | 2 | *b* | Advance the E switch, stopping at position *b*, and advance the F switch the same number of steps as E is stepped. |

Thus, even more efficient use may be made of the available number of instructions in the pinboard by operating the E and F switches to modify the instruction sequence and memory.

Circuits which may be used in operation with the modified control circuits of FIGS. 36 and 37 are shown in FIG. 37*a*.

*Diode Control Circuits*

The notation used throughout the logical and diode diagrams is listed in the following chart to facilitate an understanding of the circuit operation.

| | |
|---|---|
| AR–1 and AR–0 | A register data. |
| BR | B register instruction. |
| BR–1 and BR–0 | B register data. |
| MU | Multiply instruction. |
| DV | Divide instruction. |
| 0, 1, 2, 3, 4, 5, 6, 7 | Operational states. |
| SL | Shift left instruction. |
| SR | Shift right instruction. |
| I=9 etc. | Output signal from counter I when it contains a count of nine. |
| MEM–1 | Memory data ones. |
| MEM–0 | Memory data zeros. |
| AD | Addition instruction. |
| SB | Subtraction instruction. |
| KY | Keyboard instruction. |
| RD | Read drum instruction. |
| WD | Write drum instruction. |
| PR | Print accumulator contents instruction. |
| MB | Motor Bar instruction. |
| TL | Tens level address digit. |
| UL | Units level address digit. |
| AS | Absolute value and shift instruction. |
| * or H | Halt the computer. |
| HS | Home the special switch instruction. |
| ST | Step the special switch instruction. |
| MES | Modified emitter signal. |
| INT | Interrupter relay signal. |
| CT | Conditional transfer instruction. |
| UT | Unconditional transfer instruction. |
| KY "—" | Minus Keyboard signal. |
| ⑥ | Transfer relay R3.~R2 signal. |
| NP | Non print instruction. |

The diode logic circuits used in the basic computer both for control signals and data are shown throughout FIGS. 41 through 55 and will be cross referenced under the various operations explained hereinafter. In each of the diode logic circuits the input and output leads are supplied with reference symbols indicating the signal conditions and/or functions performed.

In general, the voltages defining the instructions to be carried out are near ground potential going into the diode system at the pinboards as controlled by the scanning switches. The pinned instruction is selected by the aforementioned stepping switches of FIGS. 35*a*–35*d*. Unpinned output lines are held at an inhibiting level by connections to —90 volts. A near ground potential source is used for the permissive level on the pinboards, and is illustrated by terminal ㉛ of FIG. 35*c* showing ~R2.~R1 at ground potential. This level is connected to the selection switch SS A1 of FIG. 35*b*, if switch 7—109 is in its control-pinboard position.

The flip flops and counter circuits each use pulse amplifiers of the type shown in FIG. 16 to drive the diode logic system. In using output signals from the diode system, they are sampled with timing signals of two microsecond width, termed chopper pulses TvU as seen from FIG. 11. These pulses are gated against a flip flop signal as seen in FIG. 26*a* to produce high current pulses. The inhibit pulses, when required, are available at one output winding of the pulse transformer. In general, the diode circuits are designed to use as few intermediate flip flop or pulse amplifiers as possible, even though more diodes may be required in some circuits than otherwise.

Since the output signals of the diode system are gated against timing pulses to change the state of the flip flops, which control other diode system circuits, it is desired that the output signals be unchanged until after expiration of the timing pulse. To insure this, delay circuits like 285 of FIG. 26*a* are provided, resulting in the saving of many diodes.

The diode circuits are presented in such form that they may be mounted readily upon plug-in panels for circuit interconnection.

*Description of Operations*

All instruction operations may be divided into a series of sub-operations which take place in the eight control states hereinbefore mentioned, with reference to FIG. 20.

State conditions are gated with timing signals and other logical operations to change into another state. State 0 is an exception to this rule as is one of the operations of the transfer instruction in state 5, as will be explained. Every operation (except the special start operation) starts in state 1 and ends in state 0, which allows the computer to be cleared for operation automatically during state 0 and made ready to accept a new instruction in state 1. The individual states have primary and secondary functions as follows:

| State | Primary function | Secondary function |
|---|---|---|
| 0 | Step to next instruction | Clear Scanner and counters V and VI to Zero.<br>Wait for K–P to finish its cycle. |
| 1 | Memory track selection | Set VI for memory selection.<br>MU, DV Transfer sign of BR to AD2.<br>DV Compare signs.<br>KY Prepare K–P for operation.<br>PR, CT Search for Zeros.<br>CT Decide whether or not to transfer.<br>ST, HS Step special switch. |
| 2 | Memory access | Step the B switch in transfers of control. |
| 3 | Scanner (digit transfers) | PR Limit the K–P racks.<br>⑥ Step C switch. |
| 4 | Data transfers (word transfers). | KY, PR Wait for K–P to set up decimal switches.<br>⑥ Step A switch.<br>HS Step special switches. |
| 5 | Shift | AD, SB Re-complement.<br>KY Read decimal switches.<br>PR Prepare K–P for operation.<br>⑥ Step X switch. |
| 6 | Shift | PR Compare accumulator to decimal switches. |
| 7 | Clear accumulator and memory access. | DV Read the B register read amplifier. |

Conditions which cause logical functions are shown in the logical diode drawings FIGS. 41 to 61. The condition is set to the left ---- and the result is set to the right. The index of functions for all instructions is as follows:

| State | All instructions (except special start) | Figure |
|---|---|---|
| 0 start | Push start button | 35a. |
| | C.㉛.⑧ ---- fire R1 | 47. |
| | ~R2.R1 ---- ⑩ | 35c. |
| | C.⑩ ---- set CN4 | 45. |
| | Release start button ---- ⑨ | 35a. |
| | C.⑦.⑨.⑩ ---- fire R4 | 47. |
| | R4 ---- reset R1, R3 and R4 | 35c. |
| | ~R2.~R1 ---- ㉛ | 35c. |
| 0 start or continue | Clear scanner ---- SD. | 34a. |
| | Reset AD2 | 42. |
| | t ---- clear V | 56. |
| | t ---- clear VI | 44, 58. |
| | B.⑬.⑨.㉛. CN4 ---- fire X thy. | 47. |
| | ---- fire M.V. | 39a, 39b, 47. |
| | ---- fire R2 | 39a, 39b, 47. |
| | R2 ----㉜ | 35c. |
| | B.㉜ ---- State 1 | 47. |
| 1 | Select track by relay | 18, 29. |
| | UL.B ---- set VI | 29, 44, 57. |
| 2 | W ---- count VI | 29, 43, 58. |
| 4 | AD3.E ---- adder input | 27, 28. |
| 7 | W ---- count VI | 29, 43, 58. |
| | Clear A register | 22, 48. |

It will be noted not all instructions require all the above states, but when a logical operation is being performed in the above states, the above functions will be performed for that instruction, except for the special start operation, which will be explained hereinafter.

The individual operations do not necessarily go into each of the eight controlled states in sequence, but may operate in one or more states selectively.

The computer is started in state 0 by pushing the start button 7—121. This produces a signal ⑧ which is gated with signal ㉛ (indicating that neither R1 nor R2 has been fired) and a C pulse to fire R1. R1.~R2 produces a signal ⑩ which is gated with the next C pulse to set CN4. Then the computer waits for a signal ⑨ to be produced by releasing the start button. When ⑨ occurs, it is gated with a C pulse, ⑩ and ⑦ (indicating that neither R2 nor R3 has been fired) to fire R4 which resets R1. The reset R1.~R2 condition produces a signal ㉛.

The operations just described are performed only when the computer had been previously stopped, and it is desired to start it up again. In the normal case when the computer passes through state 0 between instructions, only the remaining operations are performed, which are also performed in a regular starting operation.

The scanner and counters V and VI are all cleared, and flip flop AD2 is reset, as soon as state 0 is entered. At the first B pulse, ③ and ⑬ (indicating normal pinboard operation) are gated with ㉛ (indicating that neither R1 nor R2 has been fired) and CN4 to fire the X thyratron which steps the pinboard switches to the next step. The multivibrator circuit of FIGS. 39*a* and 39*b* is also fired at this time to fire R2 at the proper time to remove voltage from the contacts of the pinboard switches. When R2 closes, it produces signal ㉜ which is gated with the next B pulse to go into state 1. State 1 always follows state 0.

In state 1, the proper memory track is always selected by the relays of FIG. 18, and the complement of the pinboard units level is set into counter VI, even though an addressing operation is not called for, as in the case of the transfer instructions. This does no harm, however, and is therefore tolerated.

In states 2 and 7, W pulses always count counter VI, and in state 7 the A register is cleared by not providing a recirculation path for the information therein.

In state 4, the adder receives an input at E time if carry flip flop AD3 has been set.

*Add-Subtract Operation*

The index of functions for addition and subtraction is as follows:

| State | AD instruction | Figure |
|---|---|---|
| 1 | B ---- state 2 | 50. |
| 2 | W(VI=9) ---- state 4 | 29, 50, 58. |
| 4 | ~DD1.MEM-1 ---- set AD2 | 42. |
| | D.~DD1.signs Opp ---- AD2 | 41, 42. |
| | D.~DD1.signs same ---- reset AD2---- | 41, 42. |
| | DD1.~AD2.MEM-1~DE.U ---- adder input | 28, 48. |
| | DD1.AD2.MEM-0.~DE.U ---- adder input | 28, 48. |
| | E.DD1.~DD2.AD2. ---- adder input | 28, 48. |
| | ~AD3.~AD2.W ---- state 0 | 50. |
| | AD3.W ---- state 0 | 50. |
| | AD2.~AD3.W ---- state 5 | 50. |
| | ~AD2.AD3.W ---- state 0 overflow alarm reset CN4 | 38, 50. |
| 5 | ~DE.T.DD1.AR0. ---- adder input | 28, 48. |
| | E.DD1.~DD2 ---- adder input | 28, 48. |
| | ~AD1.W ---- set AD1 | 41. |
| | AD1.W ---- reset AD1 | 41. |
| | AD3.E ---- adder input | 27, 28. |
| | W ---- state 0 | 50. |

| State | SB instruction | Figure |
|---|---|---|
| 1 | Same as Add | |
| 2 | Same as Add | |
| 4 | ~DD1.MEM0 ---- set AD2 | 42. |
| 5 | Same as Add | |

In the addition or subtraction process the pinboard is pinned in the three sections with the notation $+ab$ or $-ab$. This instructs the machine to automatically sequence through the steps causing the contents of memory location *ab* to be added to or subtracted from the contents of the accumulator. The addition is algebraically done with automatic handling of the signs and therefore the only change in the subtraction operation is that the sign of the word in the memory is complemented as it is sent to the sign flip flop AD2, as has been explained with reference to the adder. Control is changed from the idling state 0 to state 1 where the track selection is made in the manner illustrated by FIG. 18 and on receipt of the first B pulse the complement of the units address digit "*b*" is set into counter VI, and the B pulse sends the control to state 2 where W pulses count the counter and shift control to state 4 when the proper address is located. The sector coincidence is established during state 2, where control changes to state 4, on the count of ten as has been explained, in which state the actual addition takes place.

In state 4 of the addition instruction, as digit time DT0, the sign of the word in the memory is read into flip flop AD2 as seen in FIG. 27, and in complementary form in the case of subtraction. Since addition is made into the accumulator, the sign flip flop AD1 already holds the accumulator sign. The word in the accumulator is continuously cycled as shown in FIG. 28. During the D pulse at the end of DT0 or the tenth bit time of DT0 of state 4, the flip flop AD2 is set if the signs are opposite, and reset if the signs are the same. When the signs are opposite, the numerical portion of the word from the memory is complemented. The number in the accumulator is never complemented during state 4. The numerical portion of the word from the memory is complemented by sending memory-0's to the adder instead of memory-1's. Accordingly, at 9's complement is produced and is accompanied by a pre-carry pulse arriving at E pulse time between digit times DT0 and DT1 thus producing an additional count to the least significant digit and the result is a tens complement.

During digit times DT1 to DT12, the bits from the accumulator and memory tracks are alternately entered into the adder, causing a carry to be stored in the carry flip flop circuit AD3, when necessary. Because of the serial adder operation, the carry in AD3 is entered to the adder between digits, by an E pulse, so that it will appear with the next digit. As may be seen from FIG. 50, the condition of flip flop circuit AD2 and the carry condition AD3 are compared after addition by a W pulse to determine whether the capacity is exceeded and are also compared to determine whether the sum is in complement form. If so, correction is necessary and control is changed to state 5 where the number in the accumulator is complemented, FIGS. 28 and 48, and flip flop AD1 is complemented, FIG. 41. The addition cycle is then finished and control goes to state 0. A flip flop circuit CN4 is provided in FIG. 38 to control whether the computer stops or proceeds automatically to the next instruction. Thus, whenever CN4 is reset, the computer, when it goes to the idling state 0, will remain there until one of the start buttons is pushed.

*Multiplication Operation*

The index of functions for multiplication is as follows:

| State | MU instruction | Figure |
|---|---|---|
| 1 | ~DE.U.~DD1.BR-1 ---- Set AD2 | 42. |
| | B ---- Reset AD1 | 41. |
| 2 | ---- State 7 | 53, 59. |
| | W(VI−9) ---- State 3 | 29, 53, 58, 59. |
| 3 | ~DD1.SDO.MEM-1 ---- set AD1 | 41. |
| | ~DD1.D.SDO (same signs) ---- reset AD1 | 41. |
| | ~DD1.D.SDO (opposite signs) ---- set AD1 | 41. |
| | ~DD1.D.SDO ---- reset AD2 | 42. |
| | D ---- count scanner | 34b. |
| | SD1.DD1.MEM-O.~DE.U ---- count V | 43, 56. |
| | W ---- count VI | 43, 58, 59. |
| | ---- State 4 | 53, 59. |
| 4 | ~DD1.D ---- count V | 43, 56. |
| | ~DD1.D.(V=9) ---- state 5 | 53, 56, 59. |
| | ~DE.U.DD1.~AD2.BR-1 ---- adder input | 19, 28, 48. |
| | W ---- count VI | 43, 58. |

| State | MU instruction | Figure |
|---|---|---|
| 5 | ~DD2.SD2 ---- state O | 34b, 53, 59. |
| | ~DD2 ---- no shift | 22, 48. |
| | DD2 ---- right shift | 22, 28, 48. |
| | SR.DD2.AR-1 ---- 1 to AR track | 22, 28, 46, 48. |
| | SR.DD2.AR-O ---- O to AR track | 22, 28, 46, 48. |
| | DD1.D ---- count scanner (precess) | 34b. |
| | W ---- count VI | 43, 58. |
| | ---- State 6 | 53, 59. |
| 6 | ~DD1 ---- right shift | 22, 48, 28. |
| | SR.~DD1.AR-1 ---- 1 to AR track | 22, 28, 48, 46. |
| | SR.~DD1.AR-O ---- O to AR track | 22, 28, 46, 48. |
| | DD1 ---- no shift | 22, 48. |
| | DD1 ---- state 2 | 53, 59. |
| 7 | W.(VI=9)----state 3 | 29, 53, 58, 59. |
| | Clear A Register | 22, 48. |

In the multiplication process the pinboard is pinned X–*ab* in the three sections to cause the contents of the B register to be multiplied by the contents of memory location *ab*, leaving the answer in the accumulator. An operational sequence chart is shown in FIG. 59 to simplify the presentation of the computer operation. The arrows and numerals signify a change of state, the letter designations signify the signal conditions, and the notations signify the different operations performed in sequence when reading in the direction of the arrows. The circle connections indicate the coincidence of those conditions at the rows and columns existing for the different operational steps of the sequence.

When multiplication begins, the multiplicand is already stored ten times around the B register and the multiplier is stored in the memory position *ab*. The product is formed in the accumulator. In state 1, the track is selected as in all operations and the multiplicand sign from the B register is read into flip flop AD2 and flip flop AD1 is reset. The B pulse at the end of state 1 sends the complement of the units address digit "*b*" of the multiplier units address to counter VI, which always occurs in state 1. Control is changed to state 7 and the accumulator is cleared, which always occurs in state 7.

In state 7, W pulses are always counted into counter VI to finish the multiplier selection, the same as in state 2 addition, after which control is changed to state 3 when the proper address is located. The multiplier sign from memory is then set into flip flop AD1 during digit time DT0 of state 3 as shown in FIG. 41. Counter VI enters state 3 when VI=9 and during the remainder of the instruction is counted by W pulses so that at every tenth count when VI=9 the proper address of the multiplier word is available for access in state 3. The signs are compared and the product sign is set into flip flop AD1 as shown in FIG. 41, and flip flop AD2 is reset. During digit time DT1 the 9's complement of the least significant digit of the multiplier is counted into counter V under control of the scanner digit SD1 as shown in FIG. 56. The W pulse counts counter VI, which is synchronized, with the drum, and sends the control to state 4.

At the beginning of state 4, counter V which contains the complement of the LSD of the multiplier, is inspected and then the multiplicand is sent to the adder. The control state changes to 5 if counter V is set at nine, indicating that no more additions are to be performed, and counter V is counted once for each time the multiplicand is sent to the adder. When counter V is not at nine, the absolute value of the multiplicand is added to the accumulator to build up the partial product. The operations during this state are continued until counter V reaches nine, at which time control changes to state 5. Throughout state 4 the W pulses keep counter VI synchronized with the drum. In state 5 during digit times DT2 through DT12 and continuing to digit time DT0 of state 6, the partial product in the accumulator is shifted one digit to the right. The right shift operation takes place in two states, and the shift overlaps one W pulse. During state 5 the digits at DP2 to DP12 are shifted one position to the right; in state 6 the digit DP0 is shifted right and the least significant digit DP1 is dropped from the accumulator loop. The scanner is also precessed during state 5, by counting only 12 digit pulses per word (a word having 13 digits) under the control of flip flop DD1 as shown in FIG. 34*b*. The W pulse changes the state counter from state 5 to state 6 and it is also counted into counter VI. As soon as the right shift is completed in state 6, control goes to state 2, where the computer waits for access to the multiplier word stored in memory.

In state 2, counter VI, upon address coincidence, changes control back to state 3, where the scanner at SD1 time, extracts the next more significant digit from the memory. The modulo 13 scanner enters state 3 at digit time DT0 set at scanner digit SD0 and is counted by 13 D pulses during one full word time. But during state 5, the scanner is precessed by D pulses under control of the flip flop DD1, which is permissive only during digit times DT1 to DT12, thus allowing only 12 D pulses to count the scanner. Accordingly, the modulo 13 scanner is caused to enter state 3 for the second time with SD12 set at digit time DT0. When SD1 becomes permissive for the second pass through state 3, it is digit time DT2, at which time the second least significant multiplier digit is available from memory, the complement of which is counted into counter V. On each succeeding pass through state 3, the scanner digit SD1 effectively becomes permissive at the next higher order digit time, and it is possible to count the complement of successively higher multiplier digits from memory into counter V by gating scanner digit SD1. This cycle continues until all twelve multiplier digits are used. In the final cycle the shift does not occur, since at the beginning of state 5 control goes to state 0. Thus, with only eleven shifts, the decimal point of the product is at the same place as the decimal point of the multiplicand and multiplier, causing a product with no round off and with the decimal point between the two most significant digits D12 and D11. The excess digits resulting from the multiplication operation have been discarded as the least significant digit of each shift.

*Division Operation*

The index of functions for division is as follows:

| State | DV Instruction | Figure |
|---|---|---|
| 1 | ~DEU.~DD1.BR-1 ---- Set AD2 | 42. |
| | B.(signs same) ---- reset AD1 | 41. |
| | B.(signs opposite) ---- set AD1 | 41. |
| | B ---- set AD2 | 42. |
| | B ---- precount scanner | 34b. |
| | B ---- state 4 | 53, 60. |
| 2 | Set AD2 | 42. |
| | W.(VI=9) ---- state 3 | 29, 58, 60. |
| 3 | D ---- count scanner | 34b. |
| | DD1.SD1(V≠9).T ---- count V | 43, 56. |
| | DD1.SD1.(V≠9) ---- 0 to MEM | 46, 56. |
| | DD1.SD1.(V=9) ---- 1 to MEM | 46, 56. |
| | w.SD0.~DD1.AD1 ---- 1 to MEM | 17b, 46. |
| | w.SD0.~DD1.~AD1 ---- 0 to MEM | 17b, 46. |
| | D.DD1.~DD2.SD1 ---- state 0 | 53, 60. |
| | W ---- count VI | 43, 58. |
| | W ---- count V | 43, 56. |
| | W ---- state 4 | 53, 60. |
| 4 | E.DD1~DD2.AD2 ---- adder input (pre-carry). | 28, 48. |
| | DD1.AD2.BR-0 ---- adder input | 19, 28, 48. |
| | DD1.~AD2.BR-1 ---- adder input | 19, 28, 48. |
| | W ---- count VI | 43, 58. |
| | W.AD2.AD3 ---- count V | 43, 56. |
| | W.~AD3 ---- reset AD2 | 42. |
| | W.AD2.AD3.(V=9) ---- reset CN4 | 38, 53, 56. |
| | ---- Alarm light | 38, 53, 54, 56. |
| | ---- State 0 | 56. |
| | W.~AD2 ---- state 5 | 53, 60. |
| | ~DD2 ---- no shift | 22, 48. |
| 5 | DD2 ---- left shift | 22, 28, 48. |
| | SL.DD2.Delay-1 ---- 1 to AR track | 22, 28, 46, 48. |
| | SL.DD2.Delay-0 ---- 0 to AR track | 22, 28, 46, 48. |
| | W ---- count scanner (precess) | 34b, 45. |
| | W ---- count VI | 43, 58. |
| | W ---- state 6 | 53, 60. |
| 6 | ~DD1 ---- left shift | 22, 28, 48. |
| | SL.~DD1.Delay-1 ---- 1 to AR track | 28, 46, 48. |
| | SL.~DD1.Delay-0 ---- to AR track | 28, 46, 48. |
| | DD1 ---- no shift | 22, 48. |
| | DD1 ---- state 2 | 53, 60. |

To perform division, the pinboard is set up with ÷ *ab* in the three sections. This causes the contents of the accumulator to be divided by the number in the B register, while the answer is stored in memory location *ab*. The remainder is left in the accumulator and may be used if double precision is desired. Division is performed as a series of subtractions, with one restoring addition, for each digit of the quotient. To obtain each quotient digit, the divisor is subtracted from the dividend until the remainder in the accumulator is less than zero, then the divisor is added back once to obtain a positive remainder. The quotient counter, counter V, counts the subtractions except the one that produces a negative remainder and in that way builds up each quotient digit. As division starts, the divisor is already in the B register and the dividend is in the accumulator. The sequence set out in FIG. 60 is followed, wherein the track is selected in state 1 and the counter VI is set according to the complement of the units address digit "*b*," as always occurs in state 1 and the sign of the divisor is read from the B register into flip flop AD2. W pulses continue to count counter VI throughout the operation, and access to the correct location in which to store the quotient in the memory may be accomplished at the next W time thereafter. The sign of the dividend in the A register already is in flip flop AD1. The signs of AD1 and AD2 are compared and flip flop AD1 is then set or reset according to the sign of the quotient. Flip flop AD2 is then set, and is used to determine when corrective additions will be made. The same B pulse that sets AD2 counts the scanner to SD1 and changes control to state 4.

In state 4 the 9's complement of the numerical portion of the divisor is added to the accumulator along with the pre-carry bit as shown in FIGS. 27 and 28.

At W time, after each subtraction of the divisor from the accumulator, flip flops AD2 and AD3 are inspected. When a valid subtraction takes place, as indicated by AD3, counter V is counted again. When there is no carry in AD3 at W pulse time, one too many subtractions have taken place, and AD2 is reset and counter V is not counted. Whenever flip flop AD2 is reset, the absolute value of the divisor is added into the accumulator restoring the correct remainder. With AD2 reset, control is changed to state 5 at the next W pulse (after the corrective addition) and counter V now holds the most significant digit of the quotient. If in state 4 the counter VI reaches nine and the W pulse still finds a carry, the quotient exceeds the capacity of the machine and the alarm is fired and the computer goes to state 0. Otherwise the W pulse is gated with ~AD2 to change control to state 5.

As the W pulse counts into counter VI and control shifts from state 4 to state 5, a left shift is begun during digit times DT2–DT12 by gating flip flop DD2 as shown in FIG. 22. The scanner receives one count from a W pulse and goes to SD2. The same W pulse changes control from state 5 to state 6, where the left shift is completed by gating ~DD1 in digit time DT0 of state 6. This effectively shifts the most significant digit out of the accumulator (which is zero after the subtractions of state 4) and places a zero digit in the new least significant digit position. Control then changes to state 2, where flip flop AD2 is again set and W pulses establish address coincidence and change control to state 3. The control enters state 3 at digit time DT0 with SD2 permissive. In state 3 the scanner is counted by 13 D pulses, and when SD1 is reached (at digit time DT12), the most significant digit of the quotient is read into memory from counter V. As shown in FIGS. 46 and 56, the contents of counter V are transferred to the correct memory location by counting counter V with T bit pulses until it reaches the count of nine, causing zeroes to be written in the digit address designated by SD1. When counter V reaches the count of nine, ones are written in memory for the remainder of the digit period. A W pulse then advances counter V one step to zero condition and changes control to state 4, where the subtraction and shifting cycles are repeated, the scanner being counted one count forward each time operation passes through state 5. On the thirteenth cycle, SD0 coincides with digit time DT0 and the sign is written into this location of the memory from flip flop AD1. At the succeeding digit time DT1, SD1 is also present, and the control changes back to state 0.

*Read Drum Operation*

The index of functions for the RD instruction is as follows:

| State | RD instruction | Figure |
|---|---|---|
| 1 | B ---- reset AD1 | 41. |
| | B ---- state 7 | 50. |
| 4 | ~ DD.1.MEM-1 ---- set AD1 | 41. |
| | DD1. ~ AD2. MEM-1 ---- adder input | 28, 48 |
| | W ---- State 0 | 50. |
| 7 | W. (VI=9) ---- state 4 | 29, 50, 58. |
| | Clear A Register | 22, 48. |

The read drum instruction, when pinned R–*ab*, transfers a word from the memory location specified in the instruction to the accumulator, first clearing the accumulator. During state 1 the 10's digit of the address selects a track on the drum, and a B pulse sets the ten's complement of the units digit of the address into counter VI, as in all instructions. The same B pulse changes control to state 7. As shown in FIG. 28 there is no recirculation gating for the accumulator loop in state 7. As explained hereinbefore, Adder–0 is permissive for there is no input to the adder, and records zeroes in the A register track for a complete word time. During state 7 the accumulator is always cleared and W pulses are always counted into counter VI until address coincidence is found, at which time control changes to state 4. During the sign digit time DT0 or ~DD1, of state 4, the sign of the memory word is stored in flip flop AD1 and the numerical portion of the memory word is read into the accumulator during the digit times DT1 to DT12, or DD1. A W pulse then changes the control back to state 0.

*Write Drum Operation*

The index of functions for the WD instruction is as follows:

| State | WD instruction | Figure |
|---|---|---|
| 1 | B ----state 2 | 50. |
| 2 | W. (VI=9) ---- state 4 | 29, 50, 58. |
| 4 | w. ~ DD1. AD1 ---- write 1 to MEM | 17b, 46. |
| | w. ~ DD1. ~ AD1 ---- write 0 to MEM | 17b, 46. |
| | DD1.AR.1 ---- 1 to MEM | 46. |
| | DD1.AR-0 ---- 0 to MEM | 46. |
| | W ---- state 0 | 50. |

The write drum instruction, when pinned W–*ab*, transfers a word from the accumulator to the specified memory location and leaves a copy of the word in the accumulator. During state 1, as always, the 10's digit of the address selects a track on the drum, and a B pulse sets the ten's complement of the units digit of the address into counter VI. The same B pulse changes control to state 2. During state 2, W pulses are always counted into counter VI until address coincidence is found. Then control changes to state 4. During the sign digit time DT0, or ~DD1, of state 4, the accumulator sign stored in flip flop AD1 is written on the drum as shown in FIG. 46, and the remaining digits are synchronously sent to the drum under control of flip flop DD1 in the set condition, as shown in FIG. 46, after which the next W pulse changes the control back to the idling state 0.

*B Register Write Operation*

The index of functions for the BR instruction is as follows:

| State | BR instruction | Figure |
|---|---|---|
| 1...... | B ---- state 4 | 19, 53. |
| 4...... | ~ DD1.AD1 ---- write 1 to BR | 19, 46. |
| | ~ DD1. ~ AD1 ---- write 0 to BR | 19, 46. |
| | DD1.AR-1 ---- 1 to BR | 19, 46. |
| | DD1.AR-0 ---- 0 to BR | 19, 46. |
| | ~ DD1.Adder-1 ---- alarm | 38, 53. |
| | ~DD.1Adder-1 ---- reset CN 4 | 38, 44. |
| | B ---- state 0 | 19, 53. |

This instruction, initiated by pinning a B in the first pinboard section, writes the accumulator contents around the B register track ten times leaving a copy of the word in the accumulator. The B pulse at the end of state 1 changes control to state 4 as may be seen in FIGS. 19 and 53. During each sign time DT0, or ~DD1, the sign of the word in the accumulator, as stored in flip flop AD1, is written on the B register track, and during digit times DT1 to DT12, or DD1, the digits of the word emerging from the A register are written on the B register. The next B pulse changes control to the idling state 0. Thus, state 4 starts and ends with a B pulse permitting the accumulator contents to be written on the B register ten times. The output of the adder, Adder–1, which allows access to the digits written on the B register track one digit time before, is gated with ~DD1 to check the most significant digit D12. Since the B register serves as memory for the multiplicand or divisor, a zero digit in D12 (appearing at digit time DT0 at the output of the adder) will safeguard against overflow products in the A register during multiplication. If the most significant digit D12 is not zero during state 4, the alarm light is fired and flip flop CN4 is reset, which stops the computer.

*Keyboard Operation*

The index of functions for the KY instruction is as follows:

| State | KY Instruction | Figure |
|---|---|---|
| 1...... | B (ULOvNP) ---- Fire Non Print | 37a. |
| | B ---- reset AD1 | 41. |
| | B ---- fire machine block thyratron | 52. |
| | B ---- precount scanner-SD1 | 34b, 52. |
| | B ---- state 4 | 52. |
| 4...... | Operator light | 45. |
| | t ---- clear V | 44, 56. |
| | t ---- clear VI | 44, 58. |
| | W. ~ AD4. (switches readable) ---- state 5 | 52, 31c. |
| 5...... | ~ DE.T.AD4.DD1.AR-1 ---- adder input recirc.) | 27, 28. |
| | KY "—" ---- Set AD1 | 31c, 41. |
| | (DEC.SW).AD4.SD ---- set VI | 44, 57. |
| | ~DE.T.~AD4. (VI=9) ---- adder input (keyboard) | 28, 48, 58. |
| | t. ~ AD4. (VI≠9) ---- count VI | 43, 58. |
| | D. ~ AD4 ---- count VI | 58. |
| | D=count scanner | 34b. |
| | ~ AD4.W ---- state 6 | 52. |
| | ---- clear scanner | 34a. |
| 6...... | SD.AD4. (DEC.SW) ---- set VI | 44, 57. |
| | D ---- count scanner | 34c. |
| | ~ AD4.D ---- count VI | 58. |
| | t. ~ AD4. (V≠9) ---- count VI | 58. |
| | ~ AD4. [(II=9).(VI≠9)] v[(II≠9).(VI - 9)]~ AD4 v[Opposite Signs] ---- Alarm light, reset CN4. | 38, 58. |
| | W.~AD4 ---- State 0 | 52. |

In the basic computer as connected in the diode circuit logic of FIGS. 41 to 55 to operate from the pinboard connections of FIG. 6, the keyboard operation is as follows: The keyboard instruction serves to halt the computer and light the keyboard light 7—79. The operator then enters a number in the keyboard 5—101 and hits a motor bar 5—103 to start a keyboard printer cycle.

The computer then transfers the numerical digits from the decimal switches of FIG. 30*d* to the accumulator loop, a digit at a time, as shown in FIG. 44, while transferring the sign of the word set in switch S33 to flip flop AD1. State 1 unblocks the printer, precounts the scanner, and resets AD1. The non-print thyratron is fired in state 1 if the N has been pinned in the pinboard of FIG. 6, or a 0 has been pinned in the units level of the pinboard of FIG. 36. It is to be understood that these pinboards are the same in every other respect for the KY operation. The B pulse at the end of state 1 transfers control to state 4 and the keyboard light goes on. The computer then waits until a number is set into the keyboard and a motor bar is depressed to set up the decimal switches, after which the following W pulse changes control to state 5. During state 5 the sign of the keyboard negative switch S33 shown in FIGS. 30*c* and 31*c*, is read, and if set causes a negative signal KY "—" to set flip flop AD1 indicative of a minus sign in the accumulator as shown in FIG. 41. If switch S33 has not been set, flip flop AD1 remains reset, indicative of a positive sign.

During state 5 the information set into the decimal switches of FIG. 30*d* is read by the scanner of FIGS. 34*a* and 34*b* to set counter VI of FIGS. 44 and 58. Information set in counter VI is read into counter I of FIG. 23 during the next digit time and recirculated as shown in FIG. 28 around the accumulator loop and fed back into counter II. Counter I and counter II outputs are combined in the adder output to form a complete word in the accumulator loop.

State 5 begins at digit time DT0 with alternator AD4 set and scanner digit SD1 permissive. The scanner digit SD1 sets counter VI under control of alternator AD4 as shown in FIG. 44. The next following D pulse resets AD4 as shown in FIG. 49 and counts the scanner as shown in FIG. 34*b*, but since ~AD4 is permissive, counter II cannot be set by SD2 during digit time DT1. While ~AD4 is permissive counter VI is counted by *t* pulses as shown in FIG. 58, and when the counter reaches the count of nine the keyboard count-out to the adder is counted by the ~DE.T count to set counter I as shown in FIGS. 23 and 58. The next following D pulse sets AD4, counts the scanner and resets counter VI (by counting it to ten). With AD4 set and scanner digit SD3 high counter VI will be set and the cycle repeated until all the odd numbered digit positions from the decimal switches are counted into the adder, under the control of the odd scanner digits.

With ~AD4 reset and scanner digit SD12 high the next D pulse marking the start of a second word sets AD4 with the scanner digit SD0 high and during this second word time all the even digit positions are set into counter VI. Since there is no connection for scanner digit SD0 as shown in FIG. 44, the sign position represented by digit time DT0 remains zero. The D pulse which counts the scanner to SD0 occurs during digit time DT0 of the second word time setting AD4, and making AD4 permissive during even digits of the second word time.

As seen in FIG. 28, with AD4 set in State 5 the information counted into counter II is arriving as a recirculation input to the adder. This recirculation input is read into counter II during AD4 time and read out in ~AD4 time, as seen in FIG. 23. Information from the keyboard decimal switches is being set into counter I during ~AD4 time and read out in AD4 time. The odd and even digits are combined in the accumulator loop to form a complete input word and control is shifted into state 6 by ~AD4 and a W pulse.

During state 6 an operation referred to as the "print check" compares the information set in the decimal switches with the word stored in the accumulator loop. This operation is identical to the print check performed in state 6 of the PR instruction and will be explained in connection therewith.

*Print Operation Using Motor Bar 1, 2, 3 or 4*

The index of functions for the PR instruction is as follows:

| State | PR instruction | Figure |
|---|---|---|
| 1 | Adder-1 ---- Set AD2 | 42. |
| | C.~AD2 ---- reset AD1 | 42. |
| | C ---- reset AD2 | 42. |
| | B.(Halt) ---- reset CN4 | 37a, 45. |
| | B ---- count V | 43, 56. |
| | B ---- fire machine block thyratron | 52. |
| | B ---- state 5 | 52. |
| 3 | T ---- count V | 43. |
| | D ---- count scanner | 34b, 45. |
| | (V=9).Adder-0 ---- set AD2 | 42. |
| | AD2.D ---- advance VI | 43, 58. |
| | D ---- reset AD2 | 42. |
| | (VI≠9) ---- match signal for thyratron | 43, 58. |
| | t.(VI≠9) ---- count VI | 58. |
| | (VI≠9).SD.tvu ---- prime rack stop thyratrons. | 32a, 32b, 34b. |
| | Emitter signal ---- MES | 40. |
| | MES.~AD3.E ---- set AD3 | 37a, 49. |
| | MES ---- fire rack stop thyratrons | 32b. |
| | AD3.E ---- advance V | 43, 56. |
| | AD3.E ---- reset AD3 | 49. |
| | W.(V=9) ---- state 4 | 56. |
| 4 | KY "—" ------ set AD2 | 31a. |
| | t ---- clear V | 44, 56. |
| | t ---- clear VI | 44, 58. |
| | W.≠AD4. (KY signal) ---- state 6 | 52. |
| 5 | Fire print thyratron | 31a, 52. |
| | AD1 ---- fire "—" sign thyratron (Set S33) | 31a. |
| | (ULOvNP) ---- fire non print thyratron | 37a, 52. |
| | VI≠9 ---- count VI | 43, 58. |
| | B ---- fire one of MB thyratrons (pinned in pinboard). | 37a, 52. |
| | B ---- count V | 43, 56. |
| | B ---- state 3 | 52. |
| 6 | SD.AD4.(DEC.SW.) ---- set VI | 57. |
| | D ---- count scanner | 34b. |
| | ~AD4.D ---- count VI | 58. |
| | t.~AD4.(VI≠9) ---- count VI | 58. |
| | ~AD4.[(II=9).(VI≠9)]v | 38, 58. |
| | ~AD4[(II≠9).(VI=9)]v | 38, 58. |
| | [opposite signs] ---- Alarm light, reset CN4 | 38, 41. |
| | W.~AD4 ---- state 0 | 52. |

The motor bar instruction serves to read the word in the accumulator to the print racks while retaining the word in the accumulator and is initiated by pinning the appropriate column of the first pinboard section 6—81, or, if the pinboard of FIG. 36 is used, by pinning the P operation in the first section, and tens level 1, 2, 3 or 4. In this manner the contents of the accumulator may be visually examined. Negative numbers are printed in absolute form with a minus sign. Completion of the operation without printing may be accomplished by pinning the non-print instruction N in the second pinboard column 6—87, or, if the pinboard of FIG. 36 is used, the units level zero; and is desirable to enable control of the printing position. The computer will halt after completion of the instruction if the halt instruction H is pinned in the third pinboard section 6—89, or, if the pinboard of FIG. 36 is used, an * will be pinned for a halt.

In normal computer operation it is possible to obtain all zeros in the accumulator, and the sign of the accumulator word may be negative. To prevent the computer from printing a negative sign when the accumulator word is zero a separate operation is performed within the computer. Initially the computer is in state 0 where AD2 is reset, and it enters state 1 with AD2 still reset. The print instruction PR is gated with state 1 and Adder–1 which produces an output capable of setting AD2 as shown in FIG. 42. Should there be no output at terminal Adder–1 (indicative of all zeros in the adder), AD2 will remain reset. AD1 will then be reset to store a positive sign for the zeros in the accumulator. It can be seen from FIGS. 41 and 42 that the sign control AD1 will be changed from negative to positive should all zeros appear in the accumulator, and the printed output which results will not have a negative sign. When the pinboard is pinned in column H of section 89, FIG. 6 (or in column * of the pinboard of FIG. 36), to cause the computer to halt upon completion of a cycle, the preparation for this halt is performed in state 1 where state 1, the B pulse and the print instruction, are gated with the halt instruction as shown in FIGS. 37*a* and 45 to reset CN4 which will stop the computer in state 0 at the end of the print cycle.

The B pulse at the end of state 1 is gated with the print instruction to precount counter V as shown in FIG. 56. This serves to advance counter V so that it can be used during state 3 as will be explained. This same B pulse at the end of state 1 is gated to change control to state 5.

During state 5 the tappet solenoid circuits are energized as seen in FIG. 52, where state 5 and NP (or ULO) are illustrated as firing the print and non-print thyratrons shown in FIG. 31*a*. The thyratron operated tappet solenoids L18–L22 are also under the control of the timing cams in the keyboard as shown in FIG. 30*c*. It can also be seen in FIG. 52 that during state 5 one of the motor bar thyratrons is fired initiating the keyboard-printer machine cycle. During state 5 the B pulse and print instruction are gated to give a second precount to counter V as shown in FIG. 56. The B pulse, state 5 and a motor bar condition are gated to change state 5 to state 3 as seen in FIG. 52.

State 3 begins with a B pulse which is at bit time T1 and the first T pulse that could count counter V of FIG. 56 will arrive at bit time T2. Counter V was precounted two counts using B pulses during states 1 and 5. With T pulses used as a scan count, ten per digit time, counter V is counted to $V=9$ at bit time T8 which makes $V=9$ output high at T9 time and will continue to be high for every digit at T9 time until counter V receives another precessed count. Another precess count would cause $V=9$ to be high at T8 time.

The output $V=9$ which is high at T9 time is gated with Adder–0 to set flip flop AD2, as seen in FIG. 56. Adder–0 will produce an output at bit time T9 only if a zero is stored in that digit position. AD2 is reset by the next D pulse at bit time T0, and is therefore ready to indicate a match, if the next digit emerging from the adder is a zero. Had the digit been greater than 0, Adder-0 would have been cut off at T9 leaving AD2 reset.

The same D pulse which resets AD2 is gated to trip counter VI into its $(VI\neq 9)$ condition. Counter VI is then counted back up to $(VI=9)$ by *t* pulses. While the condition $(VI=9)$ prevails, for nine bit times, it is gated with *tvu* pulses and an appropriate scanner output to prime the rack stop thyratron corresponding to the digit position in which the zero occurred. Because the digit scanned in the accumulator has been delayed one digit time in the adder and one digit time by counter V, the appropriate scanner output is SD3 for DP1, SD4 for DP2, etc., since the scanner is advanced one count each digit time and it entered state 3 with SD0 high during digit time DT0 since it had been reset in state 0.

After all digits in the word have been matched for zeros, and the appropriate rack step thyratrons have been primed, an emitter signal is produced, stretched into a modified emitter signal in FIG. 40, and used to fire the thyratrons which have been primed.

Counter V is now precounted under the control of AD3 which is set by MES and gates the first E pulse presented by the memory drum after the emitter signal. AD3 is then reset. It will be noted that counter V was being counted by T pulses to cause $(V=9)$ to be high at each digit time T9. The precess count by the E pulse causes the counter V condition $(V=9)$ to be high at digit time T8. This condition occurs after the rack stop thyratrons have been fired at the zero position of the actuator racks and the actuator racks are moving toward the ones digit print position. At this time state 3 functions are repeated, but matching will take place with ones instead of zeros. Only zeros and ones will produce an output from the Adder–0 at T8 time. The thyratrons have already been fired for zeros, however, and so only the rack stop thyratrons corresponding to the digit positions occupied by ones will be fired during the second cycle through state 3.

State 3 is cycled through again and again, each time matching for successively higher order digits, and priming the rack stop thyratrons. These are fired each cycle by the MES signal which also precounts counter V for the next matching operation. Thus during each cycle of state 3, all the digits in the word being read out are successively examined for the value represented by the next position in which the actuator racks of FIG. 30*a* (all moving together) can be stopped. Then all of the appropriate racks are stopped simultaneously by the MES signal. Since the keyboard printer is mechanically limited in the nines position no emitter signal is provided for the nine digit and the rack stop solenoid is not energized for nines. The time required for the actuator rack to move from one digit position to the next is several word times so that the accumulator word is scanned several times but only one emitter signal is applied for each digit position of the actuator rack and this one signal for each digit position fires all thyratrons whose RC circuits 382 in FIG. 32*a* have been set by the match. In addition to the fact that each thyratron match grid is driven high enough to fire the tube at the digit scanned, the match signal is produced for each succeeding digit and repeatedly fires the thyratron. As an example, the thyratron which was fired at zero digit position is also fired at 1 to 8 positions, but this does not affect the solenoid whose pawl is locked under the leading edge of an actuator rack stop tooth when it is first fired. The MES fire signal is produced at the last portion of the digit position scanned and, for this reason, it is used to set AD3 which precessses counter V with one E pulse (after AD3 is set) and starts the scanning of the next higher order digit in the accumulator. The next following MES pulse is not produced until several word times later which does not permit misfiring of the rack stop thyratron at the wrong digit position.

As already explained counter V is precessed for each digit 1 to 8 in the scanning operation and ($V=9$) will be high at T0 if the accumulator had been scanned for nines. Since the actuator racks are stopped mechanically at their nine positions after all other possible digits are eliminated, this cycle of state 3 is skipped and the computer is set into state 4 by gating ($V=9$) with a W pulse which occurs at time T0 as seen in FIG. 52.

State 4 is a waiting and preparation state to condition the computer for a print check which takes place in state 6. During this state a *t* pulse will clear counter VI and counter V as seen in FIGS. 56 and 58, and flip flop AD2 is set if the minus sign function thyratron in FIG. 31*a* has been fired to index L18 which sets switch S33. State 4 is a waiting state and must wait for timing cam switch TC–3 of FIGS. 30*c* and 31*c* (switches readable) to close at near midcycle creating the (Keyboard Signal) before changing control to state 6. The next W pulse coinciding with ~AD4 shifts control to state 6 at digit time DT0.

During the print check accomplished in state 6, the switches of FIG. 44, which were set during state 3, are checked against the word still retained in the accumulator. In FIG. 34*b* the scanner is counted by D pulses for the print count check when in state 6 under PR instruction. The scanner is shown in FIG. 34*a* also, with the SD conditions indicated. All twelve keyboard digits are scanned, but in the comparison operation for counter II with counter VI every other digit is compared starting with digit position DP2. A second word time is consumed in comparing the odd digits. Should the data, read back from the keyboard switches, appearing at counter VI differ from the data of the accumulator loop appearing at counter II, the print alarm will be sounded as shown in FIG. 38.

The print check operation is similar to the keyboard instruction in that the decimal switches are scanned and the information is set into counter VI. Counter VI is counted out and the time of ($VI=9$) is compared with the time of ($II=9$), representing information recirculating in the accumulator. The word recirculating in the accumulator is gated through counter II by the alternator signal AD4 as shown in FIG. 23. At digit time DT0 when AD4 is high there is no sign input to counter II, and at digit time DT1 when counter II is read-out, there is no output from counter II. Counter VI also produces no output at this time since there is no sign digit read from the decimal switches. At digit time DT2, when SD2 and AD4 are high, the second lowest order digit is set in counter VI. This digit is read out of counter VI by the print check count-out, as shown in FIG. 58 at digit time DT3 and during ~AD4 time. At digit time DT2 counter II was counted in during AD4 time by the second lowest order digit of the accumulator, and is counted out by ~AD4 at the same time as counter VI. At the outputs of counters II and VI are digits of identical order appearing at the same time. These digits are compared by the comparison circuit of FIG. 38 and should they differ in any respect the alarm circuit is energized, halting the computer. At the end of the second word time a W pulse gated with ~AD4 returns the computer to state 0. This identical operation is performed during state 6 of the KY instruction as hereinbefore explained. FIG. 38 also shows that the signs of the two words are also compared during state 6, and if they fail to correspond, flip flop CN4 is reset and the alarm circuits are energized.

*Shift Right or Left Operation*

The index of functions for the SL or SR operation is as follows:

| State | SL and SR instruction | Figure |
|---|---|---|
| 1 | B. (Halt) ---- reset CN4 | 37a, 45. |
| | UL.B ---- set counter VI | 29. |
| | B. ---- stste 5 | 53, 61. |
| 5 | ~DD1.(Halt) ---- state 0 | 53. |
| | ~DD2 ---- no shift | 22, 48. |
| | SL.DD2.(Delay-1) ---- 1 to AR track | 22, 28, 46, 48. |
| | SL.DD2.(Delay-0) ---- 0 to AR track | 22, 28, 46, 48. |
| | SR.DD2.AR-1 ---- 1 to AR track | 22, 28, 46, 48. |
| | SR.DD2.AR-0 ---- 0 to AR track | 22, 28, 46, 48. |
| | W ---- state 6 | 53, 61. |
| 6 | SL.~DD1.(Delay-1) ---- 1 to AR track | 22, 28, 46, 48. |
| | SL.~DD1.(Delay-0) ---- 0 to AR track | 22, 28, 46, 48. |
| | SR.~DD1.AR-1 ---- 1 to AR track | 22, 28, 46, 48. |
| | SR.~DD1.AR-0 ---- 0 to AR track | 22, 28, 46, 48. |
| | DD1 ---- no shift | 22, 48. |
| | DD1.(VI-9) ---- state 0 | 53, 58. |
| | W ---- count VI | 43. |
| | W ---- state 5 | 53, 61. |

By pinning in the first and third pinboard sections 6—81 the instruction ← *b*, where *b* is between 0 and 9, the accumulator word is shifted left the number of decimal places indicated by the *b* digit, or, if the pinboard of FIG. 36 is used, the absolute value instruction A is pinned, together with a tens level "1" for left shift and a units level indicating the number of shifts which is to take place. The operation is diagrammatically shown in FIG. 61. When the 0 position is pinned, a ten place shift results. At the end of state 1, the B pulse always sets the 10's complement of the units position into counter VI and changes control to state 5. If H, or *, of the pinboard of FIG. 36 is used, is also pinned, flip flop CN4 is reset in state 1, and the computer will halt when it next reaches state 0, which is immediately after the beginning of state 5.

In state 5 digits D0–D10 are shifted left one digit position at digit time DT2–DT12, and digit D11 is shifted left in state 6 at digit time DT0. During a left shift, the most significant digit (DT12) is dropped and a 0 is brought in on the right at DP1. During a right shift, on the other hand, the least significant digit (DP1) is dropped and a 0 occupies the most significant position DP12. The W pulse changes control from state 5 to state 6, and at the end of digit time DT0 counter VI, which keeps track of the number of shifts desired, is inspected to determine whether control should be changed back to the idling state 0. If not, the next W pulse counts counter VI once and changes control back to state 5 where operation is repeated until the total number of shifts are performed. The various gated paths used in shifting are shown in FIGS. 22, 28, 46 and 48.

For shifting right, the timing of the operation is identical except that the word is shifted to the right, and the instruction is performed by pinning → *b* in the first and third pinboard sections 6—81 and 6—89, or, if the pinboard of FIG. 36 is used, by pinning A 2 *b* respectively in the three sections.

*Unconditional Transfer Operation*

The index of functions for the UT instruction is as follows:

| State | Transfer UT instruction | Figure |
|---|---|---|
| 1 | C ---- fire transfer thyratron R3 | 51. |
| | R3 ---- ⑥ | 35c, 54. |
| | C ---- state 2 | 51. |
| 2 | ⑥.~inter. (Halt) ---- set AD2 | 37a. |
| | ⑥.C ---- fire B thyratron | 51. |
| | BSw.=TL ---- ㉘ | 35d. |
| | ⑥.B.(㉘ v NP) ---- state 3 | 51. |
| 3 | ⑥.B ---- fire C thyratron | 51. |
| | CSw=UL ---- ㉕ | 35d. |
| | ⑥.C.㉕ ---- state 4 | 51. |
| 4 | ⑥.CN3 ---- fire R1 start thyratron | 54. |
| | ⑥.C ---- fire A thytron | 51. |
| | ASw=BSw ---- ㉖ | 35c. |
| | ⑥.B.㉖ ---- state 5 | 51. |
| 5 | ⑥.B ---- fire X thyratron | 47. |
| | SS4=CSw ---- ㉙ | 35d. |
| | ⑥.C.㉙.④ ---- fire R4 reset thyratron | 47. |
| | ⑥.C.㉙.④ ---- state 0 | 51. |

To perform the unconditional transfer operation, the instruction U–*ab* is set up in the pinboard sections 6—81, 6—87 and 6—89 to instruct the computer to transfer the control to pinboard *a* step *b*. In accomplishing the transfer, the B and C stepping switches are advanced to remember the positions *a* and *b* pinned in the pinboard, so that the complete instruction U—*ab* is retained after the stepping switches are advanced. The B memory switches SSB1 and SSB2 are shown in FIGS. 35*b* and 35*d* where SSB2 is wired to match the tens level and SSB1 is wired to match SSA2. The C memory switch SSC1 and SSC2 are shown in FIG. 35*d* where SSC1 is wired to match the units level and SSC2 is wired to match the step level of SS(I to V)4. After the instruction is in storage so that it can be remembered, the pinboard scanning switches are advanced to positions corresponding to switches B and C.

The first C pulse in state 1 which arrives once per drum revolution and intermediate two B pulses, fires the thyratron which operates relay R3 to generate the signal ⑥. This relay is used to retain the instruction during the transfer because the stepping switch will lose the U instruction voltage as soon as it advances. In addition, the C pulse transfers control to state 2.

While the computer is in state 2, the B switch is inspected by B pulses to see whether it is in the position desired, which is manifested by the signal ㉘. When the B switch reaches the tens level, it will produce ㉘ and on the next B pulse control will shift to state 3. But until 28 is produced, C pulses continue to step the switch once for each pulse. After the stepping switch is advanced, which requires 1 to 1½ drum revolutions, the succeeding B pulse inspects the B switch until the switch is in the desired position where control changes to state 3.

It should be noted that if the non-print instruction is pinned (on either pinboard) together with the UT instruction, or any instruction that produces a ⑥, the operations of state 2, will be avoided and control will go directly to state 3.

In state 3 the same procedure occurs with respect to the C switch, with the C pulse inspecting the switch because it is the first pulse available in state 3 after it is initiated by a B pulse. Thus, the transfer is performed in less time by inverting the sampling procedure to cause the inspection and stepping to be performed by the consecutive C and B pulses. At the end of the C switch stepping operation, after ㉕ is produced, control is transferred to state 4 by the C pulse. In state 4 the A switch, which selects a pinboard, is advanced by firing the A thyratron with C pulses until it agrees with the B switch position, as indicated by ㉖. Transfer is then made to state 5 with the B pulse as soon as the A switch and the B switch agree. In state 5 the B pulse fires the X thyratron, scanning pinboard steps, until a ㉙ is produced, indicating that the pinboard selected agrees with the position of the C switch. A C pulse then fire the R4 thyratron and returns the computer to state 0, where the newly selected instruction is performed.

*Conditional Transfer Operation*

The index of functions for the CT instruction is as follows:

| State | Transfer CT instruction | Figure |
|---|---|---|
| 1 | Adder-1 ---- set AD2 | 42. |
| | C.~ AD2 ---- reset AD1 | 41. |
| | C ---- reset AD2 | 42. |
| | C.~ AD1 ---- state 0 | 51. |
| | C.AD1.AD2 ---- fire R3 transfer thyratron | 51. |
| | ---- State 2 | 51. |
| 2 | Same as UT | |
| 3 | Same as UT | |
| 4 | Same as UT | |
| 5 | Same as UT | |

The conditional transfer operation is performed by pinning the instruction C–*ab* in the pinboard and depends upon the sign in the accumulator to cause a transfer only if the sign is minus. It is not desirable to transfer for a negative 0, however, and therefore the Adder–1 output of the accumulator is examined in state 1 to determine whether the word in the accumulator contains any non-zero digits. If so, AD2 is set. The first C pulse examines the state of AD1. If it is reset (indicating a positive sign), the outcome of the zero check will not change the sign, so control is changed to state 0. If flip flop AD1 indicates a negative sign however, the sign can be made positive if the word contains all zeros. By this time, that fact is indicated by the state of AD2. If it has been set (by non-zero digits from the Adder) control is transferred directly to state 2, firing R3, and AD2 is reset.

If AD2 is found in its reset condition, however, the C pulse resets AD1 to indicate a positive sign, and the next C pulse shifts control to state 0.

When the computer goes into state 2 in the CT instruction, later operations are identical to those in the UT instruction.

*Stepping Transfer Operation with the Z Switch*

The index of functions for the ST instruction is as follows:

| State | Step Z Switch instruction | Figure |
|---|---|---|
| 1 | Set AD2 | 37a. |
| | C ---- fire Z thyratron | 37a, 51. |
| | Z Sw=c ---- ㉚ | 35d. |
| | C.㉚ ---- fire R3 | 51. |
| | ---- state 2 | 51. |
| | B ---- state 0 | 51. |
| 2 | Same as UT | |
| 3 | Same as UT | |
| 4 | Same as UT | |
| 5 | Same as UT | |

To set up the operation which steps the Z switch once, S–*abc* is pinned in the respective pinboard sections 6—81, 6—87, 6—89 and 6—83. This instructs the computer to step the Z switch once, and when the Z switch steps past *c*, where *c* is between 0 and 15, to transfer control to pinboard *a* step *b*. During state 1, a C pulse fires the Z thyratron to step the switch once. If the next C pulse finds the Z switch is at the position *c* it fires the R3 thyratron which changes control to state 2 and effects the unconditional transfer operation. If the R3 thyratron is not fired, which occurs when the Z switch is not yet in position *c*, the next B pulse changes control to state 0 where the next instruction may be performed. The Z switch SSZ3, is shown in FIG. 35*b* wired to the "*c*" level of the pinboard (I4 to V4) and the circuit is wired through the SSB3 switch which is set to the pinboard I–V in which the instruction is being performed.

*Home Z Switch Operation*

The index of functions for the HS instruction is as follows:

| State | Home Z Switch instruction | Figure |
|---|---|---|
| 1 | C ---- fire Z thyratron<br>(Z SW.=0) ---- ㉗<br>B.㉗ ---- State 0 | 51.<br>35c.<br>51. |

In this operation which is performed by pinning the 0 in the first pinboard section 6—81, the Z switch is automatically stepped back to 0 position so that it is ready for any further stepping under the control of the step transfer operation. During state 1, a C pulse fires the Z thyratron to step the Z switch once. When the next B pulse arrives, if the Z switch is in the home position, as indicated by ㉗, control goes to state 0 to await the next instruction. However, if there is no ㉗, the next C pulse steps the Z switch again until home is reached. The Z switch SSZ4 is shown in FIG. 35*b* wired to the zero tap at the contact.

*Special Start Operation*

The index of functions for the Special Start instruction is as follows:

| State | Special Start instruction | Figure |
|---|---|---|
| 0 | Push special start button ---- ⑤ | 35a, 35c, 35d. |
| | Release special start button ---- ④ | 35a, 35c, 35d. |
| | C.⑤.㉛ ---- fire R3 | 47. |
| | ~R2.R3 ---- ⑥ | 35c. |
| | C.⑥ ---- fire R1 | 47. |
| | ~R2.R1 ---- ⑩ | 35c. |
| | C.⑩ ---- set CN4 | 45. |
| | Clear scanner ---- SD0 | 34a. |
| | Reset AD2 | 42. |
| | t ---- clear V | 56. |
| | t ---- clear VI | 44, 58. |
| | B.⑬.⑨.⑥.CN4 ---- fire X thyratrons | 47. |
| | ---- fire MV | 39a, 39b, 47. |
| | ---- fire R2 | 39a, 39b, 47. |
| | R2 ---- ㉜ | 35c. |
| | B. --㉜-- state 1 | 47. |
| 1 | C. ⑥---- state 2 | 51. |
| 2 | Same as UT | |
| 3 | Same as UT | |
| 4 | Same as UT | |
| 5 | Same as UT | |

The special start operation is provided to enable the operator to start the operation of the computer at the pinboard corresponding to the special start button selected, and at the first step in that pinboard.

To initiate the operation, the operator selects one of the special start buttons in FIG. 35*a* (one for each pinboard), and pushes it, producing a ⑤. This signal is gated with ㉛ (indicating that neither R1 nor R2 have been fired) to fire R3 and produce the transfer signal ⑥. ⑥ is gated with the next C pulse to fire R1, thereby actuating the lead from the contacts RY1 in FIG. 35*b* to the special start switches 7—123 in FIG. 35*a* and to the manual units level selector. R1 also produces ⑩ which sets CN4.

In the meantime, flip flop AD2 has been reset, and counters V and VI and the scanner have been cleared, which events always occur in state 0.

The next B pulse is gated with ⑥ and ⑨.⑬ (indicating normal pinboard operation) and CN4 to fire the X thyratron, thus advancing the pinboard one step, and at the same time to fire R2 via the multivibrator of FIGS. 39*a* and 39*b* to interrupt the cathode circuit of the Z thyratron so as to reset it after the stepping switch is stepped. R2 produces a ㉜ which is gated with the next B pulse to change control to state 1.

State 1 is merely a waiting state in which the computer waits for a C pulse before going into state 2. From state 2, all operations are identical to the UT instruction, with the exception that R1 is energized throughout. This has the effect of removing operating potential from SSA1 in FIG. 35*b* and thus from the pinboard, even though switch 7—109 in FIG. 35*a* is in the pinboard position. The tens level is instead fed by the selected special start switch in FIG. 35*a* and the units level is fed by the signal ⑩ from the normally open contact of RY1 in FIG. 35*c*, as shown in FIG. 35*a*.

*Other Instructions—Modified Pinboard*

Several modifications have been mentioned hereinbefore, and will be enumerated for purposes of clarity. The preferred embodiment pinboard and manual control panel is shown in FIGS. 6 and 7, and the modified controls are shown in FIG. 36. Most of the operations of the computer are identical whether the pinboard of FIG. 6 is used, or the pinboard of FIG. 36 is substituted for it. The operations that are not the same will now be described.

The major modifications of the control panel of FIG. 36 is to expand the number of pinboards provided, and to substitute two special stepping switches E and F, for the single Z switch provided with the pinboard of FIG. 6. The manner in which this modified control panel may be incorporated into the present embodiment is shown in FIGS. 36, 37, and 37*a*, and will be described hereinafter.

In the modified pinboard of FIG. 36, provision is made for pinning the A column to designate the Shift and Absolute Value instruction. The manner in which this instruction is pinned is shown in FIG. 37*a* and the logical outputs may be applied to the logical diode circuits, FIGS. 41 to 55 in the same manner as has been hereinbefore explained for the preferred embodiment. The shift operation is otherwise the same as that of the FIG. 6 pinboard, as has been described. To illustrate how this instruction may be connected into the present computer an index of function for the AS instruction is included as follows:

| State | AS instruction | Figure |
|---|---|---|
| 1 | (Shift).B ---- state 5 | 37a, 53. |
| 5 | TL3vTL4v* ---- state 0 | 37a. |
| | TL3 ---- reset AD1 | 37a. |
| | TL4 ---- set AD1 | 37a. |

Positive absolute value is accomplished by pinning 3 in the tens level. At the end of state 1, the B pulse changes control to state 5. The first pulse in state 5 resets flip flop AD1, making the accumulator positive and changes control back to state 0.

Negative absolute value is accomplished by pinning 4 in the tens level. At the end of state 1 the B pulse changes control to state 5. The first pulse in state 5 sets AD1, making the accumulator negative, and changes control to state 0.

The Z switch of FIG. 6 may be replaced with two address modification stepping switches E and F shown in FIG. 37, which illustrates how they are connected in place of the Z switches in FIGS. 35*b* and 35*d*. The step operations of the switches may be separate or in unison, depending on how the tens level of the pinboard is pinned.

The index of functions for the Step the Special Switch instruction is as follows:

| State | Step E or F Switch (ST) instruction | Figure |
|---|---|---|
| 1...... | Set AD2 | 37a. |
| | C.(TL=0) .... fire E thyratron | 37a. |
| | C.(TL=1) .... fire F thyratron | 37a. |
| | C.(TL=2) .... fire E thyratron | 37a. |
| | .... fire F thyratron | 37a. |
| | C.(TL=0)(E=UL) .... fire X thryatron | 37a. |
| | C.(TL=1)(F=UL) .... fire X thyratron | 37a. |
| | C.(TL=2)(E=UL) .... fire X thyratron | 37a. |
| | B .... state 0 | 37a. |

The ST instruction causes the modified special switches E or F to step, and this instruction is used to perform what is called a branch operation. Either the E switch, or the F switch, or both, may be stepped one step with this instruction. If, at the beginning of the instruction, the position of the E (or F) switch is equal to the number pinned in the units level, *b*, the next instruction will be skipped over by firing the X thyratron, and the next following instruction read. If there is no equality, the next instruction will be executed, in regular course. If 0 is pinned in the tens level, the E switch will be stepped and the branch will be made when E equals the units level digit. If 1 is pinned in the tens level, the F switch is stepped and the branch will be made when F equals the units level digit. If 2 is pinned, both the E and F switches will be stepped, and the branch will be made when E equals the units level digit.

In state 1 of the ST instruction the C pulse fires the E (or F) thyratrons according to the tens level pinning. This same C pulse fires the X thyratron, thus stepping the active stepping switch, if the units level digit equals the position of the E (or F) switch. This accomplishes skipping the next instruction. Then a B pulse changes control back to state 0.

The method of connecting the E and F switches to the preferred embodiment circuits is shown in FIG. 37. SSE1 is substituted directly for SSZ1 of FIG. 35*d*, and SSF1 and SSE3 are substituted directly for SSZ2 in FIG. 35*d*. All of these switches operate in the same manner. When the units level pinboard is pinned at E, for example, that pin is connected directly to the rotor of the SSE3 stepping switch. The rotor, in turn, rests on one of its contacts which are connected back to respective units level pins. Thus if the position of the E stepping switch is 4, for example, the output from pin 4 of the units level will be high, just as if a pin had been placed there.

The switches SSZ3 and SSZ4 in FIG. 35*b* are not used with the pinboard of FIG. 36, and the Z thyratron in FIG. 35*d* is replaced by E and F thyratrons. Of course, each time the E or F thyratron is fired, the multivibrator of FIGS. 39*a* and 39*b* is also fired, to allow R2 to interrupt the cathode circuit, just as in the Z switch operation.

The sections SSE2 and SSF2 of the E and F switches are provided in FIG. 37 to indicate via lamps 390 what step each switch is on when its respective switch, 37—400 or 37—401 is depressed. The other structure of FIG. 37 merely illustrates that it is identical to FIGS. 35*a* and 35*d* in all other respects except the number of pinboards.

The index of functions for the Home the Special Switch Instruction is as follows:

| State | Home E or F Switch (HS) Instruction | Figure |
|---|---|---|
| 1....... | C.(TL=0) .... fire E | 37a. |
| | C.(TL=1) .... fire F | 37a. |
| | C.(TL=2) .... fire E | 37a. |
| | .... fire F | 37a. |
| | B.(TL=0)(E=UL) .... state 0 | 37a. |
| | B.(TL=1)(F=UL) .... state 0 | 37a. |
| | B.(TL=2)(E=UL) .... state 0 | 37a. |

The H instruction of the FIG. 36 pinboard directs that the special switches be homed to any selected position. This is not to be confused with the halt instruction of FIG. 6. This instruction homes either the E switch or the F switch, or both, to the step pinned in the units level. If 0 is pinned in the tens level, the E switch will be homed, to the units level position. If 1 is pinned in the tens level, the F switch will be homed to the units level position. If 2 is pinned in the tens level the E switch will be homed to the units level position and the F switch will step each time the E switch steps. The switch chosen by the tens level digit will be stepped until it reaches the step that is pinned in the units level.

In state 1 of the H Instruction (FIG. 36), the C pulse fires the E or F thyratron (or both) according to the digit pinned in the tens level. The B pulse will change control back to state 0 if the switch selected has reached the position designated by the units level digit. Otherwise, the next C pulse will again fire the thyratron.

The modified pinboard of FIG. 36 may also be used to provide functions not permitted by the pinboard of FIG. 6. An auxiliary column T has been provided, for example, which permits the introduction of data into the computer from an auxiliary tape input device (not shown). FIGS. 57 and 58 show part of the structure within the present computer that could accommodate such data. During state 6, counter VI can be set from tape input data during ~DD1 (or DT0) as shown in FIG. 57. Controls may then change to state 5, and counter VI is counted up to nine during ~DD1 time. When counter VI reaches nine, the data set therein during state 6 is counted out to the adder. The next W pulse clears counter VI by counting it to ten, as shown in FIG. 58. Thus, successive digits may be read directly from tape into the adder. Control may then change back again to state 6 to repeat the operation. A suitable error checking circuit may operate the computer alarm as shown in FIG. 38.

No further structure has been shown in connection with the tape read-in operation because of its apparent similarity to the KY operation.

It is evident from the foregoing specification that an improved electronic computer system is afforded having many advantages over prior art computer systems.

Accordingly, those novel features descriptive of the improvements afforded to the art by the inventor are defined with particularity in the following claims:

What is claimed is:

1. An electronic computer system comprising in combination, a data input device which includes temporary storage means capable of being manually conditioned to represent data information including a plurality of digits, an electronic counter coupled to said storage means, a scanning circuit coupled to said storage means for successively presetting said counter in accordance with successive ones of said digits represented by said temporary storage means, computer arithmetic circuits coupled to said counter and adapted to receive said data from said temporary storage means, and electronic control circuits coupled to said scanning circuit, said counter and said arithmetic circuits for synchronizing the setting of said counter and counting out said counter into said computer arithmetic circuits.

2. An electronic digital computer system comprising a data input device which includes temporary storage means capable of being conditioned to represent data information including a plurality of digits, an electronic counter coupled to said storage means, a scanning circuit coupled to said storage means for successively presetting said counter in accordance with successive ones of said digits represented by said temporary storage means, computer arithmetic circuits coupled to said counter and adapted to perform a data processing operation on pulses representative of said successive digits, an external program control device, electronic control circuits selectively responsive to signals from said control device to select the sequence in which said control device shall control the computer system, and internal timing circuits coupled with said counter and also with said control circuits and said computer arithmetic circuits, said control device coupled with said timing devices, said data input device, said scanner, said counter, and said arithmetic circuits to perform a data processing operation on said data information.

3. In a computer system having a plurality of internal memory addresses, a pinboard control panel for externally programming the computer, said control panel having a first section coupled to the computer for selecting an instruction which directs the mode of computer operation and separate sections coupled for selecting one of said plurality of memory addresses, an address counter for specifying a memory address, a stepping switch for automatically sequentially selecting an instruction and an address from said pinboard panel, and control circuits for stepping said stepping switch and simultaneously reading the selected instruction into the computer and setting the address counter whereby a selected instruction operation is performed on a selected memory address.

4. A pinboard circuit as defined in claim 3 including a further pinboard section operatively coupled to control a stepping circuit for automatically making a predetermined number of passes through a said program.

5. An automatically sequenced electronic computer, in combination with means for reading keyboard information into the computer, comprising a keyboard actuated printer having a plurality of printing format control means set up to perform different predetermined operation schedules and a plurality of motor bars for selecting the different modes of operation within a schedule, at least one of the motor bars constructed to tabulate the format control means to a position dependent upon the resident tabulated position, means under control of the computer for actuating one of the motor bars to determine the printing format, means for reading information out of the computer into the printer, and means in the computer to prevent keyboard actuation of the printer from reading information into or out of the computer in the absence of predetermined input and output program signals.

6. The combination defined in claim 5 wherein the keyboard actuated printer has an operation cycle asynchronous from the computer operation cycle, a timing mechanism in the printer operable to direct the computer to receive information from the printer one digit at a time, and means in the computer operable to receive in response to the timing mechanism information in the printer keyboard one digit at a time in synchronism with the computer operation cycle.

7. The combination defined in claim 5 including means for programming the computer to direct the printer to follow a predetermined format schedule, and automatic means for selectively causing the printer to print at different scheduled format positions only in response to a predetermined signal condition developed in the computer.

8. The combination defined in claim 7 including separate solenoid operated controls in the printer under direction of signals in said computer for initiating the printer operation cycle, setting up a printing array in response to computer output signals, selectively operating the printing mechanism, and printing a minus sign for negative numbers.

9. The combination defined in claim 5 wherein the means for reading information into the computer comprises a series of switches in the printer, a printer rack for engaging the switches to set up keyboard information, and means in the computer for scanning the switches one by one to read the number synchronously into a computer register.

10. The combination defined in claim 5 wherein the means for reading information into the computer is responsive to manual operation of a motor bar, and including means for causing the computer to begin an automatic computation sequence in response to the motor bar actuation.

11. In a computer system having a plurality of internal memory addresses, a plurality of pinboard control panels for externally programming the computer, said control panels having a first section coupled for selecting an instruction which directs the mode of computer operation and separate sections coupled for selecting one of said plurality of memory addresses, an address counter for specifying a memory address, a stepping switch for automatically sequentially selecting an instruction and an address from said pinboard panel, means for initiating the automatic sequencing at a different one of said pinboard panels, and control circuits for stepping said stepping switch and simultaneously reading the selected instruction into the computer and setting the address counter whereby a selected instruction operation is performed on a selected memory address.

12. In an electronic computer for processing data words of a fixed number of decimal digits; arithmetic circuit means for performing over and over addition type of multiplication upon the data words comprising a first closed loop data word path, an adder circuit in said first closed loop path, said adder circuit including delay means to afford storage of one decimal digit, a circulating memory means to afford storage of all but one digit of a data word and being coupled to said first closed loop, a second closed loop coupled to said circulating memory means and including a further delay means for storing a further decimal digit; and means for optionally coupling to said circulating memory said first or said second closed loop data word paths with said circulating memory means whereby addition or a decimal digit delay is performed on a word during a single pass in said circulation paths.

13. An electronic digital computer comprising a data output printing device which includes rack stop means for conditioning print bars in said printing device to represent data information stored in said computer, circulating computer arithmetic circuits for storing digit data, an electronic counting means coupled to said arithmetic circuits for identifying the magnitude of said stored digits, scanning circuits synchronized with said arithmetic circuits and coupled to said rack stop means for identifying the order of presentation of digits stored in said arithmetic circuits, and internal computer timing circuits responsive to print bar positions in said printing device, said circuits coupled with said counter and with said scanning circuits for identifying the order and magnitude of said digits and creating a rack stop signal which releases the rack stop means to set said print bars representative of data stored in said arithmetic circuits.

14. A combination as defined in claim 13 including switch means for storing the information set in said print bars, and means for comparing the digit data stored in said switch means and said computer arithmetic circuits whereby a print check operation is performed.

15. In an automatically sequenced electronic computer having a plurality of memory addresses, a program selection matrix of rows and columns of conductors for externally programming said computer, said conductors adapted for interconnection, pins for interconnecting said conductors at different matrix positions, said matrix including a first section coupled to the computer for selecting an instruction which directs the mode of computer operations and separate sections coupled for selecting one of said plurality of memory addresses, an address counter for specifying a memory address, a stepping switch for automatically reading said selected instruction from said matrix into the computer and said selected address into said counter whereby a selected instruction operation is performed on a selected memory address.

16. In an automatic sequenced electronic computer, external program means for specifying different instruction operations to be performed upon data located in memory addresses, said means comprising a plurality of pinboards each presenting a selection matrix of rows and columns of conductors adapted for interconnection by insertion of a pin in defined matrix positions, said columns defining different modes of computer operation and memory addresses, said rows defining different instructions operation, a first selection circuit for manually starting said computer at a desired one of said pinboards, a separate selection circuit for the rows of conductors in each pinboard, and control circuitry in the computer for stepping the selection circuits from one instruction to another in response to synchronous computer signals.

17. The combination defined in claim 16 where each selection circuit comprises a stepping switch and including means for interrupting the current path through the stepping switches in response to a stepping signal while the switch contacts are still in engagement.

18. The combination defined in claim 17 wherein a further array of stepping switches, each connected for storing temporarily the information contained in one of said selection circuits during computer operations is programmed to transfer control from one pinboard interconnection to another.

19. The combination defined in claim 16 wherein a separate indicator device is provided for each pinboard selection, and each pinboard column selection, the device being operable in response to operation of the selection circuits.

20. The combination defined in claim 16 including a stepping circuit connected for choosing a modified program instruction in response to a predetermined computer signal.

21. The combination defined in claim 16 including a stepping circuit connected for causing a program subsequence to be repeated for a preset number of iterations.

22. An electronic computer comprising, in combination, rotatable memory means having a data storage memory section and a timing memory section, an accumulator loop in said memory means adapted to receive data from the data storage memory section and modify and store an accumulator word, a short access time register in said memory means adapted to store a multiplicand word or a divisor word at a plurality of sequentially presented positions within a memory rotation cycle, keyboard-printer input-output means operatively coupled to the accumulator loop to enter input information and receive output signals, means for synchronously transducing information between the keyboard-printer input-output means and the timing section of the rotatable memory means, a program storage device having a plurality of preset instruction steps, means for sequentially and selectively scanning a plurality of said preset instructions, controllable computer means for step by step operation through a plurality of predetermined procedural steps each identified by said preset instructions, control means connected for receiving the scanned instructions and automatically cycling the computer operation through corresponding procedural steps, means automatically operable for selectively controlling the state of operation of the computer for different procedural steps, scanning means for serially addressing numerical digits set up in the keyboard of the keyboard-printer input-output means to thereby identify them and permit selection of desired digits at a specified time period, means operable to perform arithmetic steps directly from the keyboard-printer input-output means including said scanning means for selecting keyboard digits, means for reading the short access time register from the sequentially presented positions, and means responsive to the multiplicand or divisor words read from the short access time register for processing with the accumulator word stored in the accumulator loop to effect either multiplication or division.

23. An electronic computer system normally following a sequential operation of instruction steps among which is a count instruction step, instruction counting means, means for presetting a predetermined count in the counting means, means for initiating a single count in the counting means in response to the computer count instruction, a conditional transfer circuit for controlling the computer to depart from the sequence of instruction steps and select a specified instruction step at the predetermined count in the sequence, means operable at the count instruction step for transferring operation to the next sequential step until said preset count is reached, and means responsive to the count instruction operable upon reaching the preset count for actuating said conditional transfer circuit thereby transferring operation to a predetermined instruction step other than the next sequential step.

24. In an electronic computer, means for causing the computer to normally follow a sequence of instruction steps, counting means, means for presetting the counting means to count to a specified count, a transfer control circuit in the computer for enabling the computer to depart from the sequence of instruction steps at a predetermined position in the sequence and to select a specified instruction step, means operatively connected to the counting means and to the transfer control circuit and being operable when the specified count in the counting means is reached for actuating said transfer control circuit to thereby transfer operation of the computer to said selected specified instruction step, and means for cycling the operation of the computer through a routine identified by the selected specified instruction step.

25. In an automatically sequenced electronic computer normally operable to automatically cycle through a sequence of programmed instructions, manual control means comprising, in combination, manually selective control means for causing the computer to perform a single instruction operation and stop automatically, manual instruction control means connected for directing the computer to perform a manually stored instruction operation rather than the automatic programmed instruction sequences, means for manually specifying and storing a desired instruction operation, and a plurality of manually operable computer start devices enabling the computer to resume the sequence of automatic programmed instructions after performance of said single manual instruction operation, each of said start devices specifying a different instruction of the sequence of automatic programmed instructions.

26. A combination as defined in claim 25 including an indicator device connected to signal the operator the completion of an instruction.

27. A combination as defined in claim 26 including a manual keyboard for inserting computer information, control circuitry permitting entry of information in the keyboard during computer operation, and computer circuitry for automatically entering the keyboard data when a specified operation is performed.

28. The invention described in claim 25 characterized in that a computer cycling control circuit is provided which is operable from said programmed instructions for entering address designations of data words to be processed, a storage device for providing to the cycling control circuit such addresses as part of the programmed instruction sequence, and optionally operable manual means for replacing the storage device upon command to supply variably selected storage addresses into the programmed instruction sequence.

29. A system for semi-automatic control of an automatically sequenced electronic computer comprising, in combination, instruction presenting means, automatic means for sequentially operating the computer responsive to the instructions of said instruction presenting means, control means for causing the computer to halt automatic operation responsive to a specified one of said instructions, operator alerting means actuated by the control means for indicating that the computer is halted and ready for a manual entry, and selective control means operable responsive to action of the first mentioned control means for enabling the operator to reinitiate the automatic sequence of the computer at any one of a plurality of predetermined inst uction positions.

30. In an electronic computer automatically sequenced through a series of program steps, the combination for producing flexible program control comprising, manual selection means for specifying a particular digit "*a*" or "*b*" of memory location "*ab*," means for specifying in a program step the memory location by one or both of the memory location digits specified in the manual selection means, and automatic program control circuits responsive to the specified program step for directing the computer to select data from that location identified by memory digits specified by the manual selection means.

31. An electronic computer comprising in combination, a multiple column keyboard assembly operated through an asynchronous internal cycle being manually settable to represent a plurality of digits to be inserted into the computer, mechanical switch means in said keyboard assembly operable during a keyboard assembly cycle to represent said digits set in said keyboard assembly, automatic electronic computer scanning circuits for sequentially scanning each digit set in said mechanical switch means, synchronous computer arithmetic circuits, an electronic counter presettable by said scanner to a condition representative of said sequentially scanned digits for counting said digits into said arithmetic circuit, and computer timing circuits coupled to said scanning circuits and said counter for reading said plurality of data from said mechanical switch in said asynchronous keyboard assembly serially into said synchronous computer arithmetic circuits.

32. A computer as defined in claim 31 wherein the keyboard assembly includes a semi-ganged printer for printing a plurality of decimal digits during an internal cycle, means for mechanically scanning the multiple columns serially through positions at which the respective decimal digits 0 through 9 may be stored, and electrical means for selecting storage positions in the printer one digit at a time from the electronic computer, and means under control of the electronic computer to initiate the internal cycle, thereby printing the stored characters.

33. A computer as defined in claim 32 including a pulse generator operable in the keyboard assembly to produce electrical printing signal pulses for digits 0 through 9 synchronized with the mechanical scanning of the printer, a generator of electrical printing signal pulses operable by said electronic computer scanning circuits to designate resident characters for each of said columns in serial fashion while the mechanical scanning means presents each one of said decimal digits 0 through 9, and means synchronizing the setting up of the printer concurrently from the electrical printing signal pulses in both the keyboard assembly and the electronic computer circuitry.

34. In an electronic computer system for electronically checking the printed output including an asynchronous cyclically operable printer for printing data stored in the computer, mechanical switch means in said printer operable during a printing cycle to represent data characters being printed by said printer, electronic computer storage circuit means in the computer for setting the printer and said mechanical switches, means representative of data in said storage circuit means, automatic electronic scanning circuits for sequentially scanning each character set in said switch means, an electronic counter presettable by said scanner to a condition representative of said sequentially scanned data characters, computer timing circuits coupled to said scanning circuits and said counter for reading said data characters from said counter, electronic comparison means coupled to said counter and said storage circuit, and means under control of said timing circuits for electronically comparing data characters set in said printer.

35. In an electronic computer system having a transfer instruction operation, a control panel having a plurality of instructions each comprising an operation level and a data level, first stepping switch means coupled to said computer and said operation level, second stepping switch means coupled to said computer and to said data level, computer control circuitry responsive to said operation level for stepping said second stepping switch means to a specific step determined by said data level, and further computer control circuitry means for temporarily disabling said computer control circuitry and stepping said first stepping switch means to coincide with said second stepping switch means, whereby an instruction may transfer control to any other of said plurality of instructions in said control panel.

36. In a system as defined in claim 35 wherein said control circuitry includes means responsive to computer instruction steps for stepping said first switching means to a selected starting position.

37. A system as defined in claim 35 wherein said first switching means includes two switches coupled for selective stepping, and control means coupled for optionally stepping the switches independently or in unison.

38. In an automatically sequenced electronic computer system, a series of stepping switches, solenoids for causing said switches to step, means for producing timing pulses for synchronizing the computer sequence, means operating the stepping switch solenoids synchronously with the timing pulses, means passing signal current pulses through the stepping switch contacts in synchronism with the timing pulses, and synchronously actuated means including a circuit path in series with the solenoid operating means for preventing motion of the stepping switches during the presence of the signal current pulses.

39. In an automatically sequenced electronic decimal pulse count computer including addition, subtraction, multiplication and division operational procedures, instruction means for producing different modes of operation, a decimal counter system for use in arithmetic processing comprising in combination, a one-digit decimal counter producing output signals for one specified count, means operating the computer in serial states including an idling state occurring between instruction steps, means for clearing the counter alternatively during the idling state in response to a readout instruction, circuit means for stepping the counter alternatively in response to the pulse count of one multiplication or division digit when the computer is in a given operating state, and means responsive to the counter output signals to both control the computer sequencing and produce output data digits to the computer memory circuits.

40. A counter system as defined in claim 39 wherein the counter includes alternative stepping means responsive to signals indicating the number of additions or subtractions, and operable in a further operating state.

41. In a synchronous electronic digital computer system actuated from a mechanical printer operable on an internal cycle asynchronous with the operation of the computer system, means responsive to the internal cycle of the printer for producing control signals to the computer system to enable the reading of computer signals into the printer, timing cam means forming part of the printer movable during the internal cycle, a series of electrical switches operable in sequence from the timing cam means, each such switch designating a different serially presented printer condition, means in the computer system for specifying a print-out of data from computer signals, means connecting the switches into the computer system for synchronizing output computer signals with the printer conditions, and means operating the printer in response to the computer signals.

42. An electronic computer system having internal computer timing circuits and automatic electronic arithmetic circuits and including, in combination, an input device having a plurality of switches upon which an input signal condition is capable of being set up by selectively operating certain ones of said switches, means operable from the computer timing circuits for reading input signals directly into the computer arithmetic circuits from said plurality of switches, said last-mentioned means including scanning circuits for selectively presenting said input signals to the arithmetic circuits, command instruction means for setting up different programs for the operation of the computer system, said command instruction means being in the form of a pinboard having a plurality of conductive terminals connected to the timing and arithmetic circuits of the computer system and further having a plurality of conductive leads capable of selective interconnection to the terminals by means of removable conductive pins for establishing the desired program instruction.

43. Means as defined in claim 41 wherein all the switches are commonly connected to a single control signal bus, each switch has an associated resistor of different ohmic value, and a supply potential is commonly connected to each resistor.

44. A system as defined in claim 34 wherein the printer has a plurality of columns for printing successive digits of the word, the electronic circuit timing means for distinguishing digits including an electronic scanning circuit comprising a series of bistable devices coupled for binary counting of timing pulses, each device having output leads for identifying respective counts representing the successive digits, a decoding matrix serving to clear and reset the counter for immediate operation with the next count after a count through all digits of a word, and a distributor circuit responsive to the output leads of the bistable devices for setting up the computer system words with the digits in the plurality of columns.

45. In an electronic computer system, a series of program pinboards, a series of stepping switches coupled to scan instruction steps on the pinboards in sequence, a circuit operable to pass current through the stepping switches during a specified time period, control circuits for the stepping switches, and an electronic interlock circuit connected to the stepping switch control circuits to de-energize the stepping switches during the specified time period so that each switch is stationary during presence of the current passage through its contacts.

46. In an electronic computer system, means for storing a plurality of instruction steps for specifying a sequence of different computer operations, a series of stepping switches connected for scanning the stored instruction steps in sequence, means responsive to one of the instruction steps for transferring control of the computer to an instruction step not in the sequence, and a further series of stepping switches connected to the first series of stepping switches for remembering instruction steps during said transfer of control.

47. In a computer system having a pinboard program control for storing and displaying and automatically sequencing instructions stored therein, separate storage means having instructions stored therein, general control circuits coupled to said separate storage means and said pinboard program control for automatically conducting a sequence of instructions in said pinboard program control, selector means included in said program control means responsive to an instruction for interrupting the sequence of instruction and connecting said separate storage means to said general control circuits for conducting an instruction operation in said separate storage means, and gating means in said selector means for automatically disconnecting said separate storage means and connecting said pinboard program control where automatic sequencing of instructions may be conducted from instructions located in a plurality of different storage means.

48. In an automatically sequenced electronic computer system having data input checking circuits, an asynchronous operated full keyboard assembly, switch means in said keyboard assembly for mechanically storing data set in said keybooard assembly, computer arithmetic circuits, means for electronically reading and storing the mechanically stored data in to said computer arithmetic circuits, and comparison means coupled to said computer arithmetic circuits and to said reading and storing means to make a comparison of data read a second time from the mechanically stored data in said keyboard switch means with the electronically stored data from said computer arithmetic circuits.

49. An electronic digital computer input system for simultaneously printing and comparing information comprising in combination, a mechanical printer having an asynchronous operating cycle, switch means in the printer operable during an asynchronous printing operating cycle to store the information printer, scanning means in the computer connected to said switch means for producing electrical signals representative of information stored in said switch means, matrix means connected to said switch means for receiving and converting said electrical signals into computer signals, storage means connected to said matrix means for storing the computer signals, comparison means connected to said matrix means and said storage means for comparing converted electrical signals from said switch means with said stored computer signals, and means responsive to the comparison to provide a keyboard check alarm signal.

50. In an electronic digital computer programmed for performing a sequence of predetermined instruction operation, means for automatically sequencing the computer through a series of instruction operation steps, computer instruction circuits actuated by said sequencing means for automatically directing different computer instruction operations, an electromechanical stepping switch coupled for actuation by one of said instruction circuits, said stepping switch being settable for coincidence at a predetermined numerical level, and circuit means responsive to said stepping switch at said predetermined numerical level for interrupting the means for automatic sequencing, said circuit means including transfer circuit means whereby the program sequence is transferred to a different instruction operation other than the next sequential operation.

51. An electronic digital computer system having data input checking circuits, a manually operable full keyboard for holding keyset digit information, switch means in said keyboard for mechanically storing digits of data representative of said keyset digit information, automatic electronic scanning circuits for sequentially scanning said switch means, an electronic counter presettable by said scanner to represent said digits of data, computer arithmetic circuits coupled to said counter for receiving and storing said digits of data, and comparison means including said electronic counter coupled to said computer arithmetic circuits and to said switch means for comparing digits of data representative of said keyset digit information with the digits of data stored in said computer arithmetic circuits.

52. In a pulse coded decimal electronic computer system comprising in combination, computer arithmetic circuits for storing a word comprising a plurality of pulse coded decimal digits to be added to a second word, said arithmetic circuits including a pair of alternately selectable decade counters coupled to form a pulse count adder, memory storage circuits for storing a second word comprising a plurality of pulse coded decimal digits, sign comparison circuits comprising a pair of flip flops for storing the sign of the first and second word, input circuits coupled to said arithmetic circuits and to said memory storage circuits for setting one of said sign flip flops with the sign digits and gating the remainder of the words into the computer arithmetic circuits, and complementing means responsive to unlike signs of said sign comparison flip flops for complementing the second word at the output of the memory storage circuits and adding a precarry pulse to said input circuits, whereby addition of negative numbers are processed in absolute form in a single cycle pass through the arithmetic circuits.

53. In an electronic computer system, pinboard means for programming said computer for automatic sequential step by step operation, said computer being responsive to instructions pinned in said pinboard, manual control means connected to said pinboard means for programming any one of said pinboard instructions, means responsive to a particular instruction pinned in said pinboard for interrupting the automatic sequential step by step operation of said pinboard instructions and transferring instruction to said manual control means, and computer state control circuits for returning instruction control to said pinboard means automatically upon completion of an instruction set in said manual control means.

54. In an automatically sequenced electronic computer, external program selection means for specifying different instruction operations to be performed upon data located in memory addresses, said program selection means comprising a matrix array of rows and columns of conductors adapted for interconnection by insertion of a pin in defined matrix positions, a series of stepping switches operable to scan the matrix rows in step by step fashion, a further stepping switch means for scanning the memory address portion of a program instruction and being settable to a predetermined numerical level, means coupled to said stepping switches and operable by the computer for reading a new instruction into said computer when scanned by said stepping switches, one of said instructions being operable to step said further stepping switch means, and a special computer control circuit set up to divert the step by step operation of said stepping switches when said stepping switch means reaches the predetermined numerical level.

55. In an electronic computer system for checking printed output including in combination, an asynchronous output printing means having its own timing cycle for printing data stored in said computer, mechanical switch means operably set during a printing cycle to represent data being printed by said printer, means for converting the setting of said mechanical switch means into electrical signals representative of data printed, and electronic comparison means for comparing data stored in said computer with said electrical signals to verify that data stored in the computer was correctly printed by said printer.

56. In an electronic computer as defined in claim 13 wherein said timing circuits include, an electronic discharge device coupled to fix the position of said print bars by creating said rack stop signals, and gating means in the computer for simultaneously discharging the electronic discharge devices for certain print bars in which the same data information is to be printed out.

57. In an electronic computer system for storing and identifying stored digit data, a serial pulse count adder comprising two alternately operable decade counters which store pulses representative of a digit, a recirculating arithmetic loop coupled to the input and the output of said adder for storing further digits, a presettable electronic counter operable in timed synchronism with said serial pulse count adder, coincidence gating means coupled with said presettable electronic counter and the output of said adder to give an output signal upon coincidence, and computer timing circuits for synchronously timing said counter and said adder whereby digits preset in said electronic counter create output signals representative of stored digits at said coincidence gating means when the preset output condition coincides with the digit pulses leaving the output of the adder.

58. In an electronic computer system including a mechanical printer having storage means for sequentially presenting decimal digit positions during a print cycle, electronic circuit means in the computer system for converting stored numeric information into decimal pulse count notation represented by a decimal word of several serially presented decimal digits, electronic scanning circuit means comprising a series of bistable devices coupled for binary counting of timing pulses, each bistable device having output leads for identifying respective counts representing the successive digits of a word, a decoding matrix serving to clear and rest the scanner for immediate operation with the next count after a count through all digits of a word, and gating circuit means operable by the scanning means for matching digits derived in the computer circuit means with the presentation of digits from said mechanical printer.

59. In an electronic computer having an electro-mechanical format controlled printer coupled as a read out means the combination comprising, an electro-mechanical printer having a format control means integral thereto, a plurality of actuation means in said printer each for selecting a different mode of format control, an electronic computer having electrical pulses indicative of data stored therein, print bars in said printer, said actuation means in said printer being under control of said computer for causing said printer to raise said print bars to one of a plurality of printing positions, solenoid means in said printer for restraining said print bar in one of said plurality of print positions, and thyratron gating means in said computer energized by said electrical pulses indicative of data stored therein for causing said solenoid means to engage said print bars in a print position indicative of data stored in said computer, whereby information is read out of said computer and printed by said printer in one of a plurality of formats.

60. In an electronic computer having an electro-mechanical printer coupled as a visual printing output means, an electro-mechanical printer having movable print bars representative of data, an electronic computer having electrical pulses indicative of data stored therein, means in the printer under control of the computer causing said printer to move said print bars to a plurality of print positions, solenoid print bar stop means in said printer engageable with said print bars by said computer for restraining said print bars in one of said plurality of print positions, a parallel array of switches engageable by a special one of said print bars by means of different voltage levels, and thyratron gating means in said computer energized by said electrical pulses indicative of data stored in the computer and the coincidence of a voltage level from said parallel array of switches indicative of identical data designation being presented by said print bars in said printer for causing said solenoid print bar stop means to engage said print bar in a print position indicative of data stored in said computer.

61. In a computing device according to claim 60 wherein there is further provided an electronic scanner which acts to select a particular thyratron for co-action with a particular print bar, whereby a plurality of digits of said stored data are distributed to a like plurality of print bars.

62. In a computing device according to claim 61 wherein there is further provided a ten position switch for each print bar which is set to a position indicative of the data printed by its respective print bar, said computer being provided with a decade counter set by means of said scanner co-acting with said ten position switches, whereby said stored electrical pulses are compared with the output of said counter pulse by pulse to determine if said data stored in said computer was correctly printed by said printer.

63. In an electronic computing system having an external program means comprising, a first manual set program comprising a plurality of program pinboards having columns and rows selectively interconnected by pins, computer operational circuits actuated by voltage signals from said pinboards, said operational circuits being electrically connected to said columns, distributor switch means having a voltage source for energizing one of said computer operational circuits, a series of stepping switches one for each pinboard operable by said computer, said steps of said stepping switches being connected to individual ones of said rows of said pinboards, one of said stepping switches being selectively energized by said distributor switch, and an electronic interlock circuit connected to said stepping switches to deenergize the voltage supplied by said distributor switch means when said stepping switch is stepping.

64. In an electronic system according to claim 63 wherein there is provided a second manual set program means for selectively energizing said computer operational circuits and disabling said first program means.

65. In an automatic sequenced electronic decimal pulse count computer for performing multiplication by over and over addition, a dynamic arithmetic register for storing a data product, a one-digit decimal counter for producing output signals for a specified count representative of the number of arithmetic operations desired, means for operating the computer in serial states including an idling state occurring between arithmetic additions, timing means for clearing the one-digit decimal counter during an idling state and returning the computer operation to an addition serial state, scanner circuit means for counting the counter in response to the complement of the pulse count representative of a multiplier digit during an idling state, and means responsive to the output of the decimal counter to produce a data product in said arithmetic register.

66. In an automatic sequenced electronic decimal pulse count computer for performing division by over and over subtraction, a dynamic arithmetic register for storing the dividend data and the remainder, a one-digit decimal counter for counting each quotient digit and for producing output signals for a count representative of the arithmetic operations performed, means for operating the computer in serial states including an idling state occurring between arithmetic subtractions, timing means for counting out the one-digit decimal counter during an idling state and returning the computer to a subtraction serial state, scanning circuit means for gating the output of said counter to the quotient storage means, and means responsive to the sign of the remainder in the arithmetic register for determining the count of the quotient digit in the decimal counter.

67. In an electronic pulse count decimal computer, a serial dynamic arithmetic register having decimal digits stored as groups of pulses in equal number to the individual digits, an amplifying output for the output of said arithmetic register providing a means of inverting said stored pulses, timing means for gating with said amplifying output for forming a nines complement of said arithmetic register output, a one digit decimal counter, said counter being counted to the nines complement of a desired digit to be read out of the arithmetic register, and gating means for comparing said amplifying output with the output of said counter and producing an output upon coincidence.

References Cited in the file of this patent

UNITED STATES PATENTS

| | | |
|---|---|---|
| 155,604 | Wooton | Oct. 6, 1874 |
| 247,979 | Wooton | Oct. 4, 1881 |
| 1,705,993 | Oswald | Mar. 19, 1929 |
| 1,723,911 | Barton | Aug. 6, 1929 |
| 2,056,361 | Mills | Oct. 6, 1936 |
| 2,330,948 | Brand | Oct. 5, 1943 |
| 2,332,755 | Robertson | Oct. 26, 1943 |
| 2,528,394 | Sharpless | Oct. 31, 1950 |
| 2,540,654 | Cohen | Feb. 6, 1951 |
| 2,604,262 | Phelps | July 22, 1952 |
| 2,624,508 | Dickenson | Jan. 6, 1953 |
| 2,634,052 | Bloch | Apr. 7, 1953 |
| 2,636,672 | Hamilton | Apr. 28, 1953 |
| 2,638,542 | Fleming | May 12, 1953 |
| 2,641,407 | Dickenson | June 9, 1953 |
| 2,679,356 | Briers | May 25, 1954 |
| 2,679,638 | Bensky et al. | May 25, 1954 |
| 2,682,995 | Carey | July 6, 1954 |
| 2,686,299 | Eckert | Aug. 10, 1954 |
| 2,698,427 | Steele | Dec. 28, 1954 |
| 2,700,504 | Thomas | Jan. 25, 1955 |
| 2,700,755 | Burkhart | Jan. 25, 1955 |
| 2,703,201 | Woods-Hill | Mar. 1, 1955 |
| 2,737,342 | Nelson | Mar. 6, 1956 |
| 2,749,037 | Stibitz | June 5, 1956 |
| 2,792,991 | DiCambio | May 21, 1957 |
| 2,793,806 | Lindesmith | May 28, 1957 |
| 2,800,539 | Edminster et al. | July 23, 1957 |
| 2,818,322 | Blakely | Dec. 31, 1957 |
| 2,822,752 | Bradshaw et al. | Feb. 11, 1958 |
| 2,827,623 | Ainsworth | Mar. 18, 1958 |
| 2,850,232 | Hagen et al. | Sept. 2, 1958 |
| 2,878,892 | Burns et al. | Mar. 24, 1959 |
| 2,910,235 | Southard | Oct. 27, 1959 |
| 2,954,166 | Eckdahl et al. | Sept. 27, 1960 |

FOREIGN PATENTS

| | | |
|---|---|---|
| 1,078,431 | France | May 12, 1954 |
| 709,407 | Great Britain | May 26, 1954 |
| 1,084,147 | France | June 30, 1954 |

OTHER REFERENCES

A Functional Description of the Edvac, The University of Pennsylvania, Moore School of Electrical Engineering, Philadelphia, Pa., vol. I, pp. 3–29, 3–30, 4–13 to 4–16, 4–40, 4–41, vol. I, FIG. 104–3LD–2, Oct. 7, 1949.

UNITED STATES PATENT OFFICE
CERTIFICATE OF CORRECTION

Patent No. 3,053,449 September 11, 1962

George G. Hoberg et al.

It is hereby certified that error appears in the above numbered patent requiring correction and that the said Letters Patent should read as corrected below.

Column 11, line 61, for "this" read -- thus --; column 21, line 22, after "previous" insert -- storage --; line 73, for "eight" read -- eighth --; column 25, line 24, for "through" read -- throughout --; line 39, before "10's" insert -- the --; column 36, line 29, for "FIS." read -- FIGS. --; column 37, line 49, for "or" read -- of --; column 38, line 63, for "35" read -- 35a --; column 42, second table, column 2, line 9 thereof, for "SD" read -- SDO --; column 43, in the table, second column, line 4 thereof, for "AD2" read -- set AD2 --; column 44, line 16, for "as" read -- at --; same column 44, in the table, second column, line 4 thereof, for "W(VI-9)" read -- W(VI=9) --; column 51, in the table, second column, line 26 thereof, for "W.≠AD4." read -- W.~AD4. --; column 54, in the table, second column, line 16 thereof, for "(VI-9)" read -- (VI=9) --; column 55, line 42, for "switch" read -- switches --; column 67, line 19, beginning with "44. A system as defined" strike out all to and including "plurality of columns." in line 31, same column 67; columns 67 to 71, claims 45 through 67 should be renumbered as claims 44 through 66; in the heading to the printed specification, line 9, for "67 Claims." read -- 66 Claims. --.

Signed and sealed this 5th day of February 1963.

(SEAL)
Attest:

ERNEST W. SWIDER
Attesting Officer

DAVID L. LADD
Commissioner of Patents